US011979343B2

(12) United States Patent
Lin et al.

(10) Patent No.: US 11,979,343 B2
(45) Date of Patent: May 7, 2024

(54) DATA TRANSMISSION METHOD AND APPARATUS

(71) Applicant: HUAWEI TECHNOLOGIES CO., LTD., Shenzhen (CN)

(72) Inventors: Wei Lin, Shenzhen (CN); Yang Yang, Chengdu (CN); Min Yan, Shenzhen (CN); Qian Wang, Shenzhen (CN); Xiaohu Tang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 326 days.

(21) Appl. No.: 17/536,294

(22) Filed: Nov. 29, 2021

(65) Prior Publication Data

US 2022/0085927 A1 Mar. 17, 2022

Related U.S. Application Data

(63) Continuation of application No. PCT/CN2020/081007, filed on Mar. 25, 2020.

(30) Foreign Application Priority Data

May 30, 2019 (CN) ......................... 201910464530.4

(51) Int. Cl.
*H04L 5/00* (2006.01)
*H04L 25/02* (2006.01)
*H04W 80/02* (2009.01)

(52) U.S. Cl.
CPC ............ *H04L 5/001* (2013.01); *H04L 5/0094* (2013.01); *H04L 25/0204* (2013.01); *H04W 80/02* (2013.01)

(58) Field of Classification Search
None
See application file for complete search history.

(56) References Cited

U.S. PATENT DOCUMENTS

2019/0132034 A1* 5/2019 Yun ...................... H04B 7/0421
2019/0190637 A1* 6/2019 Lomayev ................ H04L 27/26

(Continued)

FOREIGN PATENT DOCUMENTS

CN 109150769 A 1/2019
WO 2018006660 A1 1/2018

(Continued)

OTHER PUBLICATIONS

Yang Liu, Channel Estimate Training Sequence Design and Application in Millimeter Wave Mimo Communication System, Southwest Jiaotong University, Issue 09, 2018, with an English Abstract, total 90 pages.

(Continued)

*Primary Examiner* — Otis L Thompson, Jr.
(74) *Attorney, Agent, or Firm* — Rimon PC

(57) ABSTRACT

This application discloses a method including a transmit end that generates and sends a physical layer protocol data unit (PPDU), and a receive end that receives the PPDU and parses the PPDU. An enhanced directional multi-gigabit (EDMG) modulation field in the PPDU includes a channel estimation field (CEF), the CEF includes a CEF sequence, and a length of the CEF sequence is m, where m is determined based on a quantity of bonding channels and a quantity of subcarriers included on a channel. When a discrete Fourier transform-spread-orthogonal frequency division multiplexing (DFT-S-OFDM) technology is introduced into a 60 GHz WLAN standard, an applied CEF sequence included in a CEF can be determined, and DFT-S-OFDM transmission is further performed by using the CEF sequence. In this way, a PAPR of a WLAN system can be reduced while frequency division multiplexing for a plurality of users is supported.

16 Claims, 10 Drawing Sheets

(56) References Cited

U.S. PATENT DOCUMENTS

| | | | | |
|---|---|---|---|---|
| 2019/0273535 | A1* | 9/2019 | Yun | H04B 7/0634 |
| 2021/0028831 | A1* | 1/2021 | Lou | H04B 7/0452 |
| 2021/0288741 | A1* | 9/2021 | Lin | H04L 27/2614 |

FOREIGN PATENT DOCUMENTS

| | | | |
|---|---|---|---|
| WO | 2018175722 | A1 | 9/2018 |
| WO | WO-2019014264 | A1 * | 1/2019 |

OTHER PUBLICATIONS

IEEE Std 802.11adTM-2012, IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band Sponsor LAN/MAN Standards Committee of the IEEE Computer Society, Approved Oct. 19, 2012, total 628 pages.

IEEE P802.11ax/D2.2, Feb. 2018, Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN, total 620 pages.

IEEE P802. 11ay/D2.0, Jul. 2018, P802.11ay /D2.0, Draft Standard for Information Technology—Telecommunications and Information Exchange Between System—Local and Metropolitan Area Networks Specific Requirements—Part 11: Wireless LAN Medium Access Control (MAC) and Physical Layer (PHY) Specifications—Amendment 7: Enhanced throughput for operation in license-exempt bands above 45 GHZ, total 673 pages.

* cited by examiner

Sequence 1

| | | | |
|---|---|---|---|
| 3.0103 | 3.0103 | 3.0103 | 3.0103 |
| 3.0000 | | 3.0000 | |
| 3.0103 | | | |

Sequence 2

| | | |
|---|---|---|
| 4.2045 | | 3.0103 |
| 3.0103 | 5.2169 | |
| 3.0103 | 2.9760 | 3.0103 |

Sequence 3

| | | | |
|---|---|---|---|
| 3.0103 | 3.0103 | 3.0103 | 3.0103 |
| 3.0085 | | 3.0085 | |
| 3.0103 | | | |

Sequence 4

| | | |
|---|---|---|
| 4.2508 | | 3.0103 |
| 3.0103 | 5.2212 | |
| 3.0103 | 2.9861 | 3.0103 |

Sequence 5

| | | | |
|---|---|---|---|
| 3.0103 | 3.0103 | 3.0103 | 3.0103 |
| 2.9744 | | 2.9744 | |
| 3.0103 | | | |

Sequence 6

| | | |
|---|---|---|
| 4.2045 | | 3.0103 |
| 3.0103 | 5.2212 | |
| 3.0103 | 2.9979 | 3.0103 |

Sequence 7

| | | | |
|---|---|---|---|
| 3.0103 | 3.0103 | 3.0103 | 3.0103 |
| 3.0100 | | 3.0100 | |
| 3.0103 | | | |

Sequence 8

| | | |
|---|---|---|
| 4.2570 | | 3.0103 |
| 3.0103 | 5.1632 | |
| 3.0103 | 3.0018 | 3.0103 |

FIG. 8

Sequence 1

<table>
<tr><td>3.0103</td><td>3.0103</td><td>3.0103</td><td>3.0103</td></tr>
<tr><td colspan="2">3.0073</td><td colspan="2">3.0073</td></tr>
<tr><td>3.0103</td><td colspan="2">3.0013</td><td>3.0103</td></tr>
<tr><td colspan="3">5.2279</td><td>3.0103</td></tr>
<tr><td>3.0103</td><td colspan="3">4.2339</td></tr>
<tr><td colspan="4">3.0103</td></tr>
</table>

Sequence 2

<table>
<tr><td>3.0103</td><td>3.0103</td><td>3.0103</td><td>3.0103</td></tr>
<tr><td colspan="2">3.0073</td><td colspan="2">3.0073</td></tr>
<tr><td>3.0103</td><td colspan="2">3.0013</td><td>3.0103</td></tr>
<tr><td colspan="3">4.2339</td><td>3.0103</td></tr>
<tr><td>3.0103</td><td colspan="3">5.2279</td></tr>
<tr><td colspan="4">3.0103</td></tr>
</table>

Sequence 3

<table>
<tr><td>3.0103</td><td>3.0103</td><td>3.0103</td><td>3.0103</td></tr>
<tr><td colspan="2">3.0013</td><td colspan="2">3.0013</td></tr>
<tr><td>3.0103</td><td colspan="2">3.0073</td><td>3.0103</td></tr>
<tr><td colspan="3">5.2210</td><td>3.0103</td></tr>
<tr><td>3.0103</td><td colspan="3">4.2339</td></tr>
<tr><td colspan="4">3.0103</td></tr>
</table>

Sequence 4

<table>
<tr><td>3.0103</td><td>3.0103</td><td>3.0103</td><td>3.0103</td></tr>
<tr><td colspan="2">3.0013</td><td colspan="2">3.0013</td></tr>
<tr><td>3.0103</td><td colspan="2">3.0073</td><td>3.0103</td></tr>
<tr><td colspan="3">4.2339</td><td>3.0103</td></tr>
<tr><td>3.0103</td><td colspan="3">5.2210</td></tr>
<tr><td colspan="4">3.0103</td></tr>
</table>

Sequence 5

<table>
<tr><td>3.0103</td><td>3.0103</td><td>3.0103</td><td>3.0103</td></tr>
<tr><td colspan="2">3.0073</td><td colspan="2">3.0073</td></tr>
<tr><td>3.0103</td><td colspan="2">3.0013</td><td>3.0103</td></tr>
<tr><td colspan="3">5.2210</td><td>3.0103</td></tr>
<tr><td>3.0103</td><td colspan="3">4.2565</td></tr>
<tr><td colspan="4">3.0103</td></tr>
</table>

Sequence 6

<table>
<tr><td>3.0103</td><td>3.0103</td><td>3.0103</td><td>3.0103</td></tr>
<tr><td colspan="2">3.0073</td><td colspan="2">3.0073</td></tr>
<tr><td>3.0103</td><td colspan="2">3.0013</td><td>3.0103</td></tr>
<tr><td colspan="3">4.2565</td><td>3.0103</td></tr>
<tr><td>3.0103</td><td colspan="3">5.2210</td></tr>
<tr><td colspan="4">3.0103</td></tr>
</table>

Sequence 7

<table>
<tr><td>3.0103</td><td>3.0103</td><td>3.0103</td><td>3.0103</td></tr>
<tr><td colspan="2">3.0013</td><td colspan="2">3.0013</td></tr>
<tr><td>3.0103</td><td colspan="2">3.0073</td><td>3.0103</td></tr>
<tr><td colspan="3">5.2279</td><td>3.0103</td></tr>
<tr><td>3.0103</td><td colspan="3">4.2565</td></tr>
<tr><td colspan="4">3.0103</td></tr>
</table>

Sequence 8

<table>
<tr><td>3.0103</td><td>3.0103</td><td>3.0103</td><td>3.0103</td></tr>
<tr><td colspan="2">3.0013</td><td colspan="2">3.0013</td></tr>
<tr><td>3.0103</td><td colspan="2">3.0073</td><td>3.0103</td></tr>
<tr><td colspan="3">4.2565</td><td>3.0103</td></tr>
<tr><td>3.0103</td><td colspan="3">5.2279</td></tr>
<tr><td colspan="4">3.0103</td></tr>
</table>

FIG. 9

DATA TRANSMISSION METHOD AND APPARATUS

CROSS-REFERENCE TO RELATED APPLICATIONS

This application is a continuation of International Application No. PCT/CN2020/081007, filed on Mar. 25, 2020, which claims priority to Chinese Patent Application No. 201910464530.4, filed on May 30, 2019. The disclosures of the aforementioned applications are hereby incorporated by reference in their entireties.

TECHNICAL FIELD

The present disclosure generally relates to the field of communications technologies, and in particular, to a data transmission method and an apparatus.

BACKGROUND

Standards applied to wireless local area network (WLAN) communication are generally within the institute of electrical and electronic engineers (IEEE) 802.11 family standards. The 802.11n/ac standard is a widely applied standard in the IEEE 802.11 family standards, and the standard operates on 2.4/5 GHz frequency bands. In addition, IEEE 802.11ax/ad/ay standards have been developed over time to improve communication throughput and reduce power consumption. A carrier corresponding to the IEEE 802.11ad/ay standard is in a frequency of 60 GHz, and the bandwidth may be relatively large. Therefore, using the IEEE 802.11ad/ay standard may have advantages such as having a high rates (e.g., such as high data rates).

In addition, during WLAN communication, an orthogonal frequency division multiplexing (OFDM) technology may be generally used. By using the OFDM technology, a transmit end may modulate, to several mutually orthogonal subcarriers, information that needs to be transmitted to a receive end. Parallel transmission is performed on the subcarriers, so that information transmission efficiency can be improved. In addition, WLAN communication may alternatively be communication conducted in a single carrier mode.

However, conventional OFDM technologies may have a disadvantage of a relatively high peak to average power ratio (PAPR), where this disadvantage reduces utilization of transmit power. Particularly, in a WLAN communication process in which a carrier is 60 GHz, if conventional OFDM technology is used, the disadvantage of a high PAPR has a more obvious impact on WLAN communication. In addition, when WLAN communication is performed by using a single carrier, frequency division multiplexing for a plurality of users cannot be supported. This reduces transmission efficiency in WLAN communication.

SUMMARY

To resolve conventional-technology problems which cause a peak to average power ratio (PAPR) to be high when WLAN communication is performed by using an OFDM technology, and frequency division multiplexing for a plurality of users cannot be supported when WLAN communication is performed by using a single carrier, embodiments of this application disclose a data transmission method and an apparatus.

According to a first aspect, an embodiment of this application discloses a data transmission method, including a transmit end that generates a physical layer protocol data unit (PPDU); and the transmit end sends the PPDU.

An enhanced directional multi-gigabit (EDMG) modulation field in the PPDU that includes a channel estimation field (CEF), the CEF includes a CEF sequence, and a length of the CEF sequence is m, where m is determined based on a quantity of bonding channels and a quantity of subcarriers included on a channel.

According to the foregoing method, the transmit end can determine the PPDU including the CEF sequence and send the PPDU to the receive end, and the receive end can obtain the CEF sequence, so that the transmit end communicates with the receive end based on the CEF sequence by using a discrete Fourier transform-spread-OFDM (DFT-S-OFDM) technology.

According to a second aspect, an embodiment of this application discloses a data transmission method, including: a receive end receives a PPDU; and the receive end parses the PPDU.

An EDMG modulation field in the PPDU includes a CEF, the CEF includes a CEF sequence, and a length of the CEF sequence is m, where m is determined based on a quantity of bonding channels and a quantity of subcarriers included on a channel.

According to the foregoing method, the receive end can obtain the CEF sequence, to communicate with a transmit end based on the CEF sequence by using a DFT-S-OFDM technology.

According to a third aspect, an embodiment of this application discloses a data transmission apparatus used for a transmit end, and the data transmission apparatus includes units configured to perform the method according to the first aspect of this application.

According to a fourth aspect, an embodiment of this application discloses a data transmission apparatus used for a receive end, and the data transmission apparatus includes units configured to perform the method according to the second aspect of this application.

According to a fifth aspect, an embodiment of this application discloses a data transmission apparatus, including a processor and a transceiver, where the processor and the transceiver communicate with each other through an internal connection; and the processor is configured to perform processing steps in the method according to the first aspect of this application, and the transceiver is configured to perform transceiving steps in the method according to the second aspect of this application; or the processor is configured to perform processing steps in the method according to the first aspect of this application, and the transceiver is configured to perform transceiving steps in the method according to the second aspect of this application.

According to a sixth aspect, an embodiment of this application discloses a data transmission apparatus, including a processing circuit, an input interface, and an output interface, where the processing circuit, the input interface, and the output interface communicate with each other through an internal connection; the input interface is configured to obtain to-be-processed information of the processing circuit; the processing circuit is configured to perform the method according to the first aspect of this application or the method according to the second aspect of this application, to process the to-be-processed information; and the output interface is configured to output information processed by the processing circuit.

According to a seventh aspect, an embodiment of this application discloses a computer-readable storage medium, where the computer-readable storage medium is configured to store a computer program, and the computer program includes instructions used to perform the method according to the first aspect of this application, or the computer program includes instructions used to perform the method according to the second aspect of this application.

According to an eighth aspect, an embodiment of this application discloses a data transmission system, including a transmit end and a receive end, where the transmit end includes the data transmission apparatus according to the third aspect of this application; and the receive end includes the data transmission apparatus according to the fourth aspect of this application.

According to the solutions in the embodiments of this application, when a DFT-S-OFDM technology is introduced into a 60 GHz WLAN standard, an applied CEF sequence in an EDMG modulation field can be determined, and DFT-S-OFDM transmission is further performed by using the CEF sequence. In this way, a PAPR of a WLAN system can be reduced while frequency division multiplexing for a plurality of users is supported.

BRIEF DESCRIPTION OF DRAWINGS

FIG. 1 (*b*) is another schematic diagram of an application scenario according to an embodiment of this application;

FIG. 2 (*b*) is a schematic diagram of a structure of a DFT-S-OFDM receiver according to an embodiment of this application;

FIG. 5 (*b*) is a schematic diagram of another spectrum resource division manner in a data transmission method according to an embodiment of this application;

FIG. 6 (*b*) is a schematic diagram of another subcarrier mapping in a data transmission method according to an embodiment of this application;

FIG. 7 (*b*) is a schematic diagram of another channel resource occupation status in a data transmission method according to an embodiment of this application;

FIG. 8 is a schematic diagram of peak to average power ratios (PAPRs) corresponding to different resource combinations in a data transmission method according to an embodiment of this application;

FIG. 9 is a schematic diagram of PAPRs corresponding to other different resource combinations in a data transmission method according to an embodiment of this application;

DESCRIPTION OF EMBODIMENTS

To resolve conventional-technology problems that a peak to average power ratio (PAPR) is high when wireless local area network (WLAN) communication is performed by using an orthogonal frequency division multiplexing (OFDM) technology, and frequency division multiplexing for a plurality of users cannot be supported when WLAN communication is performed by using a single carrier, embodiments of this application disclose a data transmission method and an apparatus.

The solutions in the embodiments of this application are applied to a scenario in which 60 GHz WLAN communication is performed by using a discrete Fourier transform-spread-orthogonal frequency division multiplexing (DFT-S-OFDM) technology, to obtain a channel estimation field (CEF) sequence in an enhanced directional multi-gigabit (EDMG) modulation field corresponding to the DFT-S-OFDM technology. Due to a DFT-S-OFDM transmission signal generally having a characteristic of a single carrier, a transmission waveform of the DFT-S-OFDM transmission signal has a relatively low PAPR, and the DFT-S-OFDM transmission signal supports frequency multiplexing for a plurality of users. Therefore, the DFT-S-OFDM technology may be introduced into a next-generation 60 GHz WLAN standard, so that the DFT-S-OFDM technology can reduce a PAPR of a WLAN system while supporting frequency division multiplexing for a plurality of users. Correspondingly, how to determine a (CEF sequence in this application scenario becomes an urgent problem to be resolved. According to the solutions in the embodiments of this application, the CEF sequence in the EDMG modulation field in this application scenario can be determined, and data transmission is performed based on the CEF sequence.

The solutions in the embodiments of this application are applied to a data transmission system. The data transmission system includes an access point (AP) and a station (STA), and WLAN communication is performed between the AP and the STA. In addition, a carrier for WLAN communication between the AP and the STA is 60 GHz, and the DFT-S-OFDM technology is used for WLAN communication between the AP and the STA.

Figure 1A:
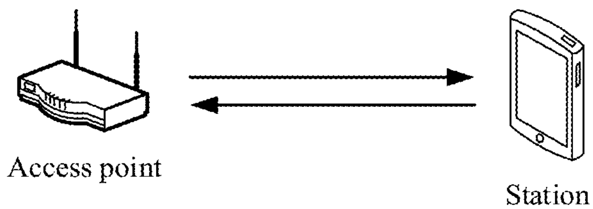
FIG. 1(*a*) is a schematic diagram of an application scenario according to an embodiment of this application.
Figure 1B:
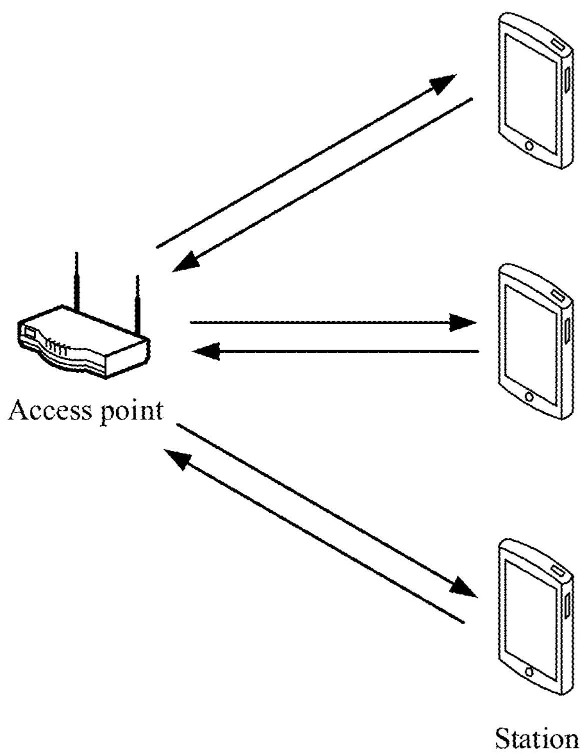

FIG. 1(*a*) shows a scenario that may be applied to WLAN communication between the AP and a single STA. The AP is a transmit end and the STA is a receive end, in other words, the data transmission system may be used for single-user downlink transmission. Alternatively, the STA is a transmit end and the AP is a receive end, in other words, the data transmission system may be used for single-user uplink transmission.

In addition, FIG. 1(*b*) shows a scenario that may be applied to WLAN communication between the AP and a plurality of STAs. The AP is a transmit end and the STAs are receive ends, in other words, the data transmission system may be used for multi-user downlink transmission. Alternatively, the STAs are transmit ends and the AP is a receive end, in other words, the data transmission system may be used for multi-user uplink transmission.

Optionally, the AP may be a network device such as a base station, a router, a switch, or a bridge, and the STA may be user equipment (UE) such as a mobile phone or a computer. This is not limited in the embodiments of this application.

In addition, when WLAN communication is performed by using the DFT-S-OFDM technology, the transmit end in the data transmission system may also be referred to as a DFT-S-OFDM transmitter, and the receive end in the data transmission system may also be referred to as a DFT-S-OFDM receiver.

Figure 2A:
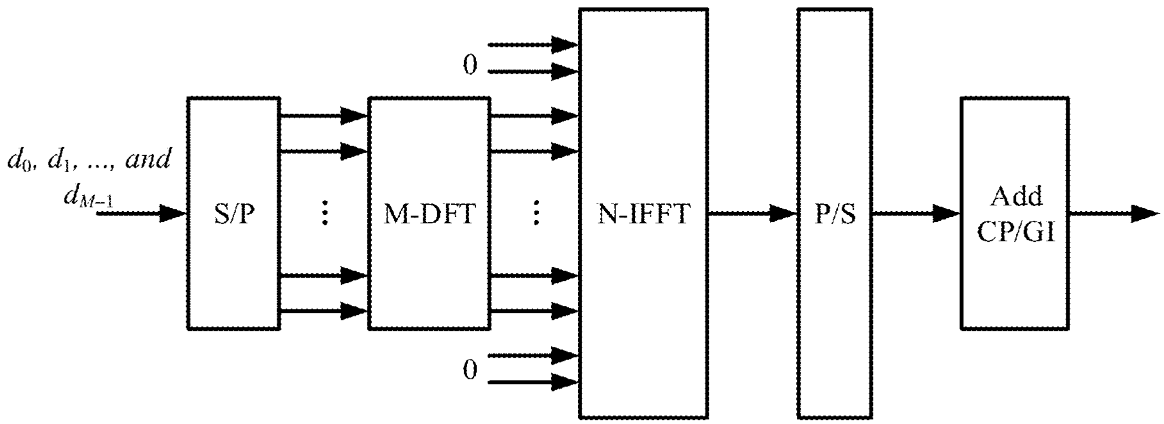
FIG. 2 (*a*) is a schematic diagram of a structure of a discrete Fourier transform-spread-orthogonal frequency division multiplexing (DFT-S-OFDM) transmitter according to an embodiment of this application.
Figure 2B:
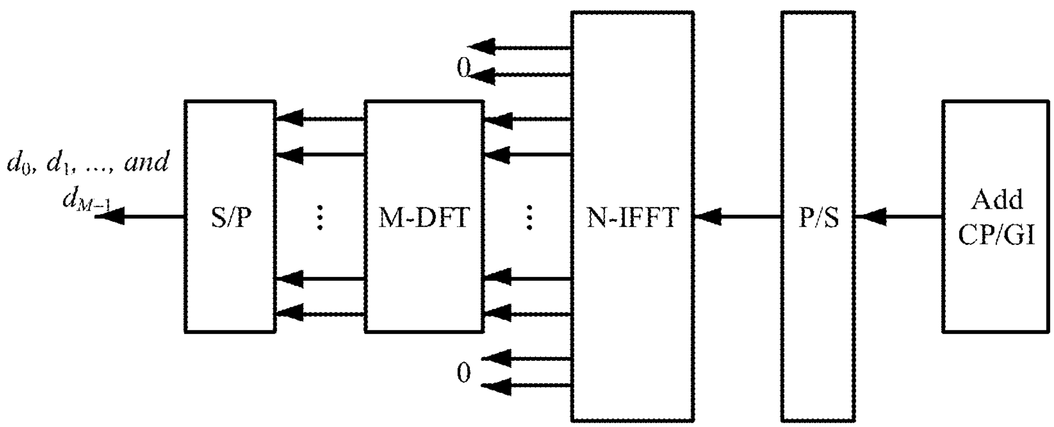

Refer to a schematic diagram of a structure of a DFT-S-OFDM transmitter shown in FIG. 2(*a*) and a schematic diagram of a structure of a DFT-S-OFDM receiver shown in FIG. 2(*b*). In comparison with an OFDM transmitter, in the DFT-S-OFDM transmitter, a discrete Fourier transform (DFT) module is added in front of (e.g., prior to) an inverse fast Fourier transform (IFFT) module. The DFT module is an M-DFT module in FIG. 2(*a*) and FIG. 2(*b*), where M represents a quantity of DFT points. In addition, the IFFT module is an N-IFFT module in FIG. 2(*a*) and FIG. 2(*b*), where N represents a quantity of IFFT points.

When the DFT-S-OFDM transmitter performs WLAN communication with the DFT-S-OFDM receiver, a CEF sequence in an EDMG modulation field may be determined according to the solutions of this application, and the CEF sequence is transmitted to the DFT-S-OFDM receiver. The determined CEF sequence may be mapped to a subcarrier at an input end of the IFFT module of the DFT-S-OFDM transmitter, so that the IFFT module of the DFT-S-OFDM transmitter obtains the CEF sequence. Then, the CEF sequence is transmitted to the DFT-S-OFDM receiver by using the subcarrier. After obtaining the CEF sequence, the DFT-S-OFDM receiver performs channel estimation based on the CEF sequence, and performs equalization, demodulation, and the like on a received signal based on a channel estimation result.

Figure 3:
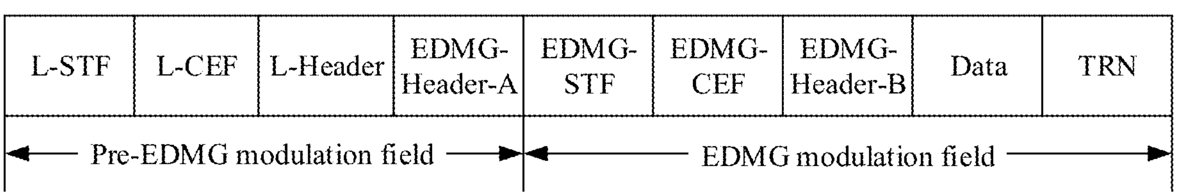
FIG. 3 is a schematic diagram of a frame structure of a physical layer protocol data unit (PPDU) in a 60 GHz wireless local area network (WLAN) standard.

FIG. 3 discloses a schematic diagram of a frame structure of a physical layer protocol data unit (PPDU) in an existing 60 GHz WLAN standard (e.g., IEEE 802.11ay). As shown in FIG. 3, the PPDU includes a pre-enhanced directional multi-gigabit (EDMG) modulation field (Pre-EDMG modulation field) and an EDMG modulation field. The pre-EDMG modulation field includes a legacy short training field (L-STF), a legacy channel estimation field (L-CEF), a legacy header (L-Header), and a header-A (also referred to as EDMG-Header-A). The EDMG modulation field includes a short training field (STF, also referred to as EDMG-STF), a CEF (also referred to as EDMG-CEF), a header-B (also referred to as EDMG-Header-B), a data field, and a training (TRN) field.

For a frame structure of a PPDU applied in the embodiments of this application, refer to FIG. 3. To implement compatibility with a conventional device, an L-CEF part in the PPDU applied in the embodiments of this application may be consistent with the L-CEF in the pre-EDMG modulation field in the PPDU in the existing 60 GHz WLAN standard. However, according to the solutions in the embodiments of this application, a CEF sequence located in the EDMG modulation field is determined. Optionally, the CEF sequence may use another name, for example, may be referred to as a DFT-S-OFDM-CEF (DSO-CEF) sequence, and a name of the CEF sequence is not limited in this application.

To clarify the solutions disclosed in this application, this application discloses the following embodiments.

Figure 4:
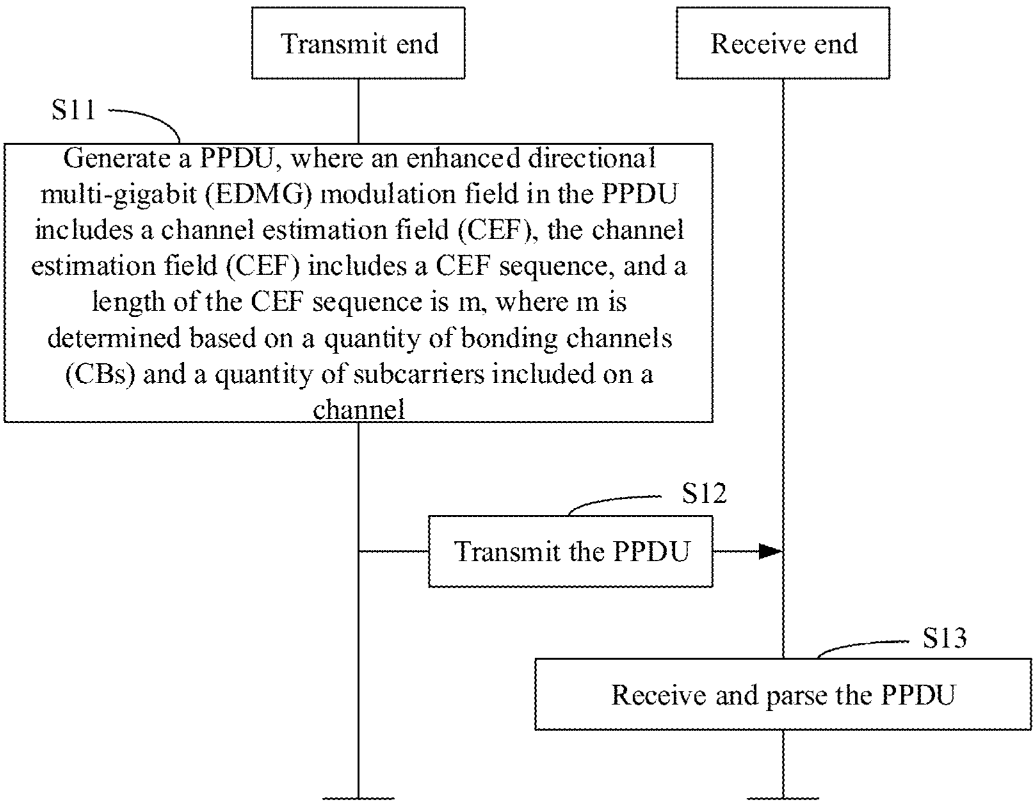
FIG. 4 is a schematic diagram of a working procedure of a data transmission method according to an embodiment of this application.

An embodiment of this application provides a data transmission method. A data transmission system to which the method is applied includes a transmit end and a receive end. A wireless communication connection is established between the transmit end and the receive end. Optionally, the transmit end and the receive end may transmit data on a 60 GHz frequency band by transmitting a PPDU. Refer to a schematic diagram of a working procedure shown in FIG. 4. The data transmission method disclosed in embodiments of this application includes the following steps.

Step S11: The Transmit End Generates a PPDU.

An EDMG modulation field in the PPDU includes a CEF, the CEF includes a CEF sequence, and a length of the CEF sequence is m, where m is determined based on a quantity of bonding channels and a quantity of subcarriers included on a channel.

In embodiments of this application, when the quantity of bonding channels is 1, it indicates that communication is performed through a single channel; or when the quantity of bonding channels is n (where n is a positive integer greater than 1), it indicates that n channels are bound together, and communication is performed through the bonding channels.

In addition, each CEF sequence corresponds to one spatial stream, and the spatial stream refers to a total quantity of data streams transmitted in parallel in space when the transmit end transmits a signal. When a spatial streams are used in a transmission process, there are usually a CEF sequences in the CEF.

Step S12: The Transmit End Sends the PPDU, so that the Receive End Obtains the CEF Sequence.

The transmit end sends the PPDU to the receive end, so that the receive end can obtain the CEF sequence. Optionally, a process in which the transmit end sends the CEF sequence in the PPDU to the receive end may include: performing subcarrier mapping on the CEF sequence, and performing IFFT, and the like on the CEF sequence.

Step S13: The Receive End Receives the PPDU, and the Receive End Phrases the PPDU.

Optionally, after receiving the CEF sequence in the EDMG modulation field of the PPDU, the receive end sequentially performs FFT and subcarrier inverse mapping on the CEF sequence, and then performs channel estimation, and the like.

In an existing OFDM technology, when channel frequency domain resource division is performed, several vacant subcarriers need to be placed at a center of a frequency band, to prevent a direct current component of a signal from affecting a subcarrier at a center of a spectrum, and the direct current component is located at a central position of a single subcarrier at the center of the frequency band.

However, in embodiments of this application, when frequency domain resource division is performed, no vacant subcarrier is placed at a center of a spectrum, to maintain a single carrier property and avoid increasing a PAPR. In other words, in embodiments of this application, when frequency domain unit division is performed, subcarriers at the center of the frequency band are mapped to frequency domain units fully, and no vacant subcarrier exists between the subcarriers. In addition, in these cases, the direct current component is located at a central position of two subcarriers at the center of the frequency band.

When 60 GHz WLAN communication is performed, a width of each channel is 2.16 gigahertz (GHz), and a spectrum resource of each channel may include four resource blocks (RBs).

Figure 5A:
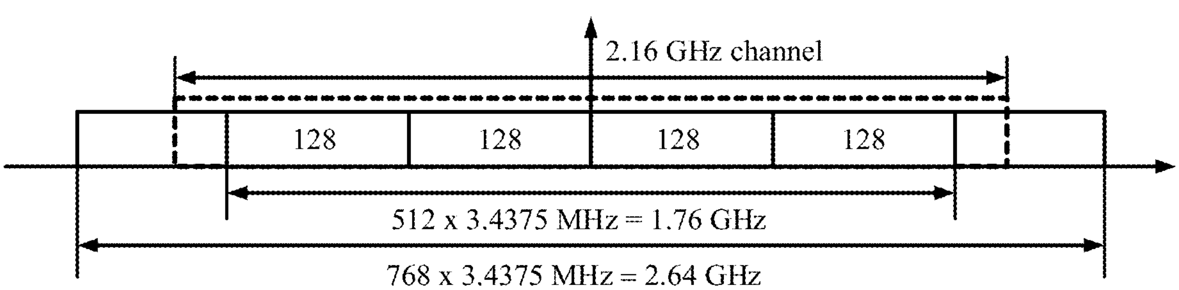
FIG. 5 (*a*) is a schematic diagram of a spectrum resource division manner in a data transmission method according to an embodiment of this application.
Figure 5B:
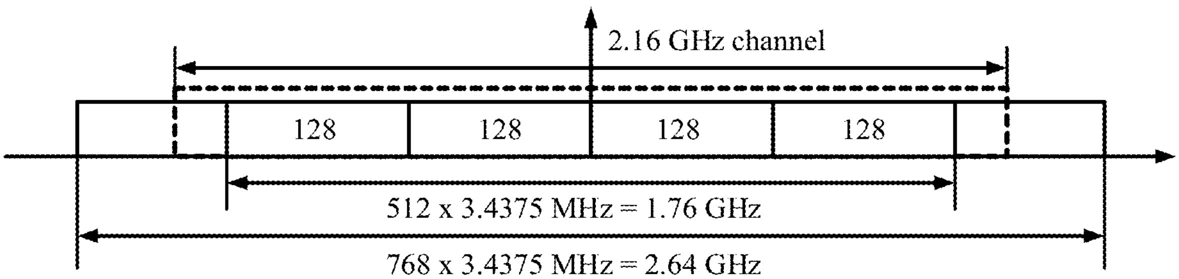

In a feasible division manner, as shown in FIG. 5(*a*), each RB includes 128 subcarriers, a width of each subcarrier is 3.4375 MHz, and a 2.16 GHz channel includes 512 subcarriers in total. In addition, during frequency domain resource division, no vacant subcarrier is placed at a center of a spectrum, and each frequency domain unit obtained through division occupies a central position of a channel, that is, the 512 subcarriers occupy the central position of the channel, and no vacant subcarrier exists between the 512 subcarriers. In addition, a direct current position is a central position of the subcarriers. In FIG. 5(*a*), the direct current position is a position indicated by an arrow.

In the frequency domain resource division manner, a quantity of DFT points is 512, and a quantity of IFFT points is 768. In other words, when the quantity of bonding channels is 1, a DFT module in a DFT-S-OFDM transmitter occupies 1.76 GHz (that is, 512×3.4375 MHz=1.76 GHz) resources at the center of each channel, and an IFFT module occupies 2.64 GHz (that is, 768×3.4375 MHz=2.64 GHz) resources.

Figure 6A:
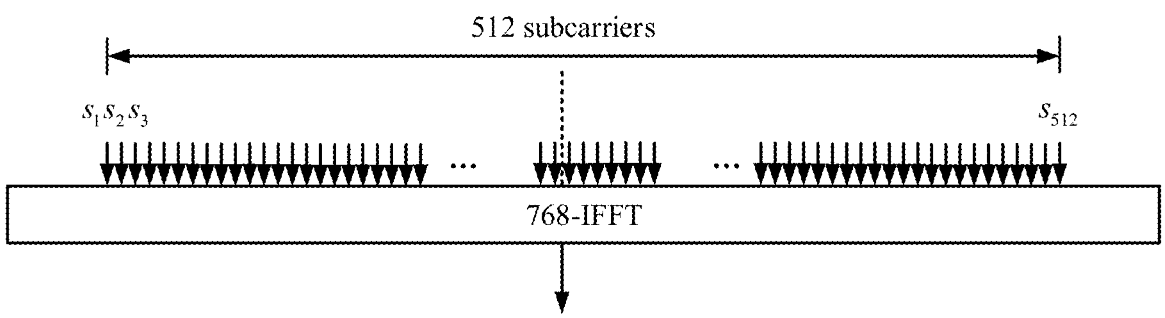
FIG. 6 (*a*) is a schematic diagram of a subcarrier mapping in a data transmission method according to an embodiment of this application.
Figure 6B:
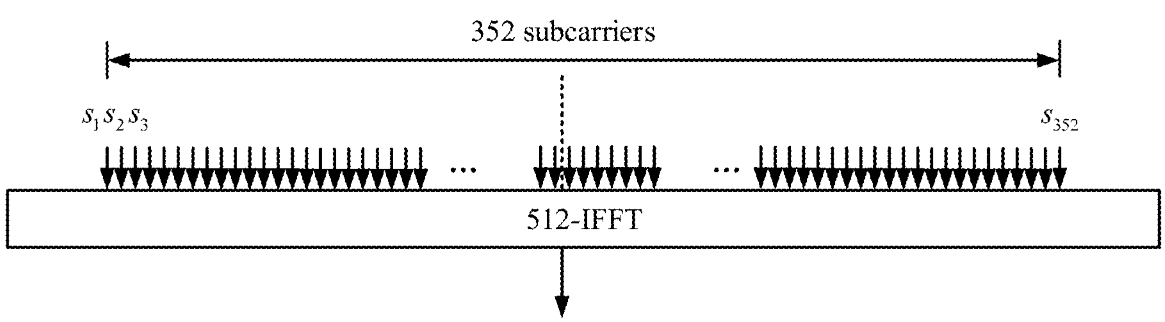

In these cases, when the resources occupied by the DFT module are mapped to the IFFT module and the quantity of bonding channels is 1, a used subcarrier mapping manner is shown in FIG. 6(*a*). In other words, 512 subcarriers are mapped to a central position of subcarriers occupied by the IFFT module, that is, the 512 subcarriers are mapped to central 512 subcarriers of 768 subcarriers occupied by the IFFT module. Correspondingly, when the quantity of bonding channels is n, 512×n subcarriers are mapped to a central position of 768×n subcarriers occupied by the IFFT module, that is, the 512×n subcarriers are mapped to central 512×n subcarriers of the 768×n subcarriers occupied by the IFFT module. In addition, in FIG. 6(*a*), a position indicated by an arrow is a position of the direct current component.

When the quantity of bonding channels is 1, it indicates that WLAN communication is performed through a single 2.16 GHz channel. When the quantity of bonding channels is 2, it indicates that two 2.16 GHz channels are bound together to constitute a 4.32 GHz channel, and WLAN communication is performed through the 4.32 GHz channel. Correspondingly, when the quantity of bonding channels is n, it indicates that n 2.16 GHz channels are bound together to constitute a 2.16×n GHz channel, and WLAN communication is performed through the 2.16×n GHz channel.

In another feasible division manner, as shown in FIG. 5(*b*), each RB includes 88 subcarriers, a width of each subcarrier is 5.15625 MHz, and 2.16 GHz channel includes 352 subcarriers in total. In addition, during frequency domain resource division, no vacant subcarrier is placed at a center of a spectrum, and each frequency domain unit obtained through division occupies a central position of a channel, that is, the 352 subcarriers occupy the central position of the channel, and no vacant subcarrier exists between the 352 subcarriers. In addition, a direct current position is a central position of the subcarriers. In FIG. 5(*b*), the direct current position is a position indicated by an arrow.

In the frequency domain resource division manner, a quantity of DFT points is 352, and a quantity of IFFT points is 512. In other words, the DFT module in the DFT-S-OFDM transmitter occupies 1.815 GHz (that is, 352×5.15625 MHz=1.815 GHz) resources at the center of each channel, and the IFFT module may occupy 2.64 GHz (that is, 512×5.15625 MHz=2.64 GHz) resources.

In these cases, when the resources occupied by the DFT module are mapped to the IFFT module and the quantity of bonding channels is 1, a used subcarrier mapping manner is shown in FIG. 6(*b*). In other words, 352 subcarriers are mapped to a central position of subcarriers occupied by the IFFT module, that is, the 352 subcarriers are mapped to central 352 subcarriers of 512 subcarriers occupied by the IFFT module. Correspondingly, when the quantity of bonding channels is n, 352×n subcarriers are mapped to a central position of 512×n subcarriers occupied by the IFFT module, that is, the 352×n subcarriers are mapped to central 352×n subcarriers of the 512×n subcarriers occupied by the IFFT module. In addition, in FIG. 6(*b*), a position indicated by an arrow is a position of the direct current component.

Figure 7A:
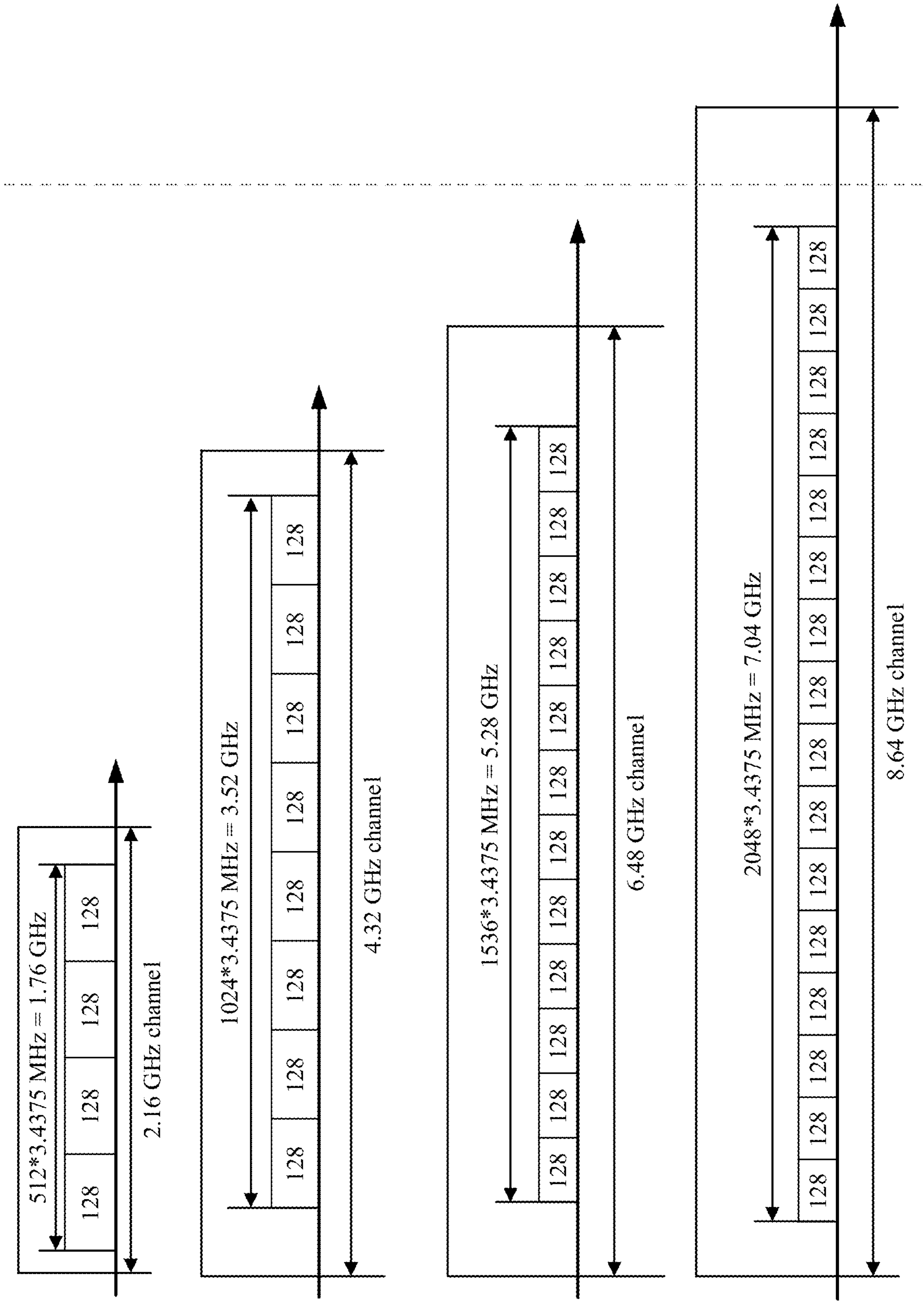
FIG. 7(*a*) is a schematic diagram of a channel resource occupation status in a data transmission method according to an embodiment of this application.
Figure 7B:
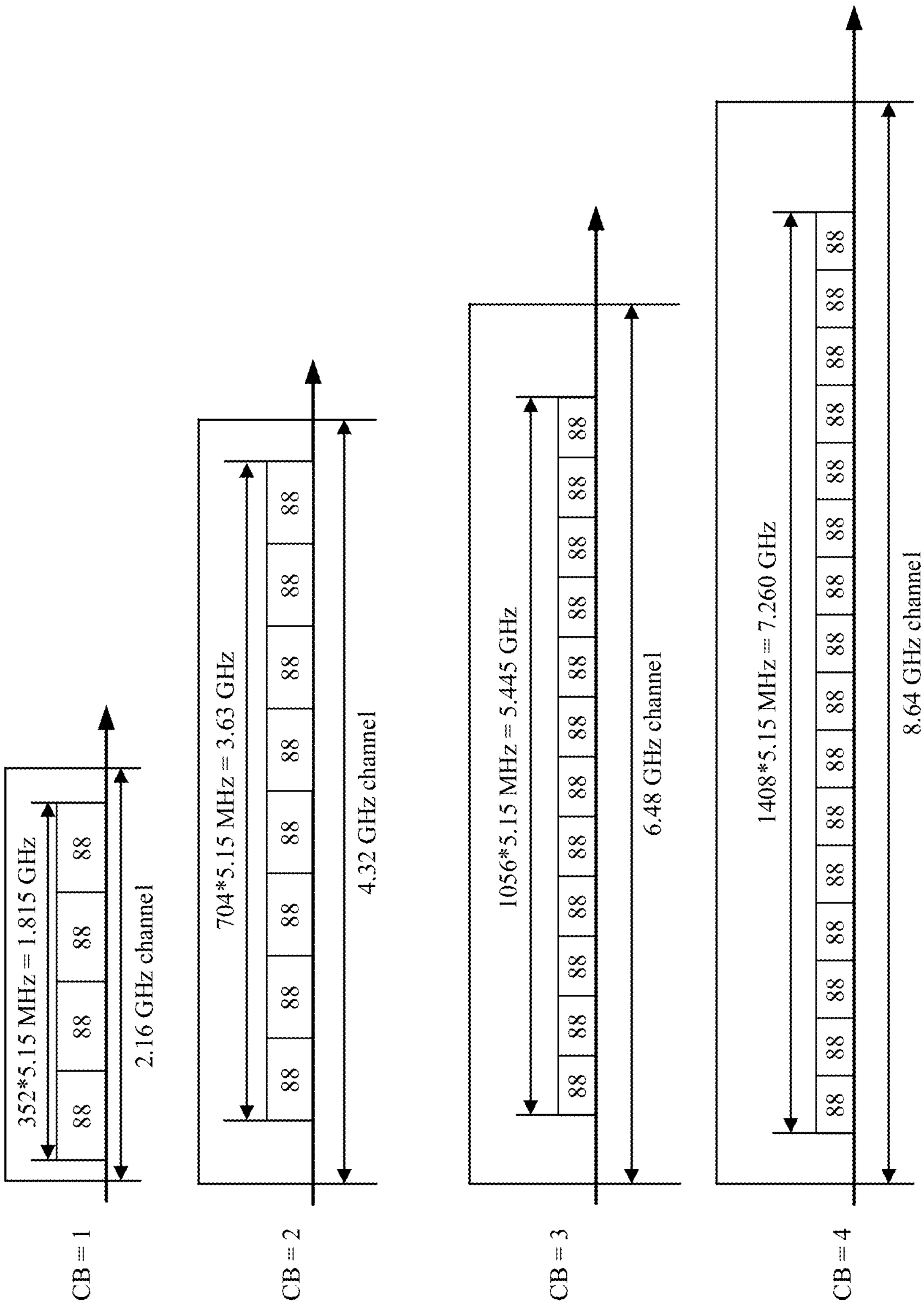

When frequency domain resource division is performed in the first manner, for different quantities of bonding channels, statuses of channel resource occupation by the transmit end are shown in FIG. 7(*a*). When the quantity of bonding channels=1, it indicates that the quantity of bonding channels is 1, that is, one channel is occupied. When the quantity of bonding channels=2, it indicates that the quantity of bonding channels is 2, that is, two bonding channels are occupied. When the quantity of bonding channels=3, it indicates that the quantity of bonding channels is 3, that is, three bonding channels are occupied. When the quantity of bonding channels=4, the quantity of bonding channels is 4, that is, four bonding channels are occupied.

FIG. 7(*a*) separately shows that when the quantity of bonding channels=1, occupied channel resources are 1.76 GHz resources at a central position of 2.16 GHz; when the quantity of bonding channels=2, occupied channel resources are 3.52 GHz resources at a central position of 4.32 GHz; when the quantity of bonding channels=3, occupied channel resources are 5.28 GHz resources at a central position of 6.48 GHz; when the quantity of bonding channels=4, occupied channel resources are 7.04 GHz resources at a central position of 8.64 GHz.

In addition, when frequency domain resource division is performed in the second manner, for different quantities of bonding channels, channel resource occupation statuses are shown in FIG. 7(*b*). FIG. 7(*b*) separately shows that when the quantity of bonding channels=1, occupied channel resources are 1.815 GHz resources at a central position of 2.16 GHz; when the quantity of bonding channels=2, occupied channel resources are 3.52 GHz resources at a central position of 3.63 GHz; when the quantity of bonding channels=3, occupied channel resources are 5.445 GHz resources at a central position of 6.48 GHz; when the quantity of bonding channels=4, occupied channel resources are 7.260 GHz resources at a central position of 8.64 GHz.

It can be learned from FIG. 7(*a*) and FIG. 7(*b*) that when frequency domain resource division are performed in different manners and quantities of bonding channels are different, occupied frequency domain resources are different. In these cases, corresponding CEF sequences may be determined based on different frequency domain resource occupation statuses.

In these cases, according to the solution in embodiments of this application, when a DFT-S-OFDM technology is introduced into a 60 GHz WLAN standard, an applied CEF sequence in an EDMG modulation field can be determined, and DFT-S-OFDM transmission is further performed by using the CEF sequence. In this way, a PAPR of a WLAN system can be reduced while frequency division multiplexing for a plurality of users is supported.

Further, in the PPDU in embodiments of this application, when the CEF includes more than two CEF sequences, any two CEF sequences in the CEF sequences are orthogonal.

When frequency domain resource division is performed in the first manner, a quantity of subcarriers included on a channel is 512. In these cases, if the quantity of bonding channels is 1, a length of the CEF sequence is 512, and two CEF sequence determining methods may be used. In a first CEF sequence determining method, when WLAN communication in a single carrier mode is performed according to the 802.11 ay standard, a Golay sequence whose length is 512 may be obtained, and the Golay sequence whose length is 512 is used as the CEF sequence in the EDMG modulation field; or a reverse arrangement result of the Golay sequence whose length is 512 is used as the CEF sequence in the EDMG modulation field; or a product of α and each Golay sequence whose length is 512 may be obtained, and the product is used as the CEF sequence in the EDMG modulation field, where α is −1, j, or −j.

The CEF sequence may be generated by using a generation register, and the generation register is shown as follows:

$$A_0(n)=\delta(n); \quad \text{formula (1)}$$

$$B_0(n)=\delta(n); \quad \text{formula (2)}$$

$$A_k(n)=W_kA_{k-1}(n)+B_{k-1}(n-D_k); \quad \text{formult (3)}$$

$$B_k(n)=W_kA_{k-1}(n)-B_{k-1}(n-D_k). \quad \text{formula (4)}$$

If the generation register has nine levels, in the CEF sequence determining method, a quantity k of register levels is 9. If a quantity of subcarriers is 512, the quantity n of subcarriers is 512. In addition, a delay module D is [1, 8, 2, 4, 16, 32, 64, 128, 256], that is, D1=1, D2=8, D3=2, D4=4, D5=16, D6=32, D7=64, D8=128, and D9=256. When n is not equal to 0, δ(n) is 1.

In addition, in the generation register, W represents a register parameter, and for a value of the register parameter, refer to Table (1).

TABLE (1)

| Spatial stream | Register parameter W |
|---|---|
| 1 | [−1, −1, −1, −1, +1, −1, −1, +1, +1] |
| 2 | [+1, −1, −1, −1, +1, −1, −1, +1, +1] |
| 3 | [−1, −1, −1, −1, −1, −1, −1, −1, −1] |
| 4 | [+1, −1, −1, −1, −1, −1, −1, −1, −1] |
| 5 | [−1, −1, −1, −1, +1, −1, −1, −1, −1] |
| 6 | [+1, −1, −1, −1, +1, −1, −1, −1, +1] |
| 7 | [−1, −1, −1, −1, +1, −1, −1, −1, +1] |
| 8 | [+1, −1, −1, −1, +1, −1, −1, −1, +1] |

One CEF sequence corresponding to each spatial stream may be generated. In Table (1), register parameters W corresponding to eight spatial streams are disclosed. When a CEF sequence corresponding to each spatial stream is calculated, a register parameter W corresponding to the spatial stream is substituted into the foregoing generation register, to obtain a sequence pair A9(n) and B9(n) corresponding to the spatial stream. When a first CEF sequence is generated, a used register parameter W is [−1, −1, −1, −1, +1, −1, −1, +1, +1], in other words, when the first CEF sequence is generated by using the generation register, W1=−1, W2=−1, W3=−1, W4=−1, W5=+1, W6=−1, W7=−1, W8=+1, and W9=+1 in the generation register. Correspondingly, when a second CEF sequence is generated, a used register parameter W is [+1, −1, −1, −1, +1, −1, −1, +1, +1], in other words, when the second CEF sequence is generated by using the generation register, W1=+1, W2=−1, W3=−1, W4=−1, W5=+1, W6=−1, W7=−1, W8=+1, and W9=+1, and so on in the generation register.

The A9(n) sequence and the B9(n) sequence corresponding to each spatial stream may be obtained according to the formula (1) to the formula (4). In embodiments of this application, the A9(n) sequence corresponding to each spatial stream may be used as the CEF sequence corresponding to the spatial stream, or the B9(n) sequence corresponding to each spatial stream may be used as the CEF sequence corresponding to the spatial stream; or a sequence obtained by reversely arranging the A9(n) sequence or the B9(n) sequence corresponding to each spatial stream may be used as the CEF sequence corresponding to the spatial stream; or a product of α and the A9(n) sequence or the B9(n) sequence corresponding to each spatial stream may be obtained, and a sequence corresponding to the product is used as the CEF sequence corresponding to the spatial stream, where α is −1, j, or −j.

The sequence corresponding to the product of α and the A9(n) sequence or the B9(n) sequence refers to a sequence constituted by new elements, where the new element is a product obtained by multiplying a with each element in the sequence. For example, if a sequence is G_5(1, :)=[1 1 −1 −1 −1], and a is −1, a new sequence corresponding to a product of the A9(n) sequence or the B9(n) sequence and a is [−1 −1 1 1 1].

In addition, a sequence obtained by reversely arranging a sequence refers to a new sequence obtained by reversely arranging elements in the sequence. For example, if a sequence is G_5(1, :)=[1 2 3 4 5], a sequence obtained by reversely arranging the sequence is [5 4 3 2 1].

In these cases, a corresponding CEF sequence may be determined by using the foregoing generation register.

In some implementations, the CEF sequence included in the CEF is at least one sequence in a sequence (1) to a sequence (8).

In addition, the sequence (1) to the sequence (8) may alternatively be reversely arranged. In these cases, the CEF sequence included in the CEF is a result obtained by reversely arranging at least one sequence in the sequence (1) to the sequence (8). Alternatively, a product of a and the sequence (1) to the sequence (8) may be obtained. In these cases, the CEF sequence included in the CEF is a product of α and at least one sequence in the sequence (1) to the sequence (8), where α is −1, j, or −j.

Alternatively, in some implementations, the CEF sequence included in the CEF is at least one sequence in a sequence (9) to a sequence (16). In addition, the sequence (9) to the sequence (16) may alternatively be reversely arranged. In these cases, the CEF sequence included in the CEF is a result obtained by reversely arranging at least one sequence in the sequence (9) to the sequence (16). Alternatively, a product of α and the sequence (9) to the sequence (16) may be obtained. In these cases, the CEF sequence included in the CEF is a product of α and at least one sequence in the sequence (9) to the sequence (16), where α is −1, j, or −j.

Through experiments, when WLAN communication in a DFT-S-OFDM mode is performed by using the CEF sequence generated in the foregoing manner, PAPRs corresponding to different resource combinations are shown in FIG. 8.

In FIG. 8, the first row in the first figure represents corresponding PAPRs when a first CEF sequence is applied and different resource combinations are used when 60 GHz WLAN communication is performed by using a DFT-S-OFDM technology. The first row in the first figure indicates that 512 subcarriers are evenly allocated to four groups, in other words, when each group occupies 128 subcarriers and 60 GHz WLAN communication is performed by using the DFT-S-OFDM technology, a PAPR of each group of subcarriers during communication is 3.0103; the second row in the first figure indicates that 512 subcarriers are evenly allocated to two groups, in other words, when each group occupies 256 subcarriers and 60 GHz WLAN communication is performed by using the DFT-S-OFDM technology, a PAPR of each group of subcarriers during communication is 3.0085; and the third row in the first figure indicates that all 512 subcarriers are allocated to one group, in other words, when the group occupies 512 subcarriers and 60 GHz WLAN communication is performed by using the DFT-S-OFDM technology, a PAPR of each group of subcarriers during communication is 3.0103.

Based on FIG. 8, it may be determined that, when 60 GHz WLAN communication is performed by using the DFT-S-OFDM technology, if the CEF sequence generated in embodiments of this application is used, a PAPR is relatively small.

In addition, after CEF sequences are determined in the foregoing manner, a corresponding CEF sequence may be further selected from the generated CEF sequences based on a requirement of the DFT-S-OFDM transmitter; and the selected CEF sequence is mapped to a subcarrier at an input end of the IFFT module of the DFT-S-OFDM transmitter, so that the IFFT module obtains the CEF sequence. The CEF sequence may be selected in a plurality of manners. For example, if the DFT-S-OFDM transmitter needs L CEF sequences, the first L CEF sequences are selected from all generated CEF sequences, or L CEF sequences with relatively low PAPRs may be selected based on PAPRs that are corresponding to different resource combinations when communication is performed by using each CEF sequence shown in FIG. 8.

In addition, when frequency domain resource division is performed in the first manner and the quantity of bonding channels is 1, a second CEF sequence determining method may alternatively be used.

In the CEF sequence determining method, two Golay sequences whose lengths are both 128 are first constructed, and the two Golay sequences are G_128 a and G_128 b:

G_128 a (1,:)=[1 1 1 −1 −1 −1 1 −1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 1 −1 1 1 −1 1 1 1 1 −1 −1 −1 1 −1 1 1 1 −1 1 1 −1 1 1 1 1 −1 −1 −1 1 −1 −1 −1 −1 1 −1 −1 1 −1]; and G_128 b (1,:)=[1 1 1 −1 −1 −1 1 −1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 −1 −1 −1 1 1 1 −1 1 −1 −1 −1 1 −1 −1 1 −1 1 1 1 −1 −1 −1 1 −1 −1 −1 −1 1 −1 −1 1 −1 −1 −1 −1 1 1 1 −1 1 −1 −1 −1 1 −1 −1 1 −1 −1 −1 −1 1 1 1 −1 1 1 1 1 −1 1 1 −1 1].

Then, eight Golay sequences whose lengths are 512 are obtained through calculation in the following calculation manner, and the eight Golay sequences whose lengths are 512 are eight sequences:

G_512(1, :)=[G_128(1, :), G_128(1, :), G_128(1, :), −G_128(1, :)];

G_512(2, :)=[G_128(1, :), G_128(1, :), −G_128(1, :), G_128(1, :)];

G_512(3, :)=[G_128(1, :), G_128(1, :), G_128(1, :), −G_128(1, :)];

G_512(4, :)=[G_128(1, :), G_128(1, :), −G_128(1, :), G_128(1, :)];

G_512(5, :)=[G_128(1, :), −G_128(1, :), G_128(1, :), G_128(1, :)];

G_512(6, :)=[—G_128(1, :), G_128(1, :), G_128(1, :), G_128(1, :)];

G_512(7, :)=[G_128(1, :), −G_128(1, :), G_128(1, :), G_128(1, :)]; and

G_512(8, :)=[—G_128(1, :), G_128(1, :), G_128(1, :), G_128(1, :)].

−G_128(1,:)=[−1 −1 −1 1 1 1 −1 1 −1 −1 −1 1 −1 −1 1 −1 1 1 1 −1 −1 −1 1 −1 −1 −1 −1 1 −1 −1 1 −1 1 1 1 −1 −1 −1 1 −1 1 1 1 −1 1 1 −1 1 1 1 1 −1 −1 −1 1 −1 −1 −1 1 −1 −1 1 −1 −1 −1 −1 1 1 1 −1 1 −1 −1 −1 1 −1 −1 1 −1 −1 1 −1 1 1 1 −1 −1 −1 1 −1 −1 −1 −1 1 −1 −1 1 −1 −1 −1 −1 −1 1 1 1 −1 1 −1 −1 −1 1 −1 −1 1 −1 −1 −1 −1 1 1 1 −1 1 1 1 1 −1 1 1 −1 1]; and −G_128(1,:)=[−1 −1 −1 1 1 1 −1 1 −1 −1 −1 1 −1 −1 1 −1 1 1 1 −1 −1 −1 1 −1 −1 −1 −1 1 −1 −1 1 −1 1 1 1 −1 −1 −1 1 −1 1 1 1 −1 1 1 −1 1 1 1 1 −1 −1 −1 1 −1 −1 −1 1 −1 −1 1 −1 −1 1 −1 1 1 1 −1 −1 −1 1 −1 1 1 1 −1 1 1 −1 1 −1 1 −1 −1 −1 1 1 1 −1 1 1 1 1 −1 1 1 −1 1 1 1 1 −1 −1 −1 1 −1 1 1 1 −1 1 1 −1 1 1 1 1 −1 −1 −1 1 −1 −1 −1 1 −1 −1 1 −1].

In these cases, the obtained eight sequences are a sequence (17) to a sequence (24). Correspondingly, in implementations of embodiments of this application, the CEF sequence included in the CEF is at least one sequence in the sequence (17) to the sequence (24).

In addition, the sequence (17) to the sequence (24) may alternatively be reversely arranged. In these cases, the CEF sequence included in the CEF is a result obtained by reversely arranging at least one sequence in the sequence (17) to the sequence (24). Alternatively, a product of α and the sequence (17) to the sequence (24) may be obtained. In these cases, the CEF sequence included in the CEF is a product of α and at least one sequence in the sequence (17) to the sequence (24), where α is −1, j, or −j.

In addition, through experiments, when WLAN communication in a DFT-S-OFDM mode is performed by using the CEF sequence generated in the foregoing manner, PAPRs corresponding to different resource combinations are shown in FIG. 9.

In FIG. 9, the first row in the first figure represents corresponding PAPRs when a first CEF sequence generated by the generation register is applied and different resource combinations are used when 60 GHz WLAN communication is performed by using a DFT-S-OFDM technology. The first row in the first figure indicates that 512 subcarriers are evenly allocated to four groups, in other words, when each group occupies 128 subcarriers and WLAN communication with a carrier of 60 GHz is performed by using the DFT-S-OFDM technology, a PAPR corresponding to each group of subcarriers is 3.0103; the second row in the first figure indicates that 512 subcarriers are evenly allocated to two groups, in other words, when each group occupies 256 subcarriers and WLAN communication with a carrier of 60 GH is performed by using the DFT-S-OFDM technology, a PAPR corresponding to each group of subcarriers is 3.0073; the third row in the first figure indicates that 512 subcarriers are allocated to three groups, in other words, when a first group and a third group each occupy 128 subcarriers and a second group occupies 256 subcarriers, and WLAN communication with a carrier of 60 GH is performed by using the DFT-S-OFDM technology, PAPRs corresponding to the first group of subcarriers and the third group of subcarriers are 3.0103, and a PAPR corresponding to the second group of subcarriers is 3.0013; the fourth row in the first figure indicates that 512 subcarriers are allocated to two groups, in other words, when a first group occupies 384 subcarriers and a second group occupies 128 subcarriers, and WLAN communication with a carrier of 60 GHz is performed by using the DFT-S-OFDM technology, a PAPR corresponding to the first group of subcarriers is 5.2279, and a PAPR corresponding to the second group of subcarriers is 3.0103; the fifth row in the first figure indicates that 512 subcarriers are allocated to two groups, in other words, when a first group occupies 128 subcarriers and a second group occupies 384 subcarriers, and WLAN communication with a carrier of 60 GHz is performed by using the DFT-S-OFDM technology, a PAPR corresponding to the first group of subcarriers is 3.0103, and a PAPR corresponding to the second group of subcarriers is 4.2339; and the sixth row in the first figure indicates that all 512 subcarriers are allocated to one group, in other words, when the group occupies 512 subcarriers, and WLAN communication with a carrier of 60 GHz is performed by using the DFT-S-OFDM technology, a PAPR corresponding to the group of subcarriers is 3.0103.

Based on FIG. 9, it may be determined that, when WLAN communication in the DFT-S-OFDM mode is performed by using the first CEF sequence generated in the foregoing manner, PAPRs corresponding to different resource combinations are relatively small.

In addition, after CEF sequences are determined in the foregoing manner, a corresponding CEF sequence may be further selected from the generated CEF sequences based on a requirement of the DFT-S-OFDM transmitter; and the selected CEF sequence is mapped to a subcarrier at an input end of the IFFT module of the DFT-S-OFDM transmitter, so that the IFFT module obtains the CEF sequence. The CEF sequence may be selected in a plurality of manners. For example, if the DFT-S-OFDM transmitter needs L CEF sequences, the first L CEF sequences are selected from all generated CEF sequences, or L CEF sequences with relatively low PAPRs may be selected based on PAPRs that are corresponding to different resource combinations when communication is performed by using each CEF sequence shown in FIG. 9.

When frequency domain resource division is performed in the first manner, a quantity of subcarriers included on a channel is 512. In these cases, if the quantity of bonding channels is 2 (in a communication process, communication is performed through two bonding channels), a length of the CEF sequence is 1024, and two CEF sequence determining methods may be used.

In a first CEF sequence determining method, when 60 GHz WLAN communication is performed according to the 802.11ay standard, a Golay sequence whose length is 1024 may be obtained, and the Golay sequence whose length is 1024 is used as the CEF sequence; or a reverse arrangement result of the Golay sequence whose length is 1024 is used as the CEF sequence; or a product of $\alpha$ and the Golay sequence whose length is 1024 may be obtained, and the product is used as the CEF sequence, where $\alpha$ is −1, j, or −j.

The CEF sequence may be generated by using the generation register, and forms of the generation register are shown in the formula (1) to the formula (4).

In the solution of the embodiments of this application, when the CEF sequence is generated, the generation register having 10 levels is applied. In the CEF sequence determining method, a quantity k of register levels is 10. In this scenario, if a quantity of subcarriers is 1024, the quantity n of subcarriers is 1024. In addition, a delay module D is [1, 8, 2, 4, 16, 32, 64, 128, 256, 512], that is, $D_1$−1, $D_2$=8, $D_3$=2, $D_4$=4, $D_5$=16, $D_6$=32, $D_7$=64, $D_5$=128, D9=256, and $D_{10}$=256.

In addition, in the generation register, W represents a register parameter, and for a value of the register parameter, refer to Table (2).

TABLE (2)

| Spatial stream | Register parameter W |
|---|---|
| 1 | [−1, −1, −1, −1, +1, −1, −1, +1, +1, +1] |
| 2 | [+1, −1, −1, −1, +1, −1, −1, +1, +1, +1] |
| 3 | [−1, −1, −1, +1, −1, −1, +1, −1, +1, +1] |
| 4 | [+1, −1, −1, +1, −1, −1, +1, −1, +1, +1] |
| 5 | [−1, −1, −1, +1, −1, +1, +1, −1, +1, +1] |
| 6 | [+1, −1, −1, +1, −1, +1, +1, −1, +1, +1] |
| 7 | [−1, −1, −1, +1, +1, +1, −1, −1, +1, +1] |
| 8 | [+1, −1, −1, +1, +1, +1, −1, −1, +1, +1] |

One CEF sequence corresponding to each spatial stream may be generated. In Table (2), register parameters W corresponding to eight spatial streams are disclosed. When a CEF sequence corresponding to each spatial stream is calculated, a register parameter W corresponding to the spatial stream is substituted into the foregoing generation register, to obtain a sequence pair A9(n) and B9(n) corresponding to the spatial stream. When a CEF sequence corresponding to a first spatial stream is generated, a used register parameter w is [−1, −1, −1, −1, +1, −1, −1, +1, +1, +1], in other words, when the CEF sequence corresponding to the first spatial stream is generated by using the generation register, w1=−1, w2=−1, w3=−1, w4=−1, w5=+1, w6=−1, w7=−1, w8=+1, w9=+1, and w10=+1 in the generation register. Correspondingly, when a CEF sequence corresponding to a second spatial stream is generated, a used register parameter W is [+1, −1, −1, −1, +1, −1, −1, +1, +1, +1], in other words, when the CEF sequence corresponding to the second spatial stream is generated by using the generation register, w1=+1, w2=−1, w3=−1, w4=−1, w5=+ 1, w6=−1, w7=−1, w8=+1, w9=+1, and w10=+1 in the generation register. In addition, when a third CEF sequence is generated, a used register parameter w is [−1, −1, −1, +1, −1, −1, −1, +1, +1, +1], and so on.

The A9(n) sequence and the B9(n) sequence corresponding to each spatial stream may be obtained according to the formula (1) to the formula (4). In embodiments of this application, the A9(n) sequence corresponding to each spatial stream may be used as the CEF sequence corresponding to the spatial stream, or the B9(n) sequence corresponding to each spatial stream may be used as the CEF sequence corresponding to the spatial stream; or a sequence obtained by reversely arranging the A9(n) sequence or the B9(n) sequence corresponding to each spatial stream may be used as the CEF sequence corresponding to the spatial stream; or a product of −1 and the A9(n) sequence or the B9(n) sequence corresponding to each spatial stream may be obtained, and the product is used as the CEF sequence corresponding to the spatial stream.

In a feasible implementation of embodiments of this application, the CEF sequence included in the CEF is at least one sequence in a sequence (25) to a sequence (32).

In addition, the sequence (25) to the sequence (32) may alternatively be reversely arranged. In these cases, the CEF sequence included in the CEF is a result obtained by reversely arranging at least one sequence in the sequence (25) to the sequence (32). Alternatively, a product of α and the sequence (25) to the sequence (32) may be obtained. In these cases, the CEF sequence included in the CEF is a product of α and at least one sequence in the sequence (25) to the sequence (32), where α is −1, j, or −j.

Alternatively, in another feasible implementation, the CEF sequence included in the CEF is at least one sequence in a sequence (33) to a sequence (40).

In addition, the sequence (33) to the sequence (40) may alternatively be reversely arranged. In these cases, the CEF sequence included in the CEF is a result obtained by reversely arranging at least one sequence in the sequence (33) to the sequence (40). Alternatively, a product of α and the sequence (33) to the sequence (40) may be obtained. In these cases, the CEF sequence included in the CEF is a product of α and at least one sequence in the sequence (33) to the sequence (40), where α is −1, j, or −j.

It may be determined through experiments that, when 60 GHz WLAN communication is performed by using the DFT-S-OFDM technology, if the CEF sequence generated in embodiments of this application is used, a PAPR is relatively small.

In addition, after CEF sequences are determined in the foregoing manner, a corresponding CEF sequence may be further selected from the generated CEF sequences based on a requirement of the DFT-S-OFDM transmitter; and the selected CEF sequence is mapped to a subcarrier at an input end of the IFFT module of the DFT-S-OFDM transmitter, so that the IFFT module obtains the CEF sequence. The CEF sequence may be selected in a plurality of manners. For example, if the DFT-S-OFDM transmitter needs L CEF sequences, the first L CEF sequences are selected from all generated CEF sequences, or L CEF sequences with relatively low PAPRs may be selected based on PAPRs that are corresponding to different resource combinations when communication is performed by using each CEF sequence.

When frequency domain resource division is performed in the first manner and the quantity of bonding channels is 2, the CEF sequence may alternatively be determined in the following manner.

In this manner, eight CEF sequences generated by using the second CEF sequence determining method when frequency domain resource division is performed in the first manner and the quantity of bonding channels is 1, that is, eight sequences G_512(i,:) whose lengths are 512, are obtained. Then, eight sequences whose lengths are 1024 are obtained according to the following formula:

G_1024(1,:)=[G_512(1,:), −G_512(2,:)];
G_1024(2,:)=[G_512(1,:), G_512(2,:)];
G_1024(3,:)=[G_512(3,:), −G_512(4,:)];
G_1024(4,:)=[G_512(3,:), G_512(4,:)];
G_1024(5,:)=[G_512(5,:), −G_512(6,:)];
G_1024(6,:)=[G_512(5,:), G_512(6,:)];
G_1024(7, :)=[G_512(7, :), −G_512(8, :)]; and
G_1024(8,:)=[G_512(7, :), G_512(8, :)].

Then, the CEF sequence is determined based on the eight sequences whose lengths are 1024.

In the foregoing embodiments, a plurality of forms of G_512(v,:) sequences are provided, where v is a positive integer less than 8. In these cases, in the foregoing calculation manner, the obtained G_1024(v,:) sequence also have a plurality of forms.

In a feasible implementation, −G_512(2, :)=[−1 1 1 −1 1
−1 1 −1 1 1 1 1 −1 −1 1 1 −1 1 1 −1 −1 1 −1 1 1 1 1 1 1
1 −1 −1 1 −1 −1 1 −1 1 −1 1 −1 −1 −1 −1 1 1 −1 −1 −1 1 1
1 −1 −1 1 −1 1 1 1 1 1 1 1 −1 −1 1 −1 −1 1 −1 1 −1 1 −1
−1 −1 −1 1 1 −1 −1 1 −1 −1 1 1 −1 1 −1 −1 −1 −1 −1 −1
−1 1 1 1 −1 −1 1 −1 1 −1 1 −1 −1 −1 −1 1 1 −1 −1 −1 1 1
−1 −1 1 −1 1 1 1 1 1 1 1 −1 −1 −1 1 1 −1 1 −1 1 −1 1 1 1
1 −1 −1 1 1 −1 1 1 −1 −1 1 −1 1 1 1 1 1 1 1 −1 −1 1 −1 −1
1 −1 1 −1 1 −1 −1 −1 −1 1 1 −1 −1 −1 1 1 −1 −1 1 −1 1 1
1 1 1 1 1 −1 −1 −1 1 1 −1 1 −1 1 −1 1 1 1 1 −1 −1 1 1 −1
1 1 −1 −1 1 −1 1 1 1 1 1 1 1 −1 −1 −1 1 1 −1 1 −1 1 −1 1
1 1 1 −1 −1 1 1 1 −1 −1 1 1 −1 1 −1 −1 −1 −1 −1 −1 −1 1
1 1 −1 −1 1 −1 1 −1 1 −1 −1 −1 −1 1 1 −1 −1 1 −1 −1 1 1
−1 1 −1 −1 −1 −1 −1 −1 −1 1 1 −1 1 1 −1 1 −1 1 −1 1 1 1
1 −1 −1 1 1 1 −1 −1 1 1 −1 1 −1 −1 −1 −1 −1 −1 −1 1 1 −1
1 1 −1 1 −1 1 −1 1 1 1 1 −1 −1 1 1 −1 1 1 −1 −1 1 −1 1 1
1 1 1 1 1 −1 −1 −1 1 1 −1 1 −1 1 −1 1 1 1 1 −1 −1 1 1 1
−1 −1 1 1 −1 1 −1 −1 −1 −1 −1 −1 −1 1 1 −1 1 1 −1 1 −1
1 −1 1 1 1 1 −1 −1 1 1 −1 1 1 −1 −1 1 −1 1 1 1 1 1 1 1 −1
−1 1 −1 −1 1 −1 1 −1 1 −1 −1 −1 −1 1 1 −1 −1 −1 1 1 −1
−1 1 −1 1 1 1 1 1 1 1 −1 −1 −1 1 1 −1 1 −1 1 −1 1 1 1 1
−1 −1 1 1 −1 1 1 −1 −1 1 −1 1 1 1 1 1 1 1 −1 −1 −1 1 1 −1
1 −1 1 −1 1 1 1 1 −1 −1 1 1 1 −1 −1 1 1 −1 1 −1 −1 −1 −1
−1 −1 −1 1 1];

−G_512(4, :)=[−1 1 1 −1 −1 1 −1 1 1 1 1 1 1 1 −1 −1 1
−1 −1 1 −1 1 −1 1 −1 −1 −1 −1 1 1 −1 −1 1 −1 −1 1
1 −1 1 −1 −1 −1 −1 −1 −1 −1 1 1 1 −1 −1 1 −1 1 −1
1 −1 −1 −1 −1 1 1 −1 −1 −1 1 1 −1 −1 1 −1 1 1 1 1 1
1 1 −1 −1 1 −1 −1 1 −1 1 −1 1 −1 −1 −1 −1 1 1 −1 −1
−1 1 1 −1 −1 1 −1 1 1 1 1 1 1 1 −1 −1 −1 1 1 −1 1 −1
1 −1 1 1 1 1 −1 −1 1 1 1 −1 −1 1 1 −1 1 −1 −1 −1 −1
−1 −1 −1 1 1 −1 1 1 −1 1 −1 1 −1 1 1 1 1 −1 −1 1 1
−1 1 1 −1 −1 1 −1 1 1 1 1 1 1 1 −1 −1 −1 1 1 −1 1 −1
1 −1 1 1 1 1 −1 −1 1 1 −1 1 1 −1 −1 1 −1 1 1 1 1 1 1
1 −1 −1 1 −1 −1 1 −1 1 −1 1 −1 −1 −1 −1 1 1 −1 −1
−1 1 1 −1 −1 1 −1 1 1 1 1 1 1 1 −1 −1 −1 1 1 −1 1 −1
1 −1 1 1 1 1 −1 −1 1 1 1 −1 −1 1 1 −1 1 −1 −1 −1 −1
−1 −1 −1 1 1 −1 1 1 −1 1 −1 1 −1 1 1 1 1 −1 −1 1 1
−1 1 1 −1 −1 1 −1 1 1 1 1 1 1 1 −1 −1 −1 1 1 −1 1 −1
1 −1 1 1 1 1 −1 −1 1 1 1 −1 −1 1 1 −1 1 −1 −1 −1 −1
−1 −1 −1 1 1 −1 1 1 −1 1 −1 1 −1 1 1 1 1 −1 −1 1 1
1 −1 −1 1 1 −1 1 −1 −1 −1 −1 −1 −1 −1 1 1 1 −1 −1
1 −1 1 −1 1 −1 −1 −1 −1 1 1 −1 −1 1 −1 −1 1 1 −1 1
−1 −1 −1 −1 −1 −1 −1 1 1 −1 1 1 −1 1 −1 1 −1 1 1 1
1 −1 −1 1 1 −1 1 1 −1 −1 1 −1 1 1 1 1 1 1 1 −1 −1 −1
1 1 −1 1 −1 1 −1 1 1 1 1 −1 −1 1 1 −1 1 1 −1 −1 1 −1
1 1 1 1 1 1 1 −1 −1 1 −1 −1 1 −1 1 −1 1 −1 −1 −1 −1
1 1 −1 −1 −1 1 1 −1 −1 1 −1 1 1 1 1 1 1 1 −1 −1 −1
1 1 −1 1 −1 1 −1 1 1 1 1 −1 −1 1 1];

−G_512(6, :)=[−1 1 1 −1 −1 1 −1 1 1 1 1 1 1 1 −1 −1 1
−1 −1 1 −1 1 −1 1 −1 −1 −1 −1 1 1 −1 −1 −1 1 1 −1
−1 1 −1 1 1 1 1 1 1 1 −1 −1 −1 1 1 −1 1 −1 1 −1 1 1
1 1 −1 −1 1 1 −1 1 1 −1 −1 1 −1 1 1 1 1 1 1 1 −1 −1
1 −1 −1 1 −1 1 −1 1 −1 −1 −1 −1 1 1 −1 −1 1 −1 −1
1 1 −1 1 −1 −1 −1 −1 −1 −1 −1 1 1 1 −1 −1 1 −1 1 −1
1 −1 −1 −1 −1 1 1 −1 −1 1 −1 1 1 −1 1 −1 −1 −1 −1
−1 −1 −1 −1 1 1 −1 1 1 −1 1 −1 1 −1 1 1 1 1 −1 −1 1
1 1 −1 −1 1 1 −1 1 −1 −1 −1 −1 −1 −1 −1 1 1 1 −1 −1
1 −1 1 −1 1 −1 −1 −1 −1 1 1 −1 −1 −1 1 1 −1 −1 1 −1
1 1 1 1 1 1 1 −1 −1 1 −1 −1 1 −1 1 −1 1 −1 −1 −1 −1
1 1 −1 −1 1 −1 −1 1 1 −1 1 −1 −1 −1 −1 −1 −1 −1 1
1 1 −1 −1 1 −1 1 −1 1 −1 −1 −1 −1 1 1 −1 −1 1 −1 −1
1 1 −1 1 −1 −1 −1 −1 −1 −1 −1 1 1 −1 1 1 −1 1 −1 1
−1 1 1 1 1 −1 −1 1 1 1 −1 −1 1 1 −1 1 −1 −1 −1 −1 −1
−1 −1 1 1 1 −1 −1 1 −1 1 −1 1 −1 −1 −1 −1 1 1 −1 −1
1 −1 −1 1 1 −1 1 −1 −1 −1 −1 −1 −1 −1 1 1 −1 1 1 −1
1 −1 1 −1 1 1 1 1 −1 −1 1 1 −1 1 1 −1 −1 1 −1 1 1 1
1 1 1 1 −1 −1 −1 1 1 −1 1 −1 1 −1 1 1 1 1 −1 −1 1 1
1 −1 −1 1 1 −1 1 −1 −1 −1 −1 −1 −1 −1 1 1 −1 1 1 −1
1 −1 1 −1 1 1 1 1 −1 −1 1 1 1 −1 −1 1 1 −1 1 −1 −1
−1 −1 −1 −1 −1 1 1 1 −1 −1 1 −1 1 −1 1 −1 −1 −1 −1

1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 1 −1 1 −1 −1 −1 −1 −1 −1 −1 1 1 1 −1 −1 1 −1 1 −1 1 −1 −1 −1 −1 1 1 −1 −1]; and −G_512(8, :)=[−1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 1 −1 1 −1 −1 −1 −1 −1 −1 −1 1 1 1 −1 −1 1 −1 1 −1 1 −1 −1 −1 −1 1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 1 −1 1 −1 −1 −1 −1 −1 −1 −1 1 1 1 −1 −1 1 −1 1 −1 1 −1 −1 −1 −1 1 1 −1 −1 1 −1 −1 1 1 −1 1 −1 −1 −1 −1 −1 −1 −1 1 1 −1 1 1 −1 1 −1 1 −1 1 1 1 1 −1 −1 1 1 1 −1 −1 1 1 −1 1 −1 −1 −1 −1 −1 −1 −1 1 1 1 −1 −1 1 −1 1 −1 1 −1 −1 −1 −1 1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 1 −1 1 −1 −1 −1 −1 −1 −1 −1 1 1 1 1 −1 1 −1 −1 1 −1 1 −1 −1 −1 −1 −1 1 1 −1 1 1 −1 1 −1 1 −1 1 1 1 1 −1 −1 1 −1 −1 1 −1 1 −1 1 −1 −1 −1 −1 1 1 −1 −1 1 1 −1 −1 1 1 −1 1 1 1 1 1 1 1 −1 −1 −1 1 1 −1 1 −1 1 −1 1 1 1 1 −1 −1 1 1 1 −1 −1 1 1 −1 1 −1 1 −1 −1 −1 −1 −1 1 1 −1 1 1 −1 1 −1 1 −1 1 1 1 1 −1 −1 1 1 1 −1 −1 1 1 −1 1 −1 −1 −1 −1 −1 −1 −1 −1 −1 −1 −1 1 1 −1 1 −1 −1 −1 −1 −1 −1 −1 −1 1 1 −1 1 −1 1 1 −1 1 −1 1 −1 1 −1 1 1 1 1 −1 −1 1 1 −1 −1 1 −1 1 −1 −1 −1 1 −1 1 −1 1 −1 −1 −1 −1 1 1 −1 1 −1 −1 1 −1 1 1 1 1 −1 −1 −1 −1 −1 −1 −1 −1 −1 −1 −1 1 1 −1 1 1 −1 1 −1 1 −1 1 1 1 −1 −1 1 −1 −1 1 1 1 −1 −1 1 1 −1 1 −1 −1 −1 −1 −1 −1 −1 −1 1 1 1 −1 −1 1 −1 1 −1 1 1 −1 −1 −1 −1 1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 1 −1 1 −1 −1 −1 −1 −1 −1 −1 1 1 −1 −1 1 −1 1 1 1 1 1 1 1 −1 −1 1 −1 −1 1 −1 1 −1 1 −1 1 −1 −1 −1 −1 1 1 −1 −11.

In these cases, eight sequences whose lengths are 1024 may be obtained through calculation, and the CEF sequence may be determined based on the eight sequences.

In some implementations, the CEF sequence included in the CEF is at least one sequence in a sequence (41) to a sequence (48).

In addition, the sequence (41) to the sequence (48) may alternatively be reversely arranged. In these cases, the CEF sequence included in the CEF is a result obtained by reversely arranging at least one sequence in the sequence (41) to the sequence (48). Alternatively, a product of α and the sequence (41) to the sequence (48) may be obtained. In these cases, the CEF sequence included in the CEF is a product of α and at least one sequence in the sequence (41) to the sequence (48), where α is −1, j, or −j.

Through experiments, when WLAN communication in the DFT-S-OFDM mode is performed by using the CEF sequence generated in the foregoing manner, if the CEF sequence generated in embodiments of the application is applied, a PAPR is relatively small.

In addition, after CEF sequences are determined in the foregoing manner, a corresponding CEF sequence may be further selected from the generated CEF sequences based on a requirement of the DFT-S-OFDM transmitter; and the selected CEF sequence is mapped to a subcarrier at an input end of the IFFT module of the DFT-S-OFDM transmitter, so that the IFFT module obtains the CEF sequence. The CEF sequence may be selected in a plurality of manners. For example, if the DFT-S-OFDM transmitter needs L CEF sequences, the first L CEF sequences are selected from all generated CEF sequences, or L CEF sequences with relatively low PAPRs may be selected based on PAPRs that are corresponding to different resource combinations when communication is performed by using each CEF sequence.

When frequency domain resource division is performed in the first manner, a quantity of subcarriers included on a channel is 512. In these cases, if the quantity of bonding channels is 3 (in a communication process, communication is performed through three bonding channels), a length of the CEF sequence is 1536, and two CEF sequence determining methods may be used.

In a first CEF sequence determining method, when 60 GHz WLAN communication in a single carrier mode is performed according to the 802.11ay standard, eight Golay sequences whose lengths are 384 may be obtained, and each Golay sequence whose length is 384 is extended to a Golay sequence whose length is 1536. During extension, eight sequences whose lengths are 768 may be obtained based on the Golay sequences whose lengths are 384 and according to the formula (1) to the formula (4), and then eight sequences whose lengths are 1536 are obtained based on the sequences whose lengths are 768 and according to the formula (1) to the formula (4). The eight sequences whose lengths are 1536 are extended sequences whose lengths are 1536. The eight extended sequences whose lengths are 1536 may be used as eight CEF sequences; or reverse arrangement results of the eight extended sequences whose lengths are 1536 are used as eight CEF sequences; or a product of α and each of the eight extended sequences may be obtained, and the product is used as a CEF sequence, where α is −1, j, or −j. Alternatively, a conjugation operation may be performed on each of the eight sequences whose lengths are 1536, and then a sequence obtained through conjugation is used as a CEF sequence.

The CEF sequence may alternatively be generated by using a generation register, and forms of the generation register are shown in a formula (5) to a formula (10).

$$Ga_3 = [+1, +1, -1]; \qquad \text{formula (5)}$$

$$Gb_3 = [+1, +j, +1]; \qquad \text{formula (6)}$$

$$(A_0(n), B_0(n)) = (+Ga_3(2-n), +Gb_3(2-n)) \qquad \text{formula (7)}$$

where, $i_{ss} = 1, 3, 5, 7$;

$$(A_0(n), B_0(n)) = (+conj(Gb_3(n)), -conj(Ga_3(n))) \qquad \text{formula (8)}$$

where, $i_{ss} = 2, 4, 6, 8$;

$$A_k(n) = W_k A_{k-1}(n) + B_{k-1}(n - D_k); \text{ and} \qquad \text{formula (9)}$$

$$B_k(n) = W_k A_{k-1}(n) - B_{k-1}(n - D_k). \qquad \text{formula (10)}$$

If the generation register has nine levels, in the CEF sequence determining method, a quantity k of register levels is 9. In this scenario, if a quantity of subcarriers is 1536, the quantity n of subcarriers is 1536. In addition, a delay module D is [3, 24, 6, 12, 48, 96, 192, 384, 768], that is, D1=3, D2=24, D3=6, D4=12, D5=48, D6=96, D7=192, D8=384, and D9=768.

$i_{ss}$ represents a label of a spatial stream, $i_{ss}=1$ represents a first spatial stream. The formula (7) indicates that when CEF sequences corresponding to the first spatial stream, a third spatial stream, a fifth spatial stream, and a seventh spatial stream are calculated, ($A_0(n)$, $B_0(n)$) follows the formula (7). The formula (8) indicates that when CEF sequences corresponding to a second spatial stream, a fourth spatial stream, a sixth spatial stream, and an eighth spatial stream are calculated, ($A_0$ (n), $B_0(n)$) follows the formula (8).

In addition, in the generation register, W represents a register parameter, and for a value of the register parameter, refer to Table (3).

TABLE (3)

| Spatial stream | Register parameter W |
|---|---|
| 1 | [-1, -1, -1, -1, +1, -1, -1, +1, +1] |
| 2 | [-1, -1, -1, -1, +1, -1, -1, +1, +1] |
| 3 | [-1, -1, -1, +1, -1, -1, +1, +1, +1] |
| 4 | [-1, -1, -1, +1, -1, -1, +1, +1, +1] |
| 5 | [-1, -1, -1, +1, -1, +1, +1, +1, +1] |
| 6 | [-1, -1, -1, +1, -1, +1, +1, +1, +1] |
| 7 | [-1, -1, -1, +1, +1, +1, -1, +1, +1] |
| 8 | [-1, -1, -1, +1, +1, +1, -1, +1, +1] |

One CEF sequence corresponding to each spatial stream may be generated. In Table (3), register parameters W corresponding to eight spatial streams are disclosed. When a CEF sequence corresponding to each spatial stream is calculated, a register parameter W corresponding to the spatial stream is substituted into the foregoing generation register, to obtain a sequence pair A9(n) and B9(n) corresponding to the spatial stream.

In embodiments of this application, one sequence (that is, A9(n) or B9(n)) may be used as the CEF sequence corresponding to the spatial stream; or one sequence (that is, A9(n) or B9(n)) is reversely arranged, and a reversely arranged sequence is used as the CEF sequence corresponding to the spatial stream; or a product of $\alpha$ and the A9(n) sequence or the B9(n) sequence may be obtained, and the product is used as the CEF sequence, where $\alpha$ is -1, j, or -j. Alternatively, a conjugation operation may be performed on the A9(n) sequence or the B9(n) sequence, and then a sequence obtained through conjugation is used as the CEF sequence.

In a feasible implementation of embodiments of this application, the CEF sequence included in the CEF is at least one sequence in a sequence (49) to a sequence (56).

In addition, the sequence (49) to the sequence (56) may alternatively be reversely arranged. In these cases, the CEF sequence included in the CEF is a result obtained by reversely arranging at least one sequence in the sequence (49) to the sequence (56). Alternatively, a product of $\alpha$ and the sequence (49) to the sequence (56) may be obtained. In these cases, the CEF sequence included in the CEF is a product of $\alpha$ and at least one sequence in the sequence (49) to the sequence (56), where $\alpha$ is -1, j, or -j. Alternatively, a conjugation operation may be performed on the sequence (49) to the sequence (56). In these cases, the CEF sequence included in the CEF is a corresponding sequence obtained by performing the conjugation operation on at least one sequence in the sequence (49) to the sequence (56).

Alternatively, in other feasible implementations, the CEF sequence included in the CEF is at least one sequence in a sequence (57) to a sequence (64).

In addition, the sequence (57) to the sequence (64) may alternatively be reversely arranged. In these cases, the CEF sequence included in the CEF is a result obtained by reversely arranging at least one sequence in the sequence (57) to the sequence (64). Alternatively, a product of $\alpha$ and the sequence (57) to the sequence (64) may be obtained. In these cases, the CEF sequence included in the CEF is a product of $\alpha$ and at least one sequence in the sequence (57) to the sequence (64), where $\alpha$ is -1, j, or -j. Alternatively, a conjugation operation may be performed on the sequence (57) to the sequence (64). In these cases, the CEF sequence included in the CEF is a corresponding sequence obtained by performing the conjugation operation on at least one sequence in the sequence (57) to the sequence (64).

Performing a conjugate operation on a sequence means performing a conjugate operation on each element in the sequence, to obtain a sequence that is constituted by new elements, that is, a corresponding sequence obtained by performing the conjugation operation on the sequence.

In addition, through experiments, when WLAN communication in the DFT-S-OFDM mode is performed by using the CEF sequence generated in the foregoing manner, PAPRs corresponding to different resource combinations are all relatively small.

Further, after CEF sequences are determined in the foregoing manner, a corresponding CEF sequence may be further selected from the generated CEF sequences based on a requirement of the DFT-S-OFDM transmitter; and the selected CEF sequence is mapped to a subcarrier at an input end of the IFFT module of the DFT-S-OFDM transmitter, so that the IFFT module obtains the CEF sequence. The CEF sequence may be selected in a plurality of manners. For example, if the DFT-S-OFDM transmitter needs L CEF sequences, the first L CEF sequences are selected from all generated CEF sequences, or L CEF sequences with relatively low PAPRs may be selected based on PAPRs that are corresponding to different resource combinations when communication is performed by using each CEF sequence.

When frequency domain resource division is performed in the first manner, a quantity of subcarriers included on a channel is 512. In these cases, if the quantity of bonding channels is 3 (in a communication process, communication is performed through three bonding channels), a length of the CEF sequence is 1536, and the CEF sequence may alternatively be determined in the following manners.

In these manners, eight Golay sequences whose lengths are 128 are first constructed in the following manner:

G_128(1,:)=[1 1 1 -1 -1 -1 1 -1 1 1 1 -1 1 1 -1 1 1 -1 1 1 1 1 -1 1 1 1 1 1 -1 1 -1 -1 -1 1 -1 -1 1 -1 -1 -1 -1 1 1 1 -1 1 1 1 1 -1 1 1 -1 1 1 1 1 -1 -1 -1 1 -1 1 1 1 -1 1 1 -1 1 -1 -1 -1 1 1 1 -1 1 1 1 1 -1 1 1 -1 1 -1 1 1 -1 1 1 1 1 -1 1 1 1 1 -1 -1 -1 1 -1 1 1 1 -1 1 1 -1 1 1 1 1 -1 -1 -1 1 -1 -1 -1 -1 1 -1 -1 1 -1];

G_128(1,:)=[1 1 1 -1 -1 -1 1 -1 1 1 1 -1 1 1 -1 1 -1 1 -1 1 1 1 -1 1 1 1 1 -1 1 1 1 1 -1 1 1 -1 1 -1 -1 -1 1 1 1 -1 1 -1 -1 -1 1 -1 -1 1 -1 -1 -1 -1 1 1 1 -1 1 1 1 1 -1 1 1 -1 1 -1 -1 -1 1 1 1 -1 1 -1 -1 -1 1 -1 -1 1 -1 1 1 1 -1 -1 -1 1 -1 -1 -1 -1 1 -1 -1 1 -1 -1 -1 -1 1 1 1 -1 1 -1 -1 -1 1 -1 -1 1 -1 -1 -1 -1 1 1 1 -1 1 1 -1 1];

G_128(2,:)=[1 -1 1 1 -1 1 1 1 1 -1 1 1 1 -1 -1 -1 -1 1 -1 -1 1 -1 -1 -1 1 -1 1 1 1 -1 -1 -1 -1 1 -1 -1 1 -1 -1 -1 -1 1 -1 -1 -1 1 1 1 -1 1 -1 -1 1 -1 -1 -1 1 -1 1 1 1 -1 -1 -1 1 -1 1 1 -1 1 1 1 1 -1 1 1 1 -1 -1 -1 -1 1 -1 -1 1 -1 -1 -1 1 -1 1 1 1 -1 -1 -1 1 -1 1 1 -1 1 1 1 1 -1 1 1 1 -1 -1 -1 1 -1 1 1 -1 1 1 1 -1 1 -1 -1 -1 1 1 1];

G_128(2,:)=[1 -1 1 1 -1 1 1 1 1 -1 1 1 1 -1 -1 -1 -1 1 -1 -1 1 -1 -1 -1 1 -1 1 1 1 -1 -1 -1 -1 1 -1 -1 1 -1 -1 -1 -1 1 -1 -1 -1 1 1 1 -1 1 -1 -1 1 -1 -1 -1 1 -1 1 1 1 -1 -1 -1 -1 1 -1 -1 1 -1 -1 -1 -1 1 -1 -1 -1 1 1 1 1 -1 1 1 -1 1 1 1 -1 1 -1 -1 -1 1 1 1 -1 1 -1 -1 1 -1 -1 -1 -1 1 -1 -1 -1 1 1 1 -1 1 -1 -1 1 -1 -1 -1 1 -1 1 1 1 -1 -1 -1];

G_128(3,:)=[1 1 1 -1 -1 -1 1 -1 1 1 1 -1 1 1 -1 1 -1 -1 -1 1 1 1 -1 1 1 1 1 -1 1 1 -1 1 -1 -1 -1 1 1 1 -1 1 -1 -1 -1 1 -1 -1 1 -1 -1 -1 -1 1 1 1 -1 1 1 1 1 -1 1 1 -1 1 -1 -1 -1 1 1 1 -1 1 -1 -1 -1 1 -1 -1 1 -1

1 1 1 −1 −1 −1 1 −1 −1 −1 −1 1 −1 −1 1 −1 −1 −1 −1 1 1 1 −1 1 −1 −1 −1 1 −1 −1 1 −1 −1 −1 −1 1 1 1 −1 1 1 1 1 −1 1 1 −1 1];

G_128(3,:)=[1 1 1 −1 −1 −1 1 −1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 1 −1 1 1 −1 1 1 1 1 −1 −1 −1 1 −1 1 1 1 −1 1 1 −1 1 1 1 1 −1 −1 −1 1 −1 −1 −1 −1 1 −1 −1 1 −1];

G_128(4,:)=[1 −1 1 1 −1 1 1 1 1 −1 1 1 1 −1 −1 −1 −1 1 −1 −1 1 −1 −1 −1 1 −1 1 1 1 −1 −1 −1 −1 1 −1 −1 1 −1 −1 −1 −1 1 −1 −1 −1 1 1 1 −1 1 −1 −1 1 −1 −1 −1 1 −1 1 1 1 −1 −1 −1 −1 1 −1 −1 1 −1 −1 −1 −1 1 −1 −1 −1 1 1 1 1 −1 1 1 −1 1 1 1 −1 1 −1 −1 −1 1 1 1 −1 1 −1 −1 1 −1 −1 −1 −1 1 −1 −1 −1 1 1 1 −1 1 −1 −1 1 −1 −1 −1 1 −1 1 1 1 −1 −1 −1]; and G_128(4,:)=[1 −1 1 1 −1 1 1 1 1 −1 1 1 1 −1 −1 −1 −1 1 −1 −1 1 −1 −1 −1 1 −1 1 1 1 −1 −1 −1 −1 1 −1 −1 1 −1 −1 −1 −1 1 −1 −1 −1 1 1 1 −1 1 −1 −1 1 −1 −1 −1 1 −1 −1 −1 1 −1 1 1 1 −1 −1 −1 1 −1 1 1 −1 1 1 1 1 −1 1 1 1 −1 −1 −1 −1 1 −1 −1 1 −1 −1 −1 1 −1 1 1 1 −1 −1 −1 1 −1 1 1 −1 1 1 1 1 −1 1 1 1 −1 −1 −1 1 −1 1 1 −1 1 1 1 −1 1 −1 −1 −1 1 1 1].

Then, based on the constructed eight Golay sequences whose lengths are 128, eight sequences whose lengths are 1536 are obtained in the following manner:

G_1536(1,:)=[G_128(1,:), −G_128(1,:), −G_128(1,:), −G_128(1,:), G_128(1,:), G_128(1,:), −G_128(1,:), G_128(1,:), −G_128(1,:), −G_128(1,:), −G_128(1,:), −G_128(1,:)];

G_1536(2,:)=[G_128(2,:), −G_128(2,:), −G_128(2,:), −G_128(2,:), G_128(2,:), G_128(2,:), −G_128(2,:), G_128(2,:), −G_128(2,:), −G_128(2,:), −G_128(2,:), −G_128(2,:)];

G_1536(3,:)=[G_128(3,:), G_128(3,:), −G_128(3,:), G_128(3,:), G_128(3,:), G_128(3,:), −G_128(3,:), −G_128(3,:), G_128(3,:), G_128(3,:), G_128(3,:), G_128(3,:)];

G_1536(4,:)=[G_128(4,:), G_128(4,:), −G_128(4,:), G_128(4,:), G_128(4,:), −G_128(4,:), −G_128(4,:), −G_128(4,:), G_128(4,:), G_128(4,:), G_128(4,:), G_128(4,:)];

G_1536(5,:)=[G_128(3,:), G_128(3,:), −G_128(3,:), G_128(3,:), G_128(3,:), G_128(3,:), −G_128(3,:), G_128(3,:), −G_128(3,:), −G_128(3,:), −G_128(3,:), −G_128(3,:)];

G_1536(6,:)=[G_128(4,:), G_128(4,:), −G_128(4,:), G_128(4,:), G_128(4,:), G_128(4,:), −G_128(4,:), G_128(4,:), −G_128(4,:), −G_128(4,:), −G_128(4,:), −G_128(4,:)];

G_1536(7,:)=[G_128(3,:), G_128(3,:), G_128(3,:), −G_128(3,:), G_128(3,:), G_128(3,:), G_128(3,:), −G_128(3,:), −G_128(3,:), G_128(3,:), −G_128(3,:), G_128(3,:)]; and G_1536(8,:)=[G_128(4,:), G_128(4,:), G_128(4,:), −G_128(4,:), G_128(4,:), G_128(4,:), G_128(4,:), −G_128(4,:), −G_128(4,:), G_128(4,:), −G_128(4,:), G_128(4,:)].

According to the foregoing description, it can be learned that:

−G_128(1,:)=[−1 −1 −1 1 1 1 −1 1 −1 −1 −1 1 −1 −1 1 −1 −1 1 −1 −1 −1 −1 1 −1 1 −1 −1 −1 −1 −1 1 1 1 −1 1 1 −1 1 1 1 1 −1 −1 −1 1 −1 −1 −1 −1 1 −1 −1 1 −1 −1 −1 −1 1 1 1 −1 −1 −1 −1 −1 1 −1 −1 1 −1 1 1 1 −1 −1 −1 1 −1 −1 −1 −1 1 −1 −1 1 −1 1 −1 −1 1 −1 −1 1 −1 −1 −1 −1 1 −1 −1 −1 −1 1 1 1 −1 1 −1 −1 −1 1 −1 −1 1 −1 −1 −1 −1 1 1 1 −1 1 1 1 1 −1 1 1 −1 1];

−G_128(1,:)=[−1 −1 −1 1 1 1 −1 1 −1 −1 −1 1 −1 −1 1 −1 1 −1 1 −1 −1 −1 1 −1 −1 −1 −1 1 −1 −1 −1 −1 1 −1 −1 1 −1 1 1 1 −1 −1 −1 1 −1 1 1 1 −1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 −1 1 1 1 1 −1 1 1 −1 1 1 1 1 −1 −1 −1 1 −1 1 1 1 −1 1 1 −1 1 1 1 1 −1 −1 −1 1 −1 −1 1 −1];

−G_128(2,:)=[−1 1 −1 −1 1 −1 −1 −1 −1 1 −1 −1 −1 1 1 1 1 −1 1 1 −1 1 1 1 −1 1 −1 −1 −1 1 1 1 1 −1 1 1 −1 1 1 1 1 −1 1 1 1 −1 −1 −1 1 −1 1 1 −1 1 1 1 −1 1 −1 −1 1 1 1 −1 1 −1 −1 1 −1 −1 −1 −1 1 −1 −1 −1 1 1 1 1 −1 1 1 −1 1 1 1 −1 1 −1 −1 −1 1 1 1 −1 1 −1 −1 1 −1 −1 −1 −1 1 −1 −1 −1 1 1 1 −1 1 −1 −1 1 −1 −1 −1 1 −1 1 1 1 −1 −1 −1];

−G_128(2,:)=[−1 1 −1 −1 1 −1 −1 −1 −1 1 −1 −1 −1 1 1 1 1 −1 1 1 −1 1 1 1 −1 1 −1 −1 −1 1 1 1 1 −1 1 1 −1 1 1 1 1 −1 1 1 1 −1 −1 −1 1 −1 1 1 −1 1 1 1 −1 1 −1 −1 1 1 1 1 −1 1 1 −1 1 1 1 1 −1 1 1 1 −1 −1 −1 −1 1 −1 −1 1 −1 −1 −1 1 −1 1 1 1 −1 −1 −1 1 −1 1 1 −1 1 1 1 1 −1 1 1 1 −1 −1 −1 1 −1 1 1 −1 1 1 1 −1 1 −1 −1 −1 1 1 1];

−G_128(3,:)=[−1 −1 −1 1 1 1 −1 1 −1 −1 −1 1 −1 −1 1 −1 1 1 1 −1 −1 −1 1 −1 −1 −1 −1 1 −1 −1 1 −1 1 1 1 −1 −1 −1 1 −1 1 1 1 −1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 1 1 1 −1 1 1 −1 1 −1 −1 −1 1 1 1 −1 1 1 1 1 −1 1 1 −1 1 1 1 1 −1 −1 −1 1 −1 1 1 1 −1 1 1 −1 1 1 1 1 −1 −1 −1 1 −1 −1 1 −1];

−G_128(3,:)=[−1 −1 −1 1 1 1 −1 1 −1 −1 −1 1 −1 −1 1 −1 1 1 1 −1 −1 −1 1 −1 −1 −1 −1 1 −1 −1 1 −1 1 1 1 −1 −1 −1 1 −1 1 1 1 −1 1 1 −1 1 1 1 1 −1 −1 −1 1 −1 −1 −1 −1 1 −1 −1 1 −1 −1 −1 −1 1 1 1 −1 1 −1 −1 −1 1 −1 −1 1 −1 1 1 1 −1 −1 −1 1 −1 −1 −1 −1 1 −1 −1 1 −1 −1 −1 −1 1 1 1 −1 1 −1 −1 −1 1 −1 −1 1 −1 −1 −1 −1 1 1 1 −1 1 1 1 1 −1 1 1 −1 1];

−G_128(4,:)=[−1 1 −1 −1 1 −1 −1 −1 −1 1 −1 −1 −1 1 1 1 1 −1 1 1 −1 1 1 1 −1 1 −1 −1 −1 1 1 1 1 −1 1 1 −1 1 1 1 1 −1 1 1 1 −1 −1 −1 1 −1 1 1 −1 1 1 1 −1 1 −1 −1 1 1 1 1 −1 1 1 −1 1 1 1 1 −1 1 1 1 −1 −1 −1 −1 1 −1 −1 1 −1 −1 −1 1 −1 1 1 1 −1 −1 −1 1 −1 1 1 −1 1 1 1 1 −1 1 1 1 −1 −1 −1 1 −1 1 1 −1 1 1 1 −1 1 −1 −1 −1 1 1 1]; and −G_128(4,:)=[−1 1 −1 −1 1 −1 −1 −1 −1 1 −1 −1 −1 1 1 1 1 −1 1 1 −1 1 1 1 −1 1 −1 −1 −1 1 1 1 1 −1 1 1 −1 1 1 1 1 −1 1 1 1 −1 −1 −1 1 −1 1 1 −1 1 1 1 −1 1 −1 −1 1 1 1 −1 1 −1 −1 1 −1 −1 −1 −1 1 −1 −1 −1 1 1 1 1 −1 1 1 −1 1 1 1 −1 1 −1 −1 −1 1 1 1 −1 1 −1 −1 1 −1 −1 −1 −1 1 −1 −1 −1 1 1 1 −1 1 −1 −1 1 −1 −1 −1 1 −1 1 1 1 −1 −1 −1].

In these cases, the eight sequences whose lengths are 1536 may be obtained, and the eight sequences are a sequence (65) to a sequence (72).

In implementations of this application, the CEF sequence included in the CEF is at least one sequence in the sequence (65) to the sequence (72).

In addition, the sequence (65) to the sequence (72) may alternatively be reversely arranged. In these cases, the CEF sequence included in the CEF is a result obtained by reversely arranging at least one sequence in the sequence (65) to the sequence (72). Alternatively, a product of $\alpha$ and the sequence (65) to the sequence (72) may be obtained. In these cases, the CEF sequence included in the CEF is a product of $\alpha$ and at least one sequence in the sequence (65) to the sequence (72), where $\alpha$ is −1, j, or −j.

In addition, through experiments, when WLAN communication in the DFT-S-OFDM mode is performed by using the CEF sequence generated in the foregoing manner, PAPRs corresponding to different resource combinations are all relatively small.

In addition, after CEF sequences are determined in the foregoing manners, a corresponding CEF sequence may be further selected from the generated CEF sequences based on a requirement of the DFT-S-OFDM transmitter; and the selected CEF sequence is mapped to a subcarrier at an input end of the IFFT module of the DFT-S-OFDM transmitter, so that the IFFT module obtains the CEF sequence. The CEF sequence may be selected in a plurality of manners. For example, if the DFT-S-OFDM transmitter needs L CEF sequences, the first L CEF sequences are selected from all generated CEF sequences, or L CEF sequences with relatively low PAPRs may be selected based on PAPRs that are corresponding to different resource combinations when communication is performed by using each CEF sequence.

When frequency domain resource division is performed in the first manner, a quantity of subcarriers included on a channel is 512. In these cases, if the quantity of bonding channels is 4 (in a communication process, communication is performed through four bonding channels), a length of the CEF sequence is 2048, and two CEF sequence determining methods may be used.

In a first CEF sequence determining method, when WLAN communication in a single carrier mode is performed according to the 802.11ay standard, eight Golay sequences whose lengths are 1024 may be obtained, and then the eight Golay sequences whose lengths are 1024 each are extended, to obtain eight sequences whose lengths are 2048. In an extension process, calculation may be performed based on the eight Golay sequences whose lengths are 1024 and according to the formula (1) to the formula (4), to obtain the eight sequences whose lengths are 2048.

The eight extended sequences whose lengths are 2048 may be used as eight CEF sequences. Alternatively, reverse arrangement results of the eight Golay sequences whose lengths are 2048 may be used as eight CEF sequences. Alternatively, a product of α and each of the eight extended sequences may be obtained, and the product is used as a CEF sequence, where α is −1, j, or H.

The CEF sequence may alternatively be generated by using a generation register, and forms of the generation register are shown in the formula (1) to the formula (4).

If the generation register has eleven levels, in the CEF sequence determining method, a quantity k of register levels is 11. In this scenario, if a quantity of subcarriers is 2048, the quantity n of the subcarriers is 2048. In addition, a delay module D is [1, 8, 2, 4, 16, 32, 64, 128, 256, 512, 1024], that is, D1=1, D2=8, D3=2, D4=4, D5=16, D6=32, D7=64, D8=128, D9=256, D10=512, and D11=1024.

In addition, in the generation register, W represents a register parameter, and for a value of the register parameter, refer to Table (4).

TABLE (4)

| Spatial stream | Register parameter W |
|---|---|
| 1 | [−1, −1, −1, −1, +1, −1, −1, +1, +1, +1, +1] |
| 2 | [+1, −1, −1, −1, +1, −1, −1, +1, +1, +1, +1] |
| 3 | [−1, −1, −1, −1, −1, −1, −1, −1, −1, +1, +1] |
| 4 | [+1, −1, −1, −1, −1, −1, −1, −1, −1, −1, +1] |
| 5 | [−1, −1, −1, −1, −1, +1, −1, −1, −1, +1, +1] |

TABLE (4)-continued

| Spatial stream | Register parameter W |
|---|---|
| 6 | [+1, −1, −1, −1, −1, +1, −1, −1, −1, +1, +1] |
| 7 | [−1, −1, −1, −1, +1, −1, −1, −1, +1, +1, +1] |
| 8 | [+1, −1, −1, −1, +1, −1, −1, −1, +1, +1, +1] |

One CEF sequence corresponding to each spatial stream may be generated. In Table (4), register parameters W corresponding to eight spatial streams are disclosed. When a CEF sequence corresponding to each spatial stream is calculated, a register parameter W corresponding to the spatial stream is substituted into the foregoing generation register, to obtain a sequence pair A9(n) and B9(n) corresponding to the spatial stream.

In embodiments of this application, one sequence (that is, A9(n) or B9(n)) may be used as the CEF sequence corresponding to the spatial stream; or one sequence (that is, A9(n) or B9(n)) is reversely arranged, and a reversely arranged sequence is used as the CEF sequence corresponding to the spatial stream. In these cases, the corresponding CEF sequence may be determined by using the foregoing generation register; or a product of α and the A9(n) sequence or the B9(n) sequence may be obtained, and the product is used as the CEF sequence corresponding to the spatial stream, where α is −1, j, or −j.

In implementations of embodiments of this application, the CEF sequence included in the CEF is at least one sequence in a sequence (73) to a sequence (80).

In addition, the sequence (73) to the sequence (80) may alternatively be reversely arranged. In these cases, the CEF sequence included in the CEF is a result obtained by reversely arranging at least one sequence in the sequence (73) to the sequence (80). Alternatively, a product of α and the sequence (73) to the sequence (80) may be obtained. In these cases, the CEF sequence included in the CEF is a product of α and at least one sequence in the sequence (73) to the sequence (80), where α is −1, j, or −j.

Alternatively, in other feasible implementations, the CEF sequence included in the CEF is at least one sequence in a sequence (81) to a sequence (88).

In addition, the sequence (81) to the sequence (88) may alternatively be reversely arranged. In these cases, the CEF sequence included in the CEF is a result obtained by reversely arranging at least one sequence in the sequence (81) to the sequence (88). Alternatively, a product of α and the sequence (81) to the sequence (88) may be obtained. In these cases, the CEF sequence included in the CEF is a product of α and at least one sequence in the sequence (81) to the sequence (88), where α is −1, j, or −j.

In addition, through experiments, when WLAN communication in the DFT-S-OFDM mode is performed by using the CEF sequence generated in the foregoing manner, PAPRs corresponding to different resource combinations are all relatively small.

Further, after CEF sequences are determined in the foregoing manners, a corresponding CEF sequence may be further selected from the generated CEF sequences based on a requirement of the DFT-S-OFDM transmitter; and the selected CEF sequence is mapped to a subcarrier at an input end of the IFFT module of the DFT-S-OFDM transmitter, so that the IFFT module obtains the CEF sequence. The CEF sequence may be selected in a plurality of manners. For example, if the DFT-S-OFDM transmitter needs L CEF sequences, the first L CEF sequences are selected from all generated CEF sequences, or L CEF sequences with relatively low PAPRs may be selected based on PAPRs that are corresponding to different resource combinations when communication is performed by using each CEF sequence.

When frequency domain resource division is performed in the first manner, a quantity of subcarriers included on a channel is 512. In these cases, if the quantity of bonding channels is 4 (in a communication process, communication is performed through four bonding channels), a length of the CEF sequence is 2048. In these cases, the CEF sequence may alternatively be determined in the following manner.

In this manner, when frequency domain resource division is first performed in the first manner, and the quantity of bonding channels is 1, any two CEF sequences are obtained when a second CEF sequence determining method is used. Then, the any two selected CEF sequences are processed to construct eight sequences whose lengths are 2048, where the eight sequences whose lengths are 2048 are used as CEF sequences generated in embodiments of this application; or reverse arrangement results of the eight sequences whose lengths are 2048 are used as CEF sequences generated in embodiments of this application; or a product of −1 and the sequence whose length is 2048 may be obtained, and the product is used as a CEF sequence.

For example, the two selected CEF sequences are G_512(1,:) and G_512(2,:). In these cases, eight orthogonal Golay sequences whose lengths are 2048 may be constructed in the following manner:

G_2048(1,:)=[G_512(1,;), G_512(2,;), G_512(1,;), −G_512(2,:)];

G_2048(2,:)=[G_512(1,;), G_512(2,;), −G_512(1,;), G_512(2,:)];

G_2048(3,:)=[G_512(2,;), G_512(1,;), G_512(2,;), −G_512(1,:)];

G_2048(4,:)=[G_512(2,;), G_512(1,;), −G_512(2,;), G_512(1,:)];

G_2048(5,:)=[G_512(1,;), −G_512(2,;), G_512(1,;), G_512(2,:)];

G_2048(6,:)=[—G_512(1,;), G_512(2,;), G_512(1,;), G_512(2,:)];

G_2048(7,:)=[G_512(2,;), −G_512(1,;), G_512(2,;), G_512(1,;)]; and

G_2048(8,:)=[—G_512(2,;), G_512(1,;), G_512(2,;), G_512(1,;)].

In a feasible implementation, −G_512(1,;)=[−1 −1 −1 1 1 1 −1 1 −1 −1 −1 1 −1 −1 1 −1 1 1 1 −1 −1 −1 1 −1 −1 −1 −1 1 −1 −1 1 −1 1 1 1 −1 −1 −1 1 −1 1 1 1 −1 1 1 −1 1 1 1 1 −1 −1 −1 1 −1 −1 −1 −1 1 −1 −1 1 −1 −1 −1 −1 1 1 1 −1 1 −1 −1 −1 1 −1 −1 1 −1 1 1 1 −1 −1 −1 1 −1 −1 −1 −1 1 −1 −1 1 −1 −1 −1 −1 1 1 1 −1 1 −1 −1 −1 1 −1 −1 1 −1 −1 −1 −1 1 1 1 −1 1 1 1 1 −1 1 1 −1 1 −1 −1 −1 1 1 1 −1 1 −1 −1 −1 1 −1 −1 1 −1 1 1 1 −1 −1 −1 1 −1 −1 −1 −1 1 −1 −1 1 −1 1 1 1 −1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 −1 1 1 −1 1 1 1 1 −1 1 1 −1 1 1 1 1 −1 −1 −1 1 −1 1 1 1 −1 1 1 −1 1 1 1 1 −1 −1 −1 1 −1 −1 −1 −1 1 −1 −1 1 −1 −1 −1 −1 1 1 1 −1 1 −1 −1 −1 1 −1 −1 1 −1 1 −1 −1 −1 −1 1 −1 −1 1 −1 1 1 1 −1 1 1 −1 1 −1 −1 −1 1 −1 1 1 1 −1 1 1 −1 1 1 1 1 −1 −1 −1 1 −1 −1 −1 −1 1 −1 −1 1 −1 −1 −1 −1 1 1 1 −1 1 −1 −1 −1 1 −1 −1 1 −1 −1 −1 1 1 1 −1 −1 −1 1 −1 −1 −1 −1 1 −1 −1 1 −1 −1 −1 −1 1 1 1 −1 −1 −1 1 −1 −1 1 −1 −1 −1 −1 1 1 1 −1 1 1 −1 1 −1 −1 −1 1 −1 −1 −1 −1 1 1 1 −1 1 1 1 −1 1 1 −1 1 1 1 1 −1 −1 −1 1 −1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 1 −1 1 −1 −1 −1 1 1 1 −1 1 −1 −1 −1 1 −1 −1 1 −1 1 1 1 −1 −1 −1 1 −1 −1 −1 −1 1 −1 −1 1 −1 −1 −1 −1 1 1 1 −1 1 −1 −1 −1 1 −1 −1 1 −1 −1 1 −1 −1 −1 −1 1 1 1 −1 1 1 1 1 −1 1 1 −1 1]; and −G_512(2,;)=[−1 −1 −1 1 1 1 −1 1 −1 −1 −1 1 −1 −1 1 −1 1 1 1 −1 −1 −1 1 −1 −1 −1 −1 1 −1 −1 1 −1 1 1 1 −1 −1 −1 1 −1 1 1 1 −1 1 1 −1 1 1 1 1 −1 −1 −1 1 −1 −1 −1 −1 1 −1 −1 1 −1 −1 1 −1 −1 −1 −1 1 1 1 −1 1 −1 −1 −1 1 −1 −1 1 −1 1 1 1 −1 −1 −1 1 −1 −1 −1 −1 1 −1 −1 1 −1 −1 −1 −1 −1 1 1 1 −1 1 −1 −1 −1 1 −1 −1 1 −1 −1 1 −1 −1 −1 −1 1 1 1 −1 1 1 1 1 −1 1 1 −1 1 −1 −1 −1 1 1 1 −1 1 −1 −1 −1 1 −1 −1 1 −1 1 1 1 −1 −1 −1 1 −1 −1 −1 −1 1 −1 1 −1 −1 1 −1 1 1 1 −1 −1 −1 1 −1 1 1 1 −1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 −1 1 1 1 1 −1 1 1 −1 1 1 1 1 −1 −1 −1 1 −1 1 1 1 −1 1 1 −1 1 1 1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 1 −1 −1 −1 −1 1 1 1 −1 1 1 1 1 −1 1 1 −1 1 1 1 1 −1 −1 −1 1 −1 1 1 −1 1 −1 1 1 1 −1 1 1 −1 1 −1 −1 −1 1 1 1 −1 1 1 1 1 −1 1 1 −1 1 1 1 1 −1 −1 −1 1 −1 1 1 1 −1 1 1 −1 1 1 1 1 1 −1 −1 −1 1 −1 −1 −1 −1 1 −1 −1 1 −1 −1 −1 −1 1 1 1 −1 1 −1 −1 −1 1 −1 −1 1 −1 1 1 1 −1 −1 −1 1 −1 −1 −1 −1 1 −1 −1 1 −1 1 1 1 −1 −1 −1 1 −1 1 1 1 −1 −1 −1 1 −1 1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 −1 1 1 1 1 −1 1 1 −1 1 1 1 1 −1 −1 −1 1 −1 1 1 1 −1 1 1 1 1 −1 −1 −1 1 −1 −1 −1 −1 1 −1 −1 1 −1 −1 1 −1].

In these cases, the following eight sequences: a sequence (89) to a sequence (96) are obtained.

In some implementations of this application, the CEF sequence included in the CEF is at least one sequence in the sequence (89) to the sequence (96).

In addition, the sequence (89) to the sequence (96) may alternatively be reversely arranged. In these cases, the CEF sequence included in the CEF is a result obtained by reversely arranging at least one sequence in the sequence (89) to the sequence (96). Alternatively, a product of α and the sequence (89) to the sequence (96) may be obtained. In these cases, the CEF sequence included in the CEF is a product of α and at least one sequence in the sequence (89) to the sequence (96), where α is −1, j, or −j.

In addition, through experiments, when WLAN communication in the DFT-S-OFDM mode is performed by using the CEF sequence generated in the foregoing manner, PAPRs corresponding to different resource combinations are all relatively small.

In addition, after CEF sequences are determined in the foregoing manners, a corresponding CEF sequence may be further selected from the generated CEF sequences based on a requirement of the DFT-S-OFDM transmitter; and the selected CEF sequence is mapped to a subcarrier at an input end of the IFFT module of the DFT-S-OFDM transmitter, so that the IFFT module obtains the CEF sequence. The CEF sequence may be selected in a plurality of manners. For example, if the DFT-S-OFDM transmitter needs L CEF sequences, the first L CEF sequences are selected from all generated CEF sequences, or L CEF sequences with relatively low PAPRs may be selected based on PAPRs that are corresponding to different resource combinations when communication is performed by using each CEF sequence.

When frequency domain resource division is performed in the second manner, a quantity of subcarriers included on a channel is 352. In these cases, if the quantity of bonding channels is 1 (in a communication process, communication is performed through one bonding channel), a length of the CEF sequence is 352, and the CEF sequence may be determined in the following manner.

In the method, in a first step, one quadruple Golay sequence pair whose length is 11 is constructed, where the sequence pair includes a sequence A and a sequence B.

A=[1, 1i, 1i, −1, −1i, 1i, −1, 1, −1, 1i, 1]; and B=[−1, 1, −1, 1i, 1, 1, −1i, −1i, −1i, 1, 1].

In a second step, orthogonal Golay sequences R1 and R2 whose lengths are 22 are generated in the following calculation manner:

R1=[A B]; and R2=[A −B].

In these cases, R1=[1, 1i, 1i, −1, −1i, 1i, −1, 1, −1, 1i, 1, −1, 1, −1, 1i, 1, 1, −1i, −1i, −1i, 1, 1].

In addition, because −B=[1, −1, 1, −1i, −1, −1, 1i, 1i, 1i, −1, −1], R2=[1, 1i, 1i, −1, −1i, 1i, −1, 1, −1, 1i, 1, 1, −1, 1, −1i, −1, −1, 1i, 1i, 1i, −1, −1]. −R1=[−1, −1i, −1i, 1, 1i, −1i, 1, −1, 1, −1i, −1, 1, −1, 1, −1i, −1, −1, 1i, 1i, 1i, −1, −1], and −R2=[−1, −1i, −1i, 1, 1i, −1i, 1, −1, 1, −1i, −1, −1, 1, −1, 1i, 1, 1, −1i, −1i, −1i, 1, 1].

In a third step, eight pairwise orthogonal sequences whose lengths are 88 are obtained in the following calculation manner:

G88(1,:)=[R1, R2, R1, −R2];
G88(2,:)=[R1, R2, −R1, R2];
G88(3,:)=[R2, R1, R2, −R1];
G88(4,:)=[R2, R1, −R2, R1];
G88(5,:)=[R1, −R2, R1, R2];
G88(6,:)=[−R1, R2, R1, R2];
G88(7,:)=[R2, −R1, R2, R1]; and
G88(8,:)=[−R2, R1, R2, R1].

Accordingly, the following sequences can be determined:

G88(1,:)=[1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1];

G88(2,:)=[1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1];

G88(3,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

G88(4,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1];

G88(5,:)=[1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1];

G88(6,:)=[−1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1];

G88(7,:)=[1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −−1 1i 1i 1i −1 −1 1 1i 1i −1 −1i 1i −1 1 −1 1i 1 −1 1 −1 1i 1 1 −1i −1i 1 1]; and G88(8,:)=[−1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 −1 1 −1 1i 1 1 −1i −1i −1i 1 1].

In a fourth step, two Golay sequences whose lengths are 88 are randomly selected from the eight Golay sequences whose lengths are 88 and that are obtained in the third step, and eight pairwise orthogonal Golay sequences whose lengths are 352 are obtained based on the two Golay sequences whose lengths are 88. The eight pairwise orthogonal Golay sequences whose lengths are 352 are used as eight CEF sequences generated in embodiments of this application; or reverse arrangement results of the eight pairwise orthogonal Golay sequences whose lengths are 352 are used as eight CEF sequences generated in embodiments of this application; or a product of −1 and the eight pairwise orthogonal Golay sequences whose lengths are 352 is obtained, and the product is used as a CEF sequence.

In feasible manners, if the two selected Golay sequences whose lengths are 88 are M1 and M2, M1=G88(3,:), and M2=G88(4,:), the eight pairwise orthogonal Golay sequences whose lengths are 352 may be generated in the following manner:

G352(1,:)=[M1, M2, M1, −M2];
G352(2,:)=[M1, M2, −M1, M2];
G352(3,:)=[M2, M1, M2, −M1];
G352(4,:)=[M2, M1, −M2, M1];
G352(5,:)=[M1, −M2, M1, M2];
G352(6,:)=[−M1, M2, M1, M2];
G352(7,:)=[M2, −M1, M2, M1]; and
G352(8,:)=[−M2, M1, M2, M1].

Because M1=G88(3,:), M2=G88(4,:), −R1=[−1, −1i, −1i, 1, 1i, −1i, 1, −1, 1, −1i, −1, 1, −1, 1, −1i, −1, −1, 1i, 1i, 1i, −1, −1], and −R2=[−1, −1i, −1i, 1, 1i, −1i, 1, −1, 1, −1i, −1, −1, 1, −1, 1i, 1, 1, −1i, −1i, −1i, 1, 1], the following sequences may be obtained:

M1=G88(3,:)=[R2, R1, R2, −R1]=[1, 1i, 1i, −1, −1i, 1i, −1, 1, −1, 1i, 1, 1, −1, 1, −1i, −1, −1, 1i, 1i, 1i, −1, −1, 1, 1i, 1i, −1, −1i, 1i, −1, 1, −1, 1i, 1, −1, 1, −1, 1i, 1, 1, −1i, −1i, −1i, 1, 1, 1, 1i, 1i, −1, −1i, 1i, −1, 1, −1, 1i, 1, 1, −1, 1, −1i, −1, −1, 1i, 1i, 1i, −1, −1, −1, −1i, −1i, 1, 1i, −1i, 1, −1, 1, −1i, −1, 1, −1, 1, −1i, −1, −1, 1i, 1i, 1i, −1, −1];

M2=G88(4, :)=[R2, R1, −R2, R1]=[1, 1i, 1i, −1, −1i, 1i, −1, 1, −1, 1i, 1, 1, −1, 1, −1i, −1, −1, 1i, 1i, 1i, −1, −1, 1, 1i, 1i, −1, −1i, 1i, −1, 1, −1, 1i, 1, −1, 1, −1, 1i, 1, 1, −1i, −1i, −1i, 1, 1, −1, −1i, −1i, 1, 1i, −1i, 1, −1, 1, −1i, −1, −1, 1, −1, 1i, 1, 1, −1i, −1i, −1i, 1, 1, 1, 1i, −1, −1i, 1i, −1, 1, −1, 1i, 1, −1, 1, −1, 1i, 1, 1, −1i, −1i, −1i, 1, 1];

−M1=[−R2, −R1, −R2, R1]=[−1, −1i, −1i, 1, 1i, −1i, 1, −1, 1, −1i, −1, −1, 1, −1, 1i, 1, 1, −1i, −1i, −1i, 1, 1, −1, −1i, −1i, 1, 1i, −1i, 1, −1, 1, −1i, −1, 1, −1, 1, −1i, −1, −1, 1i, 1i, 1i, −1, −1, −1, −1i, −1i, 1, 1i, −1i, 1, −1, 1, −1i, −1, −1, 1, −1, 1i, 1, 1, −1i, −1i, −1i, 1, 1, 1, 1i, 1i, −1, −1i, 1i, −1, 1, −1, 1i, 1, −1, 1, −1, 1i, 1, 1, −1i, −1i, −1i, 1, 1]; and −M2=[−R2, −R1, R2, −R1]=[−1, −1i, −1i, 1, 1i, −1i, 1, −1, 1, −1i, −1, −1, 1, −1, 1i, 1, 1, −1i, −1i, −1i, 1, 1, −1, −1i, −1i, 1, 1i, −1i, 1, −1, 1, −1i, −1, 1, −1, 1, −1i, −1, −1, 1i, 1i, 1i, −1, −1, 1, 1i, 1i, −1, −1i, 1i, −1, 1, −1, 1i, 1, 1, −1, 1, −1i, −1, −1, 1i, 1i, 1i, −1, −1, −1, −1i, −1i, 1, 1i, −1i, 1, −1, 1, −1i, −1, 1, −1, 1, −1i, −1, −1, 1i, 1i, 1i, −1, −1].

In these cases, eight sequences: a sequence (97) to a sequence (104) are obtained.

In feasible implementations of embodiments of this application, the CEF sequence included in the CEF is at least one sequence in the sequence (97) to the sequence (104).

In other feasible implementations, the sequence (97) to the sequence (104) may alternatively be reversely arranged. In these cases, the CEF sequence included in the CEF is a result obtained by reversely arranging at least one sequence in the sequence (97) to the sequence (104). Alternatively, a product of α and the sequence (97) to the sequence (104) may be obtained. In these cases, the CEF sequence included in the CEF is a product of α and at least one sequence in the sequence (97) to the sequence (104), where α is −1, j, or −j.

In addition, after CEF sequences are determined in the foregoing manners, a corresponding CEF sequence may be further selected from the generated CEF sequences based on a requirement of the DFT-S-OFDM transmitter; and the selected CEF sequence is mapped to a subcarrier at an input end of the IFFT module of the DFT-S-OFDM transmitter, so that the IFFT module obtains the CEF sequence. The CEF sequence may be selected in a plurality of manners. For example, if the DFT-S-OFDM transmitter needs L CEF sequences, the first L CEF sequences are selected from all generated CEF sequences, or L CEF sequences with relatively low PAPRs may be selected based on PAPRs that are corresponding to different resource combinations when communication is performed by using each CEF sequence.

Through experiments, when WLAN communication in the DFT-S-OFDM mode is performed by using the CEF sequence generated in the foregoing manner, PAPRs corresponding to different resource combinations are all relatively small.

Further, after CEF sequences are determined in the foregoing manners, a corresponding CEF sequence may be further selected from the generated CEF sequences based on a requirement of the DFT-S-OFDM transmitter; and the selected CEF sequence is mapped to a subcarrier at an input end of the IFFT module of the DFT-S-OFDM transmitter, so that the IFFT module obtains the CEF sequence. The CEF sequence may be selected in a plurality of manners. For example, if the DFT-S-OFDM transmitter needs L CEF sequences, the first L CEF sequences are selected from all generated CEF sequences, or L CEF sequences with relatively low PAPRs may be selected based on PAPRs that are corresponding to different resource combinations when communication is performed by using each CEF sequence.

When frequency domain resource division is performed in the second manner, a quantity of subcarriers included on a channel is 352. In these cases, if the quantity of bonding channels is 2 (in a communication process, communication is performed through two bonding channels), a length of the CEF sequence is 704, and the CEF sequence may be determined by using the following method.

In the method, in a first step, eight pairwise orthogonal Golay sequences whose lengths are 352: G352(1, :), G352 (2, :), G352(3, :), G352(4, :), G352(5, :), G352(6, :), G352 (7, :), and G352(8, :) that are generated when frequency domain resource division is performed in the second manner and the quantity of bonding channels is 1 are obtained.

In a second step, eight pairwise orthogonal Golay sequences whose lengths are 704 are generated based on the eight pairwise orthogonal Golay sequences whose lengths are 352 in the following manner:

G704(1,:)=[G352(1,:), G352(2,:)]; G704(2,:)=[G352(1,:), −G352(2,:)];

G704(3,:)=[G352(3,:), G352(4,:)]; G704(4,:)=[G352(3,:), −G352(4,:)];

G704(5,:)=[G352(5,:), G352(6,:)]; G704(6,:)=[G352(5,:), −G352(6,:)]; and

G704(7,:)=[G352(7,:), G352(8,:)]; G704(8,:)=[G352(7,:), −G352(8,:)].

According to the foregoing embodiment, the following sequences may be obtained:

−G352(2,:)=[−1 −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1, −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

−G352(4,:)=[−1 −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1−1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1i −1i 1 1i −1i 1 −1 1 −1i −1 −1 1 −1 1i 1 1 −1i −1i 1 1 1 1i 1i −1 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1i −1i 1 1i −1i 1 −1 1 −1i −1 −1 1 −1 1i 1 1 −1i 1 1 1 1i 1i −1 −1i 1i −1 1 −1 1i 1 −1 1 −1 1i 1 1 −1i −1i 1 1];

−G352(6,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1]; and −G352(8, :)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1

−1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1].

In these cases, the eight pairwise orthogonal sequences whose lengths are 704 may be determined, and the eight pairwise orthogonal sequences are a sequence (105) to a sequence (112).

In a feasible implementation, the CEF sequence included in the CEF is at least one sequence in the sequence (105) to the sequence (112).

Alternatively, in other feasible implementations, the sequence (105) to the sequence (112) may alternatively be reversely arranged. In these cases, the CEF sequence included in the CEF is a result obtained by reversely arranging at least one sequence in the sequence (105) to the sequence (112). Alternatively, a product of α and the sequence (105) to the sequence (112) may be obtained. In these cases, the CEF sequence included in the CEF is a product of α and at least one sequence in the sequence (105) to the sequence (112), where α is −1, j, or −j.

Through experiments, when WLAN communication in the DFT-S-OFDM mode is performed by using the CEF sequence generated in the foregoing manner, PAPRs corresponding to different resource combinations are all relatively small.

Further, after CEF sequences are determined in the foregoing manner, a corresponding CEF sequence may be further selected from the generated CEF sequences based on a requirement of the DFT-S-OFDM transmitter; and the selected CEF sequence is mapped to a subcarrier at an input end of the IFFT module of the DFT-S-OFDM transmitter, so that the IFFT module obtains the CEF sequence. The CEF sequence may be selected in a plurality of manners. For example, if the DFT-S-OFDM transmitter needs L CEF sequences, the first L CEF sequences are selected from all generated CEF sequences, or L CEF sequences with relatively low PAPRs may be selected based on PAPRs that are corresponding to different resource combinations when communication is performed by using each CEF sequence.

When frequency domain resource division is performed in the second manner, a quantity of subcarriers included on a channel is 352. In these cases, if the quantity of bonding channels is 3 (in a communication process, communication is performed through three bonding channels), a length of the CEF sequence is 1056, and the CEF sequence may be determined in the following manner.

In the method, in a first step, eight pairwise orthogonal Golay sequences whose lengths are 88: G88(1, :), G88(2, :), G88(3, :), G88(4, :), G88(5, :), G88(6, :), G88(7, :), and G88(8, :) that are generated when frequency domain resource division is performed in the second manner and the quantity of bonding channels is 1 are obtained. Then, the eight pairwise orthogonal Golay sequences whose lengths are 88 are divided into four sequence pairs. A first sequence pair includes sequences Z1(1,:) and Z2(1,:); a second sequence pair includes sequences Z1(2,:) and Z2(2,:); a third sequence pair includes sequences Z1(3,:) and Z2(3,:); and a fourth sequence pair includes sequences Z1(4,:) and Z2(4,:).

The division method is as follows:

Z1(1,)=G88(1,); Z2(1,)=G88(2,);

Z1(2,)=G88(3,); Z2(2,)=G88(4,);

Z1(3,)=G88(5,); Z2(3,)=G88(6,); and

Z1(4,)=G88(7,); Z2(4,)=G88(8,).

Accordingly, the following sequences may be determined:

Z1(1,:)=G88(1,:)=[1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1];

Z2(1,:)=G88(2,:)=[1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1];

Z1(2,:)=G88(3,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

Z2(2,:)=G88(4,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1];

Z1(3,:)=G88(5,:)=[1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1];

Z2(3,:)=G88(6,:)=[−1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1];

Z1(4,:)=G88(7,:)=[1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1]; and Z2(4,:)=G88(8,:)=[−1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1].

In addition, the following sequences may also be determined:

—Z1(1,:)=[−1 −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 −1 1 −1 1i 1 1 −1i −1i 1 1];

−Z2(1,:)=[−1 −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1];

−Z1(2,:)=[−1 −1i 1 1i −1i 1 −1 1 −1i −1 −1 1 −1 1i 1 1 −1i −1i 1 1 −1 −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1];

−Z2(2,:)=[−1 −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

−Z1(3,:)=[−1 −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1];

−Z2(3,:)=[1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1i −1 1i 1i 1i −1 −1 −1 −1i −1i 1 1i −1i 1 −1 1 −1i −1 −1 1 −1 1i 1 1 −1i −1i −1i 1 1];

−Z1(4,:)=[−1 −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1]; and −Z2(4,:)=[1 1i 1i −1 −1i 1i −1 1 −1 1i 1 1 −1 1 −1i −1 −1 1i 1i 1i −1 −1 −1 −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1].

In a second step, based on the sequence pairs obtained through division, eight pairwise orthogonal sequences whose lengths are 1056 are constructed in the following manner:

G_1056(1,:)=[Z1(1,:), −Z2(1,:), −Z1(1,:), Z2(1,:), −Z1 (1,:), Z2(1,:), −Z1(1,:), Z2(1,:), −Z1(1,:), −Z2(1,:), Z1(1,:), Z2(1,:)];

G_1056(2,:)=[Z1(4,:), −Z2(4,:), −Z1(4,:), Z2(4,:), −Z1 (4,:), Z2(4,:), −Z1(4,:), Z2(4,:), −Z1(4,:), −Z2(4,:), Z1(4,:), Z2(4,:)];

G_1056(3,:)=[Z1(2,:), −Z2(2,:), Z1(2,:), −Z2(2,:), −Z1 (2,:), Z2(2,:), Z1(2,:), −Z2(2,:), −Z1(2,:), −Z2(2,:), −Z1 (2,:), −Z2(2,:)];

G_1056(4,:)=[Z1(4,:), −Z2(4,:), Z1(4,:), −Z2(4,:), Z1(4,:), Z2(4,:), −Z1(4,:), −Z2(4,:), Z1(4,:), Z2(4,:), Z1(4,:), Z2(4,:)];

G_1056(5,:)=[Z1(1,:), Z2(1,:), −Z1(1,:), −Z2(1,:), −Z1 (1,:), Z2(1,:), Z1(1,:), −Z2(1,:), Z1(1,:), −Z2(1,:), Z1(1,:), −Z2(1,:)];

G_1056(6,:)=[Z1(2,:), Z2(2,:), −Z1(2,:), Z2(2,:), −Z1(2,:), Z2(2,:), Z1(2,:), −Z2(2,:), Z1(2,:), Z2(2,:), Z1(2,:), −Z2 (2,:)];

G_1056(7,:)=[Z1(4,:), Z2(4,:), −Z1(4,:), Z2(4,:), −Z1(4,:), Z2(4,:), Z1(4,:), −Z2(4,:), Z1(4,:), Z2(4,:), Z1(4,:), −Z2 (4,:)]; and G_1056(8,:)=[Z1(3,:), Z2(3,:), −Z1(3,:), Z2(3,:), Z1(3,:), −Z2(3,:), Z1(3,:), −Z2(3,:), Z1(3,:), Z2(3,:), Z1(3,:), −Z2(3,:)].

In these cases, the eight sequences whose lengths are 1056 may be obtained, and the eight sequences are a sequence (113) to a sequence (120).

In feasible implementations, the CEF sequence included in the CEF is at least one sequence in the sequence (113) to the sequence (120).

Alternatively, the sequence (113) to the sequence (120) may alternatively be reversely arranged. In these cases, the CEF sequence included in the CEF is a result obtained by reversely arranging at least one sequence in the sequence (113) to the sequence (120). Alternatively, a product of α and the sequence (113) to the sequence (120) may be obtained. In these cases, the CEF sequence included in the CEF is a product of α and at least one sequence in the sequence (113) to the sequence (120), where α is −1, j, or −j. Alternatively, a conjugation operation may be performed on the sequence (113) to the sequence (120). In these cases, the CEF sequence included in the CEF is a corresponding sequence obtained by performing the conjugation operation on at least one sequence in the sequence (113) to the sequence (120).

Through experiments, when WLAN communication in the DFT-S-OFDM mode is performed by using the CEF sequence generated in the foregoing manner, PAPRs corresponding to different resource combinations are all relatively small.

Further, after CEF sequences are determined in the foregoing manner, a corresponding CEF sequence may be further selected from the generated CEF sequences based on a requirement of the DFT-S-OFDM transmitter; and the selected CEF sequence is mapped to a subcarrier at an input end of the IFFT module of the DFT-S-OFDM transmitter, so that the IFFT module obtains the CEF sequence. The CEF sequence may be selected in a plurality of manners. For example, if the DFT-S-OFDM transmitter needs L CEF sequences, the first L CEF sequences are selected from all generated CEF sequences, or L CEF sequences with relatively low PAPRs may be selected based on PAPRs that are corresponding to different resource combinations when communication is performed by using each CEF sequence.

When frequency domain resource division is performed in the second manner, a quantity of subcarriers included on a channel is 352. In these cases, if the quantity of bonding channels is 4 (in a communication process, communication is performed through four bonding channels), a length of the CEF sequence is 1408, and the CEF sequence may be determined in the following manner.

In the method, in a first step, eight pairwise orthogonal Golay sequences whose lengths are 352: G352(1, :), G352 (2, :), G352(3, :), G352(4, :), G352(5, :), G352(6, :), G352 (7, :), and G352(8, :) that are generated when frequency domain resource division is performed in the second manner and the quantity of bonding channels is 1 are obtained. Then, the eight pairwise orthogonal Golay sequences whose lengths are 352 are divided into four sequence pairs. A first sequence pair includes sequences C1(1,:) and C2(1,:); a second sequence pair includes sequences C1(2,:) and C2(2,:); a third sequence pair includes sequences C1(3,:) and C2(3,:); and a fourth sequence pair includes sequences C1(4,:) and C2(4,:).

The division method is as follows:

C1(1,:)=G352(1,:); C2(1,:)=G352(2,:);
C1(2,:)=G352(3,:); C2(2,:)=G352(4,:);
C1(3,:)=G352(5,:); C2(3,:)=G352(6,:); and
C1(4,:)=G352(7,:); C2(4,:)=G352(8,:).

Accordingly, the following sequences may be obtained:

C1(1,:)=G352(1,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

C2(1,:)=G352(2,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1, 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1];

C1(2,:)=G352(3,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1];

C2(2,:)=G352(4,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

C1(3,:)=G352(5,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 1 −1 1i 1 1 −1 1 −1i −1 −1 1i 1i 1i −1 −1 −1 −1i −1i 1 1i −1 1i −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1];

C2(3,:)=G352(6,:)=[−1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 1i −1 1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1];

C1(4,:)=G352(7,:)=[1 1i 1i −1 −1i 1i −1 1 −1 1i 1 1 −1 1 −1i −1 −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1 i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

C2(4,:)=G352(8,:)=[−1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

–C1(1,:)=[–1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1i 1i 1 1i 1i 1 –1 1 1i –1 –1 1 –1 1i 1 1 1i 1i 1i 1 1 1 1i 1i –1 1i 1i –1 1 –1 1i 1 –1 1 –1 1i 1 1 1i 1i 1i 1 1 –1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1 1i 1i –1 1i 1i –1 1 –1 1i 1 1 –1 1 1i –1 –1 1i 1i 1i –1 –1 –1 1i 1i 1 1i 1i 1 –1 1 1i –1 1 –1 1 1i –1 –1 1i 1i 1i –1 –1 –1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1i 1i 1 1i 1i 1 –1 1 1i –1 –1 1 –1 1i 1 1 1i 1i 1i 1 1 1 1i 1i –1i 1i –1 1 –1 1i 1 –1 1 –1 1i 1 1 1i 1i 1i 1 1 1 –1i 1i –1 1i 1i –1 1 –1 1i 1 1 –1 1 1i –1 –1 1i 1i 1i –1 –1 1 1i 1i –1 1i 1i –1 1 –1 1i 1 –1 1 –1 1i 1 1 1i 1i 1i 1 1 –1 1i 1i 1 1i 1i 1 –1 1 1i –1 –1 1 –1 1i 1 1 1i 1i 1i 1 1 1 1i 1i –1 1i 1i –1 1 –1 1i 1 –1 1 –1 1i 1 1 1i 1i 1 1];

–C2(1,:)=[–1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1i 1i 1 1i 1i 1 –1 1 1i –1 –1 1 –1 1i 1 1 1i 1i 1i 1 1 1 1i 1i –1 1i 1i –1 1 –1 1i 1 –1 1 –1 1i 1 1 1i 1i 1i 1 1, –1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1 1i 1i –1 1i 1i –1 1 –1 1i 1 1 –1 1 1i –1 –1 1i 1i 1i –1 –1 –1 1i 1i 1 1i 1i 1 –1 1 1i –1 1 –1 1 1i –1 –1 1i 1i 1i –1 –1 1 1i 1i –1 1i 1i –1 1 –1 1i 1 1 –1 1 1i –1 –1 1i 1i 1i –1 –1 1 1i 1i –1 1i 1i –1 1 –1 1i 1 –1 1 –1 1i 1 1 1i 1i 1i 1 1 1 1i 1i –1 1i 1i –1 1 –1 1i 1 1 –1 1 1i –1 –1 1i 1i 1i –1 –1 –1 1i 1i 1 1i 1i 1 –1 1 1i –1 1 –1 1 1i –1 –1 1i 1i 1i –1 –1 –1 1i 1i 1 1i 1i 1 –1 1 1i –1 –1 1 –1 1i 1 1 1i 1i 1 1i 1i 1 –1 1 1i –1 1 –1 1 1i –1 –1 1i 1i 1i 1 1i 1i 1 1i 1i 1 –1 1 1i –1 1 –1 1 1i –1 –1 1i 1i –1 –1 1 1i 1i –1 1i 1i –1 1 –1 1i 1 1 –1 1 1i –1 –1 1i 1i 1i –1 –1 –1 1i 1i 1 1i 1i 1 –1 1 1i –1 1 –1 1 1i –1 –1 1i 1i 1i –1 1];

–C1(2,:)=[–1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1 1i 1i –1 1i 1i –1 1 –1 1i 1 1 –1 1 1i –1 –1 1i 1i 1i –1 –1 –1 1i 1i 1 1i 1i 1 –1 1 1i –1 1 –1 1i –1 –1 1i 1i 1i –1 –1 –1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1i 1i 1 1i 1i 1 –1 1 1i –1 –1 1 –1 1i 1 1 1i 1i 1i 1 1 1 1i 1i –1 1i 1i –1 1 –1 1i 1 –1 1 –1 1i 1 1 1i 1i 1i 1 1 –1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1 1i 1i –1 1i 1i –1 1 –1 1i 1 1 –1 1 1i –1 –1 1i 1i 1i –1 –1 –1 1i 1i 1 1i 1i 1 –1 1 1i –1 1 –1 1 1i –1 –1 1i 1i 1i –1 –1 1 1i 1i –1 1i 1i –1 1 –1 1i 1 1 –1 1 1i –1 –1 1i 1i 1i –1 –1 1 1i 1i –1 1i 1i –1 1 –1 1i 1 –1 1 –1 1i 1 1 1i 1i 1i 1 1 1 1i 1i –1 1i 1i –1 1 –1 1i 1 1 –1 1 1i –1 –1 1i 1i 1i –1 –1 –1 1i 1i 1 1i 1i 1 –1 1 1i –1 1 –1 1 1i –1 –1 1i 1i –1 1 1];

–C2(2,:)=[–1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1 1i 1i –1 1i 1i –1 1 –1 1i 1 1 –1 1 1i –1 –1 1i 1i 1i –1 –1 –1 1i 1i 1 1i 1i 1 –1 1 1i –1 1 –1 1i –1 –1 1i 1i 1i –1 –1 –1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1i –1 –1 1i 1i 1i –1 –1 1i 1i 1 1i 1i 1 –1 1 1i –1 –1 1 –1 1i 1 1 1i 1i 1i 1 1 1 1i 1i –1 1i 1i –1 1 –1 1i 1 –1 1 –1 1i 1 1 1i 1i 1i 1 1 1 1i 1i –1 1i 1i –1 1 –1 1i 1 1 –1 1 1i –1 –1 1i 1i 1i –1 –1 1 1i 1i –1 1i 1i –1 1 –1 1i 1 –1 1 –1 1i 1 1 1i 1i 1i 1 1 –1 1i 1i 1 1i 1i 1 –1 1 1i –1 –1 1 –1 1i 1 1 1i 1i 1i 1 1 1 1i 1i –1 1i 1i –1 1 –1 1i 1 –1 1i 1 –1 1 –1 1i 1 1 1i 1i 1i 1 1 –1 1i 1i 1 1i 1i 1 –1 1 1i –1 –1 1 –1 1i 1 1 1i 1i 1i 1 1 –1 1i 1i 1 1i 1i 1 –1

1 1i –1 1 –1 1 1i –1 –1 1i 1i 1i –1 –1 1i 1i 1 1i 1i 1 –1 1 1i –1 –1 1 –1 1i 1 1 1i 1i 1i 1 1 1 1i 1i –1 1i 1i –1 1 –1 1i 1 –1 1 –1 1i 1 1 1i 1i 1i 1 1];

–C1(3,:)=[–1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1i 1i 1 1i 1i 1 –1 1 1i –1 –1 1 –1 1i 1 1 1i 1i 1i 1 1 1 1i 1i –1 1i 1i –1 1 –1 1i 1 –1 1 –1 1i 1 1 1i 1i 1i 1 1 1 1i 1i –1 1i 1i –1 1 –1 1i 1 1 –1 1 1i –1 –1 1i 1i 1i –1 –1 1 1i 1i –1 1i 1i –1 1 –1 1i 1 –1 1 –1 1i 1 1 1i 1i 1i –1 1i 1i 1 1i 1i 1 –1 1 1i –1 –1 1 –1 1i 1 1 1i 1i 1i 1 1 1 1i 1i –1 1i 1i –1 1 –1 1i 1 –1 1 –1 1i 1 1 1i 1i 1i 1 1 –1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i –i 1i –1 –1 1i 1i 1 1i 1i 1 –1 1 1i –1 –1 1 –1 1i 1 1 1i 1i 1i 1 1 1 1i 1i –1 1i 1i –1 1 –1 1i 1 –1 1 –1 1i 1 1 1i 1i 1i 1 1 –1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1i 1i 1i –1 –1 1 1i 1i –1 1i 1i –1 1 –1 1i 1 1 –1 1 1i –1 –1 1i 1i 1i –1 –1 –1 1i 1i 1 1i 1i 1 –1 1 1i –1 1 –1 1 1i –1 –1 1i 1i 1i –1 1];

–C2(3,:)=[1 1i 1i –1 1i 1i –1 1 –1 1i 1 1 –1 1 1i –1 –1 1i 1i 1i –1 –1 1 1i 1i –1 1i 1i –1 1 –1 1i 1 –1 1 –1 1i 1 1 1i 1i 1i 1 1 1 1i 1i –1 1i 1i –1 1 –1 1i 1 1 –1 1 1i –1 –1 1i 1i 1i –1 –1 –1 1i 1i 1 1i 1i 1 –1 1 1i –1 1 –1 1 1i –1 –1 1i 1i 1i –1 –1 –1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1i –1 –1 1i 1i 1i –1 –1 1 1i 1i –1 1i 1i –1 1 1 –1 1i 1 1 –1 1 1i –1 –1 1i 1i 1i –1 –1 –1 1i 1i 1 1i 1i 1 –1 1 1i –1 1 –1 1i –1 –1 1i 1i 1i –1 –1 –1 1i 1i 1 1i 1i 1 –1 1 1i –1 1 –1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1i 1i 1 1i 1i 1 –1 1 1i –1 –1 1 –1 1i 1 1 1i 1i 1i 1 1 1 1i 1i –1 1i 1i –1 1 –1 1i 1 –1 1 –1 1i 1 1 1i 1i 1i 1 1 –1 1i 1i 1 1i 1i 1 –1 1 1i –1 –1 1 –1 1i 1 1 1i 1i 1 1 –1 1i 1i 1 1i 1i 1 –1 1 1i –1 1 –1 1 1i –1 –1 1i 1i 1i –1 –1 1 1i 1i –1 1i 1i –1 1 –1 1i 1 1 –1 1 1i –1 –1 1i 1i 1i –1 –1 –1 1i 1i 1 1i 1i 1 –1 1 1i –1 1 –1 1i –1 –1 1i 1i 1i –1 1];

–C1(4,:)=[–1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1 1i 1i –1 1i 1i –1 1 –1 1i 1 1 –1 1 1i –1 –1 1i 1i 1i –1 –1 –1 1i 1i 1 1i 1i 1 –1 1 1i –1 1 –1 1 1i –1 –1 1i 1i 1i –1 –1 1 1i 1i –1 1i 1i –1 1 –1 1i 1 1 –1 1 1i –1 –1 1i 1i 1i –1 –1 1 1i 1i –1 1i 1i –1 1 –1 1i 1 1 –1 1 –1 1i 1 1 1i 1i 1i 1 1 1 1i 1i –1 1i 1i –1 1 –1 1i 1 1 –1 1 1i –1 –1 1i 1i 1i –1 –1 –1 1i 1i 1 1i 1i 1 –1 1 1i –1 1 –1 1 1i 1i –1 –1 1i 1i 1i –1 –1 –1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1 1i 1i –1 1i 1i –1 1 –1 1i 1 1 –1 1 1i –1 –1 1i 1i 1i –1 –1 –1 1i 1i 1 1i 1i 1 –1 1 1i –1 1 –1 1 1i –1 –1 1i 1i –1 –1 –1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1i 1i 1 1i 1i 1 –1 1 1i –1 –1 1 –1 1i 1 1 1i 1i 1i 1 1 1 1i –1 1i 1i –1 1 –1 1i 1 –1 1 –1 1i 1 1 1i 1i 1i 1 1]; and –C2(4,:)=[1 1i 1i –1 1i 1i –1 1 –1 1i 1 1 –1 1 1i –1 –1 1i 1i 1i –1 –1 1 1i 1i –1 1i 1i –1 1 –1 1i 1 –1 1 –1 1i 1 1 1i 1i 1i 1 1 –1 1i 1i 1 1i 1i 1 –1 1 1i –1 –1 1 –1 1i 1 1 1i 1i 1i 1 1 1 1i 1i –1 1i 1i –1 1 –1 1i 1 –1 1 –1 1i 1 1 1i 1i 1i 1 1 –1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1i 1i 1 1i 1i 1 –1 1 1i –1 –1 1 1 –1 1i 1 1 1i 1i 1i 1 1 1 1i 1i –1 1i 1i –1 1 –1 1i 1 –1 1 –1 1i 1 1 1i 1i 1i 1 1 –1 1i 1i 1 1i 1i 1 –1 1 1i –1 –1 1 –1 1i 1 1 1i 1i 1i 1 1 –1 1i 1i 1 1i 1i 1 –1 1 1i –1 1 –1 1 1i –1 –1 1i 1i 1i –1 –1 1 1i 1i –1 1i 1i –1 1 –1

1i 1 1 −1 1 1i −1 −1 1i 1i 1i −1 −1 −1 1i 1i 1 1i 1i 1 −1 1 1i −1 1 −1 1 1i −1 −1 1i 1i 1i −1 −1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1i 1i 1 1i 1i 1 −1 1 1i −1 −1 1 −1 1i 1 1 1i 1i 1i 1 1 1 1i 1i −1 1i 1i −1 1 −1 1i 1 −1 1 −1 1i 1 1 1i 1i 1i 1 1].

In a second step, 32 pairwise orthogonal sequences whose lengths are 1408 are generated based on the orthogonal Golay sequences whose lengths are 352, and eight sequences with low PAPRs are selected from the 32 pairwise orthogonal sequences. The eight sequences with low PAPRs may be as follows:

G1408(1,:)=[C1(1,:), C2(1,:), C1(1,:), −C2(1,:)];
G1408(2,:)=[−C2(1,:), C1(1,:), C2(1,:), C1(1,:)];
G1408(3,:)=[C1(2,:), C2(2,:), −C1(2,:), C2(2,:)];
G1408(4,:)=[C1(3,:), C2(3,:), −C1(3,:), C2(3,:)];
G1408(5,:)=[C2(3,:), −C1(3,:), C2(3,:), C1(3,:)];
G1408(6,:)=[C2(4,:), C1(4,:), C2(4,:), −C1(4,:)];
G1408(7,:)=[C2(4,:), −C1(4,:), C2(4,:), C1(4,:)]; and
G1408(8,:)=[−C2(4,:), C1(4,:), C2(4,:), C1(4,:)].

In these cases, eight sequences whose lengths are 1408 may be obtained, and the eight sequences are a sequence (121) to a sequence (128).

In feasible implementations, the CEF sequence included in the CEF is at least one sequence in the sequence (121) to the sequence (128).

Alternatively, the sequence (121) to the sequence (128) may alternatively be reversely arranged. In these cases, the CEF sequence included in the CEF is a result obtained by reversely arranging at least one sequence in the sequence (121) to the sequence (128). Alternatively, a product of $\alpha$ and the sequence (121) to the sequence (128) may be obtained. In these cases, the CEF sequence included in the CEF is a product of $\alpha$ and at least one sequence in the sequence (121) to the sequence (128), where $\alpha$ is −1, j, or −j.

Through experiments, when WLAN communication in the DFT-S-OFDM mode is performed by using the CEF sequence generated in the foregoing manner, PAPRs corresponding to different resource combinations are all relatively small.

Further, after CEF sequences are determined in the foregoing manner, a corresponding CEF sequence may be further selected from the generated CEF sequences based on a requirement of the DFT-S-OFDM transmitter; and the selected CEF sequence is mapped to a subcarrier at an input end of the IFFT module of the DFT-S-OFDM transmitter, so that the IFFT module obtains the CEF sequence. The CEF sequence may be selected in a plurality of manners. For example, if the DFT-S-OFDM transmitter needs L CEF sequences, the first L CEF sequences are selected from all generated CEF sequences, or L CEF sequences with relatively low PAPRs may be selected based on PAPRs that are corresponding to different resource combinations when communication is performed by using each CEF sequence.

Figure 10:
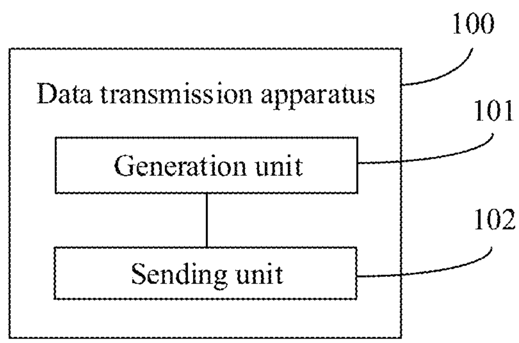
FIG. 10 is a schematic diagram of a structure of a data transmission apparatus according to an embodiment of this application.

FIG. 10 is a schematic diagram of a structure of a data transmission apparatus 100 according to an embodiment of this application. The data transmission apparatus may be used for the transmit end in FIG. 2(*a*) or FIG. 2(*b*), and the data transmission apparatus may include units configured to perform the method performed by the transmit end in FIG. 4. As shown in FIG. 10, the data transmission apparatus 100 may include: a generation unit 101, configured to generate a PPDU; and a sending unit 102, configured to send the PPDU.

An EDMG modulation field in the PPDU includes a CEF, the CEF includes a CEF sequence, and a length of the CEF sequence is m, where m is determined based on a quantity of bonding channels and a quantity of subcarriers included on a channel.

In embodiments of this application, the data transmission apparatus shown in FIG. 10 is used as an example to describe units in the data transmission apparatus used for the transmit end. It should be understood that the data transmission apparatus used for the transmit end in embodiments of this application has any function of the transmit end in the data transmission method shown in FIG. 4.

Figure 11:
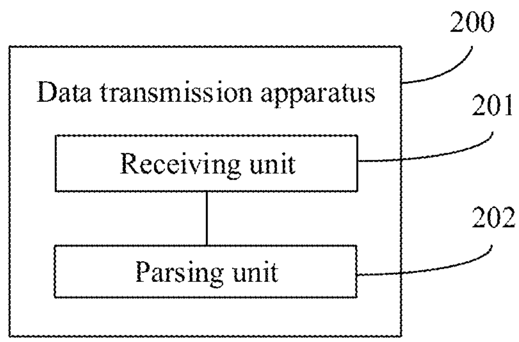
FIG. 11 is a schematic diagram of a structure of another data transmission apparatus according to an embodiment of this application.

FIG. 11 is a schematic diagram of a structure of another data transmission apparatus 200 according to an embodiment of this application. The data transmission apparatus may be used for the receive end in FIG. 2(*a*) or FIG. 2(*b*), and the data transmission apparatus may include units configured to perform the method performed by the receive end in FIG. 4. As shown in FIG. 11, the data transmission apparatus 200 may include: a receiving unit 201 (e.g., receiving circuit), configured to receive a PPDU; and a parsing unit 202 (e.g., parsing circuit), configured to parse the PPDU.

An EDMG modulation field in the PPDU includes a CEF, the CEF includes a CEF sequence, and a length of the CEF sequence is m, where m is determined based on a quantity of bonding channels and a quantity of subcarriers included on a channel.

In embodiments of this application, the data transmission apparatus shown in FIG. 11 is used as an example to describe units in the data transmission apparatus used for the receive end. It should be understood that the data transmission apparatus used for the receive end in embodiments of this application has any function of the receive end in the data transmission method shown in FIG. 4.

The foregoing data transmission apparatus (used for the transmit end or the receive end) provided in the embodiments of this application may be implemented in a plurality of product forms. For example, the data transmission apparatus may be configured as a general-purpose processing system. For example, the data transmission apparatus may be implemented by a general bus architecture. For example, the data transmission apparatus may be implemented by an application-specific integrated circuit (ASIC). The following provides several possible product forms of the data transmission apparatus in the embodiments of this application. It should be understood that the following provides merely an example, and the possible product forms in the embodiments of this application are not limited thereto.

Figure 12:
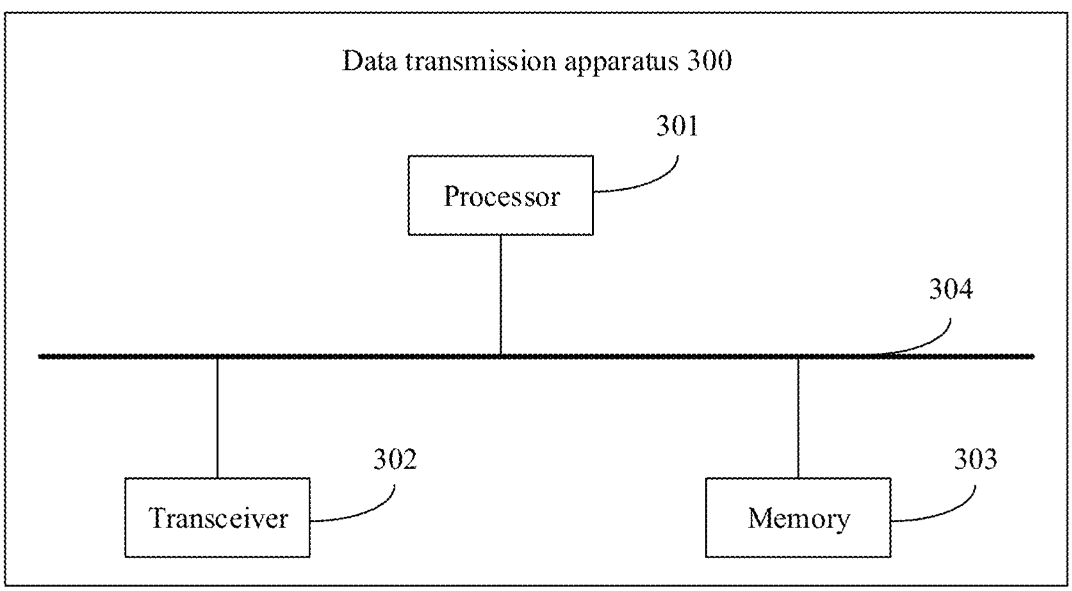
FIG. 12 is a schematic diagram of a structure of a still another data transmission apparatus according to an embodiment of this application.

As a possible product form, a data transmission apparatus 300 may be a device (for example, a base station, UE, or an AP) configured to transmit data. As shown in FIG. 12, the data transmission apparatus 300 may include a processor 301 and a transceiver 302. Optionally, the data transmission apparatus may further include a memory 303. The processor 301, the transceiver 302, and the memory 303 communicate with each other through an internal connection. For example, the data transmission apparatus 300 may further include a bus 304, and the processor 301, the transceiver 302, and the memory 303 communicate with each other through the bus 304. The processor 301 is configured to perform a processing step in the method performed by the data transmission apparatus in the method shown in FIG. 4. For example, when the data transmission apparatus is used for the transmit end, the processing step may be step 11 in FIG. 4, or when the data transmission apparatus is used for the receive end, the processing step may be step 13 in FIG. 4. The transceiver 302 is configured to receive control of the processor 301, and is configured to perform a step of transceiving the PPDU in the method performed by the data transmission apparatus in the method shown in FIG. 4. For example, when the data transmission apparatus is used for the transmit end, the transceiving step may be step 12 in FIG. 4, or when the data transmission apparatus is used for the receive end, the transceiving step may be a step in which the receive end receives the PPDU. The memory 303 is configured to store instructions. The instructions are invoked by the processor 301, to perform the processing step in the method performed by the data transmission apparatus in the method shown in FIG. 4.

Figure 13:
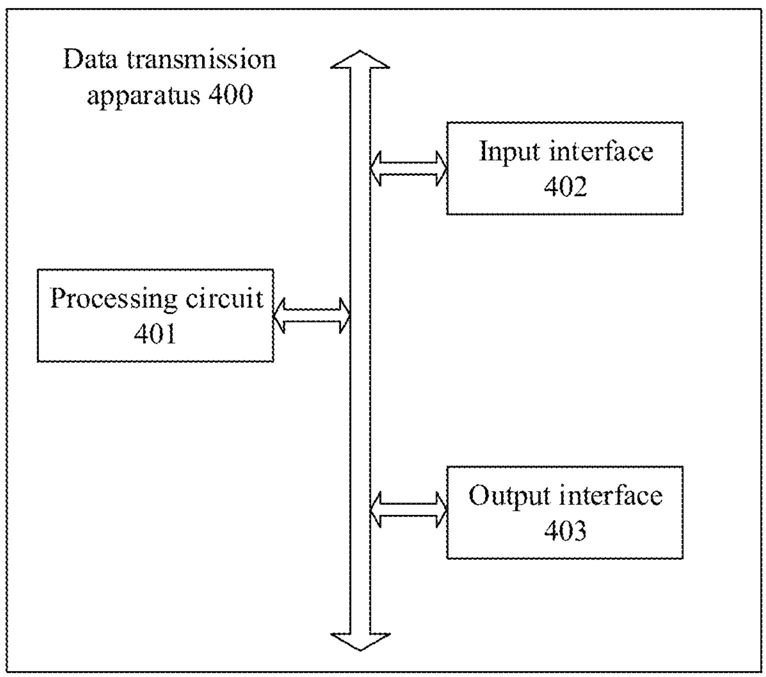
FIG. 13 is a schematic diagram of a structure of a yet another data transmission apparatus according to an embodiment of this application.

As another possible product form, a data transmission apparatus 400 is also implemented by a general-purpose processor, namely, a commonly known chip. As shown in FIG. 13, the data transmission apparatus may include a processing circuit 401, an input interface 402, and an output interface 403. The processing circuit 401, the input interface 402, and the output interface 403 communicate with each other through an internal connection. The input interface 402 is configured to obtain information (for example, to-be-sent data in step 11) to be processed by the processing circuit 401; the processing circuit 401 is configured to perform the processing step (for example, step 11) performed by the transmit end in FIG. 2, to process the to-be-processed information; and the output interface 403 is configured to output information processed by the processing circuit 401. Alternatively, the input interface 402 is configured to obtain information (the PPDU received by the receive end in the embodiment shown in FIG. 2) to be processed by the processing circuit 401; the processing circuit 401 is configured to perform the processing step (for example, step 13) performed by the receive end in FIG. 2, to process the to-be-processed information; and the output interface 403 is configured to output information processed by the processing circuit.

Optionally, the data transmission apparatus may further include a transceiver (which is not shown in FIG. 13). When the processing circuit 401 is configured to perform the processing step performed by the transmit end in FIG. 2, to process the to-be-processed information, the output interface 403 is configured to output the information processed by the processing circuit 401 to the transceiver, and the transceiver is configured to send the information processed by the processing circuit 401. When the processing circuit 401 is configured to perform the processing step performed by the receive end in FIG. 2, to process the to-be-processed information, the transceiver is configured to receive the information to be processed by the processing circuit 401, and send the information to be processed by the processing circuit 401 to the input interface 402.

As still another possible product form, the data transmission apparatus may alternatively be implemented by using the following: a field programmable gate array (FPGA), a programmable logic device (PLD), a controller, a state machine, gate logic, a discrete hardware component, any other suitable circuit, or any combination of circuits that can perform various functions described in this application.

Correspondingly, another embodiment of this application further discloses a computer-readable storage medium. The computer-readable storage medium is configured to store a computer program, and the computer program includes instructions for the method performed by the transmit end in FIG. 2(*a*) or FIG. 2(*b*). The transmit end may be the data transmission apparatus disclosed in FIG. 10. Alternatively, the computer-readable storage medium is configured to store the computer program, and the computer program includes instructions for the method performed by the receive end in FIG. 2(*a*) or FIG. 2(*b*). The receive end may be the data transmission apparatus disclosed in FIG. 11.

Correspondingly, another embodiment of this application further discloses a data transmission system, where the data transmission system includes a transmit end and a receive end.

The transmit end includes the data transmission apparatus disclosed in FIG. 10.

The receive end includes the data transmission apparatus disclosed in FIG. 11.

It should be noted that mutual reference may be made to the method embodiments provided in the embodiments of this application and the corresponding apparatus embodiments. This is not limited in the embodiments of this application. A sequence of the steps of the method embodiments provided in the embodiments of this application can be properly adjusted, and the steps can be correspondingly added or deleted based on a situation. Any method that can be easily figured out by a person skilled in the art without departing from a technical scope disclosed in this application shall fall within the protection scope of this application, and therefore details are not described again.

The term "and/or" in this application describes only an association relationship for describing associated objects and indicates that three relationships may exist. For example, A and/or B may indicate the following three cases: Only A exists, both A and B exist, and only B exists. In addition, the character "/" in this specification usually indicates an "or" relationship between the associated objects.

In addition, functional units in the embodiments of this application may be integrated into one processing unit, or each of the units may exist alone physically, or two or more units are integrated into one unit. The integrated unit may be implemented in a form of hardware (e.g., a circuit, an integrated circuit, sub-circuits), or may be implemented in a form of a software functional unit.

When the integrated unit is implemented in the form of a software functional unit and is sold or used as an independent product, the integrated unit may be stored in a computer-readable storage medium. Based on such an understanding, the technical solutions in this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely optional embodiments of this application, but are not intended to limit this application. Any modification, equivalent replacement, improvement, or the like made without departing from the spirit and principle of this application shall fall within the protection scope of this application.

In the embodiments of this application, the related sequences are as follows:

sequence (1): G_512(1,:)=[1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 1 1 1

−1 1 −1 1 −1 1 1 −1 1 1 1 −1 −1 −1 −1 −1 −1 1 −1 1 1 −1 −1 1 1 1 −1 −1 1 1 1 1 1 −1 1 −1 1 −1 1 1 1 −1 −1 −1 1 1 1 1 1 1 1 −1 1 −1 −1 1 1 −1 1 1 −1 −1 1 1 1 1 −1 1 −1 1 −1 1 −1 1 1 −1 −1 −1 −1 −1 −1 −1 1 −1 1 1 −1 −1 1 1 1 −1 −1 1 1 1 1 −1 1 −1 1 −1 1 1 −1 1 1 −1 −1 −1 −1 −1 −1 −1 1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 1 −1 1 −1 1 1 −1 1 1 −1 −1 −1 −1 −1 −1 −1 1 −1 1 1 −1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 −1 1 −1 1 1 −1 1 1 −1 −1 1 −1 1 1 −1 1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 1 1 −1 1 1 −1 −1 −1 −1 −1 −1 −1 1 −1 1 1 1 −1 −1 1 −1 −1 1 1 −1 −1 −1 −1 1 −1 1 −1 1 −1 −1 1];

sequence (2): G_512(2,:)=[1 −1 −1 1 −1 1 −1 1 −1 −1 −1 −1 1 1 −1 −1 1 −1 −1 1 1 −1 1 −1 −1 −1 −1 −1 −1 −1 1 1 −1 1 1 −1 1 −1 1 −1 1 1 1 1 −1 −1 1 1 1 −1 −1 1 1 −1 1 −1 −1 −1 −1 −1 −1 −1 1 1 −1 1 1 −1 1 −1 1 −1 1 1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 1 −1 −1 1 1 −1 1 −1 −1 −1 −1 −1 −1 −1 1 1 1 −1 −1 1 −1 1 −1 1 −1 −1 −1 −1 1 1 −1 −1 1 −1 −1 1 1 −1 1 −1 −1 −1 −1 −1 −1 −1 1 1 −1 1 1 −1 1 −1 1 −1 1 1 1 1 −1 −1 1 1 1 −1 −1 1 1 −1 −1 1 1 −1 1 −1 −1 −1 −1 −1 −1 −1 1 1 1 −1 −1 1 −1 1 −1 1 −1 −1 −1 −1 1 1 −1 −1 1 −1 −1 1 1 −1 1 −1 −1 −1 −1 −1 −1 −1 −1 1 1 1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 −1 −1 1 −1 −1 1 −1 1 −1 1 −1 1 −1 −1 −1 1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 1 −1 1 −1 −1 −1 −1 −1 −1 −1 1 1 1 −1 −1 1 −1 1 −1 1 −1 −1 −1 −1 1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 1 −1 1 −1 −1 −1 −1 −1 −1 −1 1 1 −1 −1 1 −1 −1 1 1 −1 1 −1 −1 −1 −1 −1 −1 −1 1 1 −1 1 1 −1 1 −1 1 −1 1 1 1 1 −1 −1 1 1 1 −1 −1 1 1 −1 1 −1 −1 −1 −1 −1 −1 −1 1 1 1 −1 −1 1 −1 1 −1 1 −1 −1 −1 −1 1 1 −1 −1 1 −1 −1 1 1 −1 −1 −1 −1 −1 −1 −1 −1 1 1 1 1 −1 −1 1 −1 1 −1 1 −1 −1 −1 −1 1 1 −1 −1 −1 1 1 −1 −1 1 −1 1 1 1 1 1 1 1 −1 −1];

sequence (3): G_512(3,:)=[1 1 −1 −1 1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 1 −1 −1 −1 −1 −1 −1 −1 1 1 −1 1 1 −1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 1 1 −1 −1 −1 −1 −1 −1 −1 1 −1 1 1 −1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1 1 1 1 −1 1 −1 1 −1 1 1 −1 1 1 −1 −1 1 1 −1 −1 −1 −1 −1 −1 −1 1 −1 1 1 −1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1

1 1 1 −1 1 −1 1 −1 1 1 −1 1 1 −1 −1 −1 −1 −1 −1 −1 −1 −1 1 1 −1 −1 1 1 1 −1 −1 1 1 1 1 −1 1 −1 1 −1 1 1 −1 1 −1 −1 −1 1 1 1 1 1 1 1 −1 1 −1 −1 1 1 −1 1 1 −1 −1 1 1 1 1 −1 1 −1 1 −1 1 1 −1 1 1 −1 −1 −1 −1 −1 −1 −1 1 −1 1 1 −1 1 1 −1 −1 1];

sequence (4): G_512(4,:)=[1 −1 −1 1 1 −1 1 −1 −1 −1 −1 −1 −1 −1 1 1 −1 1 1 −1 1 −1 1 −1 1 1 1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 1 −1 −1 1 1 −1 1 −1 −1 −1 −1 −1 −1 −1 1 1 −1 1 1 −1 1 −1 1 −1 1 1 1 1 1 −1 −1 1 1 1 −1 −1 1 1 −1 1 −1 −1 −1 −1 −1 −1 −1 1 1 1 −1 −1 1 −1 1 −1 1 −1 −1 −1 −1 1 1 −1 −1 −1 1 1 −1 −1 −1 −1 1 1 1 1 1 1 1 −1 −1 1 −1 −1 1 −1 1 −1 1 −1 −1 −1 −1 1 1 −1 −1 1 −1 −1 1 1 −1 1 −1 −1 −1 −1 −1 −1 −1 1 1 1 −1 −1 1 −1 1 −1 1 −1 −1 −1 −1 1 1 −1 −1 1 −1 −1 1 1 −1 1 −1 −1 −1 −1 −1 −1 −1 1 1 −1 1 1 −1 1 −1 1 −1 1 1 1 1 −1 −1 1 1 −1 −1 −1 1 1 1 −1 −1 1 −1 1 −1 1 −1 −1 −1 −1 1 1 −1 −1 −1 1 1 −1 −1 1 −1 1 1 1 1 1 1 1 −1 −1 1 −1 1 −1 1 −1 −1 −1 −1 1 1 −1 −1 1 −1 −1 1 1 −1 1 −1 −1 −1 −1 −1 −1 1 1 1 −1 −1 1 −1 1 −1 1 −1 −1 −1 −1 1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 −1 1 1 −1 1 −1 1 1 1 1 1 1 1 −1 −1 −1 1 1 −1 1 −1 1 −1 1 1 1 −1 1 −1 −1 1 −1 1 −1 1 −1 −1 −1 −1 1 1 −1 −1 1 −1 −1 1 1 −1 1 −1 −1 −1 −1 −1 −1 −1 1 1 1 −1 −1 1 −1 1 −1 1 −1 −1 −1 −1 1 1 −1 −1 1 −1 −1 1 1 −1 1 −1 −1 −1 −1 −1 −1 1 1 −1 1 1 −1 1 −1 1 −1 1 1 1 1 −1 −1 1 1 1 −1 −1 1 1 −1 1 −1 −1 −1 −1 −1 −1 −1 1 1 1 −1 −1 1 −1 1 −1 1 −1 −1 −1 −1 1 1 −1 −1];

sequence (5): G_512(5,:)=[1 1 −1 −1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 −1 −1 1 −1 1 −1 −1 1 1 1 −1 −1 −1 −1 −1 −1 −1 1 −1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 1 −1 −1 1 1 1 −1 −1 −1 −1 −1 −1 −1 1 −1 1 1 −1 −1 1 −1 −1 1 1 −1 −1 −1 −1 1 −1 1 −1 1 −1 −1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1 1 1 1 −1 1 −1 1 −1 −1 −1 −1 −1 −1 −1 1 −1 1 1 −1 −1 1 1 1 −1 −1 1 1 1 1 −1 1 −1 1 −1 −1 1 −1 1 −1 1 1 −1 −1 −1 −1 −1 −1 −1 1 1 −1 1 1 −1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 −1 −1 1 1 −1 −1 −1 −1 1 −1 1 −1 1 −1 −1 1 −1 −1 1 −1 1 −1 1 −1 −1 1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 1 −1 −1 1 −1 −1 1 1 1 1 1 1 1 −1 1 −1 −1 1 1 −1];

sequence (6): G_512(6,:)=[1 −1 −1 1 1 −1 1 −1 −1 −1 −1 −1 −1 −1 1 1 −1 1 1 −1 1 −1 1 −1 1 1 1 1 −1 −1 1 1 1 −1 −1 1 1 −1 −1 −1 −1 −1 −1 −1 −1 1 1 1 1 −1 −1 1 −1 1 −1 1 −1 −1 −1 −1 1 1 −1 −1 1 −1 −1 1 1 −1 1 −1 −1 −1 −1 −1 −1 −1 1 1 −1 1 1 −1 1 −1 1 −1 1 1 1 1 −1 −1 1 1 −1 1 1 −1 −1 1 −1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 1 −1 −1 1 −1 1 1

−1 −1 −1 −1 −1 −1 −1 1 1 −1 1 1 −1 1 −1 1 −1 1 1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 1 −1 1 −1 −1 −1 −1 −1 −1 −1 1 1 1 −1 −1 1 −1 1 −1 1 −1 −1 −1 −1 1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 1 −1 −1 1 1 −1 1 −1 −1 −1 −1 −1 −1 −1 1 1 −1 1 1 −1 1 −1 1 1 −1 1 −1 1 1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 1];

sequence (7): G_512(7,:)=[1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 −1 1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 −1 1 −1 1 1 −1 −1 1 1 −1 −1 1 1 1 1 −1 1 −1 1 −1 1 −1 1 1 −1 1 1 −1 −1 1 1 1 1 −1 1 −1 1 −1 1 1 −1 −1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 −1 1 1 −1 −1 −1 1 1 −1 −1 −1 −1 1 −1 1 −1 1 −1 1 −1 −1 1 1 1 −1 −1 −1 −1 −1 −1 −1 1 −1 1 1 1 −1 −1 1 1 1 1 −1 1 −1 1 −1 1 1 −1 1 1 −1 −1 −1 −1 −1 −1 −1 1 −1 1 1 −1 −1 1 1 −1 −1 −1 1 1 −1 −1 −1 −1 1 −1 1 −1 1 −1 1 −1 −1 1 1 1 −1 −1 −1 −1 −1 −1 −1 1 −1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 1 1 −1 1 1 1 1 −1 1 −1 1 −1 1 1 −1 −1 −1 1 1 1 1 1 1 1 −1 1 −1 1 −1 −1 1 1 −1];

sequence (8): G_512(8,:)=[1 −1 −1 1 1 −1 1 −1 −1 −1 −1 −1 −1 −1 1 1 1 −1 −1 1 −1 1 −1 1 −1 −1 −1 −1 1 1 −1 −1 1 −1 −1 1 1 −1 1 −1 −1 −1 −1 −1 −1 −1 1 1 −1 1 1 −1 1 −1 1 −1 1 1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 1 −1 −1 1 1 −1 1 −1 −1 −1 −1 −1 −1 −1 1 1 −1 1 1 −1 1 −1 1 −1 1 1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 −1 −1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 1 −1 −1 1 1 −1 1 −1 −1 −1 −1 −1 −1 −1 1 1 −1 1 1 −1 1 −1 1 −1 1 1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 1 −1 1 −1 −1 −1 −1 −1 −1 1 1 1 −1 −1 1 −1 1 −1 1 −1 −1 −1 −1 1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 −1 −1 1 1 −1 1 1 −1 −1 1 −1 1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 −1 −1 1 1 1 −1 −1 1 1 −1 1 −1 −1 −1 −1 −1 −1 −1 1 1 −1 1 1 −1 1 −1 1 −1 1 1 1 1 −1 −1 1 1];

sequence (9): G_512(1,:)=[−1 −1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 −1 −1 −1 1 1 −1 1 1 −1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1 1 1 1 −1 1 −1 1 −1 1 1 −1 1 1 −1 −1 −1 −1 −1 −1 −1 1 −1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 1 1 1 −1 −1 −1 −1 −1 −1 1 −1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 1 1 1 −1 1 −1 1 −1 1 1 −1 −1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1 1 1 1 −1 1 −1 1 −1 1 1 −1 1 1 −1 −1 −1 −1 −1 −1 −1 1 −1 1 1 −1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 1 −1 1 −1 1 1 −1 1 1 −1 1 −1 −1 −1 −1 −1 −1 1 1 −1 −1 1 1 1 1 −1 −1 1 1 1 1 −1 1 −1 1 −1 1 1 −1 1 1 −1 −1 −1 −1 −1 −1 −1 1 −1 1 1 −1 −1 1 −1 −1 1 1 −1 −1 −1 −1 1 −1 1 −1 1 −1 −1 1];

sequence (10): G_512(2,:)=[−1 1 1 −1 1 −1 1 −1 1 1 1 1 −1 −1 1 1 −1 1 1 −1 −1 1 −1 1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 −1 1 −1 −1 −1 −1 −1 −1 −1 1 1 1 1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 1 −1 −1 1 1 −1 1 −1 −1 −1 −1 −1 −1 −1 1 1 −1 1 1 −1 1 −1 1 −1 1 1 1 1 −1 −1 1 1 −1 1 1 −1 −1 1 −1 1 1 1 1 1 1 1 −1 −1 −1 1 −1 −1 1 −1 1 −1 1 −1 −1 −1 −1 1 1 −1 −1 −1 1 1 −1 −1 1 −1 1 1 1 1 1 1 1 −1 −1 1 −1 1 −1 1 −1 −1 −1 −1 1 1 −1 −1 1 1 −1 1 −1 −1 −1 −1 −1 −1 −1 −1 1 1 1 −1 −1 1 −1 1 −1 1 −1 −1 −1 −1 1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 1 −1 1 −1 −1 −1 −1 −1 −1 −1 1 1 −1 1 1 −1 1 −1 1 −1 1 1 1 1 −1 −1 1 1 1 −1 −1 1 1 −1 1 −1 −1 −1 −1 −1 −1 −1 1 1 1 −1 −1 1 −1 1 −1 1 −1 −1 −1 −1 1 1 −1 −1 1 −1 −1 1 1 −1 1 −1 −1 −1 −1 −1 −1 −1 1 1 1 −1 −1 1 −1 1 −1 1 −1 −1 −1 −1 1 1 −1 −1 −1 1 1 −1 −1 1 −1 1 1 1 1 1 1 1 −1 −1];

sequence (11): G_512(3,:)=[−1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1 1 1 1 −1 1 −1 1 −1 −1 1 1 −1 1 1 −1 −1 −1 −1 −1 −1 1 −1 1 1 −1 −1 1 −1 −1 1 1 −1 −1 −1 −1 1 −1 1 −1 1 −1 −1 1 −1 −1 −1 −1 −1 −1 −1 1 −1 1 −1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 1 −1 −1 1 −1 −1 1 1 −1 −1 −1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 1 1

1 1 1 –1 1 –1 1 –1 1 1 –1 1 1 –1 –1 –1 –1 –1 –1 –1 1 –1 1 1 –1 –1 1 –1 –1 1 1 –1 –1 –1 –1 1 –1 1 –1 1 –1 –1 1 1 1 –1 –1 –1 –1 –1 –1 –1 1 –1 1 1 –1 –1 1 –1 –1 1 1 –1 –1 –1 –1 1 –1 1 –1 1 –1 –1 1 –1 –1 1 1 1 1 1 1 –1 1 –1 –1 1 1 –1 –1 –1 1 1 –1 –1 –1 –1 1 –1 1 –1 1 –1 –1 1 1 1 –1 –1 –1 –1 –1 –1 1 1 –1 1 1 –1 –1 1 1 1 1 –1 –1 1 1 1 1 –1 1 –1 1 –1 1 1 –1 1 1 –1 –1 –1 –1 –1 –1 –1 1 –1 1 1 –1 –1 1 1 1 –1 –1 1 1 1 1 –1 1 –1 1 –1 1 1 –1 –1 –1 1 1 1 1 1 1 1 –1 1 –1 –1 1 1 –1 1 1 –1 –1 1 1 1 1 –1 1 –1 1 1 –1 1 1 –1 1 1 –1 –1 –1 –1 –1 –1 1 –1 1 1 –1 –1 1];

sequence (12): G_512(4,:)=[–1 1 1 –1 –1 1 –1 1 1 1 1 1 1 1 –1 –1 1 –1 –1 1 –1 1 –1 1 –1 –1 –1 –1 1 1 –1 –1 1 –1 –1 1 1 –1 1 –1 –1 –1 –1 –1 –1 –1 1 1 1 1 –1 –1 1 –1 1 –1 1 –1 –1 –1 –1 1 1 –1 –1 –1 1 1 –1 –1 1 –1 1 1 1 1 1 1 1 –1 –1 1 –1 –1 1 –1 1 –1 1 –1 –1 –1 –1 1 1 –1 –1 –1 1 1 –1 –1 1 –1 1 1 1 1 1 1 1 –1 –1 –1 1 1 –1 1 –1 1 –1 1 1 1 1 –1 –1 1 1 1 –1 –1 1 1 –1 1 –1 –1 –1 –1 –1 –1 –1 1 1 –1 1 1 –1 1 –1 1 –1 1 1 1 1 –1 –1 1 1 –1 1 1 –1 –1 1 –1 1 1 1 1 1 1 1 –1 –1 –1 1 1 –1 1 –1 1 –1 1 1 1 1 –1 –1 1 1 –1 1 1 –1 –1 1 –1 1 1 1 1 1 1 1 –1 –1 1 –1 –1 1 –1 1 –1 1 –1 –1 –1 –1 1 1 –1 –1 –1 1 1 –1 –1 1 –1 1 1 1 1 1 1 1 –1 –1 –1 1 1 –1 1 –1 1 –1 1 1 1 1 –1 –1 1 1 –1 1 1 –1 –1 1 –1 1 1 1 1 1 1 1 –1 –1 1 –1 –1 1 –1 1 –1 1 –1 –1 –1 –1 1 1 –1 –1 1 –1 –1 1 1 –1 1 –1 –1 –1 –1 –1 –1 –1 1 1 1 –1 –1 1 –1 1 –1 1 –1 –1 –1 –1 1 1 –1 –1 –1 1 1 –1 –1 1 –1 1 1 1 1 1 1 1 –1 –1 1 –1 –1 1 –1 1 –1 1 –1 1 –1 –1 –1 –1 1 1 –1 –1 –1 1 1 –1 –1 1 1 –1 –1 1 –1 1 1 1 1 1 1 –1 –1 –1 1 1 –1 1 –1 1 –1 1 1 1 1 –1 –1 1 1 –1 1 1 –1 1 –1 –1 1 –1 1 1 1 1 1 1 1 –1 –1 1 –1 –1 1 –1 1 –1 1 –1 –1 –1 –1 1 1 –1 –1 1 –1 1 –1 –1 –1 –1 1 1 1 –1 –1 1 –1 1 –1 1 –1 –1 –1 –1 1 1 –1 –1 1 –1 –1 1 1 –1 –1 –1 –1 –1 –1 –1 –1 1 1 –1 1 1 –1 1 1 –1 1 –1 1 1 1 1 –1 –1 1 1 1 –1 –1 1 1 –1 1 –1 –1 –1 –1 –1 –1 –1 1 1 1 –1 –1 1 –1 1 –1 1 –1 –1 –1 –1 1 1 –1 –1 –1];

sequence (13): G_512(5,:)=[–1 –1 1 1 –1 –1 –1 –1 1 –1 1 –1 1 –1 –1 1 1 1 –1 –1 –1 –1 –1 –1 –1 1 –1 1 1 –1 –1 1 –1 –1 1 1 –1 –1 –1 –1 1 –1 1 –1 1 –1 –1 1 –1 –1 1 1 1 1 1 1 1 –1 1 –1 –1 1 1 –1 –1 –1 1 1 –1 –1 –1 –1 1 –1 1 –1 1 –1 –1 1 1 1 –1 –1 –1 –1 –1 –1 –1 1 –1 1 1 –1 –1 1 1 1 –1 –1 1 1 1 1 –1 1 –1 1 –1 1 1 –1 –1 –1 –1 –1 –1 –1 1 –1 1 1 –1 1 1 –1 –1 1 1 1 –1 –1 1 1 1 1 –1 1 –1 1 –1 1 1 –1 –1 –1 1 1 1 1 1 1 1 –1 1 –1 –1 1 1 –1 1 1 –1 1 –1 –1 1 1 1 1 –1 1 –1 1 –1 1 1 –1 1 1 –1 –1 –1 –1 –1 –1 –1 1 –1 1 1 –1 –1 1 –1 –1 1 1 1 –1 –1 –1 –1 1 –1 1 –1 1 –1 –1 1 1 –1 –1 1 1 –1 1 1 –1 –1 1 1 1 –1 –1 1 1 1 1 –1 1 –1 1 –1 1 1 –1 1 1 –1 1 1 –1 –1 –1 –1 –1 –1 –1 1 –1 1 1 –1 –1 1 –1 –1 1 1 –1 –1 1 1 –1 –1 –1 –1 1 –1 1 –1 1 –1 –1 1 1 1 –1 –1 –1 –1 –1 –1 –1 1 –1 1 1 –1 –1 1 –1 –1 1 1 –1 –1 –1 –1 –1 1 –1 1 –1 1 –1 –1 1 –1 –1 1 1 1 1 1 1 1 –1 1 –1 –1 1 1 –1 –1 –1 1 1 –1 –1 –1 –1 1 –1 1 –1 1 –1 –1 1 1 1 –1 –1 –1 –1 –1 –1 –1 1 –1 1 1 –1 –1 1 1 1 –1 –1 1 1 1 1 –1 1 –1 1 –1 1 1 –1 1 1 –1 1 –1 –1 –1 –1 –1 –1 –1 –1 1 –1 1 –1 1 –1 –1 1 –1 –1 1 1 –1 –1 –1 –1 1 –1 1 –1 1 –1 –1 1 –1 –1 1 1 1 1 1 1 1 –1 1 –1 –1 1 1 –1 1 1 –1 –1 1 1 1 1 –1 1 –1 1 –1 1 1 –1 1 1 –1 –1 –1 –1 –1 –1 –1 1 –1 1 1 –1 1 1 –1 –1 –1 1 1 –1 –1 –1 –1 1 –1 1 –1 1 –1 –1 1 –1 –1 1 1 1 1 1 1 1 –1 1 –1 –1 1 1 –1];

sequence (14): G_512(6,:)=[–1 1 1 –1 –1 1 –1 1 1 1 1 1 1 1 –1 –1 1 –1 –1 1 –1 1 –1 1 –1 –1 –1 –1 1 1 –1 –1 –1 1 1 –1 –1 1 –1 1 1 1 1 1 1 1 –1 –1 –1 1 1 –1 1 –1 1 –1 1 1 1 1 –1 –1 1 1 –1 1 1 –1 –1 1 –1 1 1 1 1 1 1 1 –1 –1 1 –1 –1 1 –1 1 –1 1 –1 –1 –1 –1 1 1 –1 –1 1 –1 –1 1 1 –1 1 –1 –1 –1 –1 –1 –1 –1 1 1 1 –1 –1 1 –1 1 –1 1 –1 –1 –1 –1 1 1 –1 1 –1 1 –1 –1 –1 –1 –1 1 1 –1 –1 1 –1 –1 1 1 –1 1 –1 –1 1 1 –1 1 –1 1 1 1 –1 –1 1 1 –1 –1 –1 1 1 –1 –1 –1 –1 –1 –1 –1 1 1 –1 1 1 –1 1 –1 1 –1 1 1 1 –1 –1 1 –1 –1 1 –1 1 1 1 1 1 1 1 –1 –1 1 –1 –1 1 –1 1 –1 1 –1 –1 –1 –1 1 1 –1 –1 1 1 –1 1 1 –1 –1 1 –1 –1 1 1 –1 1 –1 –1 –1 –1 –1 –1 –1 –1 1 –1 1 –1 1 –1 –1 –1 –1 1 1 –1 –1 –1 1 1 –1 –1 1 –1 1 1 1 1 1 1 1 –1 –1 1 –1 –1 1 –1 1 –1 1 –1 –1 –1 –1 1 1 –1 –1 1 –1 –1 –1 –1 –1 –1 –1 1 1 1 –1 –1 1 –1 1 –1 1 –1 –1 –1 –1 1 1 –1 –1 –1 1 1 –1 –1 1 –1 1 1 1 1 1 1 1 –1 –1 1 –1 –1 1 –1 1 –1 1 –1 1 –1 –1 –1 –1 1 1 –1 –1 –1 1 1 –1 1 –1 1 1 1 1 1 1 1 –1 –1 –1 1 1 –1 1 –1 1 –1 1 1 1 1 –1 –1 1 1 –1 1 1 –1 1 –1 –1 –1 –1 1 –1 –1 1 1 1 –1 –1 1 1 –1 1 –1 –1 –1 –1 –1 –1 –1 1 1 –1 1 1 –1 1 1 –1 1 –1 1 1 1 1 –1 –1 1 1 1 –1 –1 1 1 –1 1 –1 1 1 1 1 –1 –1 1 1];

sequence (15): G_512(7,:)=[–1 –1 1 1 –1 –1 –1 –1 1 –1 1 –1 1 –1 –1 1 –1 –1 1 1 1 1 1 1 1 –1 1 –1 –1 1 1 –1 –1 –1 1 1 –1 –1 –1 –1 1 –1 1 –1 1 –1 –1 1 1 1 –1 –1 –1 –1 –1 –1 –1 1 –1 1 1 –1 –1 1 1 1 –1 –1 1 1 1 1 –1 1 –1 1 –1 1 1 –1 1 1 –1 –1 –1 –1 –1 –1 –1 1 –1 1 1 –1 –1 1 –1 –1 1 1 –1 –1 –1 –1 1 –1 1 –1 1 –1 –1 1 1 1 –1 –1 –1 –1 –1 –1 –1 1 –1 1 1 –1 –1 1 1 1 –1 –1 1 1 1 1 –1 1 –1 1 –1 1 1 –1 1 1 –1 –1 –1 –1 –1 –1 –1 1 –1 1 1 –1 –1 1 1 1 –1 –1 1 1 1 1 –1 1 –1 1 –1 1 1 –1 –1 –1 1 1 1 1 1 1 1 –1 1 –1 –1 1 1 –1 1 1 –1 –1 1 1 1 1 –1 1 –1 1 –1 1 1 –1 1 1 –1 –1 –1 –1 –1 –1 –1 1 –1 1 1 –1 –1 1 –1 –1 1 1 –1 –1 –1 –1 1 –1 1 –1 1 –1 –1 –1 1 1 1 –1 –1 –1 –1 –1 –1 –1 1 –1 1 1 –1 –1 1 –1 –1 1 1 –1 –1 –1 –1 1 –1 1 –1 1 –1 –1 1 –1 –1 1 1 1 1 1 1 –1 1 –1 –1 1 1 –1 –1 –1 1 1 –1 –1 –1 –1 1 –1 1 –1 1 –1 –1 1 1 –1 –1 –1 –1 –1 –1 –1 1 –1 1 1 1 –1 –1 1 1 1 –1 –1 1 1 1 1 –1 1 –1 1 –1 1 1 –1 1 1 –1 –1 –1 –1 –1 –1 –1 1 –1 1 1 –1 –1 1 –1 –1 1 1 –1 –1 –1 –1 1 –1 1 –1 1 –1 –1 1 1 1 –1 –1 –1 –1 –1 –1 1 –1 –1 1 –1 1 1 –1 –1 1 –1 –1 1 1 –1 –1 –1 –1 1 –1 1 –1 1 –1 –1 1 –1 –1 1 1 1 1 1 1 1 –1 1 –1 –1 1 1 –1 –1 –1 1 1 –1 –1 –1 –1 1 –1 1 –1 1 –1 –1 1 1 –1 –1 –1 –1 –1 –1 1 –1 1 –1 1 –1 –1 1 –1 –1 1 1 1 1 1 1 1 –1 1 –1 –1 1 1 –1 1 1 –1 –1 1 1 1 1 –1 1 –1 1 –1 1 1 –1 –1 –1 1 1 1 1 1 1 1 –1 1 –1 –1 1 1 –1];

sequence (16): G_512(8,:)=[–1 1 1 –1 –1 1 –1 1 1 1 1 1 1 1 –1 –1 –1 1 1 –1 1 –1 1 –1 1 1 1 1 –1 –1 1 1 –1 1 1 –1 –1 1 –1 1 1 1 1 1 1 1 –1 –1 1 –1 –1 1 –1 1 –1 1 –1 –1 –1 –1 1 1 –1 –1 1 –1 –1 1 1 –1 1 –1 –1 –1 –1 –1 –1 –1 1 1 1 –1 –1 1 –1 1 –1 1 –1 –1 –1 –1 1 1 –1 –1 –1 1 1 –1 –1 1 –1 1 1 1 1 1 1 1 –1 –1 1 –1 –1 1 –1 1 –1 1 –1 –1 –1 –1 1 1 –1 –1 1 –1 –1 1 1 –1 1 –1 –1 –1 –1 –1 –1 –1 1 1 1 –1 –1 1 –1 1 –1 1 –1 –1 –1 –1 1 1 –1 –1 1 –1 –1 1 1 –1 1 –1 1 –1 –1 –1 –1 –1 –1 –1 1 1 –1 1 1 –1 1 –1 1 –1 1 1 1 1 –1 –1 1 1 1 –1 –1 1 1 –1 1 –1 –1 –1 –1 –1 –1 –1 1 1 1 –1 –1 1 –1 1 –1 –1 –1 –1 1 1 –1 –1 –1 1 1 –1 –1 1 –1 1 1 1 1 1 –1 –1 1 –1 –1 1 –1 1 –1 1 –1 –1 –1 –1 1 1 –1 –1 –1 1 1 –1 –1 1 –1 1 1 1 1 1 1 1 –1 –1 –1 1 1 –1 1 –1 1 –1 1 1 1 1 –1 –1 1 1 –1 1 1 –1 –1 1 –1 1 1 1 1 1 1 –1 –1 1 –1 –1 1 –1 1 –1 1 –1 –1 –1 –1 1 1 –1 –1 1 –1 –1 1 1 –1 1 –1 –1 –1 –1 –1 –1 –1 1 1 1 –1 –1 1 –1 1 –1 1 –1 –1 –1 –1 1 1 –1 –1 –1 1 1 –1 –1 1 –1 1 1 1 1 1 1 1 –1 –1 1 –1 –1 1 –1 1 –1 1 –1 1 –1

−1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 1 1 −1 −1 1 1 −1 1 −1 −1 −1 −1 −1 −1 −1 1 1 −1 1 1 −1 1 −1 1 −1 1 1 1 1 −1 −1 1 1];

sequence (17): G_512(1,:)=[1 1 1 −1 −1 −1 1 −1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 1 −1 1 1 −1 1 1 1 1 −1 −1 −1 1 −1 1 1 1 −1 1 1 −1 1 1 1 1 −1 −1 −1 1 −1 −1 −1 −1 1 −1 −1 1 −1 1 1 1 −1 −1 −1 1 −1 1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 −1 −1 −1 1 1 1 −1 1 −1 1 −1 −1 1 −1 1 −1 −1 1 −1 1 1 1 −1 −1 −1 1 −1 −1 −1 −1 1 −1 −1 1 −1 −1 −1 −1 1 1 1 −1 1 −1 −1 −1 1 −1 −1 1 −1 −1 −1 −1 1 1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 1 −1 1 1 −1 1 −1 1 −1 −1 −1 1 1 1 −1 1 −1 −1 −1 1 −1 −1 1 −1 −1 −1 −1 1 1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 1 −1 1 1 −1 1 1 −1 1 1 1 1 −1 −1 −1 1 −1 1 1 1 −1 1 1 −1 1 1 1 1 −1 −1 −1 1 −1 −1 −1 −1 1 −1 −1 1 −1 −1 −1 −1 1 1 1 1 −1 1 −1 −1 −1 1 −1 −1 1 −1 1 1 1 −1 −1 −1 1 −1 −1 −1 −1 1 −1 1 −1 −1 1 −1 1 1 1 −1 −1 −1 1 −1 1 1 1 −1 1 1 −1 1 1 1 1 −1 −1 −1 1 −1 −1 −1 −1 1 −1 −1 1 −1 −1 −1 1 −1 −1 1 −1 1 1 1 1 −1 −1 −1 1 −1 1 1 1 −1 1 1 −1 1 1 −1 1 1 −1 1 1 1 1 1 −1 −1 −1 1 −1 1 1 1 1 −1 1 1 1 −1 1 1 1 1 −1 −1 −1 1 −1 −1 −1 −1 1 −1 −1 1 −1];

sequence (18): G_512(2,:)=[1 1 1 −1 −1 −1 1 −1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 1 1 1 −1 −1 −1 1 −1 1 1 1 1 −1 1 1 −1 1 −1 −1 −1 1 1 1 −1 1 1 1 1 −1 1 1 −1 1 1 1 1 −1 −1 −1 1 −1 1 1 1 −1 1 1 −1 1 1 1 1 −1 −1 −1 1 1 −1 −1 −1 −1 1 −1 −1 1 −1 1 1 1 −1 −1 −1 1 −1 1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 −1 −1 −1 1 1 1 −1 1 −1 −1 −1 1 −1 1 −1 −1 1 −1 1 1 1 −1 −1 −1 1 −1 −1 −1 −1 1 −1 −1 1 −1 −1 −1 −1 1 1 1 −1 1 −1 −1 −1 1 −1 −1 1 −1 −1 −1 −1 1 1 1 1 −1 1 1 1 1 −1 1 1 −1 1 −1 −1 −1 1 1 1 1 −1 1 −1 −1 −1 1 −1 −1 1 −1 1 1 1 −1 −1 −1 1 −1 −1 −1 −1 1 −1 1 −1 −1 1 −1 1 1 1 −1 −1 −1 1 −1 1 1 1 −1 1 1 −1 1 1 1 1 −1 −1 −1 1 −1 −1 −1 −1 1 −1 −1 1 −1 −1 −1 −1 1 1 1 −1 1 −1 −1 −1 1 −1 −1 1 −1 1 1 1 −1 −1 −1 1 −1 −1 −1 −1 1 −1 −1 1 −1 1 −1 −1 −1 −1 1 1 1 1 −1 1 1 −1 −1 1 −1 −1 1 −1 −1 −1 −1 1 1 1 1 −1 1 1 1 1 1 −1 1 1 −1 1 1 1 1 1 −1 −1 −1 1 −1 1 1 1 −1 1 1 −1 −1 −1 1 1 1 −1 1 1 1 1 −1 1 1 1 −1 1 −1 −1 −1 1 1 1 1 −1 1 1 −1 −1 1 −1 −1 1 −1 −1 −1 −1 1 1 1 1 −1 1 1 1 1 1 −1 1 1 −1 1 −1 −1 −1 1 1 1 1 −1 1 1 −1 −1 1 −1 −1 1 −1 −1 1 −1 1 1 1 −1 1 −1 −1 −1 1 −1 −1 −1 −1 1 1 −1 1 −1 1 −1 −1 −1 −1 1 1 1 1 −1 1 1 −1 −1 −1 1 1 −1 1 −1 −1 1 −1 −1 −1 −1 1 1 1 1 −1 1 1 1 1 1 −1 1 1 −1 1 1 −1 1 1 1 −1 1 1];

sequence (19): G_512(3,:)=[1 1 1 −1 −1 −1 1 −1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 −1 −1 −1 1 1 1 −1 1 −1 −1 −1 1 −1 −1 1 −1 1 1 1 −1 −1 −1 1 −1 −1 −1 −1 1 −1 −1 1 −1 1 −1 −1 −1 −1 1 1 1 −1 1 1 −1 −1 −1 1 −1 −1 1 −1 −1 1 −1 −1 −1 1 1 1 −1 1 1 1 1 −1 1 1 1 −1 1 1 1 1 −1 −1 −1 1 1 −1 1 1 1 −1 1 1 −1 1 −1 −1 −1 1 1 1 −1 1 1 1 1 −1 1 1 1 −1 1 1 −1 1 1 −1 1 −1 −1 −1 1 1 1 −1 1 −1 −1 −1 1 1 −1 1 −1 −1 −1 1 1 1 −1 1 1 1 1 −1 −1 −1 1 1 1 1 −1 1 1 1 1 −1 1 1 −1 1 1 −1 1 −1 −1 −1 1 1 1 −1 1 1 1 1 −1 1 1 −1 1 1 −1 1 1 1 1 −1 −1 −1 1 −1 −1 1 1 1 −1 1 1 1 1 −1 1 1 1 −1 1 −1 −1 −1 1 1 1 1 −1 −1 −1 1 −1 −1 −1 −1 1 −1 −1 1 −1 −1 −1 −1 1 1 1 −1 1 −1 −1 −1 1 −1 −1 1 −1 −1 −1 −1 1 1 1 1 −1 1 1 −1 −1 −1 −1 1 −1 −1 1 −1 −1 −1 1 −1 1 1 1 −1 1 1 −1 1 1 −1 1 1 1 −1 1 1 −1 1 −1 −1 −1 1 1 1 −1 1 −1 −1 −1 1 1 −1 1 −1 −1 −1 −1 1 −1 −1 1 −1 −1 −1 −1 1 1 1 1 −1 −1 −1 1 1 1 −1 1 1 1 −1 1 −1 −1 −1 1 1 1 −1 1 1 1 1 −1 1 1 1 −1 1 1 −1 1 1 1 1 −1 −1 −1 1 1 −1 1 1 1 −1 1 1 −1 1 −1 −1 −1 1 1 1 −1 1 1 1 1 −1 1 1 1 −1 1 −1 −1 −1 1 1 1 1 −1 1 1 −1 −1 1 −1 −1 1 −1 −1 1 −1 1 1 1 −1 1 −1 −1 −1 1 −1 −1 −1 −1 1 1 1 −1 1 1 1 1 −1 −1 −1 1 −1 −1 −1 −1 1 −1 −1 1 −1 −1 −1 −1 1 −1 1 −1 −1 1 −1 −1 −1 −1 1 1 1 −1 1 −1 −1 −1 1 −1 −1 −1 1 1 1 −1 1 1 1 1 −1 −1 −1 1 1 1 −1 1 1 1 1 −1 1 1 −1 1 1 −1 1 1 −1 1 1];

sequence (20): G_512(4,:)=[1 1 1 −1 −1 −1 1 −1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 −1 −1 −1 1 1 1 −1 1 −1 −1 −1 1 −1 −1 1 −1 1 1 1 −1 −1 −1 1 −1 −1 −1 −1 1 −1 −1 1 −1 1 −1 −1 −1 −1 1 1 1 −1 1 1 −1 −1 −1 1 −1 −1 1 −1 −1 1 −1 −1 −1 1 1 1 −1 1 1 1 1 −1 1 1 1 −1 1 1 1 1 1 −1 −1 −1 1 1 −1 1 1 1 −1 1 1 −1 1 −1 −1 −1 1 1 1 −1 1 1 1 1 −1 1 1 1 −1 1 −1 −1 −1 1 1 1 −1 1 1 −1 −1 1 −1 −1 1 −1 −1 1 −1 1 1 1 1 −1 1 1 −1 −1 −1 1 1 1 1 −1 1 1 1 1 −1 1 1 −1 1 1 −1 1 1 1 1 −1 −1 −1 1 1 −1 1 1 1 −1 1 1 −1 1 −1 −1 −1 1 1 1 −1 1 1 1 1 −1 1 1 1 −1 1 −1 −1 −1 1 1 1 1 −1 1 1 −1 −1 1 −1 −1 1 −1 −1 1 −1 1 1 1 −1 1 1 −1 1 −1 1 −1 −1 −1 1 −1 −1 −1 −1 1 1 1 −1 −1 1 −1 −1 1 −1 1 1 1 −1 −1 −1 1 −1 −1 −1 −1 1 −1 −1 1 −1 −1 −1 −1 1 1 1 −1 1 −1 −1 −1 1 −1 −1 1 −1 1 1 1 −1 −1 −1 1 −1 1 1 1 1 −1 1 1 −1 1 −1 −1 −1 1 1 1 1 −1 1 1 −1 1 1 1 1 −1 −1 −1 1 −1 1 1 1 −1 1 1 −1 1 1 1 1 −1 −1 −1 1 −1 1 1 1 1 −1 1 1 −1 1 1 −1 1 1 −1 1 1 1 −1 1 1 1 1 1 −1 −1 −1 1 −1 1 1 1 1 −1 1 1 −1 1 1 1 1 −1 −1 −1 1 1 −1 1 1 1 −1 1 1 −1 1 −1 −1 −1 1 1 1 −1 1 1 1 1 −1 1 1 1 −1 1 1 −1 1 1 1 1 −1 −1 −1 1 1 −1 1 1 1 −1 1 1 −1 1 −1 −1 −1 1 1 1 −1 1 1 1 1 −1 −1 −1 1 −1 −1 −1 −1 1 −1 −1 1 −1 −1 −1 1 −1 1 1 1 1 −1 1 −1 −1 −1 −1 1 1 1 1 −1 1 1 −1 1 −1 −1 −1 1 1 1 1 −1 1 1 1 1 1 −1 1 1 1 −1 1 1 1 1 −1 1 1 −1 1 1 −1 1 1 1 1 −1 −1 −1 1 1 −1 1 1 1 −1 1 1 −1 1 −1 −1 −1 1 1 1 −1 1 1 1 1 −1 1 1 −1 1 1 −1 1 1 1 1 −1 −1 −1 1 1 −1 1 1 1 −1 1 1 −1 1 1 1 1 −1 −1 −1 1 −1 −1 −1 −1 1 −1 −1 1 −1];

sequence (21): G_512(5,:)=[1 1 1 −1 −1 −1 1 −1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 1 1 1 −1 −1 −1 1 −1 1 1 1 1 −1 1 1 −1 1 −1 −1 −1 1 1 1 −1 1 1 1 1 −1 1 1 −1 1 1 1 1 −1 −1 −1 1 −1 1 1 1 −1 1 1 −1 1 1 1 1 −1 −1 −1 1 1 −1 −1 −1 1 −1 1 1 1 −1 1 1 −1 1 1 1 1 −1 −1 −1 1 −1 1 1 1 1 −1 1 −1 −1 −1 1 −1 −1 1 −1 −1 1 −1 −1 −1 −1 1 −1 −1 1 −1 −1 −1 −1 1 1 1 −1 1 1 1 1 −1 −1 −1 1 −1 1 1 1 1 −1 1 −1 −1 −1 1 −1 −1 1 −1 −1 −1 1 1 −1 1 −1 −1 1 −1 1 1 1 −1 1 1 −1 1 1 −1 1 −1 1 −1 −1 −1 1 −1 1 −1 −1 −1 1 1 1 −1 1 1 1 1 −1 1 1 −1 1 −1 −1 −1 1 1 1 −1 1 1 1 1 −1 1 1 1 1 −1 1 1 1 1 −1 −1 −1 1 −1 1 1 1 −1 1 1 −1 1 1 1 1 −1 −1 −1 1 −1 −1 1 −1 −1 −1 −1 1 −1 −1 1 −1 1 1 1 −1 −1 −1 1 −1 1 1 1 −1 1 1 −1 1 −1 −1 −1 1 1 1 −1 1 1 1 1 −1 1 1 −1 1 −1 1 −1 −1 −1 1 1 1 −1 1 −1 −1 −1 1 −1 −1 1 −1 −1 −1 −1 1 1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 1 −1 1 1 −1 1 −1 1 −1 −1 −1 1 1 1 −1 1 −1 −1 −1 1 −1 −1 1 −1 −1 −1 −1 1 1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 1 −1 1 1 −1 1 −1 1 −1 −1 −1 1 1 1 −1 1 −1 −1 −1 1 −1 −1 1 −1 −1 −1 −1 1 1 1 1 −1 1 1 1 1 −1 1 1 −1 1 1 −1 1 1 1 1 −1 −1 −1 1 −1 −1 −1 1 −1 −1 1 −1 1 1 1 −1 −1 −1 1 −1 −1 −1 −1 1 −1 1 −1 −1 1 −1 −1 −1 −1 1 1 1 −1 1 −1 −1 −1 1 −1 −1 1 −1 −1 −1 −1 1 1 1 1 −1 1 1 1 1 −1 1 1 1 −1 1 1];

sequence (22): G_512(6,:)=[−1 −1 −1 1 1 1 −1 1 −1 −1 −1 1 −1 −1 1 −1 1 1 1 −1 −1 −1 1 −1 −1 −1 −1 1 −1 −1 1 −1 1 1 1 −1 −1 −1 1 −1 1 1 1 −1 1 1 −1 1 1 1 1 −1 −1 −1 1 −1 −1 −1 −1 1 −1 −1 1 −1 −1 −1 −1 1 1 1 −1 1 −1 −1 −1 1 −1 −1 1 −1 1 1 1 −1 −1 −1 1 −1 −1 −1 −1 1 −1 −1 1 −1 −1 −1 −1 1 1 1 −1 1 −1 1 −1 −1 −1 1 −1 −1 −1 −1 1 1 1 −1 1 1 −1 1 1 1 −1 1 1 1 1 −1 1 1 −1 1 1 −1 1 −1 −1 −1 1 1 1 −1 1 1 1 −1 1 1 −1 1 −1 −1 −1 1 1 1 −1 1 1 1 −1 1 1 −1 1 −1 −1 −1 1 −1 −1 −1 −1 1 1 1 −1 1 1 1 1 −1 1 1 −1 1 −1 −1 −1 1 1 1 −1 1 −1 −1 −1 1 −1 −1 1 −1 1 1 1 −1 1 −1 −1 −1 1 −1 −1 −1 1 −1 −1 1 −1 −1 −1 −1 1 1 1 −1 1 −1 −1 −1 1 −1 −1 1 −1 −1 1 −1 −1 −1 −1 1 1 1 −1 1 1 1 1 −1 1 1 −1 1 1 1 1 −1 −1 −1 1 −1 1 1 1 −1 1 1 −1 1 −1 −1 −1 1 1 1 −1 1 1 −1 1 −1 −1 −1 1 −1 −1 1 −1 −1 −1 −1 1 1 1 −1 1 1 1 1 −1 1 1 −1 1 1 1 1 −1 −1 −1 1 −1 −1 1 −1 1 −1 1 1 1 1 −1 1 1 −1 1 −1 −1 −1 1 1 1 −1 1 1 1 −1 1 1 1 1 −1 1 1 −1 1 1 1 1 −1 −1 −1 1 −1 1 1 1 −1 1 1 1 1 −1 −1 −1 1 −1 −1 −1 −1 1 −1 −1 1 −1 −1 1 −1 1 1 1 −1 −1 −1 1 −1 1 1 1 −1 1 1 −1 1 −1 −1 −1 1 1 1 −1 1 1 1 −1 1 1 1 1 −1 1 1 −1 1 −1 −1 −1 1 1 1 −1 1 −1 −1 −1 1 −1 −1 1 −1 −1 1 −1 −1 −1 −1 1 1 1 −1 1 1 1 1 −1 1 1 −1 1 −1 −1 −1 1 1 1 −1 1 −1 1 −1 −1 −1 1 −1 −1 1 −1 −1 −1 1 −1 −1 1 −1 1 1 1 −1 −1 −1 1 −1 −1 −1 −1 1 −1 −1 1 −1 −1 −1 −1 1 1 1 −1 1 −1 −1 −1 1 −1 −1 1 −1 −1 −1 −1 1 1 1 −1 1 1 1 1 −1 1 1 −1 1 1 1 −1 1];

sequence (23): G_512(7,:)=[1 1 1 −1 −1 −1 1 −1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 −1 −1 −1 1 1 1 −1 1 −1 −1 −1 1 −1 −1 1 −1 1 1 1 −1 −1 −1 1 −1 −1 −1 −1 1 −1 −1 1 −1 −1 −1 −1 1 1 1 −1 1 −1 −1 −1 1 −1 −1 1 −1 −1 1 −1 −1 −1 1 1 1 −1 1 1 1 1 −1 1 1 −1 1 −1 −1 −1 1 1 1 −1 1 −1 −1 −1 1 −1 −1 1 −1 1 1 1 −1 −1 −1 1 −1 −1 −1 −1 1 −1 1 −1 −1 1 −1 1 1 1 −1 −1 −1 1 −1 1 1 1 −1 1 1 −1 1 1 1 1 −1 −1 −1 1 −1 −1 −1 −1 1 −1 −1 1 −1 −1 −1 −1 1 1 1 −1 1 −1 −1 −1 1 −1 −1 1 −1 −1 −1 1 −1 −1 1 −1 1 1 1 −1 −1 −1 1 −1 −1 −1 −1 1 1 1 −1 1 −1 −1 1 −1 −1 1 −1 −1 −1 −1 1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 −1 1 1 1 1 −1 1 1 −1 1 −1 −1 −1 1 1 1 −1 1 −1 −1 −1 1 −1 −1 1 −1 −1 1 −1 −1 −1 −1 1 1 1 −1 1 1 1 1 −1 1 1 −1 1 −1 −1 −1 1 1 1 −1 1 −1 1 −1 −1 −1 1 −1 −1 1 −1 −1 −1 1 −1 −1 1 −1 1 1 1 −1 1 −1 −1 −1 1 −1 −1 −1 −1 1 −1 −1 1 −1 −1 −1 −1 1 1 1 −1 1 1 1 −1 1 1 −1 1 1 1 1 −1 −1 −1 1 −1 1 1 1 −1 1 1 1 −1 1 −1 −1 −1 1 1 1 −1 1 1 1 1 −1 1 1 −1 1 −1 −1 −1 1 1 −1 1 −1 −1 −1 1 −1 −1 1 −1 −1 −1 −1 1 1 1 −1 1 1 1 −1 1 1 −1 1 1 1 1 −1 −1 −1 1 −1 1 1 1 −1 1 1 1 −1 1 −1 −1 −1 1 1 1 −1 1 1 1 1 −1 1 1 −1 1 1 1 1 −1 −1 −1 1 −1 1 −1 1 1 1 −1 1 1 −1 1 1 1 1 −1 −1 −1 1 −1 −1 −1 −1 1 −1 1 −1 −1 1 −1];

sequence (24): G_512(8,:)=[−1 −1 −1 1 1 1 −1 1 −1 −1 −1 1 −1 −1 1 −1 1 1 1 −1 −1 −1 1 −1 −1 −1 −1 1 −1 −1 1 −1 1 1 1 −1 −1 −1 1 −1 1 1 1 −1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 −1 1 1 1 1 1 −1 1 1 −1 1 1 1 1 −1 −1 −1 1 −1 1 1 1 −1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 −1 1 1 1 1 1 −1 1 1 −1 1 −1 −1 −1 1 1 1 −1 1 −1 −1 −1 1 −1 −1 1 −1 −1 1 −1 −1 −1 1 1 1 −1 1 1 1 1 −1 1 1 −1 1 1 1 1 1 −1 −1 −1 1 −1 1 1 1 −1 1 1 −1 1 −1 −1 −1 1 1 1 −1 1 1 1 1 1 −1 1 1 −1 1 1 1 1 −1 −1 −1 1 −1 1 1 1 −1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 −1 1 1 1 1 1 −1 1 1 −1 1 −1 −1 −1 1 1 1 −1 1 −1 −1 −1 1 −1 −1 1 −1 −1 1 −1 −1

−1 −1 1 1 1 −1 1 1 1 1 −1 1 1 −1 1 −1 −1 −1 1 1 1 −1 1 −1 −1 −1 1 −1 −1 1 −1 1 1 1 −1 −1 −1 1 −1 −1 −1 −1 1 −1 1 −1 −1 1 −1 −1 −1 −1 1 1 1 −1 1 −1 1 −1 −1 1 −1 −1 −1 −1 1 1 1 −1 1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 −1 1 1 −1 1 −1 −1 −1 1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 −1 1 1 −1 1 1 1 1 −1 −1 −1 1 −1 1 1 1 −1 1 1 1 1 −1 −1 −1 1 −1 −1 −1 −1 1 −1 −1 1 −1 −1 1 −1 1 −1];

sequence (25): G_1024(1,:)=[−1 −1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 −1 −1 1 1 −1 −1 −1 −1 1 --1 1 −1 1 −1 −1 1 1 1 −1 −1 −1 −1 −1 −1 −1 1 −1 1 1 −1 −1 1 1 1 −1 −1 1 1 1 1 −1 1 −1 1 −1 1 1 −1 1 1 −1 −1 −1 −1 −1 −1 −1 1 −1 −1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 −1 −1 1 1 −1 −1 −1 −1 1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 −1 1 −1 −1 1 1 −1 1 1 −1 −1 1 1 1 1 −1 1 −1 1 −1 1 1 −1 −1 1 1 1 1 1 1 1 −1 1 −1 −1 1 1 −1 −1 −1 1 1 −1 −1 −1 −1 1 −1 1 −1 1 −1 1 −1 −1 1 −1 −1 1 1 1 −1 −1 −1 −1 −1 −1 −1 1 −1 1 1 −1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1 1 1 1 −1 1 −1 1 −1 1 1 −1 1 1 −1 −1 −1 −1 −1 −1 −1 1 1 −1 1 −1 −1 1 −1 −1 1 1 −1 −1 −1 −1 1 −1 1 −1 1 −1 −1 1 1 1 −1 −1 −1 −1 −1 −1 −1 1 1 −1 1 −1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 −1 1 −1 −1 1 1 −1 1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 1 1 −1 1 1 −1 −1 −1 −1 −1 −1 −1 1 −1 1 1 −1 −1 1 1 1 −1 −1 1 −1 1 −1 1 −1 −1 1 1 1 −1 −1 −1 −1 −1 −1 −1 1 −1 1 1 −1 1 1 −1 −1 −1 −1 −1 −1 −1 1 −1 1 1 −1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 1 −1 −1 −1 1 1 1 1 1 1 −1 1 −1 −1 1 1 −1 −1 −1 1 1 −1 −1 1 −1 −1 1 1 1 1 1 1 −1 1 −1 −1 1 1 −1 −1 1 1 1 −1 −1 1 1 1 1 −1 1 −1 1 −1 1 1 −1 1 1 −1 1 1 −1 −1 −1 −1 −1 −1 −1 1 −1 1 1 −1 −1 −1 1 1 −1 −1 −1 −1 1 −1 1 −1 1 −1 −1 1];

sequence (26): G_1024(2,:)=[−1 1 1 −1 1 −1 1 −1 1 1 1 1 −1 −1 1 1 −1 1 1 −1 −1 1 −1 1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 1 −1 1 −1 −1 −1 −1 −1 −1 −1 1 1 1 −1 −1 1 −1 1 −1 1 −1 −1 −1 −1 1 1 −1 −1

−1 1 1 −1 −1 1 −1 1 1 1 1 1 1 1 −1 −1 −1 1 1 −1 1 −1
1 −1 1 1 1 1 −1 −1 1 1 −1 1 1 −1 −1 1 −1 1 1 1 1 1 1
1 −1 −1 1 −1 −1 1 −1 1 −1 1 −1 −1 −1 −1 1 1 −1 −1
−1 1 1 −1 −1 1 −1 1 1 1 1 1 1 1 −1 −1 −1 1 1 −1 1 −1
1 −1 1 1 1 1 −1 −1 1 1 −1 1 1 −1 −1 1 −1 1 1 1 1 1 1
1 −1 −1 −1 1 1 −1 1 −1 1 −1 1 1 1 1 −1 −1 1 1 1 −1
−1 1 1 −1 1 −1 −1 −1 −1 −1 −1 −1 1 1 −1 1 1 −1 1 −1
1 −1 1 1 1 1 −1 −1 1 1 −1 1 1 −1 −1 1 −1 1 1 1 1 1 1
1 −1 −1 1 −1 −1 1 −1 1 −1 1 −1 −1 −1 −1 1 1 −1 −1
−1 1 1 −1 −1 1 −1 1 1 1 1 1 1 1 −1 −1 1 −1 −1 1 −1
1 −1 1 −1 −1 −1 −1 1 1 −1 −1 1 −1 −1 1 1 −1 1 −1 −1
−1 −1 −1 −1 −1 1 1 1 −1 −1 1 −1 1 −1 −1 −1 −1 1 −1
−1 −1 1 1 −1 −1 1 −1 1 1 1 1 1 1 1 −1 −1 1 −1 −1 1
−1 1 −1 1 −1 −1 −1 −1 1 1 −1 −1 1 −1 −1 1 1 −1 1 −1
−1 −1 −1 −1 −1 −1 1 1 −1 1 1 −1 1 −1 1 −1 1 1 1 1 −1
−1 1 1 1 −1 −1 1 1 −1 1 −1 −1 −1 −1 −1 −1 −1 1 1 1
−1 −1 1 −1 1 −1 1 −1 −1 −1 −1 1 1 −1 −1 1 −1 −1 1
1 −1 1 −1 −1 −1 −1 −1 −1 −1 1 1 1 −1 −1 1 −1 1 −1
1 −1 −1 −1 −1 1 1 −1 −1 −1 1 1 −1 −1 1 −1 1 1 1 1 1
1 1 −1 −1 1 −1 −1 1 −1 1 −1 1 −1 −1 −1 −1 1 1 −1 −1
1 −1 −1 1 1 −1 1 −1 −1 −1 −1 −1 −1 −1 1 1 −1 1 1 −1
1 −1 1 −1 1 1 1 1 −1 −1 1 1 1 −1 −1 1 1 −1 1 −1 −1
−1 −1 −1 −1 −1 1 1 −1 1 1 −1 1 −1 1 −1 1 1 1 1 −1 −1
1 1 −1 1 1 −1 −1 1 −1 1 1 1 1 1 1 1 −1 −1 −1 1 1 −1
1 −1 1 −1 1 1 1 1 −1 −1 1 1 1 −1 −1 1 1 −1 1 −1 −1
−1 −1 −1 −1 −1 1 1 1 −1 −1 1 −1 1 −1 1 −1 −1 −1 −1
1 1 −1 −1 1 −1 −1 1 1 −1 1 −1 −1 −1 −1 −1 −1 −1 1
1 −1 1 1 −1 1 −1 1 −1 1 1 1 1 1 −1 −1 1 1 1 −1 −1 1 1
−1 1 −1 −1 −1 −1 −1 −1 −1 1 1 1 −1 −1 1 −1 1 −1 1
−1 −1 −1 −1 1 1 −1 −1 1 −1 −1 1 1 −1 1 −1 −1 −1 −1
−1 −1 −1 1 1 1 −1 −1 1 −1 1 −1 1 −1 −1 −1 −1 1 1 −1
−1 −1 1 1 −1 −1 1 −1 1 1 1 1 1 1 1 −1 −1 −1 1 1 −1
1 −1 1 −1 1 1 1 1 −1 −1 1 1 −1 1 1 −1 −1 1 −1 1 1 1
1 1 1 1 −1 −1 1 −1 −1 1 −1 1 −1 1 −1 −1 −1 −1 1 1 −1
−1 −1 1 1 −1 −1 1 −1 1 1 1 1 1 1 1 −1 −1 1 −1 −1 1
−1 1 −1 1 −1 −1 −1 −1 1 1 −1 −1 1 −1 −1 1 1 −1 1 −1
−1 −1 −1 −1 −1 −1 1 1 1 −1 −1 1 −1 1 −1 1 −1 −1 −1
−1 1 1 −1 −1 −1 1 1 −1 −1 1 −1 1 1 1 1 1 1 1 −1 −1
1 −1 −1 1 −1 1 −1 1 −1 −1 −1 −1 1 1 −1 −1 1 −1 −1
1 1 −1 1 −1 −1 −1 −1 −1 −1 −1 1 1 −1 1 1 −1 1 −1 1
−1 1 1 1 1 −1 −1 1 1 1 −1 −1 1 1 −1 1 −1 −1 −1 −1 −1
−1 −1 1 1 1 −1 −1 1 −1 1 −1 1 −1 −1 −1 −1 1 1 −1 −1
1 −1 −1 1 1 −1 1 −1 −1 −1 −1 −1 −1 −1 1 1 1 −1 −1
1 −1 1 −1 1 −1 −1 −1 −1 1 1 −1 −1 −1 1 1 −1 −1 1 −1
1 1 1 1 1 1 1 −1 −1];

sequence (27): G_1024(3,:)=1 −1 −1 1 1 −1 −1 −1 −1 1
−1 1 −1 1 −1 −1 1 1 1 −1 −1 −1 −1 −1 −1 −1 1 −1 1
1 −1 −1 1 1 1 −1 −1 1 1 1 1 −1 1 −1 1 −1 1 1 −1 1 1
−1 −1 −1 −1 −1 −1 −1 1 −1 1 1 −1 −1 1 −1 −1 1 1 −1
−1 −1 −1 1 −1 1 −1 1 −1 −1 1 1 1 −1 −1 −1 −1 −1 −1
−1 1 −1 1 1 −1 −1 1 −1 −1 1 1 −1 −1 −1 −1 1 −1 1 −1
1 −1 −1 1 −1 −1 1 1 1 1 1 1 1 −1 1 −1 −1 1 1 −1 1 1
−1 −1 1 1 1 1 −1 1 −1 1 −1 1 1 −1 −1 −1 1 1 1 1 1 1
1 −1 1 −1 −1 1 1 −1 −1 −1 1 1 −1 −1 −1 −1 1 −1 1 −1
1 −1 −1 1 −1 −1 1 1 1 1 1 1 1 −1 1 −1 −1 1 1 −1 −1
−1 1 1 −1 −1 −1 −1 1 −1 1 −1 1 −1 −1 1 1 1 −1 −1 −1
−1 −1 −1 −1 1 −1 1 1 −1 −1 1 −1 −1 1 1 −1 −1 −1 −1
1 −1 1 −1 1 −1 −1 1 −1 −1 1 1 1 1 1 1 1 −1 1 −1 −1
1 1 −1 −1 −1 1 1 −1 −1 −1 −1 1 −1 1 −1 1 −1 −1 1 1
1 −1 −1 −1 −1 −1 −1 −1 1 −1 1 1 −1 −1 1 1 1 −1 −1
1 1 1 1 −1 1 −1 1 −1 1 1 −1 1 1 −1 −1 −1 −1 −1 −1 −1
1 −1 1 1 −1 −1 1 −1 −1 1 1 −1 −1 −1 −1 1 −1 1 −1 1
−1 −1 1 1 1 −1 −1 −1 −1 −1 −1 −1 1 −1 1 1 −1 −1 1
−1 −1 1 1 −1 −1 −1 −1 1 −1 1 −1 1 −1 −1 1 −1 −1 1
1 1 1 1 1 1 −1 1 −1 −1 1 1 −1 −1 −1 1 1 −1 −1 −1 −1
1 −1 1 −1 1 −1 −1 1 1 1 −1 −1 −1 −1 −1 −1 −1 1 −1
1 1 −1 −1 1 1 1 −1 −1 1 1 1 1 −1 1 −1 1 −1 1 1 −1 1
1 −1 −1 −1 −1 −1 −1 −1 1 −1 1 1 −1 −1 1 1 1 −1 −1
1 1 1 1 −1 1 −1 1 −1 1 1 −1 −1 −1 1 1 1 1 1 1 1 −1 1
−1 −1 1 1 −1 1 1 −1 −1 1 1 1 1 −1 1 −1 1 −1 1 1 −1
1 1 −1 −1 −1 −1 −1 −1 −1 1 −1 1 1 −1 −1 1 −1 −1 1
1 −1 −1 −1 −1 1 −1 −1 1 −1 −1 1 1 1 −1 −1 −1 −1 −1
−1 −1 1 −1 1 1 −1 −1 1 1 1 −1 −1 1 1 1 1 −1 1 −1 1
−1 1 1 −1 1 1 −1 −1 −1 −1 −1 −1 −1 1 −1 1 1 −1 −1
1 1 1 −1 −1 1 1 1 1 −1 1 −1 1 −1 1 1 −1 −1 −1 1 1 1
1 1 1 1 −1 1 −1 −1 1 1 −1 1 1 −1 −1 1 1 1 1 −1 1 −1
1 −1 1 1 −1 1 1 −1 −1 −1 −1 −1 −1 −1 1 −1 1 1 −1 1
−1 1 1 −1 −1 −1 −1 1 −1 1 −1 1 −1 −1 1 1 1 −1 −1 −1
−1 −1 −1 −1 1 −1 1 1 −1 −1 1 1 1 −1 −1 1 1 1 1 −1 1
−1 1 −1 1 1 −1 1 1 −1 −1 −1 −1 −1 −1 −1 1 −1 1 1 −1
−1 1 −1 −1 1 1 −1 −1 −1 −1 1 −1 1 −1 1 −1 −1 1 1 1
−1 −1 −1 −1 −1 −1 −1 1 −1 1 1 −1 −1 1 −1 −1 1 1 −1
−1 −1 −1 1 −1 1 −1 1 −1 −1 1 −1 −1 1 1 1 1 1 1 1 −1
1 −1 −1 1 1 −1 −1 −1 1 1 −1 −1 −1 −1 1 −1 1 −1 1 −1
−1 1 1 1 −1 −1 −1 −1 −1 −1 −1 1 −1 1 1 −1 −1 1 1 1
−1 −1 1 1 1 1 −1 1 −1 1 −1 1 1 −1 1 1 −1 −1 −1 −1 −1
−1 −1 1 −1 1 1 −1 −1 1 1 1 −1 −1 1 1 1 1 −1 1 −1 1
−1 1 1 −1 −1 −1 1 1 1 1 1 1 1 −1 1 −1 −1 1 1 −1 1 1
−1 −1 1 1 1 1 −1 1 −1 1 −1 1 1 −1 1 1 −1 −1 −1 −1 −1
−1 −1 1 −1 1 1 −1 −1 1];

sequence (28): G_1024(4,:)=1 −1 1 1 −1 −1 1 −1 1 1 1 1
1 1 1 −1 −1 1 −1 −1 1 −1 1 −1 1 −1 −1 −1 −1 1 1 −1
−1 1 −1 −1 1 1 −1 1 −1 −1 −1 −1 −1 −1 −1 1 1 1 −1
−1 1 −1 1 −1 1 −1 −1 −1 −1 1 1 −1 −1 −1 1 1 −1 −1
1 −1 1 1 1 1 1 1 1 −1 −1 1 −1 −1 1 −1 1 −1 1 −1 −1
−1 −1 1 1 −1 −1 −1 1 1 −1 −1 1 −1 1 1 1 1 1 1 1 −1
−1 −1 1 1 −1 1 −1 1 −1 1 1 1 1 −1 −1 1 1 1 −1 −1 1
1 −1 1 −1 −1 −1 −1 −1 −1 −1 1 1 −1 1 1 −1 1 −1 1 −1
1 1 1 1 −1 −1 1 1 −1 1 1 −1 −1 1 −1 1 1 1 1 1 1 1 −1
−1 −1 1 1 −1 1 −1 1 −1 1 1 1 1 −1 −1 1 1 −1 1 1 1 −1
−1 1 −1 1 1 1 1 1 1 1 −1 −1 1 −1 −1 1 −1 1 −1 1 −1
−1 −1 −1 1 1 −1 −1 −1 1 1 −1 −1 1 −1 1 1 1 1 1 1 1
−1 −1 −1 1 1 −1 1 −1 1 −1 1 1 1 1 −1 −1 1 1 −1 1 1
−1 −1 1 −1 1 1 1 1 1 1 1 −1 −1 1 −1 −1 1 −1 1 −1 1
−1 −1 −1 −1 1 1 −1 −1 1 −1 −1 1 1 −1 −1 −1 −1 −1 −1
−1 −1 1 1 1 1 −1 −1 1 −1 1 −1 1 −1 −1 −1 −1 1 1 −1
−1 −1 1 1 −1 −1 1 −1 1 1 1 1 1 1 1 −1 −1 1 −1 −1 1
−1 1 −1 1 −1 −1 −1 −1 1 1 −1 −1 −1 1 1 −1 −1 1 −1
1 1 1 1 1 1 1 −1 −1 −1 1 1 −1 1 −1 1 −1 1 1 1 1 −1 −1
1 1 −1 1 1 −1 −1 1 −1 1 1 1 1 1 1 1 −1 −1 1 −1 −1 1
−1 1 −1 1 −1 −1 −1 −1 1 1 −1 −1 1 −1 −1 1 1 −1 1 −1
−1 −1 −1 −1 −1 −1 1 1 1 −1 −1 1 −1 1 −1 1 −1 −1 −1
−1 1 1 −1 −1 1 −1 −1 1 1 −1 1 −1 −1 −1 −1 −1 −1 −1
1 1 −1 1 1 −1 1 −1 1 −1 1 1 1 1 −1 −1 1 1 1 −1 −1 1
1 −1 1 −1 −1 −1 −1 −1 −1 −1 1 1 1 −1 −1 1 −1 1 −1
1 −1 −1 −1 −1 1 1 −1 −1 1 −1 −1 1 1 −1 1 −1 −1 −1
−1 −1 −1 −1 1 1 −1 1 1 −1 1 −1 1 −1 1 1 1 1 −1 −1 1
1 −1 1 1 −1 −1 1 −1 1 1 1 1 1 1 1 −1 −1 −1 1 1 −1 1
−1 1 −1 1 1 1 1 −1 −1 1 1 1 −1 −1 1 1 −1 1 −1 −1 −1
−1 −1 −1 −1 1 1 −1 1 1 −1 1 −1 1 −1 1 1 1 1 −1 −1 1
1 1 −1 −1 1 1 −1 1 −1 −1 −1 −1 −1 −1 1 1 1 1 −1 −1
1 −1 1 −1 1 −1 −1 −1 −1 1 1 −1 −1 −1 1 1 −1 −1 1 −1
1 1 1 1 1 1 1 −1 −1 1 −1 −1 1 −1 1 −1 1 −1 −1 −1 −1
1 1 −1 −1 1 −1 −1 1 1 −1 1 −1 −1 −1 −1 −1 −1 −1 1
1 1 −1 −1 1 −1 1 −1 1 −1 −1 −1 −1 1 1 −1 −1 1 −1 −1
1 1 −1 1 −1 −1 −1 −1 −1 −1 −1 1 1 −1 1 1 −1 1 −1 1
−1 1 1 1 1 −1 −1 1 1 1 −1 −1 1 1 −1 1 −1 −1 −1 −1 −1
−1 −1 1 1 1 −1 −1 1 −1 1 −1 1 −1 −1 −1 −1 1 1 −1 −1

−1 1 1 −1 −1 1 −1 1 1 1 1 1 1 1 −1 −1 1 −1 −1 1 −1
1 −1 1 −1 −1 −1 −1 1 1 −1 −1 1 −1 −1 1 1 −1 1 −1 −1
−1 −1 −1 −1 −1 1 1 1 −1 −1 1 −1 1 −1 1 −1 −1 −1 −1
1 1 −1 −1 −1 1 1 −1 −1 1 −1 1 1 1 1 1 1 1 −1 −1 1 −1
−1 1 −1 1 −1 1 −1 −1 −1 −1 1 1 −1 −1 −1 1 1 −1 −1
1 −1 1 1 1 1 1 1 1 −1 −1 −1 1 1 −1 1 −1 1 −1 1 1 1 1
−1 −1 1 1 −1 1 1 −1 −1 1 −1 1 1 1 1 1 1 1 −1 −1 1 −1
−1 1 −1 1 −1 1 −1 −1 −1 −1 1 1 −1 −1 1 −1 −1 1 1 −1
1 −1 −1 −1 −1 −1 −1 −1 1 1 1 −1 −1 1 −1 1 −1 1 −1
−1 −1 −1 1 1 −1 −1 1 −1 −1 1 1 −1 1 −1 −1 −1 −1 −1
−1 −1 1 1 −1 1 1 −1 1 −1 1 −1 1 1 1 1 −1 −1 1 1 1 −1
−1 1 1 −1 −1 −1 −1 −1 −1 −1 −1 1 1 1 1 −1 −1 1 −1
1 −1 1 −1 −1 −1 −1 1 1 −1 −1];

sequence (29): G_1024(5,:)=[−1 −1 1 1 −1 −1 −1 −1 1 −1
1 −1 1 −1 −1 1 1 1 −1 −1 −1 −1 −1 −1 −1 1 −1 1 1 −1
−1 1 −1 −1 1 1 −1 −1 −1 −1 1 −1 1 −1 1 −1 −1 1 −1
−1 1 1 1 1 1 1 1 −1 1 −1 −1 1 1 −1 −1 −1 1 1 −1 −1
−1 −1 1 −1 1 −1 1 −1 −1 1 1 1 −1 −1 −1 −1 −1 −1 −1
1 −1 1 1 −1 −1 1 1 1 −1 −1 1 1 1 1 −1 1 −1 1 −1 1 1
−1 1 1 −1 −1 −1 −1 −1 −1 −1 1 −1 1 1 −1 −1 1 1 1 −1
−1 1 1 1 1 −1 1 −1 1 −1 1 1 −1 −1 −1 1 1 1 1 1 1 1 −1
1 −1 −1 1 1 −1 1 1 −1 −1 1 1 1 1 −1 1 −1 1 −1 1 1 −1
1 1 −1 −1 −1 −1 −1 −1 −1 1 −1 1 1 −1 −1 1 −1 −1 1
1 −1 −1 −1 −1 1 −1 1 −1 1 −1 −1 1 1 1 −1 −1 −1 −1
−1 −1 −1 1 −1 1 1 −1 −1 1 1 1 −1 −1 1 1 1 1 −1 1 −1
1 −1 1 1 −1 1 1 −1 −1 −1 −1 −1 −1 −1 1 −1 1 1 −1 −1
1 −1 −1 1 1 −1 −1 −1 −1 1 −1 1 −1 1 −1 −1 1 1 1 −1
−1 −1 −1 −1 −1 −1 1 −1 1 1 −1 −1 1 −1 −1 1 1 −1 −1
−1 −1 1 −1 1 −1 1 −1 −1 1 −1 −1 1 1 1 1 1 1 1 −1 1
−1 −1 1 1 −1 −1 −1 1 1 −1 −1 −1 −1 1 −1 1 −1 1 −1
−1 1 1 1 −1 −1 −1 −1 −1 −1 −1 1 −1 1 1 −1 −1 1 1 1
−1 −1 1 1 1 1 −1 1 −1 1 −1 1 1 −1 1 1 −1 −1 −1 −1 −1
−1 −1 1 −1 1 1 −1 −1 1 −1 −1 1 1 −1 −1 −1 −1 1 −1
1 −1 1 −1 −1 1 1 1 −1 −1 −1 −1 −1 −1 −1 1 −1 1 1 −1
−1 1 −1 −1 1 1 −1 −1 −1 −1 1 −1 1 −1 1 −1 −1 1 −1
−1 1 1 1 1 1 1 1 −1 1 −1 −1 1 1 −1 1 1 −1 −1 1 1 1 1
−1 1 −1 1 −1 1 1 −1 −1 −1 1 1 1 1 1 1 1 −1 1 −1 −1
1 1 −1 −1 −1 1 1 −1 −1 −1 −1 1 −1 1 −1 1 −1 −1 1 −1
−1 1 1 1 1 1 1 1 −1 1 −1 −1 1 1 −1 1 1 −1 −1 1 1 1 1
−1 1 −1 1 −1 1 1 −1 −1 −1 1 1 1 1 1 1 1 −1 1 −1 −1
1 1 −1 1 1 −1 −1 1 1 1 1 −1 1 −1 1 −1 1 1 −1 1 1 −1
−1 −1 −1 −1 −1 −1 1 −1 1 1 −1 −1 1 1 1 −1 −1 1 1 1
1 −1 1 −1 1 −1 1 1 −1 −1 −1 1 1 1 1 1 1 1 −1 1 −1 −1
1 1 −1 −1 −1 1 1 −1 −1 −1 −1 1 −1 1 −1 1 −1 −1 1 −1
−1 1 1 1 1 1 1 1 −1 1 −1 −1 1 1 −1 −1 −1 1 1 −1 −1
−1 −1 1 −1 1 −1 1 −1 −1 1 1 1 −1 −1 −1 −1 −1 −1 −1
1 −1 1 1 −1 −1 1 −1 −1 1 1 −1 −1 −1 −1 1 −1 1 −1 1
−1 −1 1 −1 −1 1 1 1 1 1 1 1 −1 1 −1 −1 1 1 −1 1 1 −1
−1 1 1 1 1 −1 1 −1 1 −1 1 1 −1 −1 −1 1 1 1 1 1 1 1 −1
1 −1 −1 1 1 −1 −1 −1 1 1 −1 −1 −1 −1 1 −1 1 −1 1 −1
−1 1 −1 −1 1 1 1 1 1 1 1 −1 1 −1 −1 1 1 −1 −1 −1 1
1 −1 −1 −1 −1 1 −1 1 −1 1 −1 −1 1 1 1 −1 −1 −1 −1
−1 −1 −1 1 −1 1 1 −1 −1 1 −1 −1 1 1 −1 −1 −1 −1 1
−1 1 −1 1 −1 −1 1 −1 −1 1 1 1 1 1 1 1 −1 1 −1 −1 1
1 −1 −1 −1 1 1 −1 −1 −1 −1 1 −1 1 −1 1 −1 −1 1 1 1
−1 −1 −1 −1 −1 −1 −1 1 −1 1 1 −1 −1 1 1 1 −1 −1 1
1 1 1 −1 1 −1 1 −1 1 1 −1 1 1 −1 −1 −1 −1 −1 −1 −1
1 −1 1 1 −1 −1 1 −1 −1 1 1 −1 −1 −1 −1 1 −1 1 −1 1
−1 −1 1 1 1 −1 −1 −1 −1 −1 −1 −1 1 −1 1 1 −1 −1 1
−1 −1 1 1 −1 −1 −1 −1 1 −1 1 −1 1 −1 −1 1 −1 −1 1
1 1 1 1 1 1 −1 1 −1 −1 1 1 −1 1 1 −1 −1 1 1 1 1 −1 1
−1 1 −1 1 1 −1 −1 −1 1 1 1 1 1 1 1 −1 1 −1 −1 1 1 −1
−1 −1 1 1 −1 −1 −1 −1 1 −1 1 −1 1 −1 −1 1 −1 −1 1
1 1 1 1 1 1 −1 1 −1 −1 1 1 −1];

sequence (30): G_1024(6,:)=1 −1 1 1 −1 −1 1 −1 1 1 1 1
1 1 1 −1 −1 1 −1 −1 1 −1 1 −1 1 −1 −1 −1 −1 1 1 −1
−1 −1 1 1 −1 −1 1 −1 1 1 1 1 1 1 1 −1 −1 −1 1 1 −1

1 −1 1 −1 1 1 1 1 −1 −1 1 1 −1 1 1 −1 −1 1 −1 1 1 1
1 1 1 1 −1 −1 1 −1 −1 1 −1 1 −1 1 −1 −1 −1 −1 1 1 −1
−1 1 −1 −1 1 1 −1 1 −1 −1 −1 −1 −1 −1 −1 1 1 1 −1
−1 1 −1 1 −1 1 −1 −1 −1 −1 1 1 −1 −1 1 −1 −1 1 1 −1
1 −1 −1 −1 −1 −1 −1 −1 1 1 −1 1 1 −1 1 −1 1 −1 1 1
1 1 −1 −1 1 1 1 −1 −1 1 1 −1 1 −1 −1 −1 −1 −1 −1 −1
1 1 1 −1 −1 1 −1 1 −1 1 −1 −1 −1 −1 1 1 −1 −1 −1 1
1 −1 −1 1 −1 1 1 1 1 1 1 −1 −1 1 −1 −1 1 −1 1 −1
1 −1 −1 −1 −1 1 1 −1 −1 1 −1 −1 1 1 −1 1 −1 −1 −1
−1 −1 −1 −1 1 1 1 −1 −1 1 −1 1 −1 1 −1 −1 −1 −1 1
1 −1 −1 −1 1 1 −1 −1 1 −1 1 1 1 1 1 1 1 −1 −1 1 −1
−1 1 −1 1 −1 1 −1 −1 −1 −1 1 1 −1 −1 −1 1 1 −1 −1
1 −1 1 1 1 1 1 1 1 −1 −1 −1 1 1 −1 1 −1 1 −1 1 1 1 1
−1 −1 1 1 −1 1 1 −1 −1 1 −1 1 1 1 1 1 1 1 −1 −1 1 −1
−1 1 −1 1 −1 1 −1 −1 −1 −1 1 1 −1 −1 1 −1 −1 1 1 −1
1 −1 −1 −1 −1 −1 −1 −1 1 1 1 −1 −1 1 −1 1 −1 1 −1
−1 −1 −1 1 1 −1 −1 −1 1 1 −1 −1 1 −1 1 1 1 1 1 1 1
−1 −1 1 −1 −1 1 −1 1 −1 1 −1 −1 −1 −1 1 1 −1 −1 −1
1 1 −1 −1 1 −1 1 1 1 1 1 1 1 −1 −1 −1 1 1 −1 1 −1 1
−1 1 1 1 1 −1 −1 1 1 1 −1 −1 1 1 −1 1 −1 −1 −1 −1 −1
−1 −1 1 1 −1 1 1 −1 1 −1 1 −1 1 1 1 1 −1 −1 1 1 1 −1
1 1 −1 −1 1 −1 1 1 1 1 1 1 1 −1 −1 −1 1 1 −1 1 −1 1
−1 1 1 1 1 −1 −1 1 1 1 −1 −1 1 1 −1 1 −1 −1 −1 −1 −1
−1 −1 1 1 −1 1 1 −1 1 −1 1 −1 1 1 1 1 −1 −1 1 1 1 −1
−1 1 1 −1 1 −1 −1 −1 −1 −1 −1 −1 1 1 1 −1 −1 1 −1
1 −1 1 −1 −1 −1 −1 1 1 −1 −1 1 −1 −1 1 1 −1 1 −1 −1
−1 −1 −1 −1 −1 1 1 −1 1 1 −1 1 −1 1 −1 1 1 1 1 −1 −1
1 1 −1 1 1 −1 −1 1 −1 1 1 1 1 1 1 1 −1 −1 −1 1 1 −1
1 −1 1 −1 1 1 1 1 −1 −1 1 1 −1 1 1 −1 −1 1 −1 1 1 1
1 1 1 1 −1 −1 1 −1 −1 1 −1 1 −1 1 −1 −1 −1 −1 1 1 −1
−1 −1 1 1 −1 −1 1 −1 1 1 1 1 1 1 1 −1 −1 −1 1 1 −1
1 −1 1 −1 1 1 1 1 −1 −1 1 1 1 −1 −1 1 1 −1 1 −1 −1
−1 −1 −1 −1 −1 1 1 −1 1 1 −1 1 −1 −1 1 −1 1 1 1 1 −1
−1 1 1 −1 1 1 −1 −1 1 −1 1 1 1 1 1 1 1 −1 −1 −1 1 1
−1 1 −1 1 −1 1 1 1 1 −1 −1 1 1 −1 1 1 −1 −1 1 −1 1
1 1 1 1 1 1 −1 −1 1 −1 −1 1 −1 1 −1 1 −1 −1 −1 −1 1
1 −1 −1 −1 1 1 −1 −1 1 −1 1 1 1 1 1 1 1 −1 −1 −1 1
1 −1 1 −1 1 −1 1 1 1 1 −1 −1 1 1 −1 1 1 −1 −1 1 −1
1 1 1 1 1 1 1 −1 −1 1 −1 −1 1 −1 1 −1 1 −1 −1 −1 −1
1 1 −1 −1 1 −1 −1 1 1 −1 1 −1 −1 −1 −1 −1 −1 −1 1
1 1 −1 −1 1 −1 1 −1 1 −1 −1 −1 −1 1 1 −1 −1 −1 1 1
−1 −1 1 −1 1 1 1 1 1 1 1 −1 −1 1 −1 −1 1 −1 1 −1 1
−1 −1 −1 −1 1 1 −1 −1 −1 1 1 −1 −1 1 −1 1 1 1 1 1 1
1 −1 −1 −1 1 1 −1 1 −1 1 −1 1 1 1 1 −1 −1 1 1 1 −1
−1 1 1 −1 1 −1 −1 −1 −1 −1 −1 −1 1 1 −1 1 1 −1 1 −1
1 −1 1 1 1 1 −1 −1 1 1 −1 1 1 −1 −1 1 −1 1 1 1 1 1 1
1 −1 −1 −1 1 1 −1 1 −1 1 −1 1 1 1 1 −1 −1 1 1];

sequence (31): G_1024(7,:)=[−1 −1 1 1 −1 −1 −1 −1 1 −1
1 −1 1 −1 −1 1 −1 −1 1 1 1 1 1 1 1 −1 1 −1 −1 1 1 −1
−1 −1 1 1 −1 −1 −1 −1 1 −1 1 −1 1 −1 −1 1 1 1 −1 −1
−1 −1 −1 −1 −1 1 −1 1 1 −1 −1 1 1 1 −1 −1 1 1 1 1 −1
1 −1 1 −1 1 1 −1 1 1 −1 −1 −1 −1 −1 −1 −1 1 −1 1 1
−1 −1 1 −1 −1 1 1 −1 −1 −1 −1 1 −1 1 −1 1 −1 −1 1
1 1 −1 −1 −1 −1 −1 −1 −1 1 −1 1 1 −1 −1 1 1 1 −1 −1
1 1 1 1 −1 1 −1 1 −1 1 1 −1 1 1 −1 −1 −1 −1 −1 −1 −1
1 −1 1 1 −1 −1 1 1 1 −1 −1 1 1 1 1 −1 1 −1 1 −1 1 1
−1 −1 −1 1 1 1 1 1 1 1 −1 1 −1 −1 1 1 −1 1 1 −1 −1
1 1 1 1 −1 1 −1 1 −1 1 1 −1 1 1 −1 −1 −1 −1 −1 −1 −1
1 −1 1 1 −1 −1 1 −1 −1 1 1 −1 −1 −1 −1 1 −1 1 −1 1
−1 −1 1 1 1 −1 −1 −1 −1 −1 −1 −1 1 −1 1 1 −1 −1 1
−1 −1 1 1 −1 −1 −1 −1 1 −1 1 −1 1 −1 −1 1 −1 −1 1
1 1 1 1 1 1 −1 1 −1 −1 1 1 −1 −1 −1 1 1 −1 −1 −1 −1
1 −1 1 −1 1 −1 −1 1 1 1 −1 −1 −1 −1 −1 −1 −1 1 −1
1 1 −1 −1 1 1 1 −1 −1 1 1 1 1 −1 1 −1 1 −1 1 1 −1 1
1 −1 −1 −1 −1 −1 −1 −1 1 −1 1 1 −1 −1 1 −1 −1 1 1
−1 −1 −1 −1 1 −1 1 −1 1 −1 −1 1 1 1 −1 −1 −1 −1 −1
−1 −1 1 −1 1 1 −1 −1 1 −1 −1 1 1 −1 −1 −1 −1 1 −1

1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 −1 −1 1 1 −1 −1 −1 −1 1 −1 1 −1 1 −1 1 −1 −1 1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 −1 1 −1 −1 1 1 −1 1 1 −1 1 1 −1 −1 1 −1 1 −1 1 −1 −1 1 1 −1 −1 1 1 1 1 −1 1 −1 1 −1 1 1 −1 −1 1 1 −1 −1 1 1 1 1 −1 1 −1 1 −1 1 1 −1 −1 −1 1 1 1 1 1 1 1 −1 1 −1 −1 1 1 −1 −1 −1 1 1 −1 −1 −1 1 −1 1 −1 1 −1 −1 1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 1 1 −1 −1 −1 −1 1 −1 1 −1 1 −1 −1 1 1 1 1 −1 −1 −1 −1 −1 −1 −1 1 −1 1 1 −1 −1 1 −1 −1 1 1 −1 −1 −1 −1 1 −1 1 −1 1 −1 −1 1 −1 −1 1 1 1 1 1 1 1 −1 1 −1 1 1 1 1 −1 1 −1 −1 1 1 −1 1 1 −1 −1 1 1 1 1 1 1 −1 1 −1 1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 1 1 1 1 −1 1 −1 −1 1 1 −1 −1 −1 1 1 −1 −1 −1 −1 1 −1 1 −1 1 −1 −1 1 1 −1 1 −1 −1 1 1 1 1 −1 −1 −1 −1 −1 −1 −1 1 −1 1 1 −1 −1 1 1 1 1 −1 −1 1 1 1 1 1 −1 1 −1 1 −1 1 1 −1 −1 1 1 −1 −1 −1 −1 −1 −1 −1 1 −1 −1 −1 1 1 1 1 1 −1 −1 −1 −1 −1 −1 −1 1 −1 1 −1 1 1 −1 −1 −1 1 1 −1 −1 −1 −1 1 −1 1 −1 1 −1 −1 1 1 −1 −1 −1 −1 −1 −1 −1 1 −1 1 1 −1 1 −1 1 −1 1 −1 1 −1 −1 1 −1 −1 1 1 1 1 1 −1 −1 −1 −1 −1 1 −1 1 1 −1 −1 1 −1 −1 1 1 1 1 1 1 1 −1 1 −1 −1 1 1 −1 −1 −1 1 1 −1 −1 −1 −1 −1 1 −1 1 −1 1 −1 −1 1 1 1 1 −1 −1 −1 1 1 −1 −1 −1 1 1 −1 −1 1 −1 1 −1 −1 1 −1 −1 1 1 1 1 1 1 1 −1 1 −1 −1 1 1 −1 1 −1 1 1 −1 −1 1 1 1 1 −1 1 −1 1 −1 1 1 −1 −1 −1 1 1 1 1 1 1 −1 1 −1 −1 1 1 −1];

sequence (32): G_1024(8,:)=[−1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 1 −1 1 −1 −1 −1 −1 −1 −1 −1 1 1 1 −1 −1 1 −1 1 −1 1 −1 −1 −1 −1 1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 1 1 −1 1 −1 1 −1 1 −1 −1 −1 −1 −1 −1 1 1 1 1 −1 −1 1 −1 1 −1 1 −1 −1 −1 −1 1 1 −1 −1 1 −1 −1 1 1 −1 1 −1 −1 −1 −1 −1 −1 −1 1 1 −1 1 1 −1 1 1 −1 1 −1 1 −1 1 1 1 1 −1 −1 1 1 1 1 −1 −1 1 1 −1 1 −1 −1 −1 −1 −1 −1 −1 1 1 1 1 −1 −1 1 −1 1 −1 1 1 −1 −1 −1 −1 1 1 −1 −1 −1 1 1 −1 −1 −1 1 1 −1 1 1 −1 −1 1 −1 −1 1 −1 1 −1 1 −1 −1 −1 −1 1 1 1 −1 −1 −1 1 1 −1 −1 1 −1 1 1 1 1 1 1 1 −1 −1 −1 1 1 −1 1 −1 1 −1 1 1 1 1 −1 −1 1 1 −1 1 1 −1 1 −1 −1 1 −1 1 −1 1 −1 −1 −1 −1 1 1 −1 −1 1 −1 −1 1 1 −1 1 −1 −1 −1 −1 −1 −1 −1 1 1 1 1 −1 −1 1 −1 1 −1 1 −1 −1 −1 −1 1 1 −1 −1 1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 1 1 1 −1 −1 1 1 1 −1 −1 1 1 −1 1 −1 −1 −1 −1 −1 −1 −1 1 1 −1 1 1 −1 1 −1 1 −1 1 1 1 1 −1 −1 −1 −1 1 1 1 −1 −1 1 1 −1 1 −1 −1 −1 −1 −1 −1 −1 1 1 1 −1 −1 1 −1 1 −1 1 −1 −1 −1 −1 1 1 −1 −1 1 −1 −1 1 1 −1 1 1 −1 1 1 −1 1 −1 1 −1 1 1 1 1 −1 −1 1 1 1 1 1 −1 −1 1 1 −1 1 −1 1 −1 1 −1 −1 −1 −1 1 1 1 −1 −1 −1 −1 −1 −1 −1 1 1 1 1 −1 −1 1 −1 1 −1 1 −1 −1 −1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 1 1 1 1 1 −1 1 −1 −1 1 1 −1 1 −1 1 1 −1 −1 1 1 1 1 −1 −1 1 1 1 1 −1 1 −1 1 1 −1 1 1 −1 −1 −1 −1 −1 −1 −1 1 1 −1 1 1 −1 1 1 −1 −1 1 −1 1 1 −1 1 −1 1 −1 1 1 1 1 −1 −1 −1 1 1 −1 −1 −1 1 1 −1 −1 1 1 1 1 1 1 1 −1 −1 −1 1 1 −1 −1 −1 −1 1 1 −1 1 −1 1 −1 1 1 1 1 −1 −1 1 1 1 1 1 −1 −1 −1 1 1 −1 1 1 −1 −1 1 −1 1 1 −1 1 1 −1 1 −1 −1 1 1 1 1 1 1 −1 −1 1 1 −1 −1 1 1 1 1 −1 −1 −1 1 −1 1 −1 −1 1 1 −1 −1 1 −1 1 1 −1 1 1 −1 −1 1 −1 1 1 1 1 1 1 1 −1 −1 1 −1 1 1 1 1 −1 −1 −1 −1 1 1 −1 −1 −1 1 1 −1 −1 1 1 −1 1 −1 1 1 1 1 1 −1 1 1 1 1 −1 1 −1 1 −1 1 −1 −1 1 1 1 1 1 1 −1 1 −1 −1 1 1 −1 −1 1 1 1 1 1 −1 1 −1 1 −1 1 −1 1 −1 −1 −1 −1 −1 1 −1 1 −1 1 −1 −1 −1 1 1 −1 −1 1 −1 1 1 1 1 1 −1 −1 −1 −1 1 1 1 1 −1 1 −1 −1 −1 −1 1 1 1 −1 −1 −1 −1 −1 1 1 −1 1 −1 1 −1 1 −1 1 1 −1 −1 1 1 1 −1 −1 1 1 1 −1 −1 1 1 −1 −1 −1 1 −1 1 1 1 1 −1 −1 1 1 1 1 1 −1 −1 1 1 1 1 1 1 1 −1 −1 1 −1 −1 1 −1 1 −1 1 −1 −1 −1 1 −1 1 1 −1 1 1 −1 −1 −1 −1 1 1 1 −1 −1 −1 −1 1 1 −1 −1 −1 1 −1 1 1 1 1 1 1 1 −1 −1 −1 −1 −1 −1 −1 1 1 −1 −1 −1 1 1 −1 1 1 1 1 −1 −1 1 1 1 1 −1 −1 1 1 −1 1 −1 1 −1 1 1 1 1 −1 −1 1 −1 1 1 1 1 1 1 1 −1 −1 1 1 −1 −1 1 −1 −1 1 −1 1 −1 1 −1 −1 1 1 −1 −1 1 1 1 1 1 1 1 1 −1 −1 1 1 −1 1 1 −1 −1 1 −1 −1 1 −1 1 1 1 1 1 1 −1 −1 1 −1 −1 −1 −1 −1 −1 −1 1 −1 1 −1 1 −1 1 1 1 1 1 −1 −1 1 1 1 1 1 1 −1 1 −1 1 −1 1 1 −1 −1 1 1 1 −1 1 −1 1 −1 −1 −1 −1 1 1 1 −1 1 1 −1 −1 −1 −1 −1 −1 −1 1 1 −1 1 −1 1 1 1 1 1 1 1 −1 −1 1 1 −1 −1 −1 1 −1 1 −1 1 1 1 1 −1 −1 1 1 1 1 −1 1 1 1 1 −1 1 −1 1 −1 −1 −1 −1 −1 −1 −1 −1 1 1 1 1 1 1 1 −1 −1 1 1 1 −1 1 1 1 1 1 1 −1 −1 1 1 1 1 −1 1 1 −1 1 1 −1 −1 −1 1 1 1 1 1 1 1 −1 1 1 1 1 1 −1 1 1 1 1 1 −1 −1 −1 1 1 1 1 −1 −1 1 1 1 1 −1 −1 −1 1 1 1 1 1 1 1 1 −1 −1 −1 1 1 −1 1 1 −1 1 1 −1 1 −1 −1 1 −1 1 1 1 −1 −1 −1 −1 −1 −1 −1 1 −1 1 1 −1 1 −1 1 −1 1 −1 −1 1 1 1 1 1 −1 1 −1 1 −1 1 1 −1 1 −1 1 −1 1 1 −1 −1 1 1 1 −1 −1 −1 −1 1 1 −1 −1 1 1 −1 1 −1 1 −1 1 −1 −1 1 −1 1 1 1 1 1 −1 −1 −1 1 1 −1 −1 1 −1 1 1 −1 −1 −1 1 1 −1 −1 −1 −1 −1 −1 −1 1 1 −1 1 1 −1 1 1 −1 1 1 −1 1 −1 −1 1 1 1 1 −1 −1 −1 −1 −1 −1 −1 1 1 −1 1 −1 1 −1 1 1 1 1 1 −1 −1 1 1 1 −1 1 1 −1 −1 1 1 −1 −1 1 −1 1 −1 1 −1 −1 −1 −1 1 1 −1 1 1 −1 −1 −1 1 −1 1 1 1 1 1 1 1 −1 1 −1 1 1 −1 1 1 −1 −1 1 1 1 1 −1 −1 1 1 1 1 −1 1 1 −1 1 1 −1 1 1 −1 −1 1 1 −1 −1 −1 −1 −1 −1 −1 1 1 1 1 1 1 −1 1 −1 1 1 −1 1 −1 1 −1 1 1 1 1 −1 −1 1 1 1 −1 −1 1 −1 −1 1 −1 1 1 1 1 1 1 1 −1 −1 −1 1 −1 1 −1 1 1 1 −1 −1 1 1 1 1 −1 −1 −1 −1 −1 −1 −1 1 1 1 −1 −1 1 −1 1 −1 1 −1 1 1 1 1 −1 −1 1 1 1 1 −1 1 1 1 1 −1 −1 −1 −1 −1 −1 1 1 1 −1 −1 1 1 −1 1 −1 1 −1 1 1 −1 1 −1 −1 1 1 1 1 −1 −1 1 −1 1 −1 1 1 1 1 −1 −1 −1 −1 −1 −1 −1 1 1 1 1 −1 1 −1 1 1 −1 1 −1 1 −1 1 1 1 1 1 −1 1 1 1 1 −1 1 −1 1 −1 1 1 1 1 −1 1 1 1 1 1 1 1 −1 −1 1 −1 1 1 −1 1 −1 1 1 1 1 1 −1 −1 −1 −1 1 1 1 −1 1 −1 1 −1 1 1 1 1 1 −1 −1 1 1 −1 −1 1 −1 1 −1 1 −1 −1 −1 −1 −1 1 1 −1 1 −1 1 1 1 1 1 1 −1 −1 −1 −1 1 −1 1 −1 1 −1 −1 1 −1 1 −1 1 −1 −1 1 1 −1 1 1 −1 1 1 1 −1 −1 −1 1 1 1 1 1 −1 −1 −1 1 1 1 −1 1 1 1 −1 1 −1 −1 1 1 −1 1 −1 1 1 −1 1 −1 1 −1 1 1 −1 1 1 1 −1 1 −1 −1 1 1 1 1 −1 −1 1 −1 −1 1 1 1 1 1 −1 1 −1 1 −1 1 1 1 1 −1 1 −1 1 1 1 1 1 1 −1 1 1 1 1 1 1 1 −1 −1 1 1 −1 1 1 1 1 1 −1 1 1 1 −1 −1 −1 −1 1 1 −1 1 −1 1 −1 −1 1 1 1 1 −1 −1 1 1 1 1 1 1 −1 1 −1 −1 1 1 1 1 −1 −1 1 −1 −1 1 1 1 1 1 −1 1 1 −1 1 1 1 1 −1 1 −1 −1 −1 1 1 1 −1 −1 1 −1 1 1 1 1 −1 1 −1 1 1 1 1 1 1 1 −1 −1 −1 1 −1 1 −1 1 −1 −1 −1 −1 −1 −1 −1 1 1 1 −1 1 1 1 1 1 1 1 −1 −1 1 1 −1 −1 1 1 1 1 −1 1 1 1 1 1 1 1 −1 1 1 1 1 −1 1 −1 1 −1 1 1 1 1 1 1 1 −1 −1 −1 1 1 1 1 −1 1 −1 −1 1 1 −1 1 −1 −1 −1 1 1 1 −1 1 −1 1 1 1 1 1 −1 −1 −1 −1 −1 1 −1 1 1 1 1 −1 1 −1 −1 1 1 −1 1 1 −1 1 1 −1 1 −1 1 −1 1 1 1 1 −1 −1 1 −1 1 1 1 1 1 1 −1 1 −1 1 −1 1 1 1 1 −1 1 −1 1 −1 1 1 1 1 −1 1 1 1 1 −1 −1 −1 1 1 1 1 1 1 1 −1 −1 −1 1 −1 1 −1 −1 1 1 1 1 1 1 −1 1 −1 1 −1 1 1 1 1 1 −1 1 1 1 −1 1 −1 1 −1 1 −1 1 1 1 1 1 −1 1 −1 1 −1 1 1 1 −1 −1 1 −1 1 1 1 1 1 1 −1 1 −1 1 −1 1 1 1 1 −1 1 1 1 1 1 1 1 −1 1 1 1 1 1 1 −1 1 1 1 1 1 1 −1 1 1 −1 −1 −1 1 1 1 1 1 1 −1 1 −1 1 1 −1 −1 1 1 1 1 1 1 −1 −1 −1 1 1 1 1 1 −1 1 −1 1 1 1 1 −1 1 1 1 −1 1 −1 1 −1 1 1 1 1 1 1 1 1 −1 1 −1 1 1 −1 1 1 1 1 1 1 1 −1 −1 1 1 1 −1 1 1 1 −1 −1 −1 1 1 1 1 1 −1 1 −1 1 −1 1 1 1 1 −1 1 1 1 1 1 1 −1 1 −1 1 −1 1 1 1 1 −1 1 1 −1 1 1 1 1 −1 −1 −1 1 1 −1 1 1 −1 1 1 −1 1 1 −1 1 −1 1 −1 1 −1 1 1 −1 1 −1 −1 1 1 1 1 −1 1 −1 1 1 1 1 1 −1 1 1 1 −1 −1 −1 −1 1 1 1 1 1 1 −1 1 1 1 1 −1 1 −1 1 1 1 1 1 −1 1 1 1 1 1 1 −1 1 −1 1 −1 1 1 1 −1 1 1 1 1 −1 1 1 1 −1 1 1 1 1 1 1 1 −1 −1 −1 −1 1 −1 1 1 1 1 1 1 1 1 1 −1 −1 1 1 −1 1 1 1 1 1 −1 1 1 1 1 1 −1 −1 −1 1 1 1 −1 1 1 1 1 −1 1 −1 1 −1 1 1 1 −1 1 1 1 1 −1 1 1 1 1 1 1 1 −1 1 1 1 1 1 −1 1 1 1 1 −1 1 −1 1 1 1 1 1 1 −1 −1 −1 1 1 1 1 1 1 −1 1 1 1 1 1 1 1 −1 1 1 −1 1 1 1 1 −1 1 −1 1 −1 1 1 1 1 −1 1 1 1 1 1 −1 1 1 1 1 −1 1 −1 1 1 1 1 1 1 1 −1 −1 1 1 −1 1 1 1 1 1 −1 1 1 1 1 1 1 −1 −1 −1 1 1 1 −1 −1 1 1 −1 1 −1 1 1 1 1 −1 1 1 1 1 1 1 1 −1 −1 −1 1 1 1 1 1 −1 1 1 1 1 1 1 1 1 −1 1 1 −1 1 −1 −1 1 1 1 1 1 1 −1 1 1 1 −1 1 −1 1 −1 −1 1 1 1 1 1 1 −1 1 −1 1 1 1 1 −1 −1 1 −1 1 −1 1 1 1 −1 −1 1 1 1 1 1 −1 1 1 −1 1 −1 1 1 −1 1 1 1 1 1 −1 1 −1 −1 1 −1 1 1 1 1 1 1 −1 1 −1 1 1 −1 1 1 1 1 1 1 1 1 1 −1 −1 1 1 −1 1 −1 1 −1 1 1 1 1 1 1 −1 1 −1 1 1 1 1 1 −1 −1 −1 −1 1 1 1 1 1 −1 1 −1 1 −1 1 1 1 1 1 1 −1 1 1 −1 −1 −1 1 1 1 1 −1 1 1 1 1 1 1 −1 1 −1 1 −1 1 1 1 1 −1 −1 1 −1 1 1 1 1 1 1 −1 1 −1 −1 1 1 1 1 −1 1 −1 1 −1 1 −1 1 −1 1 1 1 1 −1 1 1 1 1 1 1 −1 1 −1 1 1 −1 1 −1 1 1 1 1 1 1 −1 −1 −1 1 1 1 −1 1 −1 1 1 −1 1 1 1 −1 −1 1 1 1 1 1 −1 1 1 1 1 1 1 1 −1 −1 −1 1 1 −1 1 −1 1 −1 1 1 −1 1 1 1 1 1 −1 −1 1 1 −1 1 1 1 1 −1 1 −1 1 1 1 1 1 −1 1 −1 1 −1 1 1 1 −1 1 1 1 1 −1 −1 1 1 1 1 1 1 1 1 −1 1 1 1 1 1 −1 1 1 1 1 1 −1 1 −1 1 −1 1 1 1 1 1 1 −1 1 1 1 1 1 1 1 1 1 1 −1 1 −1 1 −1 1 1 1 1 −1 −1 −1 1 1 −1 1 −1 −1 1 1 1 1 1 1 −1 1 −1 1 −1 1 1 1 1 1 1 −1 1 1 −1 1 1 1 1 −1 −1 1 1 1 1 1 −1 1 −1 1 1 1 1 1 1 1 1 −1 1 −1 −1 1 1 −1 1 1 1 1 −1 1 −1 1 1 1 1 1 1 −1 1 1 1 1 −1 1 1 −1 1 1 1 −1 1 1 1 1 −1 1 −1 1 −1 1 1 1 1 1 −1 1 1 1 1 1 −1 1 −1 1 1 −1 1 1 1 1 1 1 1 1 −1 1 −1 1 −1 1 −1 1 1 1 1 −1 1 1 1 1 1 1 −1 1 −1 1 −1 1 1 1 1 −1 1 1 1 1 −1 1 1 −1 1 1 −1 1 1 1 1 1 1 −1 −1 1 1 −1 1 1 1 −1 1 1 1 1 −1 1 1 1 1 1 1 1 1 −1 1 −1 1 1 1 1 1 −1 1 −1 1 1 1 1 1 1 −1 1 1 1 1 −1 1 −1 1 −1 1 1 1 −1 −1 1 1 −1 1 1 1 1 1 1 −1 1 −1 1 −1 1 1 −1 1 1 1 1 −1 1 1 1 1 1 1 −1 1 1 −1 1 1 1 1 1 1 −1 1 −1 1 1 −1 1 −1 1 1 1 1 1 1 1 1 −1 −1 1 1 −1 1 1 1 1 1 1 −1 1 −1 1 1 1 1 −1 1 1 1 1 1 1 −1 1 1 −1 1 1 1 1 1 1 1 −1 1 −1 1 1 1 1 −1 1 1 1 −1 1 −1 1 1 1 1 1 1 −1 1 1 1 1 1 1 1 −1 1 1 1 1 −1 1 1 −1 1 1 1 1 −1 1 1 1 1 1 1 1 −1 1 −1 1 1 1 1 1 −1 1 1 1 1 1 1 1 −1 1 1 1 1 1 1 1 −1 1 −1 1 1 1 1 1 −1 1 1 1 1 1 1 1 −1 1 −1 1 1 −1 1 1 1 1 1 1 −1 1 −1 1 1 −1 1 1 1 1 1 −1 1 1 1 −1 1 1 1 1 1 −1 1 1 1 1 1 1 1 −1 1 1 1 1 1 1 1 −1 1 1 1 1 1 −1 1 1 1 1 1 −1 1 1 1 1 1 1 1 −1 1 −1 1 1 1 1 1 1 1 1 1 −1 1 1 1 1 1 1 1 1 1 −1 1 1 1 1 1 1 1 −1 1 1 1 1 1 1 1 1 1 1 1 1 1 −1 1 1 1 1 −1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1];

1 1 –1 1 –1 –1 –1 –1 –1 –1 –1 1 1 –1 1 1 –1 1 –1 1
–1 1 1 1 1 –1 –1 1 1 –1 1 1 –1 –1 1 –1 1 1 1 1 1 1 1
–1 –1 –1 1 1 –1 1 –1 1 –1 1 1 1 1 –1 –1 1 1 1 –1 –1
1 1 –1 1 –1 –1 –1 –1 –1 –1 –1 1 1 1 –1 –1 1 –1 1 –1
1 –1 –1 –1 –1 1 1 –1 –1 1 –1 –1 1 1 –1 1 –1 –1 –1
–1 –1 –1 –1 1 1 –1 1 1 –1 1 –1 1 –1 1 1 1 1 –1 –1 1
1 1 –1 –1 1 1 –1 1 –1 –1 –1 –1 –1 –1 –1 1 1 1 –1 –1
1 –1 1 –1 1 –1 –1 –1 –1 1 1 –1 –1 1 –1 –1 1 1 –1 1
–1 –1 –1 –1 –1 –1 –1 1 1 1 –1 –1 1 –1 1 –1 1 –1 –1
–1 –1 1 1 –1 –1 –1 1 1 –1 –1 1 –1 1 1 1 1 1 1 1 –1
–1 1 –1 –1 1 –1 1 –1 1 –1 –1 –1 –1 1 1 –1 –1 1 –1
–1 1 1 –1 1 –1 –1 –1 –1 –1 –1 –1 1 1 –1 1 1 –1 1 –1
1 –1 1 1 1 1 –1 –1 1 1 1 –1 –1 1 1 –1 1 –1 –1 –1 –1
–1 1 –1 1 1 –1 1 1 –1 1 –1 1 –1 1 1 1 1 –1 –1 1 1 –1
1 1 –1 –1 1 –1 1 1 1 1 1 1 1 –1 –1 –1 1 1 –1 1 –1 1
–1 1 1 1 1 –1 –1 1 1 1 –1 –1 1 1 –1 1 –1 –1 –1 –1 –1
–1 –1 1 1 –1 1 1 –1 1 –1 1 –1 1 1 1 1 –1 –1 1 1 –1
1 1 –1 –1 1 –1 1 1 1 1 1 1 1 –1 –1 1 –1 –1 1 –1 1 –1
1 –1 –1 –1 –1 1 1 –1 –1 –1 1 1 –1 –1 1 –1 1 1 1 1 1
1 1 –1 –1 –1 1 1 –1 1 –1 1 –1 1 1 1 1 –1 –1 1 1 –1
1 1 –1 –1 1 –1 1 1 1 1 1 1 1 –1 –1 –1 1 1 –1 1 –1 1
–1 1 1 1 1 –1 –1 1 1 1 –1 –1 1 1 –1 1 –1 –1 –1 –1 –1
–1 –1 1 1 1 –1 –1 1 –1 1 –1 1 –1 –1 –1 –1 1 1 –1 –1
1 –1 –1 1 1 –1 1 –1 –1 –1 –1 –1 –1 –1 1 1 –1 1 1 –1
1 –1 1 –1 1 1 1 1 –1 –1 1 1 1 –1 –1 1 –1 –1 –1 –1 –1
–1 –1 1 1 –1 1 1 –1 1 1 –1 1 –1 1 –1 1 1 1 1 –1 –1
1 1 –1 1 1 –1 –1 1 –1 1 1 1 1 1 1 –1 –1 –1 1 1 –1
1 –1 1 –1 1 1 1 1 –1 –1 1 1 1 –1 –1 1 1 –1 1 –1 –1
–1 –1 –1 –1 –1 1 1 1 –1 –1 1 –1 1 –1 1 –1 –1 –1 –1
1 1 –1 –1 1 –1 –1 1 1 –1 1 –1 –1 –1 –1 –1 –1 –1 1
1 –1 1 1 –1 1 –1 1 –1 1 1 1 1 –1 –1 1 1 1 –1 –1 1 1
–1 1 –1 –1 –1 –1 –1 –1 –1 1 1 1 –1 –1 1 –1 1 –1 1
–1 –1 –1 –1 1 1 –1 –1 1 –1 –1 1 1 –1 1 –1 –1 –1 –1
–1 –1 –1 1 1 1 –1 –1 1 –1 1 –1 1 –1 –1 –1 –1 1 1 –1
–1 –1 1 1 –1 –1 1 –1 1 1 1 1 1 1 1 –1 –1 –1 1 1 –1
1 –1 1 –1 1 1 1 1 –1 –1 1 1 –1 1 1 –1 –1 1 –1 1 1 1
1 1 1 1 –1 –1 1 –1 –1 1 –1 1 –1 1 –1 –1 –1 –1 1 1 –1
–1 –1 1 1 –1 –1 1 –1 1 1 1 1 1 1 1 –1 –1 1 –1 –1 1 1
–1 1 –1 1 1 –1 –1 –1 –1 1 1 1 –1 –1 1 –1 –1 1 1 1 –1
–1 –1 –1 –1 –1 –1 1 1 1 –1 –1 1 –1 1 –1 1 –1 –1 –1 –1
–1 1 1 –1 –1 –1 1 1 –1 –1 1 –1 1 1 1 1 1 1 1 –1 –1
1 –1 –1 1 –1 1 –1 1 –1 –1 –1 –1 1 1 1 –1 –1 1 1 –1 –1
1 1 –1 1 –1 –1 –1 –1 –1 –1 –1 1 1 1 –1 1 1 –1 1 1
–1 1 1 1 1 –1 –1 1 1 1 1 –1 –1 1 1 1 –1 1 1 –1 –1 –1 –1 –1
–1 –1 1 1 1 –1 –1 1 –1 1 1 –1 1 1 –1 –1 –1 –1 1 1 1 –1 –1
1 –1 –1 1 1 1 –1 1 1 –1 –1 –1 –1 –1 –1 –1 1 1 1 1 –1 –1
1 –1 1 1 –1 1 1 –1 –1 –1 –1 1 1 1 –1 –1 –1 1 1 1 –1 –1 1 1 –1
1 1 1 1 1 1 1 –1 –1];

sequence (35): G_1024(3,:)=[1 1 –1 –1 1 1 1 1 –1 1 1 –1
1 –1 1 1 1 –1 –1 –1 1 1 1 1 1 1 1 1 –1 1 1 –1 –1 1 1 1 –1 –1
–1 1 1 1 –1 –1 –1 –1 1 1 –1 1 1 –1 1 1 –1 –1 1 1 –1 –1 1 1 1 1
1 1 1 1 –1 1 1 –1 –1 1 1 1 –1 1 1 1 –1 –1 1 1 1 1 1 –1 1 1 –1
1 –1 1 1 1 –1 –1 –1 1 1 1 1 1 1 1 1 –1 1 1 –1 –1 1 1 1 –1 1 1
1 –1 –1 1 1 1 1 1 –1 1 1 –1 1 1 –1 1 1 1 –1 1 1 1 –1 –1 –1 –1
–1 –1 –1 1 1 –1 1 1 1 –1 –1 1 1 –1 –1 1 1 1 –1 –1 –1 –1 1 1
–1 1 –1 1 1 –1 –1 1 1 1 1 –1 –1 –1 –1 –1 –1 –1 1 1 –1 1 1
1 –1 –1 1 1 1 –1 –1 1 1 1 1 1 –1 1 1 –1 1 1 –1 1 1 1 –1 1 1 1
–1 –1 –1 –1 –1 –1 –1 1 1 1 –1 1 1 –1 –1 1 1 1 1 –1 –1 1 1
1 1 1 –1 1 1 –1 1 1 –1 1 1 1 –1 –1 –1 1 1 1 1 1 1 1 1 –1 1 1 –1
–1 1 1 1 –1 1 1 1 –1 –1 1 1 1 1 1 –1 1 1 –1 1 1 –1 1 1 1 –1 –1 –1
–1 –1 –1 –1 –1 1 1 1 –1 1 1 –1 1 1 1 –1 –1 1 1 1 1 –1 –1 1 1
1 1 1 –1 1 1 –1 1 1 –1 1 1 1 –1 –1 –1 1 1 1 1 1 1 1 1 –1 1 1 –1
–1 1 1 1 –1 –1 –1 1 1 1 –1 –1 –1 –1 1 1 –1 1 1 –1 1 1 –1 –1 –1
1 –1 –1 1 1 1 1 1 1 1 1 –1 1 1 –1 –1 1 1 1 –1 1 1 1 –1 –1 1 1
1 1 1 –1 1 1 –1 1 1 –1 1 1 1 –1 –1 –1 1 1 1 1 1 1 1 1 –1 1 1 –1
–1 1 1 1 –1 1 1 1 –1 –1 1 1 1 1 1 –1 1 1 –1 1 1 –1 1 1 1 –1 1 1 1
–1 –1 –1 –1 –1 –1 –1 1 1 –1 1 1 1 –1 1 –1 1 1 1 1 –1 –1 1 1
1 1 1 –1 1 –1 1 –1 1 1 –1 –1 –1 1 1 1 1 1 1 1 –1 1 –1
–1 1 1 –1 –1 –1 1 1 –1 –1 –1 –1 1 –1 1 –1 1 –1 –1
1 –1 –1 1 1 1 1 1 1 1 –1 1 –1 –1 1 1 –1 –1 –1 1 1 –1
–1 –1 –1 1 –1 1 –1 1 –1 –1 1 1 1 –1 –1 –1 –1 –1 –1
–1 1 –1 1 1 –1 –1 –1 –1 1 1 –1 –1 –1 –1 1 –1 1 –1
1 –1 –1 1 –1 –1 1 1 1 1 1 1 1 –1 1 –1 –1 1 1 –1 1 1
–1 –1 1 1 1 1 –1 –1 1 –1 1 1 –1 –1 –1 1 1 1 1 1 1 1
–1 1 –1 –1 1 1 –1 –1 –1 1 1 –1 –1 –1 –1 1 –1 1 –1
1 –1 –1 1 –1 –1 1 1 1 1 1 1 1 –1 1 –1 –1 1 1 –1 1 1
–1 –1 1 1 1 1 –1 1 –1 1 –1 1 1 –1 –1 –1 1 1 1 1 1 1
1 –1 1 –1 –1 1 1 –1 1 1 –1 –1 1 1 1 1 –1 1 –1 1 –1
1 1 –1 –1 –1 –1 –1 –1 –1 1 1 –1 1 –1 1 1 –1 –1 1 –1
–1 1 1 –1 –1 –1 –1 1 –1 1 –1 1 –1 –1 1 1 1 –1 –1 –1
–1 –1 –1 –1 1 –1 1 1 –1 –1 1 1 1 –1 –1 1 1 1 1 –1 1
–1 1 –1 1 1 –1 1 1 –1 –1 –1 –1 –1 –1 –1 1 –1 1 1 –1
–1 1 1 1 –1 –1 1 1 1 1 –1 1 –1 1 –1 1 1 –1 –1 –1 1
1 1 1 1 1 1 –1 1 –1 –1 1 1 –1 1 1 –1 –1 1 1 1 1 –1 1
–1 1 –1 1 1 –1 1 1 –1 –1 –1 –1 –1 –1 –1 1 –1 1 1 –1
–1 1 –1 –1 1 1 –1 –1 –1 –1 1 –1 1 –1 1 –1 –1 1 1 1
–1 –1 –1 –1 –1 –1 –1 1 –1 1 1 –1 –1 1 1 1 –1 –1 1
1 1 1 –1 1 –1 1 –1 1 1 –1 1 1 –1 –1 –1 –1 –1 –1 –1
1 –1 1 1 –1 –1 1 –1 –1 1 1 –1 –1 –1 –1 1 –1 1 –1 1
–1 –1 1 1 1 –1 –1 –1 –1 –1 –1 –1 1 –1 1 1 –1 –1 1
–1 –1 1 1 –1 –1 –1 –1 1 –1 1 –1 1 –1 –1 1 –1 –1 1
1 1 1 1 1 1 –1 1 –1 –1 1 1 –1 –1 –1 1 1 –1 –1 –1 –1
1 –1 1 –1 1 –1 –1 1 1 1 –1 –1 –1 –1 –1 –1 –1 1 1 –1
1 1 –1 1 1 1 –1 –1 1 1 1 1 –1 1 –1 1 –1 1 1 –1 1 1 –1
–1 –1 –1 –1 –1 –1 1 –1 1 1 –1 –1 1 1 1 –1 –1 1 1 1
1 –1 1 –1 1 –1 1 1 –1 –1 –1 1 1 1 1 1 1 1 –1 1 –1 –1
1 1 –1 1 1 –1 –1 1 1 1 1 –1 1 –1 1 –1 1 1 –1 1 1 –1
–1 –1 –1 –1 –1 –1 1 –1 1 1 –1 –1 1];

sequence (36): G_1024(4,:)=[1 –1 –1 1 1 –1 1 –1 –1 –1
–1 –1 –1 –1 1 1 –1 1 1 –1 1 –1 1 –1 1 1 1 1 –1 –1 1
1 –1 1 1 –1 –1 1 –1 1 1 1 1 1 1 1 –1 –1 –1 1 1 –1 1
–1 1 –1 1 1 1 1 –1 –1 1 1 1 –1 –1 1 1 –1 1 –1 –1 –1
–1 –1 –1 –1 1 1 –1 1 1 –1 1 –1 1 –1 1 1 1 1 –1 –1 1
1 1 –1 –1 1 1 –1 –1 –1 –1 –1 –1 –1 1 1 1 –1 –1 1 –1
1 –1 1 –1 1 –1 –1 –1 –1 1 1 –1 –1 –1 1 1 –1 –1 1 –1
1 1 1 1 1 1 1 –1 –1 1 –1 –1 1 –1 1 –1 1 –1 –1 –1 –1
1 1 –1 –1 1 –1 –1 1 1 –1 1 –1 –1 –1 –1 –1 –1 –1 1
1 1 –1 –1 1 –1 1 –1 1 –1 –1 –1 –1 1 1 –1 –1 1 –1 –1
1 1 –1 1 –1 –1 –1 –1 –1 –1 –1 1 1 –1 1 1 –1 1 –1 1
–1 1 1 1 1 –1 –1 1 1 1 –1 –1 1 1 –1 1 –1 –1 –1 –1 –1
–1 –1 1 1 1 –1 –1 1 –1 1 –1 1 –1 –1 –1 –1 1 1 –1 –1
1 –1 –1 1 1 –1 1 –1 –1 –1 –1 –1 –1 –1 1 1 1 1 –1 1
1 –1 1 –1 1 1 1 1 –1 –1 1 1 –1 1 1 –1 –1 1 –1 1 1 1
1 1 1 1 –1 –1 –1 1 1 –1 1 –1 1 –1 1 1 1 1 –1 –1 1 1
1 –1 –1 1 1 –1 1 –1 –1 –1 –1 –1 –1 –1 1 1 –1 1 1 –1
1 –1 1 –1 1 1 1 1 –1 –1 1 1 1 –1 –1 1 1 –1 1 –1 –1
–1 –1 –1 –1 –1 1 1 1 –1 –1 1 –1 1 –1 1 –1 –1 –1 –1
1 1 –1 –1 1 –1 –1 1 1 –1 1 –1 –1 –1 –1 –1 –1 –1 1
1 –1 1 1 –1 1 –1 1 –1 1 1 1 1 –1 –1 1 1 –1 1 1 –1 –1
1 –1 1 1 1 1 1 1 1 –1 –1 –1 1 1 –1 1 –1 1 –1 1 1 1 1
–1 –1 1 1 –1 1 1 –1 –1 1 –1 1 1 1 1 1 1 1 –1 –1 1 –1
–1 1 –1 1 –1 1 –1 –1 –1 –1 1 1 –1 –1 –1 1 1 –1 –1
1 –1 1 1 1 1 1 1 1 –1 –1 –1 1 1 –1 1 –1 1 –1 1 1 1 1
–1 –1 1 1 1 –1 –1 1 1 –1 1 –1 –1 –1 –1 –1 –1 –1 1
1 –1 1 1 –1 1 –1 1 –1 1 1 1 1 –1 –1 1 1 –1 1 1 –1 –1
1 –1 1 1 1 1 1 1 –1 –1 –1 1 1 –1 1 –1 1 –1 1 1 1 1 –1
–1 1 1 1 –1 –1 1 1 –1 1 –1 –1 –1 –1 –1 –1 –1 –1 1
1 –1 1 1 –1 1 –1 1 –1 1 1 1 1 –1 –1 1 1 1 –1 –1 1 1
–1 1 –1 –1 –1 –1 –1 –1 –1 1 1 1 –1 –1 1 –1 1 –1 1
–1 –1 –1 –1 1 1 –1 –1 –1 1 1 –1 –1 1 –1 1 1 1 1 1 1
1 –1 –1 1 –1 –1 1 –1 1 –1 1 –1 –1 –1 –1 1 1 –1 –1
1 –1 –1 1 1 –1 1 –1 –1 –1 –1 –1 –1 –1 1 1 1 –1 –1
1 –1 1 –1 1 –1 –1 –1 –1 1 1 –1 –1 1 –1 –1 1 1 –1 1
–1 –1 –1 –1 –1 –1 –1 1 1 –1 1 1 –1 1 –1 1 –1 1 1 1

891 –1 –1 1 1 1 –1 –1 1 1 –1 1 –1 –1 –1 –1 –1 –1 –1 1 1 1 –1 –1 1 –1 1 –1 1 –1 –1 –1 –1 1 1 –1 –1 –1 1 1 1 –1 –1 1 –1 1 1 1 1 1 1 1 –1 –1 1 –1 –1 1 –1 1 1 –1 1 –1 –1 –1 –1 1 1 –1 –1 1 –1 –1 1 1 –1 1 –1 –1 –1 –1 –1 –1 –1 1 1 1 –1 –1 1 –1 1 –1 1 –1 –1 –1 –1 1 1 1 –1 –1 –1 1 1 –1 –1 1 –1 1 1 1 1 1 1 1 –1 –1 1 –1 –1 1 –1 1 –1 1 –1 –1 –1 –1 1 1 –1 –1 –1 1 1 1 –1 –1 1 –1 1 1 1 1 1 1 1 –1 –1 –1 1 1 –1 1 –1 1 –1 1 1 1 1 –1 –1 1 1 –1 1 1 –1 –1 1 –1 1 1 1 1 1 1 1 –1 –1 1 –1 –1 1 –1 1 –1 1 –1 –1 –1 –1 1 1 –1 –1 1 –1 –1 1 1 –1 1 –1 –1 –1 –1 –1 –1 –1 1 1 1 –1 –1 1 –1 1 –1 1 1 –1 –1 –1 –1 1 1 –1 –1 1 –1 –1 1 1 –1 1 –1 –1 –1 –1 –1 –1 –1 1 1 –1 1 1 –1 1 –1 1 –1 1 1 1 1 –1 –1 1 1 1 –1 –1 1 1 –1 1 –1 –1 –1 –1 –1 –1 –1 1 1 1 –1 –1 1 –1 1 –1 1 –1 –1 –1 –1 1 1 –1 –1];

sequence (37): G_1024(5,:)=[1 1 –1 –1 1 1 1 1 –1 1 –1 1 –1 1 1 –1 –1 –1 1 1 1 1 1 1 1 –1 1 –1 –1 1 1 –1 1 1 –1 –1 1 1 1 1 –1 1 –1 1 –1 1 1 –1 –1 –1 –1 –1 –1 –1 1 1 –1 1 –1 1 1 –1 –1 1 1 1 –1 –1 1 1 1 1 1 –1 1 –1 1 –1 1 1 –1 –1 –1 1 1 1 1 1 1 1 –1 1 –1 –1 1 1 –1 –1 –1 1 1 –1 1 –1 –1 –1 1 –1 1 –1 1 –1 –1 1 –1 –1 1 1 1 1 1 1 1 –1 1 –1 –1 1 1 1 –1 –1 –1 1 1 –1 –1 –1 1 1 –1 –1 –1 –1 1 –1 1 –1 1 1 –1 –1 1 1 1 1 –1 –1 –1 –1 –1 –1 –1 1 1 –1 1 1 1 –1 1 1 –1 1 1 –1 –1 1 1 1 –1 –1 –1 –1 1 –1 1 –1 1 –1 1 –1 1 –1 1 1 1 1 1 1 1 1 –1 1 –1 –1 1 1 1 –1 1 1 1 –1 –1 1 1 1 1 1 –1 1 –1 1 –1 1 1 1 –1 1 –1 –1 1 1 1 1 1 1 1 1 –1 1 –1 –1 1 1 –1 1 –1 1 –1 1 1 1 –1 –1 –1 –1 1 1 –1 1 –1 1 1 –1 1 1 –1 –1 1 1 1 1 1 1 1 –1 1 –1 –1 1 1 1 –1 –1 1 1 1 1 1 1 1 –1 1 –1 –1 1 1 1 –1 1 1 1 –1 –1 1 1 1 1 1 1 1 –1 1 –1 –1 1 1 –1 1 –1 1 –1 1 1 1 –1 1 –1 1 –1 1 –1 1 –1 1 1 –1 –1 –1 1 1 1 1 1 1 1 –1 1 –1 –1 1 1 –1 1 –1 1 –1 1 1 1 –1 –1 –1 –1 1 1 –1 –1 –1 1 1 –1 –1 –1 –1 1 1 1 1 –1 –1 –1 –1 1 1 1 –1 –1 1 1 1 1 1 –1 1 –1 –1 –1 1 1 1 1 1 1 –1 –1 1 1 –1 –1 1 1 1 1 –1 –1 1 1 1 –1 1 –1 –1 –1 1 1 –1 1 –1 1 –1 1 –1 1 –1 1 1 1 1 –1 –1 1 1 –1 –1 –1 1 1 1 –1 –1 –1 –1 –1 –1 –1 1 1 –1 1 1 –1 1 –1 1 1 1 –1 1 –1 1 –1 1 –1 1 1 1 1 1 –1 –1 1 1 1 1 1 1 1 –1 1 1 –1 –1 –1 1 1 1 1 –1 –1 1 1 1 –1 1 –1 –1 1 1 1 1 1 1 1 1 –1 1 1 –1 –1 –1 1 1 1 –1 –1 –1 1 1 –1 –1 –1 –1 1 1 –1 1 –1 1 –1 1 –1 –1 1 1 –1 1 –1 –1 1 1 1 1 1 1 1 1 –1 1 1 –1 –1 1 1 –1 1 1 1 –1 1 1 1 –1 –1 1 1 1 1 1 –1 1 1 –1 1 –1 1 –1 1 –1 1 1 1 –1 –1 –1 –1 1 1 1 1 1 1 1 –1 1 1 –1 1 –1 –1 1 1 1 –1 –1 –1 –1 1 1 –1 1 –1 1 –1 1 1 –1 –1 –1 –1 –1 –1 –1 1 1 –1 1 1 1 –1 –1 1 1 –1 1 –1 1 –1 1 –1 1 –1 1 1 –1 –1 –1 –1 1 1 –1 1 –1 1 –1 1 –1 1 1 1 1 1 1 1 1 –1 1 –1 –1 1 1 –1 1 –1 –1 1 1 1 –1 –1 –1 –1 1 1 –1 1 –1 –1 1 1 –1 1 –1 1 1 –1 1 –1 –1 1 1 1 1 1 1 1 1 –1 1 –1 –1 1 1 1 1 –1 –1 1 1 1 1 1 –1 1 –1 1 –1 1 1 1 –1 1 1 1 –1 –1 –1 –1 1 1 –1 1 –1 –1 –1 1 1 1 –1 1 –1 –1 1 1 –1 –1 –1 –1 1 1 –1 1 –1 1 –1 1 –1 1 1 1 –1 1 –1 –1 1 1 1 1 1 1 1 1 –1 1 –1 –1 1 1 1 –1 1 1 1 –1 –1 1 1 1 –1 1 –1 1 –1 1 1 1 –1 –1 –1 1 1 1 1 1 1 1 1 –1 1 –1 –1 1 1 1 –1 –1 1 1 1 1 –1 –1 –1 –1 1 1 –1 1 –1 1 –1 1 –1 1 –1 1 –1 –1 –1 –1 1 1 1 1 1 1 1 –1 1 –1 –1 1 1 1 –1 –1];

sequence (38): G_1024(6,:)=[1 –1 –1 1 1 1 –1 1 –1 –1 –1 –1 –1 –1 –1 1 1 1 –1 1 1 1 –1 1 1 –1 1 1 –1 1 1 1 1 1 –1 –1 1 1

1 1 –1 –1 1 1 1 –1 1 –1 –1 –1 –1 –1 –1 –1 1 1 1 1 –1 –1 1 –1 1 1 –1 1 –1 –1 –1 –1 1 1 1 –1 –1 1 –1 –1 1 1 1 –1 1 1 –1 –1 –1 –1 –1 –1 –1 1 1 1 –1 1 1 1 –1 1 1 –1 1 1 –1 1 1 1 1 1 –1 –1 1 1 1 –1 –1 1 1 1 –1 1 1 1 –1 –1 1 1 –1 1 1 1 1 1 1 1 1 –1 –1 –1 1 1 –1 1 –1 1 –1 1 1 1 1 1 –1 –1 1 1 1 –1 1 1 1 –1 –1 1 1 –1 1 1 1 1 1 1 –1 –1 1 1 –1 –1 1 1 –1 1 1 –1 1 1 –1 1 –1 –1 –1 –1 1 1 –1 –1 –1 1 1 1 –1 –1 1 1 –1 1 1 1 1 1 1 1 1 –1 –1 –1 1 1 –1 1 –1 1 –1 1 1 1 1 1 –1 –1 1 1 1 1 –1 –1 1 1 1 –1 1 1 –1 –1 –1 –1 –1 –1 –1 1 1 1 –1 1 1 1 –1 1 1 –1 1 1 –1 1 1 1 1 1 –1 –1 1 1 1 –1 –1 1 1 1 –1 1 1 1 –1 –1 1 1 –1 1 1 1 1 1 1 1 1 –1 –1 –1 1 1 –1 1 –1 1 –1 1 1 1 1 1 –1 –1 1 1 1 1 –1 –1 1 1 1 –1 1 1 –1 –1 –1 –1 –1 –1 –1 1 1 1 –1 1 1 1 –1 1 1 –1 1 1 –1 1 1 1 1 1 –1 –1 1 1 1 1 –1 –1 1 1 1 –1 1 1 –1 –1 –1 –1 –1 –1 –1 1 1 1 –1 –1 1 –1 1 1 –1 1 –1 1 –1 1 –1 –1 –1 1 1 1 –1 –1 1 1 –1 1 1 –1 1 –1 1 –1 1 –1 –1 –1 –1 –1 –1 –1 1 1 1 –1 1 1 –1 1 1 –1 1 1 –1 1 –1 1 1 1 1 1 –1 –1 1 1 1 1 1 1 –1 –1 1 1 1 –1 1 1 1 –1 –1 1 1 –1 1 1 1 1 1 1 1 1 1 –1 –1 –1 1 1 –1 1 1 –1 1 –1 –1 1 1 1 1 –1 –1 1 1 1 1 –1 –1 1 –1 1 1 –1 1 –1 –1 –1 –1 –1 –1 –1 1 1 1 –1 1 1 1 –1 1 1 –1 1 1 –1 1 1 1 1 1 –1 –1 1 1 1 –1 –1 1 1 –1 1 –1 –1 –1 –1 –1 –1 –1 –1 1 1 1 1 –1 –1 1 1 –1 1 1 –1 1 –1 1 –1 1 –1 1 –1 –1 –1 –1 1 1 1 –1 –1 1 1 –1 1 –1 –1 –1 1 1 –1 –1 1 1 –1 1 1 –1 1 1 –1 1 1 –1 1 –1 –1 –1 –1 –1 –1 –1 –1 1 1 –1 1 1 1 –1 1 1 –1 1 1 1 –1 1 1 1 1 –1 –1 1 1 1 1 –1 –1 1 1 –1 1 1 –1 1 –1 –1 –1 1 –1 1 –1 –1 –1 –1 –1 1 1 1 –1 –1 1 1 –1 1 1 –1 1 1 –1 –1 –1 –1 1 1 1 –1 1 1 1 –1 1 1 –1 1 1 –1 1 1 1 1 1 –1 –1 1 1 –1 1 1 –1 1 1 –1 1 1 1 1 1 1 1 1 –1 –1 –1 1 1 –1 1 –1 1 –1 –1 1 1 1 1 1 –1 –1 1 1 1 –1 1 1 1 –1 –1 1 1 –1 1 1 1 1 1 1 1 1 –1 –1 1 1 –1 1 –1 –1 1 1 1 –1 –1 –1 –1 1 1 –1 1 1 –1 1 –1 –1 –1 –1 1 1 1 –1 –1 1 –1 1 1 –1 1 1 –1 1 1 –1 1 1 –1 1 1 1 1 1 –1 –1 1 1 1 1 –1 –1 1 1 1 –1 1 1 –1 1 1 –1 1 1 1 1 1 1 1 1 –1 –1 –1 1 1 –1 1 –1 1 –1 1 1 1 1 1 –1 –1 1 1 1 –1 1 1 1 –1 –1 1 1 –1 1 1 1 1 1 1 1 1 –1 –1 1 1 –1 1 –1 –1 1 1 1 –1 –1 –1 –1 1 1 –1 1 1 –1 1 –1 –1 –1 –1 1 1 1 –1 –1 1 –1 1 1 –1 1 1 –1 1 1 –1 1 1 –1 1 1 1 1 1 –1 –1 1 1 1 1 –1 –1 1 1 1 –1 1 1 –1 1 1 –1 1 1 1 1 1 1 1 1 –1 –1 –1 1 1 –1 1 –1 1 –1 1 1 1 –1 –1 –1 –1 1 1 1 1 1 –1 –1 1 1 1 –1 1 1 1 –1 –1 1 1 –1 1 –1 –1 1 1 1 –1 –1 1 1 –1 1 1 –1 1 –1 1 1 –1 –1 –1 1 –1 1 1 1 1 1 –1 –1 1 1 –1 –1 1 1 –1 1 1 –1 1 1 –1 1 –1 –1 –1 –1 1 1 1 –1 –1 –1 1 1 1 –1 –1 1 1 –1 1 1 1 1 1 1 1 1 –1 –1 –1 1 1 1 –1 1 1 –1 1 1 1 1 1 –1 –1 1 1 1 1 –1 –1 1 1 1 –1 1 1 –1 –1 –1 –1 –1 –1 –1 1 1 1 –1 1 1 1 –1 1 1 –1 1 1 –1 1 1 1 1 1 –1 –1 1 1 1 –1 1 1 –1 1 1 –1 1 1 –1 1 1 1 1 1 1 1 1 –1 –1 –1 1 1 –1 1 –1 1 1 1 1 1 –1 –1 1 1 1];

sequence (39): G_1024(7,:)=[1 1 –1 –1 1 1 1 1 –1 1 –1 1 –1 1 1 1 –1 1 1 1 –1 –1 –1 –1 –1 –1 –1 –1 1 1 –1 1 1 1 –1 –1 1 1 1 –1 –1 1 1 1 1 1 –1 1 1 –1 1 –1 1 1 1 –1 –1 –1 1 1 1 1 1 1 –1 1 1 –1 –1 1 1 1 –1 –1 –1 1 1 1 –1 –1 –1 –1 1 1 –1 1 –1 1 1 –1 1 –1 –1 1 1 1 1 1 1 1 1 –1 1 1 –1 –1 1 1 1 –1 1 1 –1 –1 1 1 1 1 1 –1 1 1 –1 1 1 –1 1 1 1 –1 –1 –1 –1 1 1 1 1 1 1 –1 1 1 –1 1 –1 –1 1 1 1 –1 –1 –1 1 1 1 –1 –1 –1 –1 1 1 –1 1 –1 1 –1 1 –1 –1 1 1 1 1 1 1 1 1 –1 1 1 –1 –1 1 1 1 –1 –1 1 1 1 –1 –1 –1 –1 1 1 –1 1 –1 1 –1 1 1 –1 1 1 –1 1 –1 –1 1 1 1 1 –1 –1 –1 –1 –1 –1 –1 1 1 –1 1 1 1 –1 –1 1 1 –1 –1 1 1 –1 –1 1 1 –1 1 –1 1 1 –1 1 –1 –1 –1 1 1 1 1 1 1 1 1 –1 1 1 –1 –1 1 1 –1 1 1 1 –1 –1 1 1 1 1 1 –1 1 1 –1 1 1 –1 1 1 1 –1 –1 –1 1 1 1 1 1 1 1 1 –1 1 1 –1 –1 1 1 1 –1 1 1 1 –1 –1 1 1 1 1 1 –1 1 1 –1 1 –1 1 –1 1 –1 1 1 –1 –1 –1 –1 –1 –1 –1 –1 1 1 –1 1 1 –1 1 1 –1 1 1 –1 1 1 –1 1 1 –1 –1 1 1 1 1 1 –1 1 1 –1 1 1 –1 1 1 1 –1 –1 1 1 1 1 1 1 1 1 –1 1 1 –1 –1 1 1 1 –1 –1 –1 1 1 1 –1 –1 1 1 1 –1 –1 1 –1 1 –1 1 –1 1 –1 –1 1 1 1 1 1 1 1 1 –1 1 1 –1 –1 1 1 1 –1 1 1 1 –1 1 1 1 –1 1 1 –1 1 1 –1 –1 1 1 1

1 1 −1 1 −1 1 −1 1 1 −1 1 1 −1 −1 −1 −1 −1 −1 −1 1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 1 1 −1 −1 −1 −1 −1 −1 −1 −1 1 −1 1 1 −1 −1 1 −1 −1 1 1 −1 −1 −1 −1 1 −1 1 −1 1 1 −1 −1 1 1 1 1 −1 −1 −1 −1 −1 −1 −1 1 −1 1 1 −1 −1 1 1 1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 1 −1 1 −1 −1 1 1 −1 1 1 −1 −1 1 1 1 1 −1 1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 −1 1 −1 1 −1 1 −1 −1 1 1 1 −1 −1 −1 −1 −1 −1 −1 1 −1 1 −1 1 1 −1 −1 1 1 1 −1 −1 1 1 1 1 −1 1 −1 1 −1 1 1 −1 1 1 −1 −1 −1 −1 −1 −1 −1 1 −1 1 1 −1 −1 1 −1 −1 1 1 −1 −1 −1 −1 1 1 −1 1 −1 1 −1 −1 1 1 1 −1 −1 −1 −1 −1 −1 −1 −1 1 −1 1 1 −1 1 −1 1 −1 1 1 1 −1 −1 −1 −1 1 −1 1 −1 1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 1 −1 −1 −1 −1 −1 −1 −1 1 −1 1 1 −1 −1 1 −1 −1 1 1 1 −1 −1 −1 −1 1 −1 1 −1 1 −1 1 −1 −1 1 −1 −1 1 1 1 1 1 1 1 −1 1 1 −1 −1 1 1 −1 1 1 −1 −1 1 1 1 1 −1 1 −1 1 −1 1 1 −1 −1 −1 1 1 1 1 1 1 1 −1 1 −1 −1 1 1 −1];

sequence (40): G_1024(8,:)=[1 −1 −1 1 1 −1 1 −1 −1 −1 −1 −1 −1 −1 1 1 1 −1 −1 1 −1 1 −1 1 −1 −1 −1 −1 1 1 −1 −1 1 −1 −1 1 1 −1 1 −1 −1 −1 −1 −1 −1 −1 1 1 −1 1 1 −1 1 −1 1 −1 1 1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 1 −1 −1 1 1 −1 1 −1 −1 −1 −1 −1 −1 −1 1 1 −1 1 1 −1 1 −1 1 −1 1 1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 1 −1 −1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 −1 1 −1 −1 −1 −1 −1 −1 −1 1 1 −1 1 1 −1 1 −1 1 −1 1 1 1 1 −1 −1 1 1 1 −1 −1 1 1 −1 1 −1 −1 −1 −1 −1 −1 −1 1 1 1 −1 −1 −1 1 1 1 −1 −1 1 −1 −1 1 1 −1 −1 −1 −1 −1 1 −1 1 −1 −1 −1 1 1 −1 −1 1 −1 −1 1 1 −1 1 −1 −1 −1 −1 −1 1 1 −1 1 1 −1 1 1 −1 1 −1 1 1 1 1 −1 −1 1 1 −1 1 1 −1 −1 1 1 −1 1 1 1 1 1 1 1 −1 −1 −1 1 1 −1 1 −1 1 −1 1 1 1 1 −1 −1 1 1 1 −1 −1 1 1 1 −1 −1 1 −1 −1 1 1 −1 1 −1 1 −1 −1 −1 −1 −1 1 1 −1 1 −1 1 −1 −1 −1 −1 −1 −1 1 1 1 1 −1 −1 1 −1 1 −1 −1 −1 −1 1 −1 1 1 −1 1 −1 −1 1 −1 −1 1 1 −1 1 −1 −1 −1 1 −1 −1 −1 −1 −1 −1 1 1 −1 1 1 −1 1 −1 1 −1 1 1 1 1 −1 −1 1 1 1 −1 −1 1 1 −1 −1 1 1 −1 1 −1 −1 −1 −1 −1 −1 −1 −1 1 1 1 −1 −1 1 −1 1 −1 1 −1 −1 −1 −1 1 −1 1 −1 −1 1 1 1 −1 −1 1 1 1 1 1 1 1 1 1 −1 −1 1 1 −1 −1 1 1 −1 1 1 1 1 1 1 1 1 −1 −1 −1 1 1 −1 1 −1 1 −1 1 1 1 1 −1 −1 1 1 −1 1 −1 1 1 −1 1 −1 −1 −1 −1 −1 −1 −1 1 1 −1 1 1 −1 1 −1 1 −1 −1 1 1 1 1 −1 −1 1 1 1 −1 −1 1 1 −1 −1 −1 −1 −1 1 1 −1 −1 −1 1 1 −1 −1 1 −1 1 1 1 1 1 1 1 −1 −1 −1 −1 1 1 1 −1 −1 −1 1 1 −1 −1 1 −1 1 1 1 1 1 1 1 1 −1 −1 −1 1 1 1 −1 1 1 −1 −1 1 −1 1 1 1 1 −1 −1 1 1 1 −1 −1 1 1 −1 1 −1 1 1 1 1 −1 −1 −1 1 1 −1 −1 −1 1 1 −1 1 −1 1 1 1 1 −1 −1 1 1 1 −1 −1 1 1 −1 1 −1 1 −1 −1 1 1 1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 1 −1 −1 −1 1 1 −1 1 −1 1 −1 1 1 1 1 −1 −1 1 1 1 −1 −1 1 1 1 −1 −1 1 1 1 1 1 −1 −1 −1 1 1 1 1 −1 1 −1 1 −1 1 −1 1 1 1 1 −1 −1 1 1 1 −1 −1 1 1 −1 1 −1 1 1 1 1 −1 −1 1 1 −1 1 1 −1 1 −1 −1 −1 −1 −1 −1 −1 1 1 −1 1 1 −1 1 −1 −1 −1 −1 −1 1 1 −1 1 −1 1 −1 −1 −1 −1 1 1 −1 1 1 −1 1 −1 −1 −1 −1 −1 −1 1 1 1 1 1 −1 −1 1 1 −1 −1 1 1 1 −1 −1 1 1 −1 1 1 −1 1 −1 −1 −1 1 1 −1 1 −1 1 −1 −1 1 1 1 1 1 1 1 1 −1 −1 −1 1 −1 −1 1 −1 1 −1 1 −1 1 1 1 1 −1 −1 1 1 1 −1 1 1 −1 −1 1 1 1 1 −1 −1 1 1 −1 1 −1 1 1 −1 1 −1 1 1 1 1 −1 −1 1 1 −1 1 1 −1 1 −1 −1 1 −1 1 −1 1 −1 1 1 −1 1 −1 1 1 −1 1 −1 −1 1 1 1 1 1 1 −1 −1 −1 −1 1 −1 1 1 −1 1 1 1 1 1 −1 −1 1 1 −1 1 −1 −1 −1 −1 1 1 −1 −1 −1 −1 −1 1 1 −1 1 −1 1 −1 −1 −1 1 1 −1 −1 −1 1 1 −1 1 −1 1 −1 1 1 1 1 1 1 1 −1 −1 −1 −1 1 −1 −1 1 −1 1 −1 1 −1 1 −1 1 1 1 1 −1 −1 1 1 1 −1 −1 1 1 1 1 −1 −1 1 1 1 1 1 1 1 −1 −1 −1 1 1 −1 1 −1 1 −1 1 1 1 1 1 −1 −1 1 −1 1 1 −1 1 −1 1 −1 1 1 −1 1 −1 1 1 1 1 1 1 1 1 −1 1 −1 −1 1 1 −1 1 1 1 −1 1 1 −1 −1 1 −1 1 1 1 1 1 1 1 1 1 1 1 1 −1 1 −1 1 −1 1 1 1 1 −1 −1 1 1];

sequence (41): G_1024(1,:)=[1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 1 1 −1 −1 −1 −1 −1 −1 −1 1 −1 1 1 −1 −1 1 1 −1 −1 −1 −1 1 −1 1 −1 1 −1 −1 1 −1 −1 1 1 1 1 1 1 1 −1 1 1 −1 1 −1 −1 1 1 −1 −1 −1 1 1 −1 −1 −1 −1 1 −1 1 −1 1 −1 1 1 −1 1 −1 −1 1 1 1 −1 −1 −1 −1 −1 −1 −1 1 −1 1 1 −1 −1 1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 1 −1 1 1 1 −1 1 −1 1 −1 1 1 −1 1 1 −1 −1 −1 −1 −1 −1 −1 1 −1 1 1 −1 −1 1 −1 −1 1 1 −1 −1 −1 −1 1 −1 1 −1 1 −1 −1 1 −1 −1 1 1 1 −1 −1 −1 −1 −1 −1 −1 1 −1 1 1 −1 −1 1 1 1 −1 −1 1 1 1 1 −1 1 −1 1 −1 1 1 1 1 −1 1 −1 −1 1 1 −1 1 1 −1 −1 1 1 1 1 −1 1 −1 1 −1 1 1 1 −1 1 1 −1 −1 −1 −1 −1 −1 −1 1 −1 1 1 −1 −1 1 1 1 −1 −1 −1 1 −1 1 1 −1 −1 1 −1 −1 1 1 −1 −1 −1 −1 1 −1 1 −1 1 −1 1 −1 1 −1 −1 1 −1 1 1 1 −1 1 −1 1 −1 1 1 1 1 −1 −1 1 1 −1 1 1 −1 −1 1 −1 1 1 1 1 1 1 1 −1 −1 1 −1 1 −1 1 −1 −1 −1 −1 1 1 −1 −1 −1 1 1 −1 −1 1 −1 1 1 1 1 1 1 1 −1 −1 −1 −1 1 1 −1 1 −1 −1 −1 −1 −1 −1 1 1 −1 1 1 −1 1 −1 1 −1 −1 1 1 −1 −1 1 −1 −1 1 1 −1 1 −1 1 −1 −1 −1 −1 1 1 −1 −1 −1 1 1 1 1 −1 1 −1 1 1 1 1 1 1 1 −1 −1 −1 1 1 −1 1 −1 1 −1 1 1 1 1 −1 −1 1 1 1 −1 −1 1 1 −1 1 −1 1 1 1 1 −1 −1 1 1 −1 1 1 −1 1 1 1 −1 1 1 −1 1 −1 1 −1 1 1 −1 −1 −1 −1 −1 −1 −1 1 −1 1 1 −1 −1 1 −1 1 −1 1 −1 −1 1 1 −1 −1 −1 −1 1 −1 1 −1 1 −1 −1 −1 −1 −1 −1 1 1 −1 1 1 −1 1 −1 1 −1 1 1 1 1 −1 −1 1 1 −1 −1 1 1 −1 1 1 −1 −1 1 −1 1 1 1 1 1 1 1 −1 −1 −1 −1 −1 1 1 −1 −1 −1 1 1 −1 −1 1 −1 1 −1 −1 −1 −1 1 −1 1 −1 −1 −1 −1 −1 −1 1 1 −1 −1 1 −1 1 1 1 1 1 1 1 −1 1 1 −1 −1 1 1 −1 1 −1 −1 −1 −1 −1 −1 −1 1 1 −1 1 1 −1 1 −1 1 −1 1 1 1 1 −1 −1 1 1 −1 −1 −1 1 1 1 1 1 1 −1 −1 −1 1 1 −1 1 −1 1 −1 1 1 1 1 −1 −1 1 1 1 −1 −1 1 1 −1 1 1 1 1 1 1 1 −1 1 1 −1 1 1 −1 1 −1 1 1 1 1 −1 −1 1 1 −1 1 1 −1 −1 1 −1 1 1 1 1 1 1 −1 −1 1 −1 −1 1 −1 1 −1 1 −1 −1 −1 −1 1 1 −1 −1 −1 −1 1 1 −1 1 −1 1 1 −1 1 1 1 1 1 1 1 −1 −1 −1 1 1 −1 1 −1 1 1 1 1 −1 −1 1 1 −1 1 1 −1 −1 1 −1 1 1 1 1 1 1 1 1 −1 −1 −1 1 1 −1 1 −1 1 −1 1 1 1 1 −1 −1 1 1 1 −1 −1 1 1 −1 1 −1 −1 −1 −1 −1 −1 −1 1 1];

sequence (42): G_1024(2,:)=[1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 1 1 −1 −1

1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 1 1 −1 −1 −1 −1 −1 −1 −1 1 −1 1 1 −1 −1 1 −1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 1 −1 1 −1 −1 1 1 1 −1 −1 −1 −1 −1 −1 −1 1 −1 1 1 −1 −1 1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1 1 1 −1 1 −1 1 −1 1 1 −1 1 1 −1 −1 −1 −1 −1 −1 −1 1 −1 1 1 −1 −1 1 −1 −1 1 1 −1 −1 −1 −1 1 −1 1 1 −1 −1 1 1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 1 −1 1 −1 1 −1 −1 1 1 −1 1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 1 −1 1 1 −1 1 1 −1 −1 1 −1 −1 −1 −1 1 −1 1 −1 1 1 −1 −1 1 −1 −1 1 1 −1 −1 −1 −1 1 −1 1 1 −1 1 −1 1 1 −1 −1 1 −1 −1 1 1 −1 −1 −1 −1 1 1 −1 −1 1 −1 −1 1 1 −1 1 −1 −1 −1 −1 −1 −1 −1 1 1 −1 1 1 −1 1 −1 1 −1 1 1 1 1 −1 −1 1 1 1 −1 −1 1 1 −1 1 −1 −1 −1 −1 −1 −1 −1 1 1 −1 1 1 1 1 −1 1 −1 1 −1 1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 1 −1 −1 1 1 −1 1 −1 −1 −1 −1 −1 −1 −1 1 1 1 −1 −1 1 −1 1 −1 1 −1 −1 −1 −1 −1 1 1 −1 −1 1 −1 −1 1 1 −1 1 −1 −1 −1 −1 −1 −1 −1 1 1 −1 1 1 −1 1 −1 1 −1 1 1 1 1 −1 −1 1 1 1 −1 −1 1 1 −1 1 −1 −1 −1 −1 −1 −1 −1 1 1 1 −1 −1 1 −1 1 −1 1 −1 −1 −1 −1 1 −1 1 −1 −1 −1 −1 1 1 −1 −1 1 −1 −1 1 −1 1 −1 −1 −1 −1 −1 −1 −1 −1 −1 −1 1 1 1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 −1 −1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 −1 1 −1 1 −1 −1 1 1 −1 1 −1 −1 −1 −1 −1 −1 1 1 1 −1 −1 1 −1 1 −1 1 −1 −1 −1 −1 1 1 1 1 −1 −1 1 −1 −1 1 −1 1 −1 −1 1 −1 1 −1 −1 1 1 −1 −1 1 1 1 1 1 −1 −1 1 −1 −1 1 −1 1 −1 1 −1 −1 −1 −1 1 1 −1 −1 1 1 −1 −1 1 1 −1 −1 1 −1 1 1 −1 1 −1 1 −1 1 1 1 1 −1 −1 1 1 1 −1 −1 1 1 −1 1 −1 −1 −1 −1 −1 −1 −1 1 1 1 −1 −1 1 −1 1 −1 1 −1 −1 −1 −1 −1 −1 1 1 −1 −1 1 −1 −1 1 −1 1 −1 −1 −1 −1 −1 −1 −1 1 1 1 1 −1 −1 1 −1 1 −1 1 −1 −1 −1 −1 1 1 −1 −1 −1 1 −1 −1 1 1 1 1 1 1 1 −1 −1 1 −1 −1 −1 −1 1 1 −1 −1 1 −1 1 1 1 1 1 1 1 −1 −1];

sequence (43): G_1024(3,:)=[1 1 −1 −1 1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 −1 1 −1 −1 1 1 −1 1 1 −1 −1 1 1 1 1 1 −1 1 −1 1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 1 1 −1 1 1 −1 −1 −1 −1 −1 −1 −1 1 −1 1 1 −1 −1 1 −1 −1 1 1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1 1 1 1 −1 1 −1 1 −1 1 1 −1 1 1 −1 −1 −1 −1 −1 −1 1 1 −1 1 1 −1 −1 1 1 1 −1 −1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 −1 1 −1 −1 −1 −1 −1 −1 1 1 −1 1 −1 1 1 −1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1 1 1 1 −1 1 −1 1 −1 1 1 −1 1 1 −1 −1 −1 −1 −1 −1 −1 1 1 −1 1 1 −1 −1 −1 −1 −1 −1 −1 1 −1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1

1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1 1 1 1 −1 1 −1 1 −1 1 1 −1 1 1 −1 −1 −1 −1 −1 −1 −1 1 −1 1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 −1 1 −1 1 −1 1 −1 1 −1 1 1 1 1 −1 −1 1 1 1 −1 −1 1 1 −1 1 −1 −1 −1 −1 −1 −1 −1 1 1 −1 1 1 −1 1 −1 1 −1 1 1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 1 −1 −1 1 1 −1 1 −1 −1 −1 −1 −1 −1 −1 1 1 −1 1 1 1 1 −1 1 −1 1 −1 1 1 1 1 −1 1 1 1 −1 −1 1 −1 1 −1 −1 −1 −1 −1 −1 −1 1 1 1 1 −1 −1 1 −1 1 −1 1 −1 −1 −1 −1 1 −1 −1 −1 1 −1 1 −1 1 −1 −1 −1 −1 1 1 −1 −1 1 −1 1 −1 1 −1 1 1 −1 1 1 −1 1 −1 1 1 −1 −1 1 −1 −1 1 1 −1 −1 −1 −1 1 −1 1 1 −1 1 1 −1 −1 1 −1 1 1 1 1 1 1 1 −1 −1 1 −1 −1 1 −1 1 −1 1 1 1 1 1 1 1 −1 1 −1 1 1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1];

sequence (44): G_1024(4,:)=[1 1 −1 −1 1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 −1 1 −1 −1 1 1 −1 1 1 −1 −1 1 1 1 1 1 −1 1 −1 1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 1 1 −1 1 1 −1 −1 −1 −1 −1 −1 −1 1 −1 1 1 −1 −1 1 −1 −1 1 1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1 1 1 1 −1 1 −1 1 −1 1 1 −1 1 −1 1 1 −1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 −1 −1 −1 −1 1 1 −1 1 −1 1 1 −1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 −1 −1 1 1 1 1 −1 1 −1 1 −1 1 1 −1 1 1 −1 −1 −1 −1 −1 −1 −1 1 1 −1 1 1 −1 −1 −1 −1 −1 −1 −1 1 −1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 1 1 −1 −1 −1 −1 −1 −1 −1 1 −1 1 1 −1 −1 1 1 −1 −1 1 1 −1 −1 1 −1 1 1 1 1 −1 1 −1 1 −1 1 1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 1 −1 −1 1 1 −1 1 −1 −1 −1 −1 −1 −1 −1 −1 1 1 −1 1 1 −1 1 −1 1 −1 1 1 1 1 −1 −1 1 1 1 −1 −1 1 1 −1 1 −1 −1 −1 −1 −1 −1 −1 1 −1 1 −1 −1 −1 −1 −1 −1 −1 1 1 1 1 −1 −1 1 −1 1 −1 1 −1 −1 −1 −1 1 1 −1 −1 −1 1 1 −1 −1 1 −1 1 1 1 1 1 1 −1 −1 1 −1 −1 1 −1 1 −1 1 −1 −1 −1 −1 1 1 −1 −1 1 −1 1 −1 −1 −1 −1 −1 −1 −1 1 1 1 1 1 −1 −1 1 −1 1 −1 1 −1 −1 −1 −1 1 1 −1 −1 1 −1 1 −1 1 −1 1 −1 −1 1 1 −1 −1 1 −1 −1 1 1 −1 1 −1 −1 −1 −1 −1 −1 −1 1 1 −1 1 1 1 1 −1 1 −1 1 1 1 1

−1 −1 1 1 1 −1 −1 1 1 −1 1 −1 −1 −1 −1 −1 −1 −1 1
1 1 −1 −1 1 −1 1 −1 1 −1 −1 −1 −1 1 1 −1 −1 −1 1 1
−1 −1 1 −1 1 1 1 1 1 1 1 −1 −1 1 −1 −1 1 −1 1 −1 1
−1 −1 −1 −1 1 1 −1 −1 1 −1 −1 1 1 −1 1 −1 −1 −1 −1
−1 −1 −1 1 1 1 −1 −1 1 −1 1 −1 1 −1 −1 −1 −1 1 1 −1
−1 −1 1 1 −1 −1 1 −1 1 1 1 1 1 1 1 −1 −1 1 −1 −1 1
−1 1 −1 1 −1 −1 −1 −1 1 1 −1 −1 −1 1 1 −1 −1 1 −1
1 1 1 1 1 1 1 −1 −1 −1 1 1 −1 1 −1 1 −1 1 1 1 1 −1 −1
1 1 −1 1 1 −1 −1 1 −1 1 1 1 1 1 1 1 −1 −1 1 −1 −1 1
−1 1 −1 1 −1 −1 −1 −1 1 1 −1 −1 1 −1 −1 1 1 −1 1 −1
−1 −1 −1 −1 −1 −1 1 1 1 −1 −1 1 −1 1 −1 1 −1 −1 −1
−1 1 1 −1 −1 1 −1 −1 1 1 −1 1 −1 −1 −1 −1 −1 −1 −1
1 1 −1 1 1 −1 1 −1 1 −1 1 1 1 1 −1 −1 1 1 1 −1 −1 1
1 −1 1 −1 −1 −1 −1 −1 −1 −1 1 1 1 −1 −1 1 −1 1 −1
1 −1 −1 −1 −1 1 1 −1 −1];

sequence (45): G_1024(5,:)=[1 1 −1 −1 1 1 1 1 −1 1 −1
1 −1 1 1 −1 −1 −1 1 1 1 1 1 1 1 −1 1 −1 −1 1 1 −1 1
1 −1 −1 1 1 1 1 −1 1 −1 1 −1 1 1 −1 −1 −1 −1 −1 −1
−1 1 1 −1 1 −1 1 1 −1 −1 1 1 1 −1 −1 1 1 1 1 −1 1 −1
1 −1 1 1 −1 −1 −1 1 1 1 1 1 1 1 −1 1 −1 −1 1 1 −1 −1
−1 1 1 −1 −1 −1 −1 1 −1 1 −1 1 −1 −1 1 −1 −1 1 1 1
1 1 1 1 −1 1 −1 −1 1 1 −1 −1 −1 1 1 −1 −1 −1 −1 1 −1
1 −1 1 −1 −1 1 1 1 −1 −1 −1 −1 −1 −1 −1 1 −1 1 1 −1
−1 1 −1 −1 1 1 −1 −1 −1 −1 1 −1 1 −1 1 −1 −1 1 −1
−1 1 1 1 1 1 1 1 −1 1 −1 −1 1 1 −1 1 1 −1 −1 1 1 1 1
−1 1 −1 1 −1 1 1 −1 −1 −1 1 1 1 1 1 1 1 −1 1 −1 −1
1 1 −1 −1 −1 1 1 −1 −1 −1 −1 1 −1 1 −1 1 −1 −1 1 −1
−1 1 1 1 1 1 1 1 −1 1 −1 −1 1 1 −1 −1 −1 1 1 −1 −1
−1 −1 1 −1 1 −1 1 −1 −1 1 −1 1 −1 −1 −1 −1 −1 −1 −1
1 1 1 1 −1 −1 1 −1 −1 1 1 −1 −1 −1 −1 1 −1 1 −1 1 −1
−1 1 −1 −1 1 1 1 1 1 1 1 −1 1 −1 −1 1 1 −1 −1 −1 1 1
1 −1 −1 −1 −1 1 −1 1 −1 1 −1 −1 1 −1 1 −1 −1 −1 −1
−1 −1 −1 1 1 1 1 −1 −1 1 1 1 −1 −1 1 1 1 1 −1 1 −1
1 −1 1 1 −1 1 1 −1 −1 −1 −1 −1 −1 −1 1 −1 1 1 −1 −1
1 −1 −1 1 1 −1 −1 −1 −1 1 −1 1 −1 1 −1 −1 1 1 1 −1
−1 −1 −1 −1 −1 −1 1 −1 1 1 −1 −1 1 −1 −1 1 1 −1 −1
−1 −1 1 −1 1 −1 1 −1 −1 1 −1 −1 1 1 1 1 1 1 1 −1 1
−1 −1 1 1 −1 1 1 −1 −1 1 1 1 1 −1 1 −1 1 −1 1 1 −1
−1 −1 1 1 1 1 1 1 1 −1 1 −1 −1 1 1 −1 −1 −1 1 1 −1
−1 −1 −1 1 −1 1 −1 1 −1 −1 1 −1 −1 1 1 1 1 1 1 1 −1
1 −1 −1 1 1 −1 −1 1 1 −1 −1 1 −1 1 1 1 1 1 1 1 −1 −1
1 −1 −1 1 −1 1 −1 1 −1 −1 −1 −1 1 1 −1 −1 −1 1 1 −1
−1 1 −1 1 1 1 1 1 1 1 −1 −1 −1 1 1 −1 1 −1 1 −1 1 1
1 1 −1 −1 1 1 −1 1 1 −1 −1 1 −1 1 1 1 1 1 1 1 −1 −1
1 −1 −1 1 −1 1 −1 1 −1 −1 −1 −1 1 1 −1 −1 1 −1 −1
1 −1 1 −1 −1 −1 −1 −1 −1 −1 1 1 1 1 −1 −1 1 −1 1 −1
1 −1 −1 −1 −1 1 1 −1 −1 1 −1 −1 1 1 −1 1 −1 −1 −1
−1 −1 −1 −1 1 1 −1 1 1 −1 1 −1 1 −1 1 1 1 1 −1 −1 1
1 1 −1 −1 1 −1 1 −1 −1 −1 −1 −1 −1 −1 1 1 1 1 −1 −1
1 −1 1 −1 1 −1 −1 −1 −1 1 1 −1 −1 −1 1 1 −1 −1 1 −1
1 1 1 1 1 1 1 −1 −1 1 −1 −1 1 −1 1 −1 1 −1 −1 −1 −1
1 1 −1 −1 1 −1 −1 1 −1 1 −1 −1 −1 −1 −1 −1 −1 1 1
1 1 −1 −1 1 −1 1 −1 1 −1 −1 −1 −1 1 1 −1 −1 1 −1 −1
1 1 −1 1 −1 −1 −1 −1 −1 −1 −1 1 1 −1 1 1 −1 1 −1 1
−1 1 1 1 1 −1 −1 1 1 1 −1 −1 1 1 −1 1 −1 −1 −1 −1 −1
−1 −1 1 1 1 −1 −1 1 −1 1 −1 1 −1 −1 −1 −1 1 1 −1 −1
1 −1 −1 1 −1 1 −1 −1 −1 −1 −1 −1 −1 −1 1 1 −1 1 1
−1 1 −1 1 −1 1 1 1 1 −1 −1 1 1 −1 1 1 −1 −1 1 −1 1
1 1 1 1 1 1 −1 −1 −1 1 1 −1 1 −1 1 −1 1 1 1 1 −1 −1
1 1 1 −1 −1 1 1 −1 1 −1 −1 −1 −1 −1 −1 −1 1 1 −1 1
1 −1 1 −1 1 −1 1 1 1 1 −1 −1 1 1 1 −1 −1 1 1 −1 1 −1
−1 −1 −1 −1 −1 −1 1 1 1 −1 −1 1 −1 1 −1 1 −1 −1 −1
−1 1 1 −1 −1 −1 1 1 −1 −1 1 −1 1 1 1 1 1 1 1 −1 −1
1 −1 −1 1 −1 1 −1 1 −1 −1 −1 −1 1 1 −1 −1 1 −1 −1
1 1 −1 1 −1 −1 −1 −1 −1 −1 −1 1 1 1 −1 −1 1 −1 1 −1
1 −1 −1 −1 −1 1 1 −1 −1];

sequence (46): G_1024(6,:)=[1 1 −1 −1 1 1 1 1 −1 1 −1
1 −1 1 1 −1 −1 −1 1 1 1 1 1 1 1 −1 1 −1 −1 1 1 −1 1
1 −1 −1 1 1 1 1 −1 1 −1 1 −1 1 1 −1 −1 −1 −1 −1 −1
−1 1 1 −1 1 −1 1 1 −1 −1 1 1 1 −1 −1 1 1 1 1 −1 1 −1
1 −1 1 1 −1 −1 −1 1 1 1 1 1 1 1 −1 1 −1 −1 1 1 −1 −1
−1 1 1 −1 −1 −1 −1 1 −1 1 −1 1 −1 −1 1 −1 −1 1 1 1
1 1 1 1 −1 1 −1 −1 1 1 −1 −1 −1 1 1 −1 −1 −1 −1 1 −1
1 −1 1 −1 −1 1 1 1 −1 −1 −1 −1 −1 −1 −1 1 −1 1 1 −1
−1 1 −1 −1 1 1 −1 −1 −1 −1 1 −1 1 −1 1 −1 −1 1 −1
−1 1 1 1 1 1 1 1 −1 1 −1 −1 1 1 −1 1 1 −1 −1 1 1 1 1
−1 1 −1 1 −1 1 1 −1 −1 −1 1 1 1 1 1 1 1 −1 1 −1 −1
1 1 −1 −1 −1 1 1 −1 −1 −1 −1 1 −1 1 −1 1 −1 −1 1 −1
−1 1 1 1 1 1 1 1 −1 1 −1 −1 1 1 −1 −1 −1 1 1 −1 −1
−1 −1 1 −1 1 −1 1 −1 −1 1 −1 1 −1 −1 −1 −1 −1 −1 −1
1 1 1 1 −1 −1 1 −1 −1 1 1 −1 −1 −1 −1 1 −1 1 −1 1 −1
−1 1 −1 −1 1 1 1 1 1 1 1 −1 1 −1 −1 1 1 −1 −1 −1 1 1
1 −1 −1 −1 −1 1 −1 1 −1 1 −1 −1 1 −1 1 −1 −1 −1 −1
−1 −1 −1 1 1 1 1 −1 −1 1 1 1 −1 −1 1 1 1 1 −1 1 −1
1 −1 1 1 −1 1 1 −1 −1 −1 −1 −1 −1 −1 1 −1 1 1 −1 −1
1 −1 −1 1 1 −1 −1 −1 −1 1 −1 1 −1 1 −1 −1 1 1 1 −1
−1 −1 −1 −1 −1 −1 1 −1 1 1 −1 −1 1 −1 −1 1 1 −1 −1
−1 −1 1 −1 1 −1 1 −1 −1 1 −1 −1 1 1 1 1 1 1 1 −1 1
−1 −1 1 1 −1 1 1 −1 −1 1 1 1 1 −1 1 −1 1 −1 1 1 −1
−1 −1 1 1 1 1 1 1 1 −1 1 −1 −1 1 1 −1 −1 −1 1 1 −1
−1 −1 −1 1 −1 1 −1 1 −1 −1 1 −1 −1 1 1 1 1 1 1 1 −1
1 −1 −1 1 1 1 −1 1 −1 −1 1 1 1 −1 1 1 −1 −1 −1 −1 −1 −1
−1 1 1 −1 1 1 1 1 −1 1 1 −1 1 1 1 1 −1 −1 1 1 1 1 −1 −1
1 1 −1 1 −1 −1 −1 −1 −1 −1 −1 1 1 1 −1 −1 1 1 −1 −1 1 −1
1 −1 −1 −1 −1 1 1 1 −1 −1 1 −1 −1 1 1 1 −1 1 1 −1 −1 −1
−1 −1 −1 −1 1 1 1 −1 1 1 1 −1 1 −1 1 1 1 1 1 −1 −1 1 1
1 −1 1 1 −1 −1 1 −1 1 1 1 1 1 1 1 1 −1 −1 −1 1 1 −1 1 1
−1 1 −1 1 1 1 1 −1 −1 1 1 1 −1 1 1 1 −1 −1 1 −1 1 1 1 1 1
1 1 1 −1 −1 1 −1 −1 1 −1 1 −1 1 −1 −1 −1 −1 −1 1 1 1 −1
−1 −1 1 1 −1 −1 1 −1 1 1 1 1 1 1 1 1 −1 −1 −1 1 1 1 −1
1 −1 1 −1 1 1 1 1 −1 −1 1 1 1 −1 −1 1 1 1 −1 1 1 −1 −1
−1 −1 −1 −1 −1 1 1 1 −1 1 1 1 1 −1 1 −1 1 1 1 1 1 −1 −1
1 1 −1 1 1 −1 −1 1 −1 1 1 1 1 1 1 1 −1 −1 −1 1 1 −1
1 −1 1 −1 1 1 1 1 −1 −1 1 1 −1 1 1 1 −1 −1 1 −1 1 1 1 1
1 1 1 1 −1 −1 1 −1 −1 1 −1 1 −1 1 −1 1 −1 −1 −1 −1 1 1 1 −1
−1 −1 1 1 −1 −1 1 −1 1 1 1 1 1 1 1 1 −1 −1 −1 1 1 1 −1
1 −1 1 −1 1 1 1 1 −1 −1 1 1 −1 1 1 1 −1 −1 1 −1 1 1 1 1
1 1 1 1 −1 −1 1 −1 −1 1 −1 1 −1 1 −1 1 −1 −1 −1 −1 1 1 1 −1
−1 1 −1 −1 1 1 −1 1 −1 −1 −1 −1 −1 −1 −1 1 1 1 1 −1
−1 1 −1 1 −1 1 −1 −1 −1 −1 1 1 1 −1 −1 −1 1 1 1 −1 −1
1 −1 1 1 1 1 1 1 1 −1 −1 1 −1 −1 1 −1 1 −1 1 −1 −1
−1 −1 1 1 −1 −1 −1 1 1 −1 −1 1 −1 1 1 1 1 1 1 1 1 −1
−1 −1 1 1 −1 1 −1 1 −1 1 1 1 1 1 −1 −1 1 1 1 1 −1 −1 1 1
1 1 1 1 1 1 1 1 −1 −1 1 1 −1 1 1 −1 1 −1 1 1 −1 1 1 1 1
1 −1 −1 1 1 −1 1 1 1 −1 −1 1 −1 1 1 1 1 1 1 1 1 −1 −1 −1
1 1 −1 1 −1 1 −1 1 1 1 1 −1 −1 1 1 1];

sequence (47): G_1024(7,:)=[1 1 −1 −1 1 1 1 1 −1 1 −1
1 −1 1 1 −1 1 1 1 −1 −1 −1 −1 −1 −1 −1 1 −1 1 1 1 −1 −1
1 1 1 −1 −1 1 1 1 1 −1 1 −1 1 −1 1 1 1 −1 −1 −1 1 1 1 1
1 1 1 1 −1 1 −1 −1 1 1 1 −1 −1 −1 1 1 1 −1 −1 −1 −1 1 1 −1
1 −1 1 1 −1 −1 1 −1 −1 1 1 1 1 1 1 1 −1 1 1 −1 −1 1 1 1 −1
1 1 −1 −1 1 1 1 1 −1 1 −1 1 −1 1 1 1 −1 −1 −1 1 1 1 1 1
1 1 1 −1 1 −1 −1 1 1 1 −1 −1 −1 1 1 1 −1 −1 −1 −1 1 1 −1
1 −1 1 1 −1 −1 1 −1 −1 1 1 1 1 1 1 1 −1 1 1 −1 −1 1 1 1 −1
−1 −1 1 1 1 −1 −1 −1 −1 1 −1 1 −1 1 −1 −1 1 1 1 1 −1 −1
−1 −1 −1 −1 −1 1 1 −1 1 1 1 −1 −1 1 1 −1 −1 1 1 1 −1 −1 −1
−1 1 −1 1 −1 1 −1 −1 1 1 −1 −1 1 1 1 1 1 1 1 1 −1 1 1 −1
−1 1 1 −1 1 1 1 −1 −1 1 1 1 1 1 −1 1 −1 1 1 −1 1 1 1 −1 −1
−1 1 1 1 1 1 1 1 −1 1 1 −1 −1 1 1 1 −1 −1 −1 1 1 1 −1 −1
−1 −1 1 −1 1 −1 1 −1 −1 1 −1 −1 1 1 1 1 1 1 1 1 −1 1 1
−1 −1 1 1 1 −1 −1 −1 1 1 1 −1 −1 −1 −1 1 1 −1 1 1 −1 1 1 −1
−1 1 1 1 −1 −1 −1 −1 −1 −1 −1 1 1 −1 1 1 1 −1 −1 1 1 1 1
−1 −1 1 1 1 1 1 −1 1 −1 1 −1 1 1 1 −1 1 1 1 −1 −1 −1 −1 −1 −1

−1 −1 1 −1 1 1 −1 −1 1 −1 −1 1 1 −1 −1 −1 −1 1 −1 1 −1 1 −1 −1 1 1 1 −1 −1 −1 −1 −1 −1 −1 1 −1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 1 1 −1 −1 −1 −1 −1 −1 −1 1 −1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 −1 1 −1 −1 1 1 −1 −1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 1 −1 −1 1 −1 −1 −1 −1 −1 −1 −1 1 1 1 −1 −1 1 −1 1 −1 1 −1 −1 −1 −1 1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 1 −1 −1 1 −1 1 −1 −1 −1 −1 −1 −1 1 1 1 1 −1 −1 1 −1 1 −1 1 −1 −1 −1 −1 1 1 −1 −1 1 −1 −1 1 1 −1 1 −1 −1 −1 −1 −1 −1 −1 1 1 −1 1 1 −1 1 −1 1 1 1 1 −1 −1 1 1 1 −1 −1 1 1 −1 1 −1 −1 −1 −1 −1 −1 −1 1 1 1 −1 −1 1 −1 1 −1 1 −1 −1 −1 −1 1 1 −1 −1 −1 1 1 −1 −1 1 −1 1 1 1 1 1 1 1 −1 −1 1 −1 −1 1 −1 1 −1 1 −1 −1 −1 −1 1 1 −1 −1 1 1 −1 1 1 −1 1 −1 1 −1 −1 −1 −1 −1 −1 −1 1 1 −1 −1 1 −1 1 1 −1 1 −1 1 −1 −1 −1 −1 1 1 −1 −1 1 −1 −1 1 1 −1 1 −1 −1 −1 −1 −1 −1 −1 1 1 1 −1 −1 1 −1 1 −1 1 −1 −1 −1 −1 1 1 −1 −1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 1 −1 −1 1 1 −1 1 −1 −1 −1 −1 −1 −1 −1 1 1 −1 1 1 −1 1 −1 1 1 1 1 −1 1 −1 1 −1 1 1 −1 −1 −1 1 1 1 1 −1 1 1 −1 −1 1 −1 1 −1 −1 −1 −1 −1 −1 −1 1 1 1 1 −1 −1 1 −1 1 −1 1 −1 −1 −1 −1 1 1 −1 −1 1 −1 −1 1 1 −1 1 −1 −1 −1 −1 −1 −1 −1 1 1 −1 1 1 −1 1 −1 1 −1 1 1 1 1 −1 −1 1 −1 1 −1 −1 −1 −1 −1 −1 1 1 1 1 −1 −1 1 −1 1 −1 1 −1 −1 −1 −1 1 1 −1 −1 1 1 −1 −1 1 1 −1 −1 1 −1 1 1 1 1 1 1 1 −1 −1 1 −1 −1 1 −1 1 −1 1 −1 −1 −1 −1 1 1 −1 −1 1 −1 1 1 1 1 1 −1 −1 −1 1 1 −1 1 −1 1 −1 1 1 1 1 −1 −1 1 1 −1 −1 1 1 −1 1 1 1 1 1 1 1 1 1 −1 1 1 −1 1 −1 1 −1 1 −1 1 1 1 1 −1 −1 1 1];

sequence (49): G_1536(1,:)=[1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 1 −1j 1 1 1 −1 −1 1j −1 −1 −1 1 1 −1j 1 1 1 −1 1 −1j 1 1 1 −1 −1 1j −1 1 1 −1 −1 1j −1 1 1 −1 −1 1j −1 1 1 −1 1 −1j 1 −1 −1 1 −1 1j −1 −1 −1 1 1 −1j 1 1 1 −1 1 −1j 1 1 1 −1 1 −1j 1 1 1 −1 1 −1j 1 −1 −1 1 1 −1j 1 −1 −1 1 −1 1j −1 1 −1j 1 −1 −1 1 −1 1j −1 1 1 −1 1 −1j 1 1 1 −1 1 −1j 1 1 1 −1 −1 1j −1 1 −1 1j −1 −1 −1 1 1 −1j 1 1 1 −1 1 −1j 1 1 1 −1 1 −1j 1 −1 −1 1 −1 1j −1 −1 1 1 −1j 1 −1 −1 1 −1 1j −1 1 1 −1 1 −1j 1 1 1 −1 1 −1j 1 1 1 −1 −1 1j −1 −1 −1 1 1 −1j 1 1 −1j 1 −1 −1 1 1 −1j 1 −1 −1 1 −1 1j −1 1 1 −1 −1 1j −1 −1 −1 1 1 −1j 1 1 1 −1 1 −1j 1 1 1 −1 1 −1j 1 1 1 −1 1 −1j 1 1 1 −1 −1 1j −1 1 1 −1 −1 1j −1 1 1 −1 1 −1j 1 −1 −1 1 −1 1j −1 1 1 −1 −1 1j −1 1 1 −1 −1 1j −1 1 1 −1 1−1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 1 −1j 1 1 1 −1 −1 1j −1 −1 −1 1 1 −1j 1 1 1 −1 1 −1j 1 −1 −1 1 1 −1 1 −1 1 −1j 1 1 1 −1 1 −1j 1 1 1 −1 1 −1j 1 1 1 −1 −1 1j −1 1 1 −1 −1 1j −1 1 1 −1 −1 1j −1 1 1 −1 −1 1j −1 −1 −1 1 1 −1j 1 1 1 −1 1 −1j 1 −1 −1 1 −1 1j −1 1 1 −1 −1 1j −1 1 1 −1 1 −1j 1 −1 −1 1 −1 1j −1 −1 −1 1 1 −1j 1 1 1 −1 1 −1j 1 −1 −1 1 1 −1j 1 −1 −1 1 −1 1j −1 1 1 −1 −1 1j −1 1 1 −1 −1 1j −1 1 1 −1 1 −1j 1 1 1 −1 −1 1j 1 −1 −1 1 1 −1j 1 1 1 −1 −1 1j −1 −1 −1 1 −1 1j −1 −1 −1 1 −1 1j −1 1 1 −1 −1 1j −1 1 1 −1 1 −1j 1 1 1 −1 −1 1j −1 −1 −1 1 −1 1j −1 −1 −1 1 −1 1j −1 1 1 −1 −1 1j −1 1 1 −1 1 −1j 1 −1 −1 1 −1 1j −1 −1 −1 −1 1 −1 1j −1 −1 −1 1 1 −1j 1 −1 −1 1 1 −1j 1 −1 −1 1 −1 1j −1 −1 −1 1 1 −1j 1 −1 −1 1 −1 1j −1 1 1 −1 1 −1j 1 −1 −1 1 −1 1j −1 1 1 −1 −1 1j −1 1 1 −1 1 −1j 1 1 1 −1 −1 1j −1 −1 −1 1 1 −1j 1 −1 −1 1 1 −1j 1 1 1 −1 −1 1j −1 −1 −1 1 −1 1j −1 1 1 −1 −1 1j −1 1 1 −1 −1 1j −1 −1 −1 1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 −1 −1 1 −1

1j −1 1 1 −1 −1 1j −1 1 1 −1 1 −1j 1 −1 −1 1 −1 1j −1 1 1 −1 1 −1j 1 1 1 −1 −1 1j −1 −1 −1 1 1 −1j 1 1 1 −1 1 −1j 1 1 1 −1 −1 1j −1 1 1 −1 −1 1j −1 1 1 −1 −1 1j −1 1 1 −1 1 −1j 1 −1 −1 1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 1 −1j 1 1 1 −1 −1 1j −1 −1 −1 1 1 −1j 1 1 1 −1 1 −1j 1 1 1 −1 −1 1j −1 1 1 −1 −1 1j −1 1 1 −1 −1 1j −1 1 1 −1 1 −1j 1 −1 −1 1 −1 1j −1 −1 −1 1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 1 −1j 1 1 1 −1 −1 1j −1 −1 −1 1 1 −1j 1 1 1 −1 1 −1j 1 1 1 −1 −1 1j −1 1 1 −1 −1 1j −1 1 1 −1 −1 1j −1 1 1 −1 1 −1j 1 −1 −1 1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 1 −1j 1 1 1 −1 −1 1j −1 −1 −1 1 1 −1j 1 1 1 −1 1 −1j 1 1 1 −1 −1 1j −1 1 1 −1 −1 1j −1 1 1 −1 1 −1j 1 −1 −1 1 1 −1j 1 1 −1 −1 1j −1 −1 −1 1 −1 1j −1 −1 −1 1 −1 1j −1 −1 −1 1 1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1];

sequence (50): G_1536(2,:)=[1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 −1 1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 1 1 −1 −1 1 1j 1 −1 1 1 −1 −1j −1 1 −1 −1 −1 −1j −1 1 −1 −1 −1 −1j −1 −1 1 1 1 1j 1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 −1 1 1 1 1j 1 1 −1 −1 −1 −1j −1 1 −1 −1 1 1j 1 1 −1 −1 1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 1 −1 −1 −1 −1j −1 1 −1 −1 1 1j 1 −1 1 1 −1 −1j −1 1 −1 −1 1 1j 1 1 −1 −1 1 1j 1 −1 1 1 1 1j 1 1 −1 −1 −1 −1j −1 1 −1 −1 −1 −1j −1 1 1 −1 −1 1 1j 1 −1 1 1 1 1j 1 −1 1 1 1 1j 1 −1 1 1 1 1j 1 1 −1 −1 −1 −1j −1 1 1 −1 −1 1 1j 1 −1 1 1 −1 −1j −1 −1 1 1 −1 −1j −1 1 1 1 −1 −1j −1 1 1 1 1j 1 1 −1 −1 −1 −1j −1 1 −1 −1 1 1j 1 −1 1 1 −1 −1j −1 1 1 1 1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 −1 −1j −1 1 −1 −1 1 1j 1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 1 −1 −1 1 1j 1 −1 1 1 −1 −1j −1 −1 1 1 −1 −1j −1 1 −1 −1 1 1j 1 −1 1 1 1 1j 1 1 −1 −1 −1 −1j −1 1 −1 −1 1 1j 1 −1 1 1 −1 −1j −1 −1 1 1 1 −1 −1j −1 −1 1 1 −1 −1j −1 −1 1 1 1 1j 1 −1 1 1 1 1j 1 −1 1 1 1 1j 1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 −1 −1j −1 1 −1 −1 1 1j 1 −1 1 1 −1 −1j −1 1 −1 −1 −1 −1j −1 1 −1 −1 −1 −1j −1 1 −1 −1 −1 −1j −1 −1 1 1 1 1j 1 1;

sequence (51): G_1536(3,:)=[1 −1j 1 1 1 −1 −1 1j −1 −1 −1 1 1 −1j 1 1 1 −1 1 −1j 1 1 1 −1 −1 1j −1 1 1 −1 −1 1j −1 1 1 −1 −1 1j −1 1 1 −1 1 −1j 1 −1 −1 1 −1 1j −1 −1 −1 1 1 −1j 1 1 1 −1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 −1 1j −1 −1 −1 1 1 −1j 1 1 1 −1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 1 −1j 1 1 1 −1 −1 1j −1 −1 −1 1 1 −1j 1 1 1 −1 1 −1j 1 1 1 −1 −1 1j −1 1 1 −1 −1 1j −1 1 1 −1 −1 1j −1 1 1 −1 1 −1j 1 1 1 −1 1 −1j 1 −1 −1 1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 1 −1j 1 1 1 −1 −1 1j −1 −1 −1 1 1 −1j 1 1 1 −1 1 −1j 1 1 1 −1 −1 1j −1 1 1 −1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 1 1 −1 −1 1j −1 1 1 −1 −1 1j −1 1 1 −1 1 −1j 1 −1 −1 1 −1 1j −1 1 1 −1 1 −1j 1 1 1 −1 −1 1j −1 −1 −1 1 1 −1j 1 1 1 −1 1 −1j 1 1 1 −1 −1 1j −1 1 1 −1 −1 1j −1 1 1 −1 1 −1j 1 −1 −1 1 −1 1j −1 1 1 −1 1 −1j 1 1 1 −1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 1 −1j 1 1 1 −1 −1 1j −1 −1 −1 1 −1 1j −1 −1 −1 1 1 −1j 1 −1 −1 1 1 −1j 1 −1 −1 1 −1 1j −1 1 1 −1 −1 1j −1 −1 −1 1 1 −1j 1 1 1 −1 1 −1j 1 1 1 −1 1 −1j 1 1 1

−1 1 −1j 1 −1 −1 1 1 −1j 1 −1 −1 1 −1 1j −1 1 1 −1 1 −1j 1 −1 −1 1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 1 −1 1j −1 −1 −1 1 1 −1j 1 −1 −1 1 1 −1j 1 −1 −1 1 1 −1j 1 −1 −1 1 −1 1j −1 1 1 −1 −1 1j −1 −1 −1 1 1 −1j 1 1 1 −1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 1 −1j 1 1 1 −1 −1 1j −1 −1 −1 1 1 −1j 1 1 1 −1 −1 1j −1 −1 −1 1 −1 1j −1 1 1 −1 1 −1j 1 −1 −1 1 1 −1j 1 1 1 −1 −1 1j −1 −1 −1 1 −1 1j −1 −1 −1 1 −1 1j −1 −1 −1 1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 1 −1j 1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 1 −1j 1 −1 −1 1 −1 1j −1 1 1 −1 1 −1j 1 −1 −1 1 −1 1j −1 1 1 −1 1 −1j 1 1 1 −1 −1 1j −1 −1 −1 1 −1 1j −1 −1 −1 1 1 −1j 1 1 1 −1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 1 −1j 1 −1 −1 1 −1 1j −1 1 1 −1 1 −1j 1 1 1 −1 −1 1j −1 −1 −1 1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 1 −1j 1 1 1 −1 −1 1j −1 −1 −1 1 1 −1j 1 1 1 −1 −1 1j −1 −1 −1 1 −1 1j −1 1 1 −1 1 −1j 1 −1 −1 1 1 −1j 1 −1 −1 1 1 −1j 1 −1 −1 1 1 −1j 1 −1 −1 1 −1 1j −1 1 1 −1 −1 1j −1 −1 −1 1 1 −1j 1 1 1 −1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 1 −1j 1 −1 −1 1 −1 1j −1 1 1 −1 1 −1j 1 −1 −1 1];

sequence (52): G_1536(4,:)=[1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 1 −1 −1 1 1j 1 −1 1 1 −1 −1j −1 1 −1 −1 1 1 1j 1 1 −1 −1 1 1j 1 −1 1 1 1 1j 1 −1 1 1 1 1j 1 −1 1 1 1 1j 1 1 −1 −1 −1 −1j −1 −1 1 1 −1 −1j −1 1 −1 −1 1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 −1 1 1 −1 −1j −1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 1 −1 −1 1 1j 1 −1 1 1 −1 −1j −1 1 −1 −1 1 1 1j 1 1 −1 −1 1 1j 1 −1 1 1 1 1j 1 −1 1 1 1 1j 1 −1 1 1 1 1j 1 1 −1 −1 −1 −1j −1 −1 1 1 −1 −1j −1 1 −1 −1 1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 −1 1 1 −1 −1j −1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 1 −1 −1 1 1j 1 −1 1 1 −1 −1j −1 1 −1 −1 1 1 1j 1 1 −1 −1 1 1j 1 −1 1 1 1 1j 1 −1 1 1 1 1j 1 −1 1 1 1 1j 1 1 −1 −1 −1 −1j −1 −1 1 1 −1 −1j −1 1 −1 −1 1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 −1 −1j −1];

sequence (53): G_1536(5,:)=[1 −1j 1 1 1 −1 −1 1j −1 −1 −1 1 1 −1j 1 1 1 −1 1 −1j 1 1 1 −1 −1 1j −1 1 1 1 −1 −1 1j −1 1 1 −1 −1 1j −1 1 1 1 −1 1 −1j 1 −1 −1 1 −1 1j −1 −1 −1 1 1 −1j 1 1 1 −1 1 −1j 1 1 1 −1 1 −1j 1 1 1 −1 1 −1j 1 −1 −1 1 1 −1j 1 −1 −1 1 −1 1j −1 1 1 −1 1 −1j 1 –1 –1 1 1 –1j 1 1 1 –1 –1 1j –1 –1 –1 1 1 –1j 1 1 1 –1 1 –1j 1 1 1 –1 –1 1j –1 1 1 –1 –1 1j –1 1 1 –1 –1 1j –1 1 1 –1 1 –1j 1 –1 –1 1 1 –1j 1 1 1 –1 –1 1j –1 –1 –1 1 –1 1j –1 –1 –1 1 –1 1j –1 –1 –1 1 –1 1j –1 1 1 –1 –1 1j –1 1 1 –1 1 –1j 1 –1 –1 1 –1 1j –1 1 1 –1 1 –1j 1 1 1 –1 –1 1j –1 –1 –1 1 1 –1j 1 1 1 –1 1 –1j 1 1 1 –1 –1 1j –1 1 1 –1 –1 1j –1 1 1 –1 –1 1j –1 1 1 –1 1 –1j 1 –1 –1 1 –1 1j –1 –1 –1 1 1 –1j 1 1 1 –1 1 –1j 1 1 1 –1 1 –1j 1 1 1 –1 1 –1j 1 –1 –1 1 1 –1j 1 –1 –1 1 –1 1j –1 1 1 –1 1 –1j 1 –1 –1 1 –1 1j –1 –1 –1 1 1 –1j 1 1 1 –1 –1 1j –1 –1 –1 1 –1 1j –1 –1 –1 1 1 –1j 1 –1 –1 1 1 –1j 1 –1 –1 1 1 –1j 1 –1 –1 1 –1 1j –1 1 1 –1 –1 1j –1 –1 –1 1 1 –1j 1 1 1 –1 1 –1j 1 1 1 –1 1 –1j 1 1 1 –1 1 –1j 1 –1 –1 1 1 –1j 1 –1 –1 1 –1 1j –1 1 1 –1 1 –1j 1 –1 –1 1 1 –1j 1 1 1 –1 –1 1j –1 –1 –1 1 1 –1j 1 1 1 –1 1 –1j 1 1 1 –1 –1 1j –1 1 1 –1 –1 1j –1 1 1 –1 –1 1j –1 1 1 –1 1 –1j 1 –1 –1 1 –1 1j –1 –1 –1 1 1 –1j 1 1 1 –1 1 –1j 1 1 1 –1 1 –1j 1 1 1 –1 1 –1j 1 –1 –1 1 1 –1j 1 –1 –1 1 –1 1j –1 1 1 –1 1 –1j 1 –1 –1 1 1 –1j 1 1 1 –1 –1 1j –1 –1 –1 1 1 –1j 1 1 1 –1 1 –1j 1 1 1 –1 –1 1j –1 1 1 –1 –1 1j –1 1 1 –1 –1 1j –1 1 1 –1 1 –1j 1 –1 –1 1 1 –1j 1 1 –1 –1 1j –1 –1 –1 1 –1 1j –1 –1 –1 1 –1 1j –1 –1 –1 1 –1 1j –1 1 1 –1 –1 1j –1 1 1 –1 1 1–1j 1 –1 –1 1 –1 1j –1 1 1 –1 –1 1j –1 –1 –1 1 1 –1j 1 1 1 –1 –1 1j –1 –1 –1 1 –1 1j –1 –1 –1 1 1 –1j 1 –1 –1 1 1 –1j 1 –1 –1 1 1 –1j 1 –1 –1 1 –1 1j –1 1 1 –1 1 –1j 1 1 1 –1 –1 1j –1 –1 –1 1 –1 1j –1 –1 –1 1 –1 1j –1 –1 –1 1 –1 1j –1 1 1 –1 –1 1j –1 1 1 –1 1 –1j 1 –1 –1 1 1 –1 1j –1 1 1 –1 1 –1j 1 1 1 –1 –1 1j –1 –1 –1 1 1 –1j 1 1 1 –1 1 –1j 1 1 1 –1 –1 1j –1 1 1 –1 –1 1j –1 1 1 –1 –1 1j –1 1 1 –1 1 –1j 1 –1 –1 1 1 –1j 1 1 1 –1 –1 1j –1 –1 –1 1 –1 1j –1 –1 –1 1 –1 1j –1 –1 –1 1 –1 1j –1 1 1 –1 –1 1j –1 1 1 –1 1 –1j 1 –1 –1 1 –1 1j –1 1 1 –1 –1 1j –1 –1 –1 1 1 –1j 1 1 1 –1 –1 1j –1 –1 –1 1 –1 1j –1 –1 –1 1 1 –1j 1 –1 –1 1 1 –1j 1 –1 –1 1 1 –1j 1 –1 –1 1 –1 1j –1 1 1 –1 1 –1j 1 1 1 –1 –1 1j –1 –1 –1 1 –1 1j –1 –1 –1 1 –1 1j –1 –1 –1 1 –1 1j –1 1 1 –1 –1 1j –1 1 1 –1 1 –1j 1 –1 –1 1 –1 1j –1 1 1 –1 1 –1j 1 1 1 –1 –1 1j –1 –1 –1 1 1 –1j 1 1 1 –1 –1 1j –1 –1 –1 1 1 –1j 1 –1 –1 1 1 –1j 1 –1 –1 1 1 –1j 1 –1 –1 1 –1 1j –1 1 1 –1 –1 1j –1 –1 –1 1 1 –1j 1 1 1 –1 1 –1j 1 1 1 –1 1 –1j 1 1 1 –1 1 –1j 1 –1 –1 1 1 –1j 1 –1 –1 1 –1 1j –1 1 1 –1 1 –1j 1 –1 –1 1 –1 1j –1 –1 –1 1 1 –1j 1 1 1 –1 –1 1j –1 –1 –1 1 –1 1j –1 –1 –1 1 1 –1j 1 –1 –1 1 1 –1j 1 –1 –1 1 1 –1j 1 –1 –1 1 –1 1j –1 1 1 –1 1 –1j 1 1 1 –1 –1 1j –1 –1 –1 1 1 1j –1 –1 –1 1 –1 1j –1 –1 –1 1 –1 1j –1 1 1 –1 –1 1j –1 1 1 –1 1 –1j 1 –1 –1 1 –1 1j –1 1 1 –1 1 –1j 1 1 1 –1 1 –1j 1 1 1 –1 –1 1j –1 –1 –1 1 1 –1j 1 1 1 –1 –1 1j –1 –1 –1 1 1 –1j 1 1 1 –1 –1 1j –1 1 1 –1 –1 1j –1 1 1 –1 –1 1j –1 1 1 –1 –1 1j –1 1 1 –1 1 –1j 1 –1 –1 1 –1 1j –1 –1 –1 1 1 –1j 1 1 1 –1 1 –1j 1 1 1 –1 –1 1j –1 1 1 –1 1 –1j 1 –1 –1 1 1 –1j 1 1 1 –1 1 –1j 1 –1 –1 1 –1 1j –1 1 1 –1 –1 1j –1 –1 –1 1 1 –1j 1 1 1 –1 –1 1j –1 –1 –1 1 1 –1 1 –1j 1 –1 –1 1 1 –1j 1 1 1 –1 –1 1j –1 –1 –1 1 1 –1j 1 1 1 –1 1 –1j 1 1 1 –1 –1 1j –1 1 1 –1 –1 1j –1 1 1 –1 –1 1j –1 1 1 –1 1 –1j 1 –1 –1 1 1 –1j 1 1 1 –1 –1 1j –1 –1 –1 1 –1 1j –1 –1 –1 1 –1 1j –1 –1 –1 1 –1 1j –1 1 1 –1 –1 1j –1 1 1 –1 1 –1j 1 –1 –1 1 –1 1j –1 1 1 –1 –1 1j –1 –1 –1 1 1 –1j 1 1 1 –1 –1 1j –1 –1 –1 1 –1 1j –1 –1 –1 1 1 –1j 1 –1 –1 1 1 –1j 1 –1 –1 1 1 –1j 1 –1 –1 1 –1 1j –1 1 1 –1 1 –1j 1 1 1 –1 –1 1j –1 –1 –1 1 –1 1j –1 –1 –1 1 –1 1j –1 –1 –1 1 –1 1j –1 1 1 –1 1 –1 1j –1 1 1 –1 –1 1j –1 1 1 –1 1 –1j 1 –1 –1 1 –1 1j –1 1 1 –1 1 –1j 1 1 1 –1 –1 1j –1 –1 –1 1 1 –1j 1 1 1 –1 –1 1j –1 –1 –1 1 1 –1j 1 1 1 –1 –1 1j –1 1 1 –1 –1 1j –1 –1 –1 1 –1 1j –1 –1 –1 1 –1 1j –1 1 1 –1 –1 1j –1 –1 –1 1 –1 1j –1 –1 –1 1 –1 1j –1 1 1 –1 1 –1 1;

sequence (54): G_1536(6,:)=[1 –1 –1 1 1j 1 –1 1 1 –1 –1j –1 1 –1 –1 1 1j 1 1 –1 –1 1 1j 1 –1 1 1 1 1j 1 –1 1 1 1 1j 1 –1 1 1 1 1j 1 1 –1 –1 –1 –1j –1 –1 1 1 –1 –1j –1 1 –1 –1 1 1j 1 1 –1 –1 1 1j 1 1 –1 –1 1 1j 1 1 –1 –1 –1 –1j –1 1 –1 –1 –1 –1j –1 –1 1 1 1 1j 1 1 –1 –1 –1 –1j –1 1 –1 –1 1 1j 1 –1 1 1 –1 –1j –1 1 –1 –1 1 1j 1 1 –1 –1 1 1j 1 –1 1 1 1 1j 1 –1 1 1 1 1j 1 –1 1 1 1 1j 1 1 –1 –1 –1 –1j –1 1 –1 –1 1 1j 1 –1 1 1 –1 –1j –1 –1 1 1 –1 –1j –1 –1 1 1 –1 –1j –1 –1 1 1 1 1j 1 –1 1 1 1 1j 1 1 –1 –1 –1 –1j –1 –1 1 1 1 1j 1 1 –1 –1 1 1j 1 –1 1 1 –1 –1j –1 1 –1 –1 1 1j 1 1 –1 –1 1 1j 1 –1 1 1 1 1j 1 –1 1 1 1 1j 1 –1 1 1 1 1j 1 1 –1 –1 –1 –1j –1 –1 1 1 –1 –1j –1 1 –1 –1 1 1j 1 1 –1 –1 1 1j 1 1 –1 –1 1 1j 1 1 –1 –1 1 1j 1 1 –1 –1 –1 –1j –1 1 –1 –1 –1 –1j –1 –1 1 1 1 1j 1 1 –1 –1 –1 –1j –1 –1 1 1 –1 –1j –1 1 –1 –1 1 1j 1 –1 1 1 –1 –1j –1 1 –1 –1 –1 –1j –1 1 –1 –1 –1 –1j –1 –1 1 1 1 1j 1 –1 1 1 –1 –1j –1 1 –1 –1 1 1j 1 1 –1 –1 1 1j 1 1 –1 –1 –1 –1j –1 1 –1 –1 –1 –1j –1 –1 1 1 1 1j 1 1 –1 –1 –1 –1j –1 1 –1 –1 1 1j 1 –1 1 1 –1 –1j –1 1 –1 –1 1 1j 1 1 –1 –1 1 1j 1 –1 1 1 1 1j 1 –1 1 1 1 1j 1 –1 1 1 1 1j 1 1 –1 –1 –1 –1j –1 –1 1 1 –1 –1j –1 –1 1 1 –1 –1j –1 –1 1 1 1 1j 1 –1 1 1 –1 1 1 1 1j 1 1 –1 –1 –1 –1j –1 –1 1 1 1 1j 1 –1 1 1 –1 –1j –1 1 –1 –1 1 1j 1 –1 1 1 –1 –1j –1 –1 1 1 –1 –1j –1 1 –1 –1 –1 –1j –1 1 –1 –1 –1 –1j –1 1 –1 –1 –1 –1j –1 –1 1 1 1 1j 1 1 –1 –1 1 1j 1 –1 1 1 –1 –1j –1 –1 1 1 –1 –1j –1 –1 1 1 1 1j 1 –1 1 1 1 1j 1 1 –1 –1 –1 –1j –1 –1 1 1 1 1j 1 1 –1 –1 1 1j 1 –1 1 1 –1 –1j –1 1 –1 –1 1 1j 1 1 –1 –1 1 1j 1 –1 1 1 1 1j 1 –1 1 1 1 1j 1 –1 1 1 1 1j 1 1 –1 –1 –1 –1j –1 1 –1 –1 1 1j 1 –1 1 1 –1 –1j –1 –1 1 1 –1 –1j –1 1 –1 –1 –1 –1j –1 –1 1 1 –1 –1j –1 –1 1 1 1 1j 1 –1 1 1 1 1j 1 1 –1 –1 –1 –1j –1 –1 1 1 1 1j 1 –1 1 1 –1 –1j –1 1 –1 –1 1 1j 1 –1 1 1 –1 –1j –1 –1 1 1 –1 –1j –1 1 –1 –1 –1 –1j –1 1 –1 –1 –1 –1j –1 1 –1 –1 –1 –1j –1 –1 1 1 1 1j 1 1 –1 –1 1 1j 1 –1 1 1 –1 –1j –1 –1 1 1 –1 –1j –1 –1 1 1 1 1j 1 –1 1 1 1 1j 1 1 –1 –1 –1 –1j –1 –1 1 1 1 1j 1 1 –1 –1 1 1j 1 –1 1 1 –1 –1j –1 1 –1 –1 1 1j 1 1 –1 –1 1 1j 1 –1 1 1 1 1j 1 –1 1 1 1 1j 1 –1 1 1 1 1j 1 1 –1 –1 –1 –1j –1 –1 1 1 –1 –1j –1 1 –1 –1 1 1j 1 1 –1 –1 1 1j 1 1 –1 –1 –1 1 1j 1 –1 1 1 1 1j 1 –1 1 1 1 1j 1 –1 1 1 1 1j 1 1 –1 –1 –1 –1j –1 –1 1 1 –1 –1j –1 1 –1 –1 1 1j 1 1 –1

–1 1 1j 1 1 –1 –1 1 1j 1 1 –1 –1 –1 –1j –1 1 –1 –1 –1 –1j –1 –1 1 1 1 1j 1 1 –1 –1 –1 –1j –1 1 –1 –1 1 1j 1 –1 1 1 –1 –1j –1 1 –1 –1 1 1j 1 1 –1 –1 1 1j 1 –1 1 1 1 1j 1 –1 1 1 1 1j 1 –1 1 1 1 1j 1 1 –1 –1 –1 –1j –1 1 –1 –1 1 1j 1 –1 1 1 –1 –1j –1 –1 1 1 –1 –1j –1 –1 1 1 –1 –1j –1 –1 1 1 1 1j 1 –1 1 1 1 1j 1 1 –1 –1 –1 –1j –1 –1 1 1 1 1j 1 –1 1 1 –1 –1j –1 1 –1 –1 1 1j 1 –1 1 1 –1 –1j –1 –1 1 1 –1 –1j –1 1 –1 –1 –1 –1j –1 1 –1 –1 –1 –1j –1 1 –1 –1 –1 –1j –1 –1 1 1 1 1j 1 1 –1 –1 1 1j 1 –1 1 1 –1 –1j –1 –1 1 1 –1 –1j –1 –1 1 1 –1 –1j –1 –1 1 1 1 1j 1 –1 1 1 1 1j 1 1 –1 –1 –1 –1j –1 –1 1 1 1 1j 1 1 –1 –1 1 1j 1 –1 1 1 –1 –1j –1 1 –1 –1 1 1j 1 1 –1 –1 1 1j 1 –1 1 1 1 1j 1 –1 1 1 1 1j 1 –1 1 1 1 1j 1 1 –1 –1 –1 –1j –1 1 –1 –1 1 1j 1 –1 1 1 –1 –1j –1 –1 1 1 –1 –1j –1 –1 1 1 –1 –1j –1 –1 1 1 1 1j 1 –1 1 1 1 1j 1 1 –1 –1 –1 –1j –1 –1 1 1 1 1j 1];

sequence (55): G_1536(7,:)=[1 –1j 1 1 1 –1 –1 1j –1 –1 –1 1 1 –1j 1 1 1 –1 1 –1j 1 1 1 –1 –1 1j –1 1 1 –1 –1 1j –1 1 1 –1 –1 1j –1 1 1 –1 1 –1j 1 –1 –1 1 1 –1j 1 1 1 –1 –1 1j –1 –1 –1 1 –1 1j –1 –1 –1 1 –1 1j –1 –1 –1 1 –1 1j –1 1 1 –1 –1 1j –1 1 1 –1 1 –1j 1 –1 –1 1 –1 1j –1 1 1 –1 1 –1j 1 1 1 –1 –1 1j –1 –1 –1 1 1 –1j 1 1 1 –1 1 –1j 1 1 1 –1 –1 1j –1 1 1 –1 –1 1j –1 1 1 –1 –1 1j –1 1 1 –1 1 –1j 1 –1 –1 1 –1 1j –1 –1 –1 1 1 –1j 1 1 1 –1 1 –1j 1 1 1 –1 1 –1j 1 1 1 –1 1 –1j 1 –1 –1 1 1 –1j 1 –1 –1 1 –1 1j –1 1 1 –1 1 –1j 1 –1 –1 1 –1 1j –1 –1 –1 1 1 –1j 1 1 1 –1 –1 1j –1 –1 –1 1 1 –1 1j –1 –1 –1 1 1 –1j 1 –1 –1 1 1 –1j 1 –1 –1 1 1 1 –1j 1 –1 –1 1 –1 1j –1 1 1 –1 –1 1j –1 –1 –1 1 1 –1j 1 1 1 –1 1 1 –1j 1 1 1 –1 1 –1j 1 1 1 –1 1 –1j 1 –1 –1 1 1 1 –1j 1 –1 –1 1 –1 1j –1 1 1 –1 1 –1j 1 –1 –1 1 1 1 –1j 1 1 1 –1 –1 1j –1 –1 –1 1 1 –1j 1 1 1 –1 1 –1j 1 1 1 –1 –1 1j –1 1 1 –1 –1 1j –1 1 1 –1 –1 1j –1 1 1 –1 1 –1j 1 –1 –1 1 –1 1j –1 –1 –1 1 1 –1j 1 1 1 –1 1 –1j 1 1 1 –1 1 –1j 1 1 1 –1 1 –1j 1 –1 –1 1 1 –1j 1 –1 –1 1 –1 1j –1 1 1 –1 1 1–1j 1 1 1 –1 –1 1j –1 –1 –1 1 1 –1j 1 1 1 –1 1 –1j 1 1 1 –1 –1 1j –1 1 1 –1 –1 1j –1 1 1 –1 –1 1j –1 1 1 –1 1 –1j 1 –1 –1 1 1 –1j 1 1 1 –1 –1 1j –1 –1 –1 1 –1 1j –1 –1 –1 1 –1 1j –1 –1 –1 1 –1 1j –1 1 1 –1 –1 1j –1 1 1 –1 1 –1j 1 1 1 –1 –1 1j –1 –1 1 –1 1 1 –1 1 –1j 1 –1 –1 1 –1 1j –1 1 1 –1 1 –1j 1 –1 –1 1 1 –1 1 1–1j 1 1 1 –1 1 –1j 1 1 1 –1 –1 1j –1 1 1 –1 –1 1j –1 1 1 –1 1 –1j 1 –1 –1 1 –1 1j –1 –1 –1 1 1 –1j 1 1 1 –1 1 –1j 1 1 1 –1 1 –1j 1 1 1 –1 1 –1j 1 –1 –1 1 1 –1j 1 –1 –1 1 –1 1j –1 1 1 –1 1 –1j 1 –1 –1 1 1 –1 –1 1 1 –1j 1 1 1 –1 –1 1j –1 –1 –1 1 1 –1j 1 1 1 –1 1 –1 1j –1 1 1 –1 –1 1j –1 1 1 –1 –1 1j –1 1 1 –1 –1 1 1j –1 –1 –1 1 1 –1j 1 1 1 –1 1 –1j 1 1 1 –1 1 –1j 1 –1 –1 1 –1 1j –1 –1 –1 1 –1 1j –1 –1 –1 1 –1 1j –1 1 1 –1 1 –1j 1 1 1 –1 –1 1j –1 1 1 –1 –1 1j –1 1 1 –1 1 –1j 1 –1 –1 1 –1 1j –1 –1 –1 1 –1 1j –1 –1 –1 1 –1 1j –1 1 1 –1 –1 1j –1 1 1 –1 –1 1j –1 –1 –1 1 1 –1j 1 1 1 –1 –1 1j –1 –1 –1 1 –1 1j –1 –1 –1 1 1 –1j 1 –1 –1 1 1 –1j 1 –1 –1 1 1 –1j 1 –1 –1 1 1 –1j 1 –1 –1 1 –1 1j –1 1 1 –1 –1 1j –1 –1 –1 1 1 –1j 1 1 1 –1 1 –1j 1 1 1 –1 1 –1j 1 –1 –1 1 1 1 –1j 1 –1 –1 1 –1 1j –1 1 1 –1 1 –1j 1 –1 –1 1 –1 1j –1 –1 –1 1 1 –1j 1 1 1 –1 –1 1j –1 –1 –1 1 –1 1j –1 –1 –1 1 1 –1j 1 –1 –1 1 1 –1j 1 –1 –1 1 1 –1j 1 –1 –1 1 –1 1j –1 1 1 –1 1 –1j 1 1 1 –1 –1 1j –1 –1 –1 1 –1 1j –1 –1 –1 1 –1 1j –1 –1 –1 1 –1 1j –1 1 1 –1 –1 1j –1 1 1 –1 1 –1j 1 –1 –1 1 –1 1j –1 1 1 –1 1 –1j 1 1 1 –1 1 –1j 1 1 1 –1 –1 1j –1 –1 –1 1 1 –1j 1 –1 –1 1 1 –1j 1 –1 –1 1 –1 1j –1 1 1 –1 1 –1j 1 –1 –1 1 –1 1j –1 1 1 –1 –1 1j –1 1 1 –1 –1 1j –1 1 1 –1 1 –1j 1 –1 –1 1 –1 1j –1 1 1 –1 –1 1j –1 –1 –1 1 1 –1j 1 1 1 –1 1 –1j 1 1 1 –1 –1 1j –1 –1 –1 1 –1 1j –1 –1 –1 1 –1 1j –1 1 1 –1 –1 1j –1 1 1 –1 1 –1j 1 –1 –1 1 –1 1j –1 –1 –1 1 –1 1j –1 –1 –1 1 –1 1j –1 1 1 –1 1 –1j 1 1 1 –1 –1 1j –1 1 1 –1 –1 1j –1 1 1 –1 –1 1j –1 1 1 –1 1 –1j 1 –1 –1 1 –1 1j –1 –1 –1 1 –1 1j –1 1 1 –1 –1 1j –1 –1 –1 1 1 –1j 1 1 1 –1 –1 1j –1 –1 –1 1 –1 1j –1 –1 –1 1 1 –1j 1 –1 –1 1 1 –1j 1 –1 –1 1 1 –1j 1 –1 –1 1 1 –1j 1 –1 –1 1 –1 1j –1 1 1 –1 1 –1j 1 1 1 –1 –1 1j –1 –1 –1 1 1 –1j 1 1 1 –1 –1 1j –1 –1 –1 1 –1 1j –1 –1 –1 1 –1 1j –1 1 1 –1 1 –1j 1 –1 –1 1 –1 1j –1 1 1 –1 1 –1j 1 –1 –1 1 –1 1j –1 1 1 –1 –1 1j –1 –1 –1 1 –1 1j –1 –1 –1 1 –1 1j –1 1 1 –1 –1 1j –1 1 1 –1 1 –1j 1 –1 –1 1 –1 1j –1 1 1 –1];

sequence (56): G_1536(8,:)=[1 –1 –1 1 1j 1 –1 1 1 –1 –1j –1 1 –1 –1 1 1j 1 1 –1 –1 1 1j 1 –1 1 1 1 1j 1 –1 1 1 1 1j 1 –1 1 1 1 1j 1 1 –1 –1 –1 –1j –1 1 –1 –1 1 1j 1 –1 1 1 –1 –1j –1 –1 1 1 –1 –1j –1 –1 1 1 –1 –1j –1 –1 1 1 1 1j 1 –1 1 1 1 1j 1 1 –1 –1 –1 –1j –1 –1 1 1 1 1j 1 1 –1 –1 1 1j 1 –1 1 1 –1 –1j –1 1 –1 –1 1 1j 1 1 –1 –1 1 1j 1 –1 1 1 1 1j 1 –1 1 1 1 1j 1 –1 1 1 1 1j 1 1 –1 –1 –1 –1j –1 –1 1 1 –1 –1j –1 1 –1 –1 1 1j 1 1 –1 –1 1 1j 1 1 –1 –1 1 1j 1 1 –1 –1 –1 –1j –1 1 –1 –1 –1 –1j –1 –1 1 1 1 1j 1 1 –1 –1 –1 –1j –1 –1 1 1 –1 –1j –1 1 –1 –1 1 1j 1 –1 1 1 –1 –1j –1 –1 1 1 –1 –1j –1 1 –1 –1 –1 –1j –1 1 –1 –1 –1 –1j –1 1 –1 –1 –1 –1j –1 –1 1 1 1 1j 1 –1 1 1 –1 –1j –1 1 –1 –1 1 1j 1 1 –1 –1 1 1j 1 1 –1 –1 1 1j 1 1 –1 –1 –1 –1j –1 1 –1 –1 –1 –1j –1 –1 1 1 1 1j 1 1 –1 –1 –1 –1j –1 1 –1 –1 1 1j 1 –1 1 1 –1 –1j –1 1 –1 –1 1 1j 1 1 –1 –1 1 1j 1 –1 1 1 1 1j 1 –1 1 1 1 1j 1 –1 1 1 1 1j 1 1 –1 –1 –1 –1j –1 1 –1 –1 1 1j 1 1 –1 –1 1 1j 1 1 –1 –1 –1 –1j –1 1 –1 –1 1 1j 1 –1 1 1 –1 –1j –1 1 –1 –1 1 1j 1 1 –1 –1 1 1j 1 –1 1 1 1 1j 1 –1 1 1 1 1j 1 –1 1 1 1 1j 1 1 –1 –1 –1 –1j –1 1 –1 –1 1 1j 1 –1 1 1 –1 –1j –1 –1 1 1 –1 –1j –1 –1 1 1 –1 –1j –1 –1 1 1 1 1j 1 –1 1 1 1 1j 1 1 –1 –1 –1 –1j –1 –1 1 1 1 1j 1 1 –1 –1 1 1j 1 –1 1 1 –1 –1j –1 1 –1 –1 1 1j 1 –1 1 1 1 1j 1 –1 1 1 1 1j 1 –1 1 1 1 1j 1 1 –1 1 1 1 1j 1 1 –1 –1 –1 –1j –1 –1 1 1 –1 –1j –1 1 –1 –1 1 1j 1 1 –1 –1 1 1j 1 1 –1 –1 1 1j 1 1 –1 –1 –1 –1j –1 1 –1 –1 –1 –1j –1 –1 1 1 1 1j 1 1 –1 –1 –1 –1j –1 –1 1 1 –1 –1j –1 1 –1 –1 1 1j 1 –1 1 1 –1 –1j –1 –1 1 1 –1 –1j –1 1 –1 –1 1 1j 1 1 –1 –1 1 1j 1 –1 1 1 1 1j 1 –1 1 1 1 1j 1 –1 1 1 1 1j 1 1 –1 –1 –1 –1j –1 1 –1 –1 –1 –1j –1 1 –1 –1 –1 –1j –1 1 –1 –1 –1 –1j –1 –1 1 1 1 1j 1 1 –1 –1 1 1j 1 –1 1 1 –1 –1j –1 –1 1 1 –1 –1j –1 –1 1 1 –1 –1j –1 –1 1 1 1 1j 1 –1 1 1 1 1j 1 1 –1 –1 –1 –1j –1 –1 1 1 1 1j 1 –1 1 1 –1 –1j –1 1 –1

−1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 1 1j 1 1 −1 −1 −1 −1j −1 −1 1 1 1j 1];

sequence (57): G_1536(1,:)=[−1 1j −1 −1 −1 1 1 −1j 1 1 1 −1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −j 1 −1 −1 1 1 −1j 1 −1 −1 1 1 −1j 1 −1 −1 1 −1 1j −1 1 1 −1 1j −1 1 1 −1 1 −1j 1 1 1 −1 −1 1j −1 −1 −1 1 −1 1j −1 −1 −1 1 −1 1j −1 1 1 −1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 −1 1j −1 1 1 −1 1 1 −1 −1j 1 −1 −1 1 1 −1j 1 −1 −1 1 −1 1j −1 1 1 −1 −1 1j −1 −1 −1 1 1 −1j 1 1 1 −1 1 −1j 1 1 1 −1 −1 1j −1 1 1 −1 −1 1j −1 −1 −1 1 −1 1j −1 1 1 −1 1 −1j 1 −1 −1 1 −1 1j −1 −1 −1 1 1 −1j 1 1 1 −1 −1 1j −1 1 1 −1 1 −1j 1 1 1 −1 1 −1j 1 1 1 −1 −1 1j −1 −1 −1 1 −1 1j −1 −1 −1 1 1 −1j 1 −1 −1 1 1 −1j 1 −1 −1 1 −1 1j −1 1 1 −1 1 −1j 1 1 1 −1 1 −1j 1 −1 −1 1 −1 1j −1 1 1 −1 −1 1j −1 1 1 −1 −1 1j −1 −1 −1 1 −1 1j −1 −1 −1 1 −1 1j −1 −1 −1 1 1 −1j 1 −1 −1 1 1 −1j 1 1 1 −1 −1 1j −1 −1 −1 1 −1 1j −1 −1 −1 1 1 −1j 1 −1 −1 1 −1 1j −1 −1 1 1 −1 −1 1j −1 −1 −1 1 −1 1j −1 −1 −1 1 −1 1j −1 −1 −1 1 −1 1j −1 1 1 −1 −1 1j −1 1 1 −1 −1 1j −1 1 1 −1 1 −1j 1 −1 −1 1 −1 1j −1 1 1 −1 1 −1j 1 −1 −1 1 1 −1j 1 1 1 −1 −1 1j −1 −1 −1 1 −1 1j −1 −1 −1 1 1 −1j 1 1 1 −1 1 −1j 1 1 1 −1 −1 1j −1 1 1 −1 −1 1j −1 1 1 −1 1 −1j 1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 1 −1j 1 −1 −1 1 1 −1j 1 1 1 −1 1 −1j 1 1 1 −1 1−1j 1 −1 −1 1 1 −1j 1 −1 −1 1 −1 1j −1 1 1 −1 1 −1j 1 −1 −1 1 1 −1j 1 1 1 −1 −1 1j −1 −1 −1 1 1−1j 1 1 1 −1 1 −1j 1 1 1 −1 −1 1j −1 1 1 −1 −1 1j −1 1 1 −1 −1 1j −1 1 1 −1 1 −1j 1 −1 −1 1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1−1j 1 −1 −1 1 −1 1j −1 1 1 −1 1 −1j 1 1 1 −1 −1 1j −1 −1 −1 1 1 −1j 1 1 1 −1 1 −1j 1 1 1 −1 −1 1j −1 1 1 −1 −1 1j −1 1 1 −1 −1 1j −1 1 1 −1 1 −1j 1 −1 −1 1 1 −1j 1 1 1 −1 −1 1j −1 −1 −1 1 −1 1j −1 −1 −1 1 −1 1j −1 1 −1 1j −1 −1 −1 1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1];

sequence (58): G_1536(2,:)=[−1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1

−1 −1j −1 −1 1 1 1 1j 1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 −1 1 1 −1 −1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 1 −1 −1j −1 −1 −1 1 1 1 1j 1 −1 1 1 1 1j 1 1 −1 −1 −1 −1j −1 −1 1 1 1 1j 1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 1 −1 −1j −1 −1 1 1 1 1j 1 −1 1 1 1 1j 1 1 −1 −1 −1 −1j −1 −1 1 1 1 1j 1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 1 −1 −1 1 1j 1 −1 1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 1 1j 1 −1 1 1 1 1j 1 1 −1 −1 −1 −1j −1 −1 1 1 −1 −1j −1 1 −1 −1 1 1j 1 1 −1 −1 1 1j 1 −1 1 −1 1 1j 1 1 −1 −1 −1 −1j −1 1 −1 −1 −1 −1j −1 −1 1 1 1 1j 1 1 −1 −1 −1 −1j −1 1 −1 −1 1 1j 1 −1 1 1 −1 −1j −1 −1 1 1 −1 1 1j 1 1 −1 −1 1 1j 1 −1 1 1 1 1j 1 −1 1 1 1 1j 1 −1 1 1 1 1j 1 1 −1 −1 −1 −1j −1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1 1j 1 1 −1 −1 −1 −1j −1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1];

sequence (59): G_1536(3,:)=[−1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 −1 1j −1 1 1 −1 1 −1j 1 1 1 −1 −1 1j −1 −1 −1 1 1 −1j 1 1 1 −1 1 −1j 1 1 1 −1 −1 1j −1 1 1 −1 −1 1j −1 1 1 −1 −1 1j −1 1 1 −1 1 −1j 1 −1 −1 1 1 −1j 1 1 1 −1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 1 −1j 1 −1 −1 1 −1 1j −1 1 1 −1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 1 −1j 1 1 1 −1 −1 1j −1 −1 −1 1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 −1 1j −1 1 1 −1 1 −1j 1 1 1 −1 −1 1j −1 −1 −1 1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 1 −1j 1 1 1 −1 −1 1j −1 1 1 −1 −1 1j −1 1 1 −1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 −1 1j −1 1 1 −1 −1 1j −1 1 1 −1 1 −1j 1 −1 −1 1 1 −1j 1 1 1 −1 −1 1j −1 −1 −1 1 −11j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 1 −1j 1 1 1 −1 −1 1j −1 −1 −1 1 1−1j 1 1 1 −1 1 −1j 1 1 1 −1 −1 1j −1 1 1 −1 −1 1j −1 1 1 −1 −1 1j −1 1 1 −1 1 −1j 1 −1 −1 1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1−1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 −1 1j −1 −1 −1 1 1 −1j 1 1 1 −1 1 −1j 1 1 1 −1 1 −1j 1 1 1 −1 1 −1j 1 −1 −1 1 1 −1j 1 −1 −1 1 1 −1j 1 −1 −1 1 −1 1j −1 1 1 −1 1 −1j 1 −1 −1 1 1 −1j 1 1 1 −1 −1 1j −1 1 1 −1 −1 1j −1 1 1 −1 1 −1j 1 −1 −1 1 −1 1j −1 1 1 −1 −1 1j −1 1 1 −1 1 −1j 1 −1 −1 1 −1 1j −1 1 1 −1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 −1 1j −1 1 1 −1 −1 1j −1 −1 −1 1 1 −1j 1 1 1 −1 1 −1j 1 1 1 −1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1−1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1

−1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 −1 1j −1 −1 −1 1 1 −1j 1 1 1 −1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1];

sequence (60): G_1536(4,:)=[−1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 −1 1 1 −1 −1j −1 1 −1 −1 1 1 1j 1 1 −1 −1 1 1j 1 1 −1 −1 1 1j 1 1 −1 −1 −1 −1j −1 −1 1 −1 −1 −1 −1j −1 −1 1 1 1 1j 1 1 −1 −1 −1 −1j −1 −1 1 1 1 1j 1 1 −1 −1 −1 −1j −1 −1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1];

sequence (61): G_1536(5,:)=[−1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 −1 1j −1 −1 −1 1 1 −1j 1 1 1 −1 1 −1j 1 1 1 −1 1 1−1j 1 1 1 −1 1 −1j 1 −1 −1 1 1 −1j 1 −1 −1 1 −1 1j −1 1 1 −1 1 −1j 1 −1 −1 1 −1 1j −1 −1 −1 1 1 1−1j 1 1 1 −1 −1 1j −1 −1 −1 1 −1 1j −1 −1 −1 1 1 −1j 1 −1 −1 1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 1 −1j 1 1 1 −1 −1 1j −1 −1 −1 1 1 −1j 1 1 1 −1 −1 1j −1 1 1 −1 1 1 −1 1 −1j 1 1 1 −1 −1 1j −1 1 1 −1 −1 1j −1 1 1 −1 −1 1j −1 1 1 −1 1 −1j 1 −1 −1 1 1 −1j 1 1 1 −1 −1 1j −1 −1 −1 1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 1 −1 −1 1j −1 −1 −1 1 1 −1j 1 1 1 −1 −1 1j −1 −1 −1 1 1 −1 1j −1 −1 −1 1 1 −1j 1 −1 −1 1 1 −1j 1 −1 −1 1 1 −1j 1 −1 −1 1 −1 1j −1 1 1 −1 −1 1j −1 −1 −1 1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 1 −1j 1 1 1 −1 −1 1j −1 −1 −1 1 1 −1j 1 1 1 −1 1 −1j 1 1 1 −1 −1 1j −1 1 1 −1 −1 1j −1 1 1 −1 −1 1j −1 1 1 −1 1 −1j 1 −1 −1 1 −1 1j −1 −1 −1 1 1 −1j 1 1 1 −1 1 −1j 1 1 1 −1 1 −1j 1 1 1 −1 1 −1j 1 −1 −1 1 1 −1j 1 −1 −1 1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 1 −1 −1 1j −1 −1 −1 1 1 −1j 1 1 1 −1 −1 1j −1 −1 −1 1 1 −1j 1 1 1 −1 1 −1j 1 1 1 −1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 −1 1j −1 1 1 −1 1 −1j 1 1 1 −1 −1 1j −1 −1 −1 1 −1 1j −1 −1 −1 1 1 −1j 1 1 1 −1 1 −1j 1 1 1 −1 1 −1j 1 −1 −1 1 1 −1j 1 −1 −1 1 −1 1j −1 1 1 −1 1

−1j 1 −1 −1 1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 1 1−1j 1 1 1 −1 −1 1j −1 −1 −1 1 1 −1j 1 1 1 −1 1 −1j 1 1 1 −1 −1 1j −1 1 1 −1 −1 1j −1 1 1 −1 −1 1j −1 1 1 −1 1 −1j 1 −1 −1 1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 1 −1 1 −1j 1 1 1 −1 −1 1j −1 −1 −1 1 1−1j 1 1 1 −1 1 −1j 1 1 1 −1 −1 1j −1 1 1 −1 −1 1j −1 1 1 −1 −1 1j −1 1 1 −1 1 −1j 1 −1 −1 1 −1 1j −1 −1 −1 1 1 −1j 1 1 1 −1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 1 −1j 1 1 1 −1 −1 1j −1 −1 −1 1 1 −1j 1 1 1 −1 1 −1j 1 1 1 −1 −1 1j −1 1 1 −1 −1 1j −1 1 1 −1 −1 1j −1 1 1 −1 1 −1j 1 −1 −1 1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 1 −1 1j −1 −1 −1 1 −1 1j −1 1 1 −1 1 −1 1j −1 1 1 −1 1 1 −1j 1 −1 −1 1 −1 1j −1 1 1 −1 1 −1j 1 1 1 −1 −1 1j −1 −1 −1 1 1−1j 1 1 1 −1 1 −1j 1 1 1 −1 1j −1 1 1 1 −1 −1 1j −1 1 1 −1 −1 1j −1 1 1 −1 1 −1j 1 −1 −1 1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1];

sequence (62): G_1536(6,:)=[−1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 −1 1 1 −1 −1j −1 1 −1 −1 1 1j 1 −1 1 1 −1 −1j −1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 1 −1 −1 1 1j 1 −1 1 1 −1 −1j −1 −1 1 1 −1 −1j −1 −1 1 1 −1 −1j −1 −1 1 1 −1 −1j −1 −1 1 1 1 1j 1 1 −1 −1 −1 −1j −1 −1 1 1 1 1j 1 −1 1 1 −1 −1j −1 −1 1 1 −1 −1j −1 1 −1 −1 1 1j 1 −1 1 1 −1 −1j −1 1 −1 −1 −1 −1j −1 1 −1 −1 −1 −1j −1 1 −1 −1 −1 −1j −1 −1 1 1 1 1j 1 1 −1 −1 1 1j 1 −1 1 1 −1 −1j −1 1 −1 −1 1 1j 1 1 −1 −1 1 1j 1 1 −1 −1 −1 −1j −1 1 −1 −1 −1 −1j −1 −1 1 1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 −1 1 1 −1 −1j −1 1 −1 −1 1 1j 1 1 −1 −1 1 1j 1 1 −1 −1 1 1j 1 1 −1 −1 −1 −1j −1 1 −1 −1 −1 −1j −1 −1 1 1 1 1j 1 1 −1 −1 −1 −1j −1 −1 1 1 −1 −1j −1 −1 1 1 −1 −1j −1 1 −1 −1 1 1j 1 −1 1 1 −1 −1j −1 −1 1 1 −1 −1j −1 1 −1 −1 −1 −1j −1 −1 1 1 −1 −1j −1 −1 1 1 −1 −1j −1 1 −1 −1 −1 −1j −1 −1 1 1 1 1j 1 1 −1 −1 1 1j 1 −1 1 1 −1 −1j −1 −1 1 1 1 1j 1 1 −1 −1 1 1j 1 1 −1 −1 1 1j 1 1 −1 −1 −1 −1j −1 1 −1 −1 −1 −1j −1 −1 1 1 −1 −1j −1 −1 1 1 −1 −1j −1 1 −1 −1 1 1j 1 1 −1 −1 1 1j 1 1 −1 −1 −1 −1j −1 −1 1 1 −1 −1j −1 1 −1 −1 1 1j 1 −1 1 1 1 1j 1 −1 1 1 1 1j 1 −1 1 1 1 1j 1 −1 1 1 1 1j 1 1 −1 −1 −1 −1j −1 1 −1 −1 1 1j 1 −1 1 1 −1 −1j −1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 1 −1 −1 1 1j 1 −1 1 1 −1 −1j −1 −1 1 1 −1 −1j −1 −1 1 1 1 1j 1 −1 1 1 1 1j 1 1 −1 −1 1 1j 1 −1 1 1 −1 −1j −1 1 −1 −1 1 1j 1 1 −1 −1 1 1j 1 −1 1 1 1 1j 1 −1 1 1 1 1j 1 −1 1 1 1 1j 1 1 −1 −1 −1 −1j −1 1 −1 −1 1 1j 1 −1 1 1 −1 −1j −1 −1 1 1 −1 −1j −1 −1 1 1 −1 −1j −1 −1 1 1 −1 −1j −1 −1 1 1 1 1j 1 −1 1 1 1 1j 1 1 −1 −1 −1 −1j −1 −1 1 1 1 1j 1];

sequence (63): G_1536(7,:)=[−1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 −1 1j −1 −1 −1 1 1 −1j 1 1 1 −1 1 −1j 1 1 1 −1 1 −1j 1 1 1 −1 1 −1j 1 −1 −1 1 1 −1j 1 −1 −1 1 −1 1j −1 1 1 −1 1 −1j 1 −1 −1 1 −1 1j −1 −1 −1 1 1 −1j 1 1 1 −1 −1 1j −1 −1 −1 1 −1 1j −1 −1 −1 1 1 −1j 1 −1 −1 1 1 1−1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 1 −1j 1 1 1 −1 −1 1j −1 −1 −1 1 1 −1j 1 1 1 −1 −1 1j −1 1 1 −1 1 −1j 1 1 1 −1 −1 1j −1 1 1 −1 −1 1j −1 1 1 −1 1 1−1j 1 −1 −1 1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 −1 1j −1 −1 −1 1 1 −1j 1 −1 −1 1 1 −1j 1 −1 −1 1 1 −1j 1 −1 −1 1 −1 1j −1 1 1 −1 1 −1j 1 1 1 −1 −1 1j −1 −1 −1 1 −1 1j −1 −1 −1 1 −1 1j −1 −1 −1 1 −1 1j −1 1 1 −1 −1 1j −1 1 1 −1 1 −1j 1 −1 −1 1 −1 1j −1 1 1 −1 −1 1j −1 −1 −1 1 1 −1j 1 1 1 −1 −1 1j −1 −1 −1 1 1 −1j 1 −1 −1 1 1 −1j 1 −1 −1 1 1 −1j 1 −1 −1 1 1 1 −1j 1 −1 −1 1 −1 1j −1 1 1 −1 −1 1j −1 −1 −1 1 1 −1j 1 1 1 −1 1 −1j 1 1 1 −1 1 −1j 1 1 1 −1 1 −1j 1 −1 −1 1 1 1 −1j 1 −1 −1 1 −1 1j −1 1 1 −1 1 −1j 1 −1 −1 1 −1 1j –1 –1 –1 1 1 –1j 1 1 1 –1 –1 1j –1 –1 –1 1 –1 1j –1 –1 –1 1 1 –1j 1 –1 –1 1 1 –1j 1 –1 –1 1 1 –1j 1 –1 –1 1 –1 1j –1 1 1 –1 1 –1j 1 1 1 –1 –1 1j –1 –1 –1 1 –1 1j –1 1j –1 –1 –1 1 –1 1j –1 –1 –1 1 –1 1j –1 1 1 –1 –1 1j –1 1 1 –1 1 –1j 1 –1 –1 1 –1 1j –1 1 1 –1 –1 1j –1 –1 –1 1 1 –1j 1 1 1 –1 –1 1j –1 –1 –1 1 –1 1j –1 –1 –1 1 1 –1j 1 –1 –1 1 1 –1j 1 –1 –1 1 1 –1j 1 –1 –1 1 –1 1j –1 1 1 –1 –1 1j –1 –1 –1 1 1 –1j 1 1 1 –1 1 –1j 1 1 1 –1 1 –1j 1 1 1 –1 1 –1j 1 –1 –1 1 1 –1j 1 –1 –1 1 –1 1j –1 1 1 –1 1 –1j 1 1 1 –1 –1 1j –1 –1 –1 1 1 –1j 1 1 1 –1 1 –1j 1 1 1 –1 –1 1j –1 1 1 –1 –1 1j –1 1 1 –1 –1 1j –1 1 1 –1 1 –1j 1 –1 –1 1 –1 1j –1 1 1 –1 1 –1j 1 1 1 –1 1 –1j 1 1 1 –1 1 –1j 1 –1 –1 1 1 –1j 1 –1 –1 1 1 –1j 1 –1 –1 1 –1 1j –1 1 1 –1 1 –1j 1 –1 –1 1 –1 1j –1 –1 –1 1 1 –1j 1 1 1 –1 –1 1j –1 –1 –1 1 –1 1j –1 –1 –1 1 1 –1j 1 –1 –1 1 1 –1j 1 –1 –1 1 1 –1j 1 –1 –1 1 –1 1j –1 1 1 –1 –1 1j –1 –1 –1 1 1 –1j 1 1 1 –1 1 –1j 1 1 1 –1 1 –1j 1 1 1 –1 1 –1j 1 1 1 –1 1 –1j 1 –1 –1 1 1 –1j 1 –1 –1 1 –1 1j –1 1 1 –1 1 –1j 1 –1 –1 1 –1 1j –1 –1 –1 1 1 –1j 1 1 1 –1 –1 1j –1 –1 1 –1 1j –1 –1 –1 1 1 –1j 1 –1 –1 1 1 –1j 1 –1 –1 1 1 –1j 1 –1 –1 1 –1 1j –1 1 1 –1 1 –1j 1 1 1 –1 –1 1j –1 –1 –1 1 –1 1j –1 –1 –1 1 –1 1j –1 –1 –1 1 –1 1j –1 1 1 –1 –1 1j –1 1 1 –1 1–1j 1 –1 –1 1 –1 1j –1 1 1 –1 1 –1j 1 1 1 –1 –1 1j –1 –1 –1 1 1 –1j 1 1 1 –1 1 –1j 1 1 1 –1 –1 1j –1 1 1 –1 –1 1j –1 1 1 –1 –1 1j –1 1 1 –1 1 –1j 1 –1 –1 1 1 –1j 1 1 1 –1 –1 1j –1 –1 –1 1 –1 1j –1 –1 –1 1 –1 1j –1 –1 –1 1 –1 1j –1 1 1 –1 –1 1j –1 1 1 –1 1 –1j 1 –1 –1 1 –1 1j –1 1 1 –1 1 –1j 1 1 –1 –1 1j –1 –1 –1 1 1 –1j 1 1 1 –1 –1 1j –1 –1 –1 1 –1 1j –1 –1 –1 1 1 –1j 1 –1 –1 1 1 –1j 1 –1 –1 1 1 1–1j 1 –1 –1 1 –1 1j –1 1 1 –1 1 –1j 1 1 1 –1 –1 1j –1 –1 –1 1 –1 1j –1 –1 –1 1 –1 1j –1 –1 –1 1 –1 1j –1 1 1 –1 –1 1j –1 1 1 –1 1 –1j 1 –1 –1 1 –1 1j –1 1 1 –1 1 –1j 1 1 1 –1 –1 1j –1 –1 –1 1 1 –1j 1 1 1 –1 1 –1j 1 1 1 –1 –1 1j –1 1 1 –1 –1 1j –1 1 1 –1 –1 1j –1 1 1 –1 –1 1j –1 1 1 –1 1 –1j 1 –1 –1 1 1 1–1j 1 1 1 –1 –1 1j –1 –1 –1 1 –1 1j –1 –1 –1 1 –1 1j –1 –1 –1 1 –1 1j –1 1 1 –1 –1 1j –1 1 1 –1 1 –1j 1 –1 –1 1 –1 1j –1 1 1 –1 1 –1j 1 1 1 –1 1 –1j 1 1 1 –1 1 –1j 1 1 1 –1 1 –1j 1 1 1 –1 –1 1j –1 1 1 –1 –1 1j –1 1 1 –1 1 –1j 1 –1 –1 1 –1 1j –1 –1 –1 1 1 –1j 1 1 1 –1 1 –1j 1 1 1 –1 1 –1j 1 –1 –1 1 1 –1j 1 –1 –1 1 1 –1j 1 –1 –1 1 –1 1j –1 1 1 –1 1 –1j 1 1 1 –1 –1 1j –1 1 1 –1 –1 1j –1 1 1 –1 1–1j 1 1 1 –1 –1 1j –1 –1 –1 1 1 –1j 1 1 1 –1 1 –1j 1 1 1 –1 –1 1j –1 1 1 –1 –1 1j –1 1 1 –1 –1 1j –1 1 1 –1 1 –1j 1 –1 –1 1 1 –1j 1 1 1 –1 –1 1j –1 –1 –1 1 –1 1j –1 –1 –1 1 1 –1 1j –1 –1 –1 1 –1 1j –1 1 1 –1 –1 1j –1 1 1 –1 1 –1j 1 –1 –1 1 –1 1j –1 1 1 –1 –1 1j –1 1 1 –1 –1 1j –1 –1 –1 1 1 –1j 1 1 1 –1 –1 1j –1 –1 –1 1 –1 1j –1 –1 –1 1 –1 1j –1 –1 –1 1 1 –1j 1 –1 –1 1 1 –1j 1 –1 –1 1 1 –1j 1 –1 –1 1 –1 1j –1 1 1 –1 1–1j 1 1 1 –1 –1 1j –1 –1 –1 1 –1 1j –1 –1 –1 1 –1 1j –1 –1 –1 1 –1 1j –1 1 1 –1 –1 1j –1 1 1 –1 1 –1j 1 –1 –1 1 –1 1j –1 1 1 –1];

sequence (64): G_1536(8,:)=[–1 1 1 –1 –1j –1 1 –1 –1 1 1j 1 –1 1 1 –1 –1j –1 –1 1 1 –1 –1j –1 1 –1 –1 –1 –1j –1 1 –1 –1 –1 –1j –1 1 –1 –1 –1 –1j –1 –1 1 1 1 1j 1 –1 1 1 –1 –1j –1 1 –1 –1 1 1j 1 1 –1 –1 1 1j 1 1 –1 –1 1 1j 1 1 –1 –1 –1 –1j –1 1 –1 –1 –1 –1j –1 –1 1 1 1 1j 1 1 –1 –1 –1 –1j –1 –1 1 1 –1 –1j –1 1 –1 –1 1 1j 1 –1 1 1 –1 –1j –1 –1 1 1 –1 –1j –1 1 –1 –1 –1 –1j –1 1 –1 –1 –1 –1j –1 1 –1 –1 –1 –1j –1 –1 1 1 1 1j 1 1 –1 –1 1 1j 1 –1 1 1 –1 –1j –1 –1 1 1 –1 –1j –1 –1 1 1 –1 –1j –1 –1 1 1 1 1j 1 –1 1 1 1 1j 1 1 –1 –1 –1 –1j –1 –1 1 1 1 1j 1 1 –1 –1 1 1j 1 –1 1 1 –1 –1j –1 1 –1 –1 1 1j 1 1 –1 –1 1 1j 1 –1 1 1 1 1j 1 –1 1 1 1 1j 1 –1 1 1 1 1j 1 1 –1 –1 –1 –1j –1 1 –1 –1 1 1j 1 –1 1 1 –1 1 1 –1 –1j –1 –1 1 1 –1 –1j –1 –1 1 1 –1 –1j –1 –1 1 1 1 1j 1 1 –1 –1 1 1j 1 –1 1 1 1 1j 1 1 –1 –1 –1 –1j –1 –1 1 1 1 1j 1 –1 1 1 –1 –1j –1 1 –1 –1 1 1j 1 –1 1 1 –1 –1j –1 –1 1 1 –1 –1j –1 1 1 –1 –1j –1 1 –1 –1 –1 –1j –1 1 –1 –1 –1 –1j –1 1 –1 –1 –1 –1j –1 1 –1 –1 1 1j 1 –1 1 1 –1 –1j –1 –1 1 1 1 1j 1 –1 1 1 –1 –1j –1 –1 1 1 –1 –1j –1 –1 1 1 1 1j 1 1 –1 –1 –1 –1j –1 –1 1 1 –1 –1j –1 1 –1 –1 1 1j 1 –1 1 1 –1 –1j –1 1 –1 –1 –1 –1j –1 1 –1 –1 –1 –1j –1 1 –1 –1 –1 –1j –1 1 –1 –1 1 1j 1 1 –1 –1 1 1j 1 1 –1 –1 1 1j 1 1 –1 –1 1 1j 1 1 –1 –1 –1 –1j –1 1 –1 –1 1 1j 1 1 –1 –1 –1 –1j –1 1 –1 –1 –1 –1j –1 1 –1 –1 –1 –1j –1 1 –1 –1 –1 –1j –1 1 –1 –1 1 1j 1 1 –1 –1 1 1j 1 1 –1 –1 1 1j 1 1 –1 –1 –1 –1j –1 1 –1 –1 –1 –1j –1 –1 1 1 1 1j 1 –1 1 1 –1 –1j –1 1 –1 –1 1 1j 1 1 –1 –1 1 1j 1 1 –1 –1 –1 –1j –1 1 –1 –1 –1 –1j –1 1 –1 –1 –1 –1j –1 1 –1 –1 1 1j 1 1 –1 –1 1 1j 1 1 –1 –1 –1 –1j –1 1 –1 –1 –1 –1j –1 –1 1 1 1 1j 1 –1 1 1 –1 –1j –1 1 –1 –1 1 1j 1 1 –1 –1 1 1j 1 1 –1 –1 –1 –1j –1 1 –1 –1 –1 –1j –1 1 –1 –1 –1 –1j –1 1 –1 –1 1 1j 1 1 –1 –1 1 1j 1 1 –1 –1 –1 –1j –1 1 –1 –1 –1 –1j –1 1 –1 –1 –1 –1j –1 1 –1 –1 –1 –1j –1 –1 1 1 1 1j 1 –1 1 1 –1 –1j –1 1 –1 –1 1 1j 1 1 –1 –1 1 1j 1 1 –1 –1 –1 –1j –1 1 –1 –1 –1 –1j –1 1 –1 –1 –1 –1j –1 1 –1 –1 1 1j 1 1 –1 –1 –1 –1j –1 1 –1 –1 –1 –1j –1 –1 1 1 1 1j 1 1 –1 –1 1 1j 1 –1 1 1 –1 –1j –1 1 –1 –1 1 1j 1 –1 1 1 1 1j 1 –1 1 1 1 1j 1 1 –1 –1 –1 –1j –1 1 –1 –1 1 1j 1 –1 1 1 –1 –1j –1 –1 1 1 –1 –1j –1 –1 1 1 –1 –1j –1 –1 1 1 1 1j 1 1 –1 –1 1 1j 1 –1 1 1 1 1j 1 –1 1 1 1 1j 1 1 –1 –1 –1 –1j –1 1 –1 –1 1 1j 1 1 –1 –1 –1 –1j –1 –1 1 1 1 1j 1 1 –1 –1 –1 –1j –1 1 –1 –1 1 1j 1 –1 1 1 –1 –1j –1 –1 1 1 –1 –1j –1 –1 1 1 –1 –1j –1 –1 1 1 1 1j 1 –1 1 1 1 1j 1 1 –1 –1 –1 –1j –1 1 –1 –1 –1 –1j –1 –1 1 1 –1 –1j –1 1 –1 –1 1 1j 1 1 –1 –1 –1 –1j –1 –1 1 1 1 1j 1 1 –1 –1 1 1j 1 –1 1 1 –1 –1j –1 1 –1 –1 –1 –1j –1 –1 1 1 1 1j 1 –1 1 1 –1 –1j –1 1 –1 –1 1 1j 1 –1 1 1 1 1j 1 1 –1 –1 –1 –1j –1 1 –1 –1 –1 –1j –1 –1 1 1 1 1j 1 1 –1 –1 1 1j 1 –1 1 1 1 1j 1 –1 1 1 1 1j 1 1 –1 –1 –1 –1j –1 –1 1 1 1 1j 1];

sequence (65): G_1536(1,:)=[1 1 1 −1 −1 −1 1 −1 1 1 1 −1 1 1 −1 1 1 −1 1 1 1 1 −1 1 1 1 1 1 −1 1 −1 −1 −1 1 −1 −1 1 −1 −1 −1 −1 1 1 1 −1 1 1 1 1 −1 1 1 −1 1 1 1 1 1 −1 −1 −1 1 −1 1 1 1 −1 1 1 −1 1 −1 −1 −1 1 1 1 1 −1 1 1 1 1 −1 1 1 −1 1 −1 1 1 −1 1 1 1 1 −1 1 1 1 1 1 −1 −1 −1 1 −1 1 1 1 −1 1 1 −1 1 1 1 1 −1 −1 −1 1 1 −1 −1 −1 −1 1 −1 −1 1 −1 −1 −1 −1 1 1 1 −1 1 −1 −1 −1 −1 1 −1 −1 1 −1 1 −1 1 −1 −1 −1 1 −1 −1 −1 −1 1 1 −1 −1 −1 −1 1 −1 −1 1 −1 1 1 1 −1 −1 −1 1 −1 1 1 1 −1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 1 −1 1 1 1 1 −1 1 1 −1 1 1 1 1 −1 −1 −1 1 −1 −1 1 −1 −1 −1 −1 1 1 1 1 1 −1 1 1 1 1 1 −1 −1 −1 1 −1 −1 1 −1 −1 −1 −1 1 1 1 −1 1 −1 −1 −1 1 −1 −1 1 −1 −1 1 −1 −1 1 −1 1 −1 −1 −1 −1 −1 −1 −1 1 −1 1 1 1 1 −1 1 1 −1 1 1 1 1 −1 −1 −1 1 1 −1 −1 −1 −1 1 −1 −1 1 −1 −1 −1 −1 1 1 1 −1 1 −1 −1 −1 1 −1 −1 1 −1 1 1 1 −1 −1 −1 1 −1 −1 −1 −1 1 −1 −1 1 −1 1 1 −1 −1 1 −1 −1 −1 −1 1 −1 −1 −1 −1 1 1 1 1 −1 1 −1 −1 1 −1 1 −1 −1 −1 −1 1 1 1 1 −1 1 1 1 1 −1 1 1 −1 1 −1 −1 −1 1 1 1 −1 1 −1 −1 −1 1 −1 −1 1 −1 1 1 −1 1 −1 −1 1 −1 −1 −1 −1 1 −1 −1 −1 −1 1 −1 −1 1 −1 1 −1 1 1 1 1 −1 −1 −1 1 −1 1 1 1 1 −1 1 1 −1 1 1 1 1 1 −1 −1 −1 1 1 −1 1 −1 −1 −1 −1 1 −1 −1 1 −1 −1 1 1 1 1 −1 −1 −1 1 1 −1 1 1 1 −1 1 1 1 −1 1 −1 −1 −1 1 1 1 1 −1 1 1 1 1 −1 1 1 −1 −1 1 1 −1 1 1 1 1 1 −1 1 1 1 1 −1 1 1 −1 1 −1 −1 −1 −1 1 1 1 1 −1 1 1 −1 −1 −1 1 −1 −1 1 1 −1 1 1 1 −1 −1 −1 1 −1 −1 1 1 1 −1 1 1 1 −1 1 1 1 1 1 −1 −1 −1 1 −1 1 −1 −1 1 −1 1 −1 1 −1 −1 1 1 1 1 1 −1 1 −1 1 1 1 1 1 −1 −1 1 1 1 −1 1 −1 −1 −1 1 1 1 −1 1 1 −1 −1 1 1 −1 1 1 1 1 −1 1 1 1 1 1 −1 1 1 1 1 1 −1 1 −1 −1 −1 1 1 −1 1 −1 −1 −1 −1 1 −1 −1 1 −1 −1 −1 −1 1 1 1 −1 1 1 1 1 −1 1 1 1 −1 1 1 1 1 1 −1 −1 −1 −1 1 −1 1 1 −1 1 1 1 1 −1 1 1 −1 −1 −1 1 1 1 1 −1 1 1 1 −1 1 1 −1 −1 1 1 −1 1 1 1 1 1 −1 1 1 1 1 1 −1 −1 −1 1 −1 1 1 1 1 −1 1 1 1 −1 1 1 1 1 1 −1 −1 −1 1 1 −1 1 −1 −1 −1 1 −1 −1 1 −1 1 −1 1 −1 1 1 1 −1 1 1 −1 −1 −1 1 −1 1 1 1 −1 1 1 1 −1 1 1 −1 1 −1 1 1 1 1 −1 1 1 1 1 1 −1 1 1 1 1 1 −1 1 1 1 −1 1 1 −1 1 −1 −1 1 1 1 1 −1 1 1 −1 −1 −1 1 1 −1 −1 1 1 −1 1 −1 −1 −1 −1 1 1 1 1 −1 1 1 1 1 1 −1 1 1 1 −1 1 1 −1 1 −1 −1 −1 1 1 1 1 −1 1 1 −1 −1 −1 1 1 1 1 1 −1 −1 −1 −1 1 1 −1 1 −1 −1 −1 −1 1 1 −1 −1 −1 1 −1 1 1 −1 1 1 −1 −1 −1 −1 1 1 1 1 −1 1 1 −1 −1 −1 1 1 −1 −1 −1 1 1 −1 1 1 −1 −1 −1 1 −1 −1 1 −1 1 1 −1 1 −1 −1 −1 1 1 −1 −1 1 1 1 1 −1 1 1 1 −1 1 1 −1 1 1 1 1 −1 1 1 −1 −1 −1 1 −1 −1 1 −1 1 −1 −1 −1 1 −1 −1 −1 −1 −1 −1 −1 −1 1 1 1 −1 1 1 1 −1 1 1 1 1 1 −1 −1 −1 1 1 −1 1 −1 −1 −1 −1 1 1 −1 1 −1 −1 −1 −1 1 1 1 1 −1 1 1 −1 −1 −1 1 1 −1 −1 −1 1 −1 −1 1 −1 −1 1 −1 −1 1 −1 −1 1 1 1 −1 −1 −1 1 −1 −1 −1 −1 1 −1 −1 −1 −1 1 1 1 1 −1 1 1 −1 −1 −1 1 1 −1 −1 1 −1 −1 −1 −1 1 1 1 1 −1 1 1 1 1 1 −1 1 1 1 −1 1 1 1 1 −1 1 1 −1 1 −1 −1 1 1 1 1 −1 1 1 1 −1 1 1 −1 1 −1 −1 −1 1 1 1 −1 −1 −1 −1 1 −1 1 1 1 1 −1 1 1 1 −1 1 1 −1 −1 −1 1 1 −1 1 −1 −1 −1 −1 1 1 −1 −1 −1 1 −1 1 −1 1 1 1 1 −1 1 1 1 1 1 −1 −1 −1 −1 1 −1 −1 −1 −1 −1 1 −1 1 −1 −1 1 −1 1 1 1 1 −1 1 −1 −1 1 −1 1 1 1 1 −1 −1 1 −1 1 1 1 1 −1 −1 −1 1 −1 −1 −1 1 1 −1 1 1 −1 −1 −1 1 −1 −1 −1 −1 1 1 −1 1 −1 −1 1 −1 −1 −1 1 −1 −1 −1 −1 1 1 −1 1 1 −1 −1 −1 1 −1 1 1 1 −1 1 1 −1 1 1 −1 −1 1 −1 −1 −1 −1 1 1 −1 1 −1 −1 −1 −1 1 1 1 −1 1 1 1 −1 1 1 −1 1 −1 −1 −1 1 1 1 −1 1 −1 −1 1 1 −1 1 1 −1 −1 −1 −1 1 −1 −1 −1 1 −1 1 −1 −1 −1 1 1 1 1 −1 1 −1 1 1 1 1 1 −1 1 1 1 −1 1 1 −1 −1 1 1 1 1 −1 1 1 −1 −1 −1 1 1 1 −1 −1 1 1 −1 1 −1 1 1 1 1 −1 −1 −1 1 −1 1 1 1 −1 1 −1 −1 −1 1 1 −1 1 −1 −1 1 1 −1 −1 1 1 −1 1 −1 −1 1 −1 1 1 1 1 −1 −1 −1 1 1 −1 −1 −1 −1 1 −1 −1 1 −1 1 −1 −1 −1 1 1 −1 1 −1 1 1 1 −1 1 1 1 −1 1 1 1 1 1 −1 −1 −1 −1 1 1 −1 −1 −1 −1 1 −1 −1 1 −1 −1 1 1 1 1 −1 1 −1 −1 −1 −1 −1 −1 1 1 −1 −1 −1 −1 1 −1 −1 1 1 1 1 −1 −1 −1 1 1 −1 −1 −1 1 1 −1 −1 −1 −1 1 −1 −1 1 −1 1 1 1 1 −1 −1 −1 1 −1 −1 −1 −1 1

1 −1 −1 1 −1 1 −1 −1 1 −1 −1 −1 −1 1 −1 −1 −1 −1 1 1 1 1 −1 1 −1 −1 −1 1 1 −1 −1 1 −1 −1 −1 −1 1 1 1 1 −1 1 1 1 1 1 −1 1 1 −1 1 −1 −1 −1 1 1 1 −1 1 1 −1 1 −1 −1 −1 1 1 −1 −1 1 1 −1 1 1 −1 1 −1 −1 −1 1 −1 −1 −1 −1 1 1 −1 −1 −1 −1 1 −1 −1 1 −1 1 1 1 −1 −1 −1 1 −1 1 1 1 1 −1 1 1 1 −1 1 1 1 1 1 −1 −1 −1 1 −1 −1 −1 1 −1 −1 1 −1 1 1 −1 1 −1 −1 1 1 1 1 −1 −1 1 1 −1 1 1 1 1 −1 1 1 1 −1 −1 1 1 −1 1 1 1 1 1 −1 −1 −1 1 −1 1 1 1 1 −1 1 1 1 −1 1 1 1 1 −1 1 1 1 1 −1];

sequence (66): G_1536(2,:)=[1 −1 1 1 −1 1 1 1 1 −1 1 1 1 −1 −1 −1 −1 1 −1 −1 −1 1 −1 1 1 −1 1 1 1 −1 −1 −1 −1 1 −1 −1 1 −1 −1 −1 −1 1 1 −1 −1 −1 1 1 1 1 −1 1 1 −1 −1 1 −1 −1 −1 1 −−1 1 1 1 −1 −1 −1 1 −1 1 1 −1 1 1 1 1 −1 1 1 1 1 −1 −1 −1 −1 1 −1 −1 1 −1 −1 −1 1 −1 1 1 1 −1 −1 −1 1 −1 1 1 −1 1 1 1 1 1 −1 1 1 1 1 −1 −1 −1 1 −1 1 1 −1 1 1 1 −1 1 −1 −1 −1 1 1 1 1 −1 1 −1 −1 1 1 −1 −1 −1 −1 1 −1 −1 −1 1 1 1 1 −1 1 1 −1 1 1 1 1 −1 1 1 −1 −1 −1 1 1 1 1 −1 1 1 −1 1 1 1 1 −1 1 1 1 1 −1 −1 −1 1 −1 1 1 −1 1 1 1 1 −1 1 −1 −1 −1 1 1 1 1 −1 1 −1 −1 1 1 1 1 −1 1 1 1 1 −1 −1 −1 −1 1 −1 −1 1 −1 −1 1 −1 −1 −1 1 −1 1 1 1 −1 −1 −1 1 −1 1 1 1 −1 1 1 1 1 1 −1 1 1 1 1 −1 −1 −1 1 −1 1 1 −1 1 1 1 1 −1 1 −1 −1 −1 1 1 1 1 −1 1 −1 −1 1 1 −1 −1 −1 −1 1 −1 −1 −1 1 1 1 1 −1 1 1 −1 1 1 1 1 −1 1 1 −1 −1 −1 1 1 1 1 −1 1 1 −1 1 1 1 1 −1 1 1 1 1 −1 −1 −1 1 −1 1 1 −1 1 1 1 1 −1 1 −1 −1 −1 1 1 1 1 −1 1 −1 −1 1 1 −1 −1 −1 −1 1 −1 −1 −1 1 1 1 1 −1 1 1 −1 1 1 1 1 −1 1 1 −1 −1 −1 1 1 1 1 −1 1 −1 −1 −1 −1 −1 1 1 −1 −1 1 1 1 1 −1 −1 −1 1 −1 1 −1 −1 −1 1 −1 1 −1 −1 1 −1 −1 −1 1 1 1 1 −1 1 1 −1 −1 1 −1 −1 −1 1 1 −1 −1 1 1 1 1 1 −1 1 1 1 −1 1 1 1 −1 −1 −1 −1 1 1 1 1 1 −1 1 1 1 −1 1 1 1 1 1 −1 1 1 1 −1 −1 −1 −1 1 1 1 1 1 −1 1 −1 −1 −1 1 1 1 1 1 −1 1 1 1 −1 1 1 1 1 −1 −1 −1 −1 1 −1 −1 1 1 −1 −1 1 −1 1 1 1 1 −1 −1 −1 −1 1 1 1 −1 −1 1 1 −1 1 1 1 1 −1 1 1 1 1 1 −1 1 1 1 1 −1 −1 −1 1 1 −1 1 1 −1 −1 1 −1 1 1 1 −1 1 1 1 1 −1 1 1 −1 −1 −1 1 1 1 −1 1 1 1 1 1 −1 1 1 1 1 −1 −1 −1 −1 1 1 −1 1 −1 −1 1 1 1 1 −1 1 −1 −1 −1 1 1 −1 −1 1 −1 −1 1 −1 −1 1 1 −1 −1 −1 1 −1 −1 1 1 1 1 −1 1 −1 −1 1 1 −1 −1 −1 −1 1 −1 −1 1 1 −1 −1 1 −1 1 −1 −1 1 1 −1 −1 −1 −1 1 −1 1 1 1 1 −1 1 1 −1 −1 −1 1 1 1 −1 1 1 1 1 −1 1 1 −1 1 1 −1 −1 1 1 1 1 −1 −1 −1 1 −1 −1 −1 1 −1 −1 −1 1 1 1 1 1 −1 1 1 1 −1 1 1 1 1 −1 1 1 −1 1 1 −1 −1 −1 1 1 1 1 −1 1 −1 −1 1 −1 1 1 1 −1 −1 −1 −1 1 −1 1 1 1 −1 1 −1 −1 −1 1 −1 1 1 −1 −1 −1 1 1 1 1 −1 1 1 1 −1 1 1 1 −1 1 1 −1 −1 −1 −1 1 1 1 −1 1 1 −1 −1 1 −1 1 1 −1 −1 −1 −1 1 −1 −1 −1 1 1 1 1 1 −1 1 1 1 −1 1 1 1 1 −1 1 1 −1 −1 −1 −1 1 1 −1 −1 −1 −1 1 −1 −1 1 1 −1 −1 1 −1 −1 −1 1 1 1 1 −1 1 −1 −1 1 1 −1 1 1 1 1 −1 1 1 −1 1 −1 −1 −1 1 1 −1 1 1 −1 −1 1 −1 1 1 1 1 −1 −1 −1 1 −1 −1 1 −1 −1 −1 1 1 1 1 1 −1 1 1 1 −1 1 1 1 1 −1 1 1 −1 −1 −1 −1 1 1 −1 −1 1 −1 −1 −1 1 1 −1 −1 1 −1 −1 1 1 1 1 −1 1 1 −1 1 −1 1 1 1 −1 −1 −1 1 1 −1 1 −1 1 −1 −1 −1 1 1 −1 −1 −1 1 1 −1 1 −1 −1 −1 1 1 −1 −1 −1 −1 1 1 −1 1 1 1 1 −1 1 1 1 −1 −1 1 1 −1 1 1 1 1 −1 1 1 −1 −1 −1 −1 1 1 −1 1 1 1 −1 −1 −1 1 −1 −1 1 −1 1 1 −1 1 −1 −1 −1 1 1 −1 1 −1 −1 1 1 1 1 −1 1 1 1 1 −1 1 1 −1 −1 −1 1 1 −1 1 −1 −1 1 1 1 1 −1 1 1 1 −1 1 1 1 1 1 −1 −1 −1 1 1 1 −1 1 −1 −1 1 1 1 1 1 −1 1 1 1 −1 1 1 1 1 1 −1 −1 1 1 1 1 −1 1 1 1 −1 1 1 1 1 −1 1 −1 −1 −1 1 −1 1 1 1 −1 1 −1 −1 −1 −1 −1 1 1 −1 −1 −1 −1 1 1 1 1 −1 1 1 −1 −1 1 −1 1 1 1 1 1 −1 1 1 1 −1 1 1 1 1 −1 1 1 −1 −1 −1 1 1 1 1 −1 1 1 −1 −1 1 −1 −1 −1 −1 1 1 −1 −1 −1 1 −1 −1 −1 1 1 1 1 −1 1 1 −1 −1 1 −1 −1 −1 1 −1 −1 1 −1 1 1 1 1 −1 −1 −1 1 −1 −1 1 −1 1 1 −1 −1 −1 1 −1 1 −1 −1 −1 1 −1 1 −1 −1 −1 1 1 1 1 1 −1 1 1 1 −1 1 1 1 1 −1 1 1 −1 −1 −1

1 1 1 1 −1 1 1 −1 1 1 1 1 −1 1 1 1 −1 −1 −1 1 −1 1 1 −1 1 1 1 −1 1 −1 −1 −1 1 1 1 1 −1 1 1 −1 1 1 1 1 −1 1 1 1 −1 −1 −1 −1 1 −1 −1 1 −1 −1 −1 1 −1 1 1 1 −1 −1 −1 1 −1 1 1 −1 1 1 1 1 −1 1 1 1 −1 −1 −1 1 −1 1 1 −1 1 1 1 −1 1 −1 −1 −1 1 1 1 −1 1 −1 −1 1 −1 −1 −1 −1 1 1 1 1 −1 1 1 −1 1 1 1 −1 1 −1 −1 −1 1 1 1 1 −1 1 1 −1 1 1 1 1 −1 1 1 1 −1 −1 −1 1 −1 1 1 −1 1 1 1 −1 1 −1 −1 −1 1 1 1 −1 1 −1 −1 1 −1 −1 −1 −1 1 −1 1 −1 −1 −1 1 1 1 1 −1 1 1 −1 1 1 1 −1 1 −1 −1 −1 1 1 1 −1 1 −1 −1 1 −1 −1 −1 −1 1 −1 −1 −1 1 1 1 −1 1 −1 −1 1 −1 −1 −1 1 −1 1 1 1 −1 −1 −1 −1 1 −1 −1 1 −1 −1 −1 −1 1 −1 −1 −1 1 1 1 1 −1 1 1 −1 1 1 1 −1 1 −1 −1 −1 1 1 1 1 −1 1 1 −1 1 1 1 1 −1 1 1 1 −1 −1 −1 −1 1 −1 1 1 −1 1 1 1 −1 1 −1 −1 −1 1 1 1 1 −1 1 1 1 −1 1 1 1 −1 −1 −1 −1 1 −1 −1 1 −1 −1 −1 1 −1 1 1 1 −1 −1 −1 1 −1 1 1 −1 1 1 1 1 −1 1 1 1 −1 −1 −1 1 −1 1 1 −1 1 1 1 −1 1 −1 −1 −1 1 1 1];

sequence (67): G_1536(3,:)=[1 1 1 −1 −1 −1 1 −1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 1 −1 1 1 −1 1 1 1 1 −1 −1 −1 1 −1 1 1 1 −1 1 −1 1 1 1 −1 1 1 −1 1 1 1 1 −1 −1 −1 1 −1 −1 −1 −1 1 −1 −1 1 −1 1 −1 1 1 −1 1 1 1 1 −1 1 1 1 1 −1 −1 −1 −1 1 −1 −1 1 −1 −1 −1 1 −1 1 1 1 −1 −1 −1 −1 −1 1 −1 −1 1 −1 −1 −1 −1 1 −1 −1 −1 1 1 1 −1 1 −1 −1 1 −1 −1 −1 1 −1 1 1 1 −1 −1 −1 −1 1 −1 −1 1 −1 −1 −1 −1 1 −1 −1 −1 1 1 1 1 −1 1 1 −1 1 1 1 −1 1 −1 −1 −1 1 1 1 −1 1 −1 −1 1 −1 −1 −1 −1 1 −1 −1 −1 1 1 1 −1 1 −1 −1 1 −1 −1 −1 1 −1 1 1 −1 1 1 −1 −1 −1 −1 −1 −1 −1 1 −1 −1 −1 1 −1 −1 1 −1 1 1 1 −1 −1 −1 1 −1 −1 −1 −1 1 −1 −1 1 −1 1 1 1 −1 −1 −1 1 −1 1 1 1 −1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 −1 1 1 1 1 −1 1 1 −1 1 1 1 1 −1 −1 −1 1 −1 1 1 1 −1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 1 −1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 −1 −1 −1 1 1 1 −1 1 −1 1 −1 −1 −1 1 1 1 −1 1 1 1 1 −1 1 1 −1 1 1 1 1 −1 −1 −1 1 −1 1 1 −1 1 1 1 1 −1 1 1 1 −1 −1 −1 −1 1 −1 1 1 −1 1 1 1 −1 1 −1 −1 −1 1 1 1 −1 1 −1 −1 1 −1 −1 −1 −1 1 1 1 1 −1 1 1 −1 1 1 1 1 −1 −1 −1 1 −1 1 1 1 −1 1 1 −1 1 1 1 1 −1 1 −1 −1 −1 −1 1 −1 −1 1 −1 −1 −1 1 −1 1 1 1 −1 −1 −1 1 −1 1 1 −1 1 −1 −1 −1 −1 −1 1 1 1 −1 1 1 1 −1 −1 1 −1 −1 1 −1 −1 −1 −1 1 −1 −1 −1 1 1 1 −1 1 −1 1 1 1 −1 1 1 −1 1 1 1 1 −1 −1 −1 1 −1 −1 −1 −1 1 1 1 −1 1 −1 −1 1 −1 1 1 1 −1 1 1 −1 −1 −1 1 −1 −1 1 −1 −1 −1 1 −1 −1 −1 1 1 1 −1 1 1 −1 1 1 1 −1 −1 −1 1 −1 1 1 1 −1 1 1 −1 1 1 −1 −1 1 1 1 −1 1 −1 −1 −1 1 1 −1 1 1 1 −1 1 1 1 −1 1 1 1 1 −1 1 1 −1 1 1 1 1 −1 1 1 1 −1 −1 −1 1 −1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 1 −1 1 1 −1 1 1 1 1 1 −1 −1 −1 1 −1 1 1 1 −1 1 1 −1 1 1 1 1 −1 −1 −1 1 −1 −1 −1 1 −1 −1 1 −1];

sequence (68): G_1536(4,:)=[1 −1 1 1 −1 1 1 1 1 −1 1 1 1 −1 −1 −1 −1 1 −1 1 −1 −1 −1 1 −1 1 1 −1 1 1 1 −1 −1 −1 −1 1 −1 −1 1 −1 −1 −1 1 −1 1 1 1 −1 −1 −1 1 −1 1 1 −1 1 −1 −1 −1 1 −−1 1 1 1 −1 −1 −1 −1 1 1 −1 1 −1 −1 1 −1 −1 −1 −1 1 −1 −1 −1 1 1 1 1 −1 1 1 −1 1 1 1 1 −1 1 1 −1 −1 −1 1 1 1 −1 1 1 −1 1 1 −1 1 −1 −1 −1 −1 1 −1 −1 1 1 1 −1 1 −1 −1 1 −1 −1 1 1 −1 1 1 1 1 −1 −1 −1 1 −1 1 1 −1 1 1 −1 1 1 1 1 −1 1 1 1 1 −1 −1 −1 1 −1 −1 1 −1 −1 −1 1 −1 1 1 −1 1 1 1 1 −1 −1 −1 1 −1 1 1 1 −1 1 −1 −1 −1 −1 1 −1 −1 1 −1 −1 −1 −1 1 −1 1 1 1 −1 1 −1 −1 −1 1 1 1 −1 1 1 1 1 −1 1 1 1 −1 −1 −1 −1 1 −1 1 −1 1 −1 −1 1 −1 1 1 −1 1 1 1 −1 −1 −1 −1 1 1 1 1 −1 1 1 −1 1 −1 −1 −1 1 1 1 1 1 −1 1 1 −1 1 1 1 1 −1 1 −1 −1 −1 1 −1 1 1 1 −1 1 1 −1 1 1 1 1 −1 1 −1 −1 −1 1 1 1 −1 1 1 1 1 −1 −1 −1 −1 1 −1 −1 1 −1 −1 −1 −1 1 −1 1 1 1 −1 1 1 1 1 −1 1 1 −1 1 1 1 1 −1 1 −1 −1 −1 −1 1 −1 −1 1 −1 −1 −1 1 −1 1 1 1 −1 −1 −1 1 −1 −1 1 −1 −1 1 −1 1 −1 −1 −1 −1 1 −1 −1 1 −1 −1 −1 1 −1 1 1 1 −1 −1 −1 1 −1 1 1 −1 −1 1 −1 1 1 1 −1 1 1 −1 1 1 1 1 −1 −1 −1 1 −1 1 1 −1 1 1 1 1 −1 1 1 1 1 −1 −1 −1 1 −1 1 1 −1 1 1 1 1 −1 1 1 −1 1 1 1 1 −1 1 −1 −1 −1 1 −1 1 −1 −1 1 −1 −1 −1 1 −1 1 1 1 −1 −1 −1 1 −1 1 1 −1 −1 1 −1 −1 −1 −1 1 −1 −1 −1 1 1 1 −1 1 −1 −1 1 −1 −1 1 −1 −1 −1 1 −1 1 1 1 −1 −1 −1 −1 1 −1 −1 1 −1 1 1 1 −1 −1 −1 −1 1 −1 −1 1 −1 −1 −1 −1 1 −1 −1 −1 1 1 1 1 −1 1 1 −1 1 1 1 −1 1 −1 −1 −1 1 1 1 1 −1 1 1 −1 1 1 1 1 −1 1 1 1 −1 −1 −1 1 −1 1 1 −1 1 1 1 −1 1 −1 −1 −1 −1 1 1 1 −1 1 1 −1 −1 −1 1 −1 −1 −1 1 1 1 −1 1 1 1 1 −1 1 1 1 −1 1 −1 −1 1 −1 −1 1 1 −1 1 −1 1 −1 −1 1 −1 −1 −1 1 −1 1 −1 1 1 1 −1 1 1 1 −1 −1 −1 −1 1 1 1 −1 1 −1 −1 −1 1 1 1 1 1 −1 1 1 1 −1 1 1 1 1 1 −1 1 1 1 −1 1 −1 −1 −1 1 −1 1 1 1 −1 1 1 1 −1 1 −1 −1 −1 −1 1 1 1 1 1 −1 1 1 1 1 1 −1 1 1 1 1 −1 1 1 1 −1 −1 −1 −1 1 −1 −1 1 −1 1 −1

−1 −1 1 −1 1 1 1 −1 −1 −1 1 −1 1 1 −1 1 1 1 1 −1 1
1 1 −1 −1 −1 1 −1 1 1 −1 1 1 1 −1 1 −1 −1 −1 1 1 1
−1 1 −1 −1 1 −1 −1 −1 −1 1 −1 −1 −1 1 1 1 1 −1 1 1
−1 1 1 1 −1 1 −1 −1 −1 1 1 1 1 −1 1 1 −1 1 1 1 1 −1
1 1 1 −1 −1 −1 1 −1 1 1 −1 1 1 1 −1 1 −1 −1 −1 1 1
1 −1 1 −1 −1 1 −1 −1 −1 −1 1 −1 −1 −1 1 1 1 1 −1 1
1 −1 1 1 1 −1 1 −1 −1 −1 1 1 1 −1 1 −1 −1 1 −1 −1 −1
−1 1 −1 −1 −1 1 1 1 −1 1 −1 −1 1 −1 −1 −1 1 −1 1 1
1 −1 −1 −1 1 −1 1 1 −1 1 1 1 1 −1 1 1 1 −1 −1 −1 −1
1 −1 −1 1 −1 −1 −1 1 −1 1 1 1 −1 −1 −1 −1 1 −1 −1
1 −1 −1 −1 −1 1 −1 −1 −1 1 1 1 −1 1 −1 −1 1 −1 −1
−1 1 −1 1 1 1 −1 −1 −1 −1 1 −1 −1 1 −1 −1 −1 −1 1
−1 −1 −1 1 1 1 1 −1 1 1 −1 1 1 1 −1 1 −1 −1 −1 1 1
1 −1 1 −1 −1 1 −1 −1 −1 −1 1 −1 −1 −1 1 1 1 −1 1 −1
−1 1 −1 −1 −1 1 −1 1 1 1 −1 −1 −1 1 −1 1 1 −1 1 1 1 1
1 −1 1 1 1 −1 −1 −1 −1 1 −1 −1 1 −1 −1 −1 1 −1 1 1
1 −1 −1 −1 −1 1 −1 −1 1 −1 −1 −1 −1 1 −1 −1 −1 1 1
1 −1 1 −1 −1 1 −1 −1 −1 1 −1 1 1 1 −1 −1 −1 1 −1 1
1 −1 1 1 1 1 −1 1 1 1 −1 −1 −1 −1 1 −1 −1 1 −1 −1 −1
1 −1 1 1 1 −1 −1 −1 1 −1 1 1 −1 1 1 1 1 −1 1 1 1 −1
−1 −1 1 −1 1 1 −1 1 1 1 −1 1 −1 −1 −1 1 1 1 1 −1 1
1 −1 1 1 1 1 −1 1 1 1 −1 −1 −1 −1 1 −1 −1 1 −1 −1 −1
1 −1 1 1 1 −1 −1 −1 −1 1 −1 −1 1 −1 −1 −1 −1 1 −1
−1 −1 1 1 1 −1 1 −1 −1 1 −1 −1 −1 1 −1 1 1 1 −1 −1
−1 −1 1 −1 −1 1 −1 −1 −1 −1 1 −1 −1 −1 1 1 1 1 −1
1 1 −1 1 1 1 −1 1 −1 −1 −1 1 1 1 −1 1 −1 −1 1 −1 −1
−1 −1 1 −1 −1 −1 1 1 1 −1 1 −1 −1 1 −1 −1 −1 1 −1
1 1 1 −1 −1 −1 1 −1 1 1 −1 1 1 1 1 −1 1 1 1 −1 −1 −1
−1 1 −1 −1 1 −1 −1 −1 1 −1 1 1 1 −1 −1 −1 −1 1 −1
−1 1 −1 −1 −1 −1 1 −1 −1 −1 1 1 1 −1 1 −1 −1 1 −1
−1 −1 1 −1 1 1 1 −1 −1 −1 1 −1 1 1 −1 1 1 1 1 −1 1
1 1 −1 −1 −1 −1 1 −1 −1 1 −1 −1 −1 1 −1 1 1 1 −1 −1
−1 1 −1 1 1 −1 1 1 1 1 −1 1 1 1 −1 −1 −1 1 −1 1 1 −1
1 1 1 −1 1 −1 −1 −1 1 1 1];

sequence (69): G_1536(5,:)=[1 1 1 −1 −1 −1 1 −1 1 1 1
−1 1 1 −1 1 −1 −1 −1 1 1 1 −1 1 1 1 1 −1 1 1 −1 1 −1
−1 −1 1 1 1 −1 1 −1 −1 −1 1 −1 −1 1 −1 −1 −1 −1 1
1 1 −1 1 1 1 1 −1 1 1 −1 1 −1 −1 −1 1 1 1 −1 1 −1 −1
−1 1 −1 −1 1 −1 1 1 1 −1 −1 −1 1 −1 −1 −1 −1 1 −1
−1 1 −1 −1 −1 −1 1 1 1 −1 1 −1 −1 −1 1 −1 −1 1 −1
−1 −1 −1 1 1 1 −1 1 1 1 1 −1 1 1 −1 1 1 1 1 −1 −1 −1
1 −1 1 1 1 −1 1 1 −1 1 −1 −1 −1 1 1 1 −1 1 1 1 1 −1
1 1 −1 1 −1 −1 −1 1 1 1 −1 1 −1 −1 −1 1 −1 −1 1 −1
−1 −1 −1 1 1 1 −1 1 1 1 1 −1 1 1 −1 1 1 1 1 −1 −1 −1
1 −1 1 1 1 −1 1 1 −1 1 −1 −1 −1 1 1 1 −1 1 1 1 1 −1
1 1 −1 1 1 1 1 −1 −1 −1 1 −1 1 1 1 −1 1 1 −1 1 1 1 1
−1 −1 −1 1 −1 −1 −1 −1 1 −1 −1 1 −1 −1 −1 −1 1 1 1
−1 1 −1 −1 −1 1 −1 −1 1 −1 1 1 1 −1 −1 −1 1 −1 −1
−1 −1 1 −1 −1 1 −1 1 1 1 −1 −1 −1 1 −1 1 1 1 −1 1 1
−1 1 1 1 1 −1 −1 −1 1 −1 −1 −1 −1 1 −1 −1 1 −1 1 1
1 −1 −1 −1 1 −1 1 1 1 −1 1 1 −1 1 −1 −1 −1 1 1 1 −1
1 1 1 1 −1 1 1 −1 1 1 1 1 −1 −1 −1 1 −1 1 1 1 −1 1 1
−1 1 1 1 1 −1 −1 −1 1 −1 −1 −1 −1 1 −1 −1 1 −1 1 1
1 −1 −1 −1 1 −1 1 1 1 −1 1 1 −1 1 −1 −1 −1 1 1 1 −1
1 1 1 1 −1 1 1 −1 1 −1 −1 −1 1 1 1 −1 1 −1 −1 −1 1
−1 −1 1 −1 −1 −1 −1 1 1 1 −1 1 1 1 1 −1 1 1 −1 1 1
1 1 −1 −1 −1 1 −1 1 1 1 −1 1 1 −1 1 −1 −1 −1 1 1 1
−1 1 1 1 1 −1 1 1 −1 1 1 1 1 −1 −1 −1 1 −1 1 1 1 −1
1 1 −1 1 1 1 1 −1 −1 −1 1 −1 −1 −1 −1 1 −1 −1 1 −1
1 1 1 −1 −1 −1 1 −1 1 1 1 −1 1 1 −1 1 −1 −1 −1 1 1
1 −1 1 1 1 1 −1 1 1 −1 1 −1 −1 −1 1 1 1 −1 1 −1 −1
−1 1 −1 −1 1 −1 −1 −1 −1 1 1 1 −1 1 1 1 1 −1 1 1 −1
1 −1 −1 −1 1 1 1 −1 1 −1 −1 −1 1 −1 −1 1 −1 1 1 1 −1
−1 −1 1 −1 −1 −1 −1 1 −1 −1 1 −1 −1 −1 −1 1 1 1 −1
1 −1 −1 −1 1 −1 −1 1 −1 −1 −1 −1 1 1 1 −1 1 1 1 1 −1
1 1 −1 1 1 1 1 −1 −1 −1 1 −1 1 1 1 −1 1 1 −1 1 −1 −1
−1 1 1 1 −1 1 1 1 1 −1 1 1 −1 1 −1 −1 −1 1 1 1 −1 1
−1 −1 −1 1 −1 −1 1 −1 −1 −1 −1 1 1 1 −1 1 1 1 1 −1
1 1 −1 1 1 1 1 −1 −1 −1 1 −1 1 1 1 −1 1 1 −1 1 −1 −1
−1 1 1 1 −1 1 1 1 1 −1 1 1 −1 1 1 1 1 −1 −1 −1 1 −1
1 1 1 −1 1 1 −1 1 1 1 1 −1 −1 −1 1 −1 −1 −1 −1 1 −1
−1 1 −1 −1 −1 −1 1 1 1 −1 1 −1 −1 −1 1 −1 −1 1 −1
1 1 1 −1 −1 −1 1 −1 −1 −1 −1 1 −1 −1 1 −1 1 1 1 1 −1
−1 −1 1 −1 1 1 1 −1 1 1 −1 1 1 1 1 −1 −1 −1 1 −1 −1
−1 −1 1 −1 −1 1 −1 1 1 1 −1 −1 −1 1 −1 1 1 1 −1 1 1
−1 1 −1 −1 −1 1 1 1 −1 1 1 1 1 −1 1 1 −1 1 1 1 1 −1
−1 −1 1 −1 1 1 1 −1 1 1 −1 1 1 1 1 −1 −1 −1 1 −1 −1
−1 −1 1 −1 −1 1 −1 1 1 1 −1 −1 −1 1 −1 1 1 1 −1 1 1
−1 1 −1 −1 −1 1 1 1 −1 1 1 1 1 −1 1 1 −1 1 −1 −1 −1
1 1 1 −1 1 −1 −1 −1 1 −1 −1 1 −1 −1 −1 −1 1 1 1 1 −1
1 1 1 1 −1 1 1 −1 1 1 1 1 −1 −1 −1 1 −1 1 1 1 −1 1 1
−1 1 −1 −1 −1 1 1 1 −1 1 1 1 1 −1 1 1 −1 1 1 1 1 −1
−1 −1 1 −1 1 1 1 −1 1 1 −1 1 1 1 1 −1 −1 −1 1 −1 −1
−1 −1 1 −1 −1 1 −1 −1 −1 −1 1 1 1 −1 1 −1 −1 −1 1
−1 −1 1 −1 1 1 1 −1 −1 −1 1 −1 −1 −1 −1 1 −1 −1 1
−1 1 1 1 −1 −1 −1 1 −1 1 1 1 −1 1 1 −1 1 1 1 1 −1 −1
−1 1 −1 −1 −1 −1 1 −1 −1 1 −1 1 1 1 −1 −1 −1 1 −1
1 1 1 −1 1 1 −1 1 −1 −1 −1 1 1 1 −1 1 1 1 1 −1 1 1 −1
1 1 1 1 −1 −1 −1 1 −1 1 1 1 −1 1 1 −1 1 1 1 1 −1 −1
−1 1 −1 −1 −1 −1 1 −1 −1 1 −1 −1 −1 −1 1 1 1 1 −1 1
−1 −1 −1 1 −1 −1 1 −1 1 1 1 −1 −1 −1 1 −1 −1 −1 −1
1 −1 −1 1 −1 1 1 1 −1 −1 −1 1 −1 1 1 1 −1 1 1 −1 1
1 1 1 −1 −1 −1 1 −1 −1 −1 −1 1 −1 −1 1 −1 −1 −1 −1
1 1 1 −1 1 −1 −1 −1 1 −1 −1 1 −1 1 1 1 −1 −1 −1 1 −1
−1 −1 −1 1 −1 −1 1 −1 −1 −1 −1 1 1 1 −1 1 −1 −1 −1
1 −1 −1 1 −1 −1 −1 −1 1 1 1 −1 1 1 1 1 −1 1 1 −1 1
−1 −1 −1 1 1 1 −1 1 −1 −1 −1 1 −1 −1 1 −1 1 1 1 −1
−1 −1 1 −1 −1 −1 −1 1 −1 −1 1 −1 1 1 1 −1 −1 −1 1
−1 1 1 1 −1 1 1 −1 1 1 1 1 −1 −1 −1 1 −1 −1 −1 −1 1
−1 −1 1 −1 1 1 1 −1 −1 −1 1 −1 1 1 1 −1 1 1 −1 1 −1
−1 −1 1 1 1 −1 1 1 1 1 −1 1 1 −1 1 1 1 1 −1 −1 −1 1
−1 1 1 1 −1 1 1 −1 1 1 1 1 −1 −1 −1 1 −1 −1 −1 −1 1
−1 −1 1 −1 −1 −1 −1 1 1 1 −1 1 −1 −1 −1 1 −1 −1 1
−1 1 1 1 −1 −1 −1 1 −1 −1 −1 −1 1 −1 −1 1 −1 1 1 1 1
−1 −1 −1 1 −1 1 1 1 −1 1 1 −1 1 1 1 1 −1 −1 −1 1 −1
−1 −1 −1 1 −1 −1 1 −1 −1 −1 −1 1 1 1 −1 1 −1 −1 −1
1 −1 −1 1 −1 1 1 1 −1 −1 −1 1 −1 −1 −1 −1 1 −1 −1
1 −1 −1 −1 −1 1 1 1 −1 1 −1 −1 −1 1 −1 −1 1 −1 −1
−1 −1 1 1 1 −1 1 1 1 1 −1 1 1 −1 1];

sequence (70): G_1536(6,:)=[1 −1 1 1 −1 1 1 1 1 −1 1 1
1 −1 −1 −1 −1 1 −1 −1 1 1 −1 1 1 1 −1 −1 −1 −1 1 −1
−1 1 −1 −1 −1 −1 1 −1 −1 −1 1 1 1 −1 1 −1 −1 1 −1
−1 −1 1 −1 −1 −1 −1 1 1 1 −1 −1 −1 −1 1 −1 −1 1 −1
−1 −1 −1 1 −1 −1 −1 1 1 1 1 −1 1 1 −1 1 1 1 −1 1 −1
−1 −1 1 1 1 −1 1 −1 −1 1 −1 −1 −1 −1 1 −1 −1 −1 1
1 1 −1 1 −1 −1 1 −1 −1 −1 1 −1 1 1 1 −1 −1 −1 1 −1
1 1 −1 1 1 1 1 −1 1 1 1 −1 −1 −1 −1 1 −1 −1 1 −1 −1
−1 1 −1 1 1 1 −1 −1 −1 −1 1 −1 −1 1 −1 −1 −1 −1 1
−1 −1 −1 1 1 1 −1 1 −1 −1 1 −1 −1 −1 1 −1 1 1 1 −1
−1 −1 1 −1 1 1 −1 1 1 1 1 −1 1 1 1 −1 −1 −1 −1 1 −1
−1 1 −1 −1 −1 1 −1 1 1 1 −1 −1 −1 1 −1 1 1 −1 1 1 1
1 −1 1 1 1 −1 −1 −1 1 −1 1 1 −1 1 1 1 −1 1 −1 −1 −1
1 1 1 −1 1 −1 −1 1 −1 −1 −1 −1 1 −1 −1 −1 1 1 1 1 −1
1 1 −1 1 1 1 −1 1 −1 −1 −1 1 1 1 1 −1 1 1 −1 1 1 1 1
−1 1 1 1 −1 −1 −1 1 −1 1 1 −1 1 1 1 −1 1 −1 −1 −1 1
1 1 1 −1 1 1 −1 1 1 1 1 −1 1 1 1 −1 −1 −1 −1 1 −1 −1
1 −1 −1 −1 1 −1 1 1 1 −1 −1 −1 1 −1 1 1 −1 1 1 1 1
−1 1 1 1 −1 −1 −1 1 −1 1 1 −1 1 1 1 −1 1 −1 −1 −1 1
1 1 1 −1 1 1 −1 1 1 1 1 −1 1 1 1 −1 −1 −1 −1 1 −1 −1
1 −1 −1 −1 1 −1 1 1 1 −1 −1 −1 −1 1 −1 −1 1 −1 −1
−1 −1 1 −1 −1 −1 1 1 1 −1 1 −1 −1 1 −1 −1 −1 1 −1
1 1 1 −1 −1 −1 1 −1 1 1 −1 1 1 1 1 −1 1 1 1 −1 −1 −1
−1 1 −1 −1 1 −1 −1 −1 1 −1 1 1 1 −1 −1 −1 1 −1 1 1
−1 1 1 1 1 −1 1 1 1 −1 −1 −1 1 −1 1 1 −1 1 1 1 −1 1

–1 –1 –1 1 1 1 1 –1 1 1 –1 1 1 1 1 –1 1 1 1 –1 –1 –1 –1 1 –1 –1 1 –1 –1 –1 1 –1 1 1 1 –1 –1 –1 –1 1 –1 –1 1 –1 –1 –1 –1 1 –1 –1 –1 1 1 1 –1 1 –1 –1 1 –1 –1 1 –1 –1 1 –1 1 1 1 –1 –1 –1 –1 1 –1 –1 1 –1 –1 –1 –1 1 –1 –1 1 –1 –1 –1 –1 1 1 1 1 –1 1 1 –1 1 1 1 –1 1 –1 –1 –1 1 1 1 –1 1 –1 –1 1 –1 –1 –1 –1 1 –1 –1 –1 1 1 1 –1 1 –1 –1 1 –1 –1 –1 1 –1 1 1 1 –1 –1 –1 1 –1 1 1 –1 1 1 1 1 –1 1 1 1 –1 –1 –1 –1 1 –1 –1 1 –1 –1 1 –1 1 –1 –1 1 –1 –1 –1 –1 1 –1 –1 –1 1 1 1 1 –1 –1 –1 –1 1 –1 –1 1 –1 –1 –1 –1 1 –1 –1 –1 1 1 1 –1 1 –1 –1 1 –1 –1 –1 1 –1 1 1 1 –1 –1 –1 1 –1 1 1 1 1 –1 1 1 1 –1 –1 –1 –1 1 –1 1 1 –1 1 1 1 –1 –1 –1 1 –1 1 1 –1 1 1 1 1 –1 1 1 1 –1 1 –1 –1 –1 1 1 1 –1 1 –1 –1 1 –1 –1 –1 1 1 1 1 –1 1 1 –1 1 1 –1 1 –1 –1 –1 1 1 1 1 –1 1 1 1 –1 1 1 –1 1 1 1 1 –1 1 1 1 –1 1 –1 –1 –1 1 1 1 1 –1 1 1 –1 1 1 1 1 –1 1 1 1 –1 –1 –1 –1 1 –1 –1 1 –1 –1 –1 1 –1 1 1 1 –1 –1 –1 –1 1 –1 1 1 –1 1 1 1 –1 1 1 1 1 –1 1 1 1 –1 –1 –1 1 –1 1 1 1 1 –1 –1 –1 1 –1 1 1 –1 1 1 1 1 –1 1 1 1 –1 –1 –1 –1 1 –1 –1 1 –1 –1 –1 1 –1 1 1 1 –1 1 –1 –1 –1 1 1 1 1 –1 –1 1 –1 1 1 1 –1 –1 –1 –1 1 –1 –1 1 –1 –1 –1 –1 1 –1 –1 –1 –1 1 –1 1 –1 1 1 1 –1 –1 –1 1 –1 –1 –1 1 –1 1 1 1 –1 –1 1 –1 1 1 –1 1 1 1 1 –1 1 1 1 –1 –1 –1 –1 1 –1 –1 1 –1 –1 –1 1 –1 –1 –1 1 –1 1 1 1 –1 –1 –1 1 –1 1 1 –1 1 1 1 1 –1 1 –1 1 1 1 –1 –1 –1 1 –1 1 1 –1 1 1 1 –1 1 –1 –1 –1 1 1 1 1 –1 1 –1 –1 1 –1 –1 –1 1 –1 –1 –1 –1 1 –1 –1 –1 1 1 1 1 –1 1 1 –1 1 1 –1 1 –1 –1 –1 1 –1 1 1 1 1 –1 1 1 –1 1 1 1 –1 –1 –1 –1 1 –1 1 1 1 1 –1 –1 –1 1 1 1 –1 1 –1 –1 –1 1 –1 1 1 –1 1 1 1 –1 –1 –1 1 –1 1 1 –1 1 1 1 –1 1 –1 –1 –1 1 1 1 1 –1 –1 1 –1 1 1 1 –1 –1 –1 –1 1 –1 –1 –1 –1 1 –1 –1 1 –1 –1 –1 1 –1 –1 –1 –1 1 1 1 1 –1 1 1 –1 1 1 1 –1 1 –1 –1 –1 1 1 1 1 –1 1 1 –1 1 1 1 –1 –1 –1 –1 1 –1 1 1 –1 1 1 1 –1 1 –1 –1 –1 1 1 1 1 –1 1 1 –1 –1 –1 1 1 1 1 –1 1 1 –1 1 1 1 1 –1 1 1 1 –1 –1 –1 –1 1 –1 –1 1 –1 –1 –1 1 –1 1 1 1 –1 1 –1 –1 –1 1 –1 1 1 –1 1 1 1 1 –1 1 1 1 –1 –1 –1 1 –1 1 1 –1 1 1 1 –1 1 1 –1 –1 –1 1 1 1 –1 1 –1 –1 1 –1 –1 –1 –1 1 –1 –1 –1 1 1 1 1 –1 1 1 –1 1 1 1 –1 1 –1 –1 –1 1 1 1 1 –1 1 1 –1 1 1 1 1 –1 1 1 1 –1 –1 –1 1 –1 1 1 –1 1 1 1 –1 1 1 –1 –1 –1 1 1 1 –1 1 –1 –1 1 –1 –1 –1 –1 1 –1 –1 –1 1 1 1 1 –1 1 1 –1 1 1 1 –1 1 –1 –1 –1 1 1 1 –1 1 –1 –1 1 –1 –1 –1 –1 1 –1 –1 –1 1 1 1 –1 1 –1 –1 1 –1 –1 –1 1 –1 1 1 1 –1 –1 –1 –1];

sequence (71): G_1536(7,:)=[1 1 1 –1 –1 –1 1 –1 1 1 1 –1 1 1 –1 1 –1 –1 –1 1 1 1 –1 1 1 1 1 –1 1 1 –1 1 –1 –1 1 1 1 –1 1 –1 1 –1 –1 –1 1 –1 –1 1 –1 –1 –1 –1 1 1 1 –1 1 1 1 1 –1 1 1 –1 1 –1 –1 –1 1 1 1 –1 1 –1 –1 –1 1 –1 –1 1 –1 –1 1 –1 1 1 1 –1 –1 –1 1 –1 –1 –1 –1 1 –1 –1 1 –1 –1 –1 –1 1 1 1 –1 1 –1 –1 –1 1 –1 –1 –1 1 –1 –1 1 –1 –1 –1 –1 1 1 1 –1 1 1 1 1 –1 1 1 –1 1 1 1 1 –1 –1 –1 1 –1 1 1 1 –1 1 1 –1 1 –1 –1 –1 1 1 1 –1 1 1 1 1 –1 1 1 –1 1 –1 1 –1 –1 –1 1 1 1 –1 1 –1 –1 –1 1 –1 –1 1 –1 –1 –1 –1 1 1 1 –1 1 1 1 1 –1 1 1 –1 1 1 1 1 –1 –1 –1 1 –1 1 1 1 –1 1 1 –1 1 –1 –1 –1 1 1 1 –1 1 1 1 1 –1 1 1 –1 1 1 1 1 1 –1 –1 –1 1 –1 1 1 1 1 –1 1 1 –1 1 1 1 1 –1 –1 –1 1 –1 –1 –1 –1 1 –1 –1 1 –1 1 1 1 1 –1 –1 –1 1 –1 1 1 1 –1 1 1 –1 1 –1 –1 –1 1 1 1 –1 1 1 1 1 –1 1 1 –1 1 –1 –1 –1 1 1 1 –1 1 –1 –1 –1 1 –1 –1 1 –1 –1 –1 –1 1 1 1 –1 1 1 1 1 –1 1 1 –1 1 –1 –1 –1 1 1 1 –1 1 –1 –1 1 –1 –1 –1 1 –1 –1 1 –1 1 1 1 –1 –1 –1 1 –1 –1 –1 1 –1 1 –1 –1 1 –1 –1 –1 1 –1 –1 –1 –1 1 1 1 –1 1 –1 –1 1 –1 –1 –1 –1 1 1 1 –1 1 1 1 1 –1 1 1 –1 1 –1 –1 –1 1 1 1 –1 1 –1 –1 –1 1 –1 –1 1 –1 –1 –1 –1 1 –1 –1 –1 1 –1 –1 –1 1 1 1 1 –1 1 –1 –1 –1 1 1 1 –1 1 –1 –1 1 –1 –1 –1 –1 1 –1 –1 –1 1 1 1 –1 1 –1 –1 1 –1 –1 –1 1 –1 1 1 1 –1 –1 –1 1 –1 1 1 –1 1 1 1 1 –1 1 1 1 –1 –1 –1 1 –1 1 1 1 1 –1 1 1 –1 1 1 1 –1 1 –1 –1 –1 1 1 1 1 –1 1 1 –1 1 1 1 1 –1 1 1 –1 1 1 1 1 –1 –1 –1 –1 1 1 1 –1 1 –1 –1 1 –1 –1 1 –1 –1 –1 –1 1 –1 –1 –1 1 1 1 1 –1 1 1 –1 1 –1 1 –1 –1 –1 1 1 1 –1 1 1 1 1 –1 1 1 –1 1 1 1 1 –1 –1 –1 1 –1 1 –1 –1 –1 1 1 1 –1 1 1 1 1 –1 1 1 –1 1 –1 –1 –1 –1 1 1 –1 1 –1 1 1 1 –1 1 –1 –1 1 –1 –1 –1 –1 1 –1 –1 –1 1 1 1 1 –1 1 1 –1 1 1 1 –1 1 –1 –1 –1 1 1 1 –1 1 –1 –1 1 –1 –1 –1 –1 1 –1 –1 –1 1 1 1 –1 1 –1 –1 1 –1 –1 –1 1 –1 1 1 1 –1 –1 –1 1 –1 1 1 –1 1 1 1 1 –1 1 1 1 –1 –1 –1 –1 1 –1 –1 1 –1 –1 –1 1 –1 1 1 1 –1 1 –1 –1 –1 1 1 1 1 –1 1 1 –1 1 1 1 –1 1 –1 –1 –1 1 1 1 –1 1 1 –1 1 1 1 1 –1 1 1 1 –1 –1 –1 –1 1 –1 –1 1 –1 –1 –1 –1 1 –1 –1 –1 1 1 1 –1 1 –1 –1 1 –1 –1 –1 1 –1 1 1 1 –1 –1 –1 1 –1 1 1 1 1 –1 1 1 –1 1 1 1 –1 1 –1 –1 –1 1 1 1 –1 1 –1 –1 1 –1 –1 –1 –1 1 –1 –1 –1 1 1 1 –1 1 –1 –1 1 –1 –1 –1 1 –1 1 1 1 –1 –1 –1 1 –1 1 1 1 1 –1 1 1 –1 1 1 1 –1 1 –1 –1 –1 1 1 1 1 –1 1 1 –1 1 1 1 1 –1 1 1 1 –1 –1 –1 –1 1 –1 –1 1 –1 –1 –1 1 –1 1 1 1 –1 1 –1 –1 –1 1 1 1 1 –1 1 1 –1 1 1 1 –1 1 –1 –1 –1 1 1 1 1 –1 1 1 –1 1 1 1 –1 1 1 –1 –1 –1 1 1 1 1 –1 1 1 –1 1 1 1 1 –1 –1 –1 1 –1 1 –1 –1 –1 1 1 1 –1 1 1 1 1 –1 1 1 –1 1 1 1 1 –1 –1 –1 1 –1 –1 1 –1 1 1 1 –1 1 1 –1 1 1 1 1 –1 –1 –1 1 –1 –1 –1 –1 1 –1 –1 1 –1 –1 –1 –1 1 1 1 –1 1 –1 –1 –1 1 –1 –1 1 –1 1 1 1 –1 –1 –1 1 –1 –1 –1 –1 1 –1 –1 1 –1 1 1 1 –1 –1 –1 1 –1 1 1 1 –1 1 1 –1 1 1 1 1 –1 –1 –1 1 –1 –1 –1 –1 1 –1 –1 1 –1 1 1 1 –1 –1 –1 1 –1 1 1 –1 1 1 1 –1 1 1 –1 1 1 1 1 –1 –1 –1 1 –1 1 1 1 –1 1 1 –1 1 1 1 1 –1 1 1 –1 1 1 1 1 –1 –1 –1 1 –1 –1 1 –1 –1 –1 –1 1 –1 –1 1 –1 1 1 1 –1 –1 –1 1 –1 1 1 1 –1 1 1 –1 1 –1 –1 –1 1 1 1 –1 1 1 1 1 –1 1 1 –1 1 –1 –1 –1 1 –1 –1 –1 1 1 1 –1 1 –1 –1 –1 1 –1 –1 1 –1 –1 1 –1 1 1 1 –1 1 –1 –1 –1 1 1 1 1 –1 1 1 –1 1 1 1 –1 1 –1 –1 –1 1 1 1 1 –1 1 1 –1 1 1 1 1 –1 1 1 –1 1 1 1 1 –1 –1 –1 1 –1 –1 1 –1 –1 –1 –1 1 –1 –1 1 –1 1 1 1 –1 –1 –1 1 –1 1 1 1 –1 1 1 –1 1 –1 –1 –1 1 1 1 –1 1 1 1 1 –1 1 1 –1 1 1 1 1 –1 –1 –1 1 –1 1 1 1 1 –1 –1 –1 1 –1 1 1 1 –1 1 1 –1 1 1 1 1 –1 –1 –1 1 –1 –1 –1 –1 1 –1 –1 1 –1];

sequence (72): G_1536(8,:)=[1 –1 1 1 –1 1 1 1 1 –1 1 1 1 –1 –1 –1 –1 1 –1 –1 1 1 –1 1 1 1 –1 –1 –1 –1 1 –1 –1 1 –1 –1 –1 –1 1 –1 –1 –1 1 1 1 –1 1 –1 –1 1 –1 –1 –1 1 –1 –1 –1 –1 1 1 1 –1 –1 –1 –1 1 –1 –1 1 –1 –1 –1 –1 1 –1 –1 –1 1 1 1 1 –1 1 1 –1 1 1 1 –1 1 –1 –1 1 1 1 –1 1 –1 –1 1 –1 –1 –1 –1 1 –1 –1 –1 1 1 1 –1 1 –1 –1 –1 1 –1 1 1 1 –1 –1 –1 1 –1 1 1 –1 1 1 1 1 –1 1 1 1 –1 –1 –1 –1 1 –1 –1 1 –1 –1 –1 1 –1 1 1 1 –1 –1 –1 1 –1 –1 –1 –1 1 –1 –1 1 –1 –1 –1 –1 1

−1 −1 −1 1 1 1 −1 1 −1 −1 1 −1 −1 −1 1 −1 1 1 1 −1
−1 −1 1 −1 1 1 −1 1 1 1 1 −1 1 1 1 −1 −1 −1 −1 1 −1
−1 1 −1 −1 −1 1 −1 1 1 1 −1 −1 −1 1 −1 1 1 −1 1 1 1
1 −1 1 1 1 −1 −1 −1 1 −1 1 1 −1 1 1 1 −1 1 −1 −1 −1
1 1 1 1 −1 1 1 −1 1 1 1 1 −1 1 1 1 −1 −1 −1 −1 1 −1
−1 1 −1 −1 −1 1 −1 1 1 1 −1 −1 −1 −1 1 −1 −1 1 −1
−1 −1 −1 1 −1 −1 −1 1 1 1 −1 1 −1 −1 1 −1 −1 −1 1
−1 1 1 1 −1 −1 −1 −1 1 −1 −1 1 −1 −1 −1 −1 1 −1 −1
−1 1 1 1 1 −1 1 1 −1 1 1 1 −1 1 −1 −1 −1 1 1 1 −1 1
−1 −1 1 −1 −1 −1 −1 1 −1 −1 −1 1 1 1 −1 1 −1 −1 1
−1 −1 −1 1 −1 1 1 1 −1 −1 −1 −1 1 −1 −1 1 −1 −1 −1
−1 1 −1 −1 −1 1 1 1 1 −1 1 1 −1 1 1 1 −1 1 −1 −1 −1
1 1 1 1 −1 1 1 −1 1 1 1 1 −1 1 1 1 −1 −1 −1 1 −1 1 1
−1 1 1 1 −1 1 −1 −1 −1 1 1 1 −1 1 −1 −1 1 −1 −1 −1
−1 1 −1 −1 −1 1 1 1 1 −1 1 1 −1 1 1 1 −1 1 −1 −1 −1
1 1 1 −1 1 −1 −1 1 −1 −1 −1 −1 1 −1 −1 −1 1 1 1 −1
1 −1 −1 1 −1 −1 −1 1 −1 1 1 1 −1 −1 −1 1 −1 1 1 −1
1 1 1 1 −1 1 1 1 −1 −1 −1 −1 1 −1 −1 1 −1 −1 −1 1 −1
1 1 1 −1 −1 −1 −1 1 −1 −1 1 −1 −1 −1 −1 1 −1 −1 −1
1 1 1 −1 1 −1 −1 1 −1 −1 −1 1 −1 1 1 1 −1 −1 −1 −1
1 −1 −1 1 −1 −1 −1 −1 1 −1 −1 −1 1 1 1 1 −1 1 1 −1
1 1 1 −1 1 −1 −1 −1 1 1 1 −1 1 −1 −1 1 −1 −1 −1 −1
1 −1 −1 −1 1 1 1 −1 1 −1 −1 1 −1 −1 −1 1 −1 1 1 1 −1
−1 −1 1 −1 1 1 −1 1 1 1 1 −1 1 1 1 −1 −1 −1 −1 1 −1
−1 1 −1 −1 −1 1 −1 1 1 1 −1 −1 −1 −1 1 −1 −1 1 −1
−1 −1 −1 1 −1 −1 −1 1 1 1 −1 1 −1 −1 1 −1 −1 −1 1
−1 1 1 1 −1 −1 −1 1 −1 1 1 −1 1 1 1 1 −1 1 1 1 −1 −1
−1 −1 1 −1 −1 1 −1 −1 −1 1 −1 1 1 1 −1 −1 −1 1 −1
1 1 −1 1 1 1 1 −1 1 1 1 −1 −1 −1 1 −1 1 1 −1 1 1 1 −1
1 −1 −1 −1 1 1 1 1 −1 1 1 −1 1 1 1 1 −1 1 1 1 −1 −1
−1 −1 1 −1 −1 1 −1 −1 −1 1 −1 1 1 1 −1 −1 −1 −1 1
−1 −1 1 −1 −1 −1 −1 1 −1 −1 −1 1 1 1 −1 1 −1 −1 1
−1 −1 −1 1 −1 1 1 1 −1 −1 −1 −1 1 −1 −1 1 −1 −1 −1
−1 1 −1 −1 −1 1 1 1 1 −1 1 1 −1 1 1 1 −1 1 −1 −1 −1
1 1 1 −1 1 −1 −1 1 −1 −1 −1 −1 1 −1 −1 −1 1 1 1 −1
1 −1 −1 1 −1 −1 −1 1 −1 1 1 1 −1 −1 −1 −1 1 −1 −1
1 −1 −1 −1 −1 1 −1 −1 −1 1 1 1 1 −1 1 1 −1 1 1 1 −1
1 −1 −1 −1 1 1 1 1 −1 1 1 −1 1 1 1 1 −1 1 1 1 −1 −1
−1 1 −1 1 1 −1 1 1 1 −1 1 −1 −1 −1 1 1 1 −1 1 −1 −1
1 −1 −1 −1 −1 1 −1 −1 −1 1 1 1 1 −1 1 1 −1 1 1 1 −1
1 −1 −1 −1 1 1 1 −1 1 −1 −1 1 −1 −1 −1 −1 1 −1 −1
−1 1 1 1 −1 1 −1 −1 1 −1 −1 −1 1 −1 1 1 1 −1 −1 −1
−1 1 −1 −1 1 −1 −1 −1 −1 1 −1 −1 −1 1 1 1 1 −1 1 1
−1 1 1 1 −1 1 −1 −1 −1 1 1 1 1 −1 1 1 −1 1 1 1 1 −1
1 1 1 −1 −1 −1 1 −1 1 1 −1 1 1 1 −1 1 −1 −1 −1 1 1
1 1 −1 1 1 −1 1 1 1 1 −1 1 1 1 −1 −1 −1 −1 1 −1 −1
1 −1 −1 −1 1 −1 1 1 1 −1 −1 −1 1 −1 1 1 −1 1 1 1 1
−1 1 1 1 −1 −1 −1 1 −1 1 1 −1 1 1 1 −1 1 −1 −1 −1 1
1 1 1 −1 1 1 −1 1 1 1 1 −1 1 1 1 −1 −1 −1 −1 1 −1 −1
1 −1 −1 −1 1 −1 1 1 1 −1 −1 −1 −1 1 −1 −1 1 −1 −1
−1 −1 1 −1 −1 −1 1 1 1 −1 1 −1 −1 1 −1 −1 −1 1 −1
1 1 1 −1 −1 −1 1 −1 1 1 −1 1 1 1 1 −1 1 1 1 −1 −1 −1
−1 1 −1 −1 1 −1 −1 −1 1 −1 1 1 1 −1 −1 −1 1 −1 1 1
−1 1 1 1 1 −1 1 1 1 −1 −1 −1 1 −1 1 1 −1 1 1 1 −1 1
−1 −1 −1 1 1 1 −1 1 −1 −1 1 −1 −1 −1 −1 1 −1 −1 −1
1 1 1 1 −1 1 1 −1 1 1 1 −1 1 −1 −1 −1 1 1 1 1 −1 1 1
−1 1 1 1 1 −1 1 1 1 −1 −1 −1 1 −1 1 1 −1 1 1 1 −1 1
−1 −1 −1 1 1 1 1 −1 1 1 −1 1 1 1 1 −1 1 1 1 −1 −1 −1
−1 1 −1 −1 1 −1 −1 −1 1 −1 1 1 1 −1 −1 −1 1 −1 1 1
−1 1 1 1 1 −1 1 1 1 −1 −1 −1 1 −1 1 1 −1 1 1 1 −1 1
−1 −1 −1 1 1 1 1 −1 1 1 −1 1 1 1 1 −1 1 1 1 −1 −1 −1
−1 1 −1 −1 1 −1 −1 −1 1 −1 1 1 1 −1 −1 −1 −1 1 −1
−1 1 −1 −1 −1 −1 1 −1 −1 −1 1 1 1 −1 1 −1 −1 1 −1
−1 −1 1 −1 1 1 1 −1 −1 −1 1 −1 1 1 −1 1 1 1 1 −1 1
1 1 −1 −1 −1 −1 1 −1 −1 1 −1 −1 −1 1 −1 1 1 1 −1 −1
−1 1 −1 1 1 −1 1 1 1 1 −1 1 1 1 −1 −1 −1 1 −1 1 1 −1
1 1 1 −1 1 −1 −1 −1 1 1 1];

sequence (73): G_2048(1,:)=[1 1 −1 −1 −1 −1 −1 −1 −1
1 −1 1 1 −1 −1 1 1 1 −1 −1 1 1 1 1 −1 1 −1 1 −1 1 1
−1 −1 −1 1 1 1 1 1 1 1 −1 1 −1 −1 1 1 −1 1 1 −1 −1
1 1 1 1 −1 1 −1 1 −1 1 1 −1 −1 −1 1 1 1 1 1 1 1 −1 1
−1 −1 1 1 −1 −1 −1 1 1 −1 −1 −1 −1 1 −1 1 −1 1 −1
−1 1 −1 −1 1 1 1 1 1 1 1 −1 1 −1 −1 1 1 −1 1 1 −1 −1
1 1 1 1 −1 1 −1 1 −1 1 1 −1 1 1 −1 −1 −1 −1 −1 −1 −1
1 −1 1 1 −1 −1 1 1 1 −1 −1 1 1 1 1 −1 1 −1 1 −1 1 1
−1 −1 −1 1 1 1 1 1 1 1 −1 1 −1 −1 1 1 −1 1 1 −1 −1
1 1 1 1 −1 1 −1 1 −1 1 1 −1 1 1 −1 −1 −1 −1 −1 −1 −1
1 −1 1 1 −1 −1 1 1 1 −1 −1 1 1 1 1 −1 1 −1 1 −1 1 1
−1 1 1 −1 −1 −1 −1 −1 −1 −1 1 −1 1 1 −1 −1 1 −1 −1
1 1 −1 −1 −1 −1 1 −1 1 −1 1 −1 −1 1 1 1 −1 −1 −1 −1
−1 −1 −1 1 −1 1 1 −1 −1 1 1 1 −1 −1 1 1 1 1 −1 1 −1
1 −1 1 1 −1 −1 −1 1 1 1 1 1 1 1 −1 1 −1 −1 1 1 −1 1
1 −1 −1 1 1 1 1 −1 1 −1 1 −1 1 1 −1 −1 −1 1 1 1 1 1
1 1 −1 1 −1 −1 1 1 −1 −1 −1 1 1 −1 −1 −1 −1 1 −1 1
−1 1 −1 −1 1 −1 −1 1 1 1 1 1 1 1 −1 1 −1 −1 1 1 −1
1 1 −1 −1 1 1 1 1 −1 1 −1 1 −1 1 1 −1 −1 −1 1 1 1 1
1 1 1 −1 1 −1 −1 1 1 −1 −1 −1 1 1 −1 −1 −1 −1 1 −1
1 −1 1 −1 −1 1 −1 1 −1 −1 −1 −1 −1 −1 −1 1 1 1 1 −1
−1 1 −1 −1 1 1 −1 −1 −1 −1 1 −1 1 −1 1 −1 −1 1 −1
−1 1 1 1 1 1 1 1 −1 1 −1 −1 1 1 −1 −1 −1 1 1 −1 −1
−1 −1 1 −1 1 −1 1 −1 −1 1 −1 −1 1 1 1 1 1 1 1 −1 1
−1 −1 1 1 −1 1 1 −1 −1 1 1 1 1 −1 1 −1 1 −1 1 1 −1
1 1 −1 −1 −1 −1 −1 −1 −1 1 −1 1 1 −1 −1 1 1 1 −1 −1
1 1 1 1 −1 1 −1 1 −1 1 1 −1 −1 −1 1 1 1 1 1 1 1 −1 1
−1 −1 1 1 −1 −1 1 −1 −1 1 1 −1 1 1 −1 −1 1 1 1 1 −1
1 −1 1 −1 1 1 −1 1 1 −1 −1 −1 −1 −1 −1 −1 1 −1 1 1
−1 −1 1 1 1 −1 −1 1 1 1 1 −1 1 −1 1 −1 1 1 −1 −1 −1
1 1 1 1 1 1 1 −1 1 −1 −1 1 1 −1 1 1 −1 −1 1 1 1 1 −1
1 −1 1 −1 1 1 −1 1 1 −1 −1 −1 −1 −1 −1 −1 1 −1 1 1
−1 −1 1 1 1 −1 −1 1 1 1 1 −1 1 −1 1 −1 1 1 −1 1 1 −1
−1 −1 −1 −1 −1 −1 1 1 1 1 −1 −1 1 −1 −1 1 1 −1 −1
−1 −1 1 −1 1 −1 1 −1 −1 1 −1 −1 1 1 1 1 1 1 1 −1 1
−1 −1 1 1 −1 −1 −1 1 1 −1 −1 −1 −1 1 −1 1 −1 1 −1
−1 1 −1 1 −1 −1 −1 −1 −1 −1 −1 1 1 1 1 −1 −1 1 −1
−1 1 1 −1 −1 −1 −1 1 −1 1 −1 1 −1 −1 1 1 1 −1 −1 −1
−1 −1 −1 −1 1 −1 1 1 −1 −1 1 1 1 −1 −1 1 1 1 1 −1 1
−1 1 −1 1 1 −1 1 1 −1 −1 −1 −1 −1 −1 −1 1 −1 1 1 −1
−1 1 −1 −1 1 1 −1 −1 −1 −1 1 −1 1 −1 1 −1 −1 1 1 1
−1 −1 −1 −1 −1 −1 −1 1 −1 1 1 −1 −1 1 1 1 −1 −1 1
1 1 1 −1 1 −1 1 −1 1 1 −1 −1 −1 1 1 1 1 1 1 1 −1 1 −1
−1 1 1 −1 1 1 −1 −1 1 1 1 1 −1 1 −1 1 −1 1 1 −1 1 1
−1 −1 −1 −1 −1 −1 −1 1 −1 1 1 −1 −1 1 1 1 −1 −1 1
1 1 1 −1 1 −1 1 −1 1 1 −1 1 1 −1 −1 −1 −1 −1 −1 −1
1 1 1 1 −1 −1 1 −1 −1 1 1 −1 −1 −1 −1 1 −1 1 −1 1 −1
−1 1 −1 −1 1 1 1 1 1 1 1 −1 1 −1 −1 1 1 −1 −1 −1 1
1 −1 −1 −1 −1 1 −1 1 −1 1 −1 −1 1 1 1 −1 −1 −1 −1
−1 −1 −1 1 −1 1 1 −1 −1 1 −1 −1 1 1 −1 −1 −1 −1 1
−1 1 −1 1 −1 −1 1 1 1 −1 −1 −1 −1 −1 −1 −1 1 −1 1
1 −1 −1 1 1 1 −1 −1 1 1 1 1 −1 1 −1 1 −1 1 1 −1 1 1
−1 −1 −1 −1 −1 −1 −1 1 −1 1 1 −1 −1 1 −1 −1 1 1 −1
−1 −1 −1 1 −1 1 −1 1 −1 −1 1 −1 −1 1 1 1 1 1 1 1 −1
1 −1 −1 1 1 −1 −1 −1 1 1 −1 −1 −1 −1 1 −1 1 −1 1 −1
−1 1 −1 1 −1 −1 −1 −1 −1 −1 −1 1 −1 1 1 −1 −1 1 −1
−1 1 1 −1 −1 −1 −1 1 −1 1 −1 1 −1 −1 1 −1 −1 1 1 1
1 1 1 1 −1 1 −1 −1 1 1 −1 −1 −1 1 1 −1 −1 −1 −1 1 −1
1 −1 1 −1 −1 1 −1 −1 1 1 1 1 1 1 1 −1 1 −1 −1 1 1 −1
1 1 −1 −1 1 1 1 1 −1 1 −1 1 −1 1 1 −1 −1 −1 1 1 1 1
1 1 1 −1 1 −1 −1 1 1 −1 −1 −1 1 1 −1 −1 −1 −1 1 −1
1 −1 1 −1 −1 1 1 1 −1 −1 −1 −1 −1 −1 −1 1 −1 1 1 −1
−1 1 −1 −1 1 1 −1 −1 −1 −1 1 −1 1 −1 1 −1 −1 1 1 1
−1 −1 −1 −1 −1 −1 −1 1 −1 1 1 −1 −1 1 1 1 −1 −1 1
1 1 1 −1 1 −1 1 −1 1 1 −1 1 1 −1 −1 −1 −1 −1 −1 −1
1 −1 1 1 −1 −1 1 −1 −1 1 1 −1 −1 −1 −1 1 −1 1 −1 1
−1 −1 1 −1 1 −1 −1 −1 −1 −1 −1 −1 1 −1 1 1 −1 −1 1

1 1 –1 –1 1 1 1 1 –1 1 –1 1 –1 1 1 –1 –1 –1 1 1 1 1 1 1 1 –1 1 –1 –1 1 1 –1 1 1 –1 –1 1 1 1 1 –1 1 –1 1 –1 1 1 –1 1 1 –1 –1 –1 –1 –1 –1 –1 1 –1 1 1 –1 –1 1 1 1 –1 –1 1 1 1 1 –1 1 –1 1 –1 1 1 –1 1 1 –1 –1 –1 –1 –1 –1 –1 1 –1 1 1 –1 –1 1 –1 –1 1 1 –1 –1 –1 –1 1 –1 1 –1 1 –1 –1 1 –1 1 –1 –1 –1 –1 –1 –1 –1 1 1 1 1 –1 –1 1 1 1 –1 –1 1 1 1 1 –1 1 –1 1 –1 1 1 –1 –1 –1 1 1 1 1 1 1 1 –1 1 –1 –1 1 1 –1 1 1 –1 –1 1 1 1 1 –1 1 –1 1 –1 1 1 –1 –1 –1 1 1 1 1 1 1 1 –1 1 –1 –1 1 1 –1 –1 –1 1 1 –1 –1 –1 –1 1 –1 1 –1 1 –1 –1 1 –1 –1 1 1 1 1 1 1 1 –1 1 –1 –1 1 1 –1 1 1 –1 –1 1 1 1 1 –1 1 –1 1 –1 1 1 –1 1 1 –1 –1 –1 –1 –1 –1 –1 1 –1 1 1 –1 –1 1 1 1 –1 –1 1 1 1 1 –1 1 –1 1 –1 1 1 –1 –1 –1 1 1 1 1 1 1 1 –1 1 –1 –1 1 1 –1 1 1 –1 –1 1 1 1 1 –1 1 –1 1 –1 1 1 –1 1 1 –1 –1 –1 –1 –1 –1 –1 1 1 –1 1 –1 –1 1 1 1 –1 –1 1 1 1 1 –1 1 –1 1 –1 1 1 –1 1 1 –1 –1 –1 –1 –1 –1 –1 1 –1 1 1 –1 –1 1 –1 –1 1 1 –1 –1 –1 –1 1 –1 1 –1 1 –1 –1 1 –1 –1 1 1 1 1 1 1 1 –1 1 –1 –1 1 1 –1 –1 –1 1 1 –1 –1 –1 –1 1 –1 1 –1 1 –1 –1 1 1 1 –1 –1 –1 –1 –1 –1 –1 1 –1 1 1 –1 –1 1 –1 –1 1 1 –1 –1 –1 –1 1 –1 1 –1 1 –1 –1 1 1 1 –1 –1 –1 –1 –1 –1 –1 –1 1 –1 1 –1 1 –1 –1 1 1 1 –1 –1 –1 –1 –1 –1 –1 1 –1 1 1 –1 –1 1 1 1 1 –1 1 –1 1 –1 1 1 –1 1 1 –1 –1 –1 –1 –1 –1 –1 1 –1 1 1 –1 –1 1 –1 –1 1 1 –1 –1 –1 –1 1 –1 1 –1 1 –1 –1 1 1 1 –1 –1 –1 –1 –1 –1 –1 1 –1 1 1 –1 –1 1 1 1 –1 –1 1 1 1 –1 1 –1 1 –1 1 1 –1 –1 –1 1 1 1 1 1 1 1 –1 1 –1 –1 1 1 –1 1 1 –1 –1 1 1 1 1 –1 1 –1 1 –1 1 1 –1 1 1 –1 –1 –1 –1 –1 –1 –1 –1 1 –1 1 1 –1 –1 1 1 1 –1 –1 1 1 1 1 –1 1 –1 1 –1 1 1 –1 1 1 –1 –1 –1 –1 –1 –1 –1 1 –1 1 –1 1 –1 –1 1 –1 –1 1 1 –1 –1 –1 –1 1 –1 1 –1 1 –1 –1 1 –1 –1 1];

sequence (74): G_2048(2,:)=[1 –1 –1 1 –1 1 –1 1 –1 –1 –1 –1 1 1 –1 –1 1 –1 –1 1 1 –1 1 –1 –1 –1 –1 –1 –1 –1 1 1 –1 1 1 –1 1 –1 1 –1 1 1 1 1 –1 –1 1 1 1 –1 –1 1 1 –1 1 –1 –1 –1 –1 –1 –1 –1 1 1 –1 1 1 –1 1 –1 1 –1 1 1 1 1 –1 –1 1 1 –1 1 1 –1 –1 1 –1 1 1 1 1 1 1 1 –1 –1 –1 1 1 –1 1 –1 1 –1 1 1 1 1 –1 –1 1 1 1 –1 –1 1 1 –1 1 –1 –1 –1 –1 –1 –1 –1 1 1 1 –1 –1 1 –1 1 –1 1 –1 –1 –1 –1 1 1 –1 –1 1 –1 –1 1 1 –1 1 –1 –1 –1 –1 –1 –1 1 1 –1 1 1 1 1 1 1 –1 1 1 1 1 –1 –1 1 1 1 –1 –1 1 1 –1 1 –1 –1 –1 –1 –1 –1 –1 1 1 1 –1 –1 1 –1 1 –1 1 –1 –1 –1 –1 1 1 –1 1 1 –1 –1 1 –1 1 –1 1 –1 –1 –1 –1 –1 –1 1 1 1 1 –1 –1 1 –1 1 –1 1 –1 –1 –1 –1 1 1 –1 –1 –1 1 1 –1 –1 1 –1 1 1 1 1 1 1 1 –1 –1 1 –1 –1 1 –1 1 –1 1 –1 –1 –1 –1 1 1 –1 –1 1 –1 –1 1 1 –1 1 –1 –1 –1 –1 –1 –1 –1 1 1 –1 1 1 –1 1 1 –1 1 1 1 –1 –1 1 1 –1 1 –1 –1 –1 –1 –1 –1 1 1 –1 –1 1 1 1 –1 –1 1 –1 –1 1 1 –1 1 –1 –1 –1 –1 –1 –1 1 1 –1 1 1 –1 1 –1 1 –1 1 1 1 1 –1 –1 1 1 1 –1 –1 1 –1 1 1 –1 –1 1 –1 1 1 1 1 1 1 1 –1 –1 –1 1 1 –1 1 –1 1 –1 1 1 1 1 –1 1 –1 –1 1 1 1 –1 –1 1 1 –1 1 –1 –1 –1 –1 –1 –1 –1 1 –1 –1 1 1 1 1 –1 1 –1 1 –1 1 1 –1 1 1 –1 –1 –1 –1 –1 –1 1 1 –1 1 1 –1 –1 1 1 1 1 1 1 1 –1 –1 1 –1 –1 1 –1 1 –1 1 –1 –1 –1 –1 1 1 –1 –1 1 1 –1 1 –1 1 1 1 1 –1 –1 1 1 1 –1 –1 1 1 –1 1 –1 –1 –1 –1 –1 –1 –1 1 1 –1 1 1 –1 1 –1 1 –1 1 –1 –1 1 1 1 1 –1 –1 1 1 1 –1 –1 1 1 –1 1 –1 –1 –1 –1 –1 –1 1 1 –1 1 –1 1 1 1 1 1 1 1 1 –1 –1 –1 1 1 –1 1 –1 1 –1 1 1 1 1 –1 –1 1 1 1 –1 –1 –1 –1 –1 –1 1 1 1 1 –1 –1 1 –1 1 –1 1 –1 –1 –1 –1 1 1 –1 –1 1 –1 –1 1 1 –1 1 –1 –1 –1 –1 –1 –1 –1 1 1 –1 1 1 –1 1 –1 1 –1 1 1 1 1 –1 –1 1 1 1 –1 –1 1 1 –1 1 –1 –1 –1 –1 –1 –1 –1 1 1 –1 1 1 –1 1 –1 1 –1 1 1 1 1 –1 –1 1 1 1 –1 –1 1 1 –1 1 1 –1 –1 1 –1 –1 1 1 1 1 1 1 1 –1 –1 1 –1 –1 1 1 –1 1 –1 –1 –1 –1 –1 –1 –1 1 1 1 –1 –1 1 –1 1 –1 1 –1 –1 –1 –1 1 1 –1 –1 1 –1 –1 1 1 –1 1 –1 –1 –1 –1 –1 –1 1 1 –1 1 1 –1 1 –1 1 –1 1 1 1 1 –1 –1 1 1 1 –1 –1 1 –1 1 1 –1 1 1 –1 1 –1 1 –1 1 1 1 1 –1 –1 1 1 1 1 –1 –1 1 –1 1 –1 1 –1 –1 –1 –1 1 1 –1 –1 1 –1 1 –1 1 –1 1 1 1 1 –1 –1 1 –1 1 1 –1 1 –1 1 –1 –1 –1 –1 1 1 1 1 1 1 1 –1 –1 –1 1 1 –1 1 –1 1 –1 1 1 1 1 –1 –1 1 1 1 –1 –1 –1 –1 –1 –1 –1 1 1 1 1 –1 –1 1 1 –1 1 –1 1 –1 1 –1 –1 –1 –1 –1 –1 1 1 –1 1 –1 1 –1 –1 –1 –1 –1 –1 1 1 1 1 1 1 1 1 –1 –1 1 1 1 –1 –1 1 –1 1 1 1 1 –1 –1 1 1 –1 1 –1 –1 –1 –1 –1 –1 –1 1 1 –1 1 1 –1 1 1 –1 1 –1 –1 –1 –1 –1 –1 –1 1 –1 1 –1 1 –1 –1 1 1 –1 1 1 1 1 1 1 1 –1 1 1 1 1 1 –1 1 –1 –1 1 –1 1 1 –1 1 1 –1 –1 1 1 1 1 –1 –1 1 1 1 1 –1 –1 –1 –1 –1 –1 –1 1 1 1 1 –1 –1 1 –1 1 –1 1 –1 –1 –1 –1 1 1 –1 1 1 –1 –1 1 –1 1 –1 1 –1 –1 –1 –1 –1 –1 1 1 –1 –1 1 –1 1 –1 –1 –1 –1 –1 –1 –1 –1 1 1 –1 1 1 –1 1 –1 1 –1 1 1 1 1 –1 –1 1 1 1 –1 –1 1 1 –1 1 –1 –1 –1 –1 –1 –1 –1 1 1 1 –1 –1 1 –1 1 –1 1 –1 –1 1 –1 –1 –1 –1 1 1 –1 –1 1 –1 –1 1 1 –1 1 –1 –1 –1 –1

–1 –1 –1 –1 1 1 1 –1 –1 1 –1 1 –1 1 –1 –1 –1 –1 1 1 –1 –1 –1 1 1 –1 –1 1 –1 1 1 1 1 1 1 1 –1 –1 –1 1 1 –1 1 –1 1 –1 1 1 1 1 –1 –1 1 1 –1 1 1 –1 –1 1 –1 1 1 1 1 1 1 1 –1 –1 1 –1 –1 1 –1 1 –1 1 –1 –1 –1 –1 1 1 –1 –1 –1 1 1 –1 –1 1 –1 1 1 1 1 1 1 1 –1 –1 1 –1 –1 1 –1 1 –1 1 –1 –1 –1 –1 1 1 –1 –1 1 –1 –1 1 –1 1 –1 1 –1 –1 –1 –1 –1 –1 –1 1 1 1 –1 –1 1 –1 1 –1 1 –1 –1 –1 –1 1 1 –1 –1 –1 1 1 –1 –1 1 1 –1 –1 1 –1 1 1 1 1 1 1 1 –1 –1 1 –1 –1 1 –1 1 –1 1 –1 –1 –1 –1 1 1 –1 –1 1 –1 –1 1 1 –1 1 –1 –1 –1 –1 –1 –1 –1 1 1 –1 1 1 –1 1 –1 1 –1 1 1 1 1 –1 –1 1 1 1 –1 –1 1 1 1 1 –1 1 –1 –1 –1 –1 –1 –1 –1 1 1 1 –1 –1 1 –1 1 –1 1 –1 –1 –1 –1 1 1 –1 –1 1 –1 –1 1 –1 1 –1 –1 –1 –1 –1 –1 –1 1 1 1 1 –1 –1 1 –1 1 –1 –1 –1 –1 1 1 –1 –1 –1 1 1 –1 –1 1 –1 1 1 1 1 1 1 1 –1 –1 1 –1 1 –1 1 1 1 1 –1 –1 1 1 –1 1 1 –1 –1 1 –1 1 1 1 1 1 1 1 –1 –1 1 –1 –1 1 –1 1 –1 1 –1 –1 –1 –1 1 1 –1 –1 –1 1 –1 –1 1 –1 1 1 1 1 1 1 1 –1 –1 1 –1 –1 1 –1 1 –1 1 –1 –1 –1 –1 1 1 –1 1 –1 –1 –1 –1 1 1 –1 –1 1 –1 –1 1 1 –1 1 –1 –1 –1 –1 –1 –1 –1 1 1 1 –1 –1 1 –1 1 –1 1 –1 –1 –1 –1 1 1 –1 –1 –1 1 1 –1 –1 1 –1 1 1 1 1 1 1 1 –1 –1 –1 1 –1 1 –1 1 –1 1 1 1 1 –1 –1 1 1 –1 1 1 –1 –1 1 –1 1 1 1 1 1 1 1 –1 –1 1 –1 –1 1 –1 1 –1 1 –1 –1 –1 –1 1 1 –1 –1 –1 1 1 –1 –1 1 –1 1 1 1 1 1 1 1 –1 –1 –1 1 1 –1 1 –1 1 –1 1 1 1 1 –1 –1 1 1 –1 1 1 1 1 1 1 1 –1 –1 –1 1 1 –1 1 –1 1 –1 1 1 1 1 –1 –1 1 1 1 –1 –1 1 1 –1 1 –1 –1 –1 –1 –1 –1 –1 1 1 –1 1 1 1 1 1 1 –1 1 1 1 1 –1 –1 1 1 –1 1 1 –1 –1 1 –1 1 1 1 1 1 1 –1 –1 1 –1 –1 1 –1 1 –1 1 –1 –1 –1 –1 1 1 –1 –1 –1 1 1 –1 –1 1 –1 1 1 1 1 1 1 1 –1 –1 1 –1 –1 1 –1 1 –1 1 –1 1 –1 –1 –1 –1 1 1 –1 –1 1 –1 –1 1 1 –1 1 –1 –1 1 –1 1 –1 –1 –1 –1 –1 –1 1 1 1 1 –1 –1 1 –1 1 –1 1 –1 –1 –1 –1 1 1 –1 –1 1 1 –1 –1 –1 1 1 –1 –1 1 –1 1 1 1 1 1 1 1 –1 –1 1 –1 –1 1 –1 1 –1 1 –1 –1 –1 –1 1 1 –1 –1 1 –1 –1 1 1 –1 1 –1 –1 –1 –1 –1 –1 –1 1 1 –1 1 1 –1 1 –1 1 –1 1 1 1 1 –1 –1 1 1 1 1 –1 –1 1 –1 1 –1 1 –1 –1 –1 –1 1 1 –1 –1 –1 1 1 –1 –1 1 –1 1 1 1 1 1 1 1 –1 –1 –1 1 1 –1 1 –1 1 –1 1 1 1 1 –1 –1 1 1 1 –1 –1 1 1 1 –1 –1 1 –1 1 –1 1 –1 –1 –1 –1 1 1 –1 –1 1 –1 –1 1 1 –1 1 –1 –1 –1 –1 –1 –1 –1 1 1 –1 1 1 –1 1 –1 1 –1 1 –1 –1 1 1 1 1 –1 –1 1 1 1 –1 –1 1 1 –1 1 –1 –1 –1 –1 –1 –1 –1 1 1 1 1 1 –1 1 1 1 1 1 1 1 –1 –1 1 –1 –1 1 –1 1 –1 1 –1 –1 –1 –1 1 1 –1 –1 1 –1 1 1 –1 1 –1 –1 –1 –1 –1 –1 –1 1 1 1 –1 –1 1 –1 1 1 –1 1 –1 –1 –1 –1 1 1 –1 –1 1 –1 1 –1 –1 –1 –1 –1 –1 –1 1 1 –1 1 1 –1 1 –1 1 –1 1 1 1 1 –1 –1 1 1 –1 1 –1 1 –1 –1 1 1 1 1 –1 –1 1 1 1 –1 –1 –1 1 –1 –1 1 1 1 1 1 1 1 –1 –1 1;

sequence (75): G_2048(3,:)=[1 1 –1 –1 –1 –1 –1 –1 –1 1 –1 1 1 –1 –1 1 –1 –1 1 1 –1 –1 –1 –1 1 –1 1 –1 1

−1 −1 1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 1 1 −1 1 1 −1 −1 −1 −1 −1 −1 −1 1 −1 1 −1 1 1 −1 −1 1 −1 −1 1 1 −1 −1 −1 −1 1 −1 1 −1 1 −1 −1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 −1 −1 1 1 −1 −1 −1 −1 1 −1 1 −1 1 −1 −1 1 1 1 1 1 1 1 −1 1 1 −1 −1 −1 −1 1 −1 1 −1 1 −1 −1 1 1 1 1 1 1 1 −1 1 −1 −1 1 1 1 −1 −1 −1 −1 −1 −1 −1 1 −1 1 −1 −1 1 1 −1 −1 −1 1 1 −1 −1 −1 −1 1 −1 1 −1 1 −1 1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 −1 −1 −1 −1 −1 −1 −1 1 1 1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 1 −1 −1 −1 −1 1 1 −1 1 −1 1 1 −1 −1 1 1 −1 −1 1 1 1 1 1 1 1 −1 1 1 −1 −1 1 1 1 −1 1 1 −1 −1 1 1 1 1 −1 1 −1 1 −1 1 1 −1 −1 −1 1 1 1 1 1 1 1 1 −1 1 −1 −1 1 1 1 −1 −1 −1 1 1 1 −1 −1 −1 −1 1 1 −1 1 −1 1 1 −1 −1 1 1 1 1 −1 −1 −1 −1 −1 −1 1 1 −1 1 1 1 −1 −1 1 −1 −1 1 1 −1 −1 −1 −1 1 1 −1 1 1 −1 1 −1 −1 1 1 −1 −1 1 1 1 1 1 1 1 −1 1 −1 −1 1 1 1 −1 −1 −1 1 1 1 −1 −1 −1 −1 1 −1 1 −1 1 −1 −1 1 1 1 −1 −1 −1 −1 −1 −1 −1 1 −1 1 1 −1 −1 1 −1 −1 1 1 1 −1 −1 −1 −1 1 1 −1 1 1 −1 1 1 −1 −1 1 1 1 −1 −1 −1 −1 −1 −1 −1 1 1 −1 1 1 1 −1 −1 1 1 1 1 −1 −1 1 1 1 1 −1 1 −1 1 −1 1 1 1 −1 −1 −1 1 1 1 1 1 1 1 1 −1 1 −1 −1 1 1 −1 1 1 −1 −1 1 1 1 1 1 −1 1 −1 1 1 −1 1 1 −1 1 1 −1 −1 −1 −1 −1 −1 −1 1 1 −1 1 1 1 −1 −1 −1 1 1 1 −1 −1 1 1 1 1 1 −1 1 −1 1 1 −1 1 1 1 −1 1 1 1 −1 −1 −1 −1 −1 −1 −1 1 1 1 −1 1 1 −1 −1 1 1 1 −1 1 1 −1 −1 1 1 1 −1 −1 −1 −1 1 −1 1 1 −1 1 1 −1 −1 1 1 1 1 −1 −1 −1 −1 −1 −1 −1 1 1 −1 1 1 −1 −1 1 1 1 1 −1 −1 1 1 1 1 1 −1 1 −1 1 −1 1 1 1 −1 1 1 1 −1 −1 −1 −1 −1 −1 −1 1 1 −1 1 1 1 −1 −1 1 1 −1 −1 1 1 1 −1 −1 −1 −1 1 −1 1 1 −1 1 −1 1 1 −1 −1 1 1 −1 −1 1 1 1 1 1 1 1 1 −1 1 −1 −1 1 1 1 −1 −1 −1 −1 1 1 1 −1 −1 −1 −1 1 1 −1 1 1 −1 1 −1 −1 1 1 1 −1 −1 −1 −1 −1 −1 −1 1 1 1 1 1 −1 −1 1 −1 −1 −1 1 −1 −1 −1 −1 1 1 −1 1 1 1 −1 −1 1 1 1 1 −1 −1 1 1 1 1 −1 −1 −1 −1 −1 −1 −1 1 1 −1 1 1 1 −1 −1 1 1 1 1 1 −1 1 1 −1 1 1 −1 1 1 1 −1 1 1 1 −1 −1 −1 −1 −1 −1 −1 1 1 −1 1 1 −1 −1 1 1 −1 −1 1 1 1 −1 −1 −1 −1 1 1 −1 1 1 −1 1 1 −1 −1 1 −1 −1 1 1 1 1 1 1 1 −1 1 1 −1 −1 1 1 1 −1 −1 −1 1 1 1 −1 −1 −1 1 −1 1 −1 1 −1 1 −1 1 −1 −1 1 −1 −1 1 1 1 1 1 1 1 −1 1 −1 −1 1 1 −1 1 1 1 −1 −1 1 1 1 1 1 −1 1 1 −1 1 1 −1 1 1 1 −1 −1 −1 1 1 1 1 1 1 1 1 −1 1 1 −1 −1 1 1 1 −1 −1 −1 1 1 1 −1 −1 −1 −1 1 −1 1 −1 1 −1 1 −1 1 −1 −1 1 −1 1 1 −1 −1 −1 −1 −1 −1 −1

−1 1 −1 1 1 −1 −1 1 −1 −1 1 1 −1 −1 −1 −1 1 1 −1 1 1 −1 1 −1 −1 1 −1 −1 1 1 1 1 1 1 1 −1 1 −1 −1 1 1 1 −1 −1 −1 1 1 −1 −1 −1 −1 1 1 −1 1 −1 1 1 −1 −1 1 1 1 1 −1 −1 −1 −1 −1 −1 −1 1 −1 1 1 −1 −1 1 −1 −1 1 1 1 −1 −1 −1 −1 1 −1 1 −1 1 −1 −1 1 1 −1 1 1 −1 −1 −1 −1 −1 −1 −1 1 1 1 1 1 −1 −1 1 1 1 −1 −1 1 1 1 1 1 −1 1 1 −1 1 1 −1 1 1 1 −1 1 1 1 −1 −1 −1 −1 −1 −1 −1 1 1 −1 1 1 1 −1 −1 1 1 −1 −1 1 1 1 −1 −1 −1 −1 1 1 −1 1 −1 1 −1 −1 1 1 −1 −1 1 1 1 1 1 1 1 −1 1 −1 −1 1 1 1 −1 −1 −1 1 1 1 −1 −1 −1 −1 1 1 −1 1 1 −1 1 −1 −1 1 −1 −1 1 1 1 1 1 1 1 −1 1 −1 −1 1 1 1 −1 1 1 1 −1 −1 1 1 1 1 −1 1 −1 1 −1 1 1 1 −1 −1 −1 1 1 1 1 1 1 1 1 −1 1 −1 −1 1 1 1 −1 −1 −1 1 1 1 −1 −1 −1 −1 1 1 −1 1 1 −1 1 −1 −1 1 −1 −1 1 1 1 1 1 1 1 −1 1 −1 −1 1 1 1 −1 1 1 1 −1 −1 1 1 1 1 −1 1 −1 1 −1 1 1 1 −1 1 1 1 −1 −1 −1 −1 −1 −1 −1 1 −1 1 1 −1 −1 1 1 1 −1 −1 1 1 1 1 1 −1 −1 1 1 −1 1 1 −1 −1 −1 1 1 1 1 1 1 1 −1 1 −1 −1 1 1 1 −1 1 1 1 −1 −1 1 1 1 1 −1 1 −1 1 −1 1 1 1 −1 −1 −1 1 1 1 1 1 1 1 1 −1 1 −1 −1 1 1 −1 −1 −1 1 1 −1 1 1 −1 1 1 −1 −1 1 1 1 −1 −1 −1 −1 −1 −1 −1 1 1 −1 1 1 1 −1 −1 1 1 −1 −1 −1 −1 1 −1 1 −1 1 −1 −1 1 −1 −1 1 1 1 1 1 1 1 −1 1 −1 −1 1 1 1 −1 −1 −1 1 1 1 −1 −1 −1 −1 1 1 −1 1 −1 1 −1 −1 1 −1 −1 1 1 1 1 1 1 1 −1 1 1 −1 −1 1 1 1 −1 1 1 −1 −1 1 1 1 1 −1 1 −1 1 −1 1 1 1 −1 −1 −1 1 1 1 1 1 1 1 −1 −1 1 1 1 −1 1 −1 −1 1 1 1 −1 −1 −1 1 1 1 −1 −1 −1 −1 1 1 −1 1 −1 1 1 −1 −1 1 1 1 1 −1 −1 −1 −1 −1 −1 1 1 −1 1 1 1 −1 −1 1 −1 −1 1 1 −1 −1 −1 −1 1 1 −1 1 1 −1 1 −1 −1 1 1 −1 −1 1 1 1 1 1 1 1 −1 1 −1 −1 1 1 1 −1 −1 −1 1 1 1 −1 −1 −1 −1 1 −1 1 −1 1 −1 1 −1 −1 1 1 1 −1 1 1 −1 −1 −1 −1 −1 −1 −1 −1 1 1 1 −1 −1 1 1 −1 −1 1 1 1 −1 −1 −1 −1 1 1 −1 1 1 −1 1 1 −1 −1 1 1 1 −1 −1 −1 −1 −1 −1 −1 1 1 −1 1 1 1 −1 −1 1 1 1 1 −1 −1 1 1 1 1 −1 1 −1 1 −1 1 1 1 −1 1];

sequence (76): G_2048(4,:)=[1 −1 −1 1 −1 1 −1 1 −1 −1 −1 −1 1 1 −1 −1 −1 1 1 −1 −1 1 −1 1 1 1 1 1 1 1 1 −1 −1 −1 1 1 1 −1 1 −1 1 −1 1 −1 1 1 1 1 −1 −1 1 1 1 −1 1 1 1 −1 −1 1 −1 1 1 1 1 1 1 1 1 −1 −1 −1 −1 1 1 1 −1 1 −1 1 −1 1 −1 1 1 1 1 −1 −1 1 1 1 1 −1 −1 1 1 1 −1 1 1 −1 −1 −1 −1 −1 −1 −1 1 1 −1 1 1 1 −1 −1 1 1 1 1 −1 1 1 1 −1 −1 1 1 1 1 −1 1 1 1 −1 1 −1 1 −1 1 −1 1 1 1 −1 −1 −1 −1 −1 −1 1 1 1 1 1 1 1 1 −1 −1 −1 1 1 1 −1 1 −1 1 −1 1 1 1 1 1 1 1 −1 −1 1 −1 1 1 1 −1 1 1 1 −1 −1 −1 1 1 −1 1 1 1 −1 −1 −1 −1 −1 1 −1 1 1 −1 1 −1 1 1 1 −1 −1 −1 1 1 1 −1 1 1 1 −1 −1 1 1 −1 −1 1 1 1 1 1 1 1 −1 −1 1 1 −1 1 1 1 −1 −1 1 1 1 −1 −1 1 1 −1 −1 −1 −1 −1 −1 1 1 1 −1 −1 1 1 1 1 −1 −1 −1 −1 −1 1 −1 1 1 −1 −1 −1 −1 −1 1 1 1 1 1 1 1 1 1 1 1 −1 1 1 −1 1 1 −1 1 1 −1 1 1 −1 −1 −1 −1 −1 1 1 −1 1 1 −1 1 1 1 1 1 1 1 1 1 1 −1 −1 −1 −1 1 1 1 −1 −1 1 1 −1 −1 1 1 −1 1 1 1 1 1 1 −1 −1 1 1 1 1 −1 1 1 1 −1 −1 1 1 −1 −1 −1 −1 −1 1 1 1 −1 1 1 1 −1 1 1 −1 −1 1 1 −1 1 1 1 1 −1 1 1 −1 1 1 1 1 1 1 1 1 −1 −1 1 1 −1 1 1 −1 1 1 1 1 1 1 −1 −1 1 1 1 1 −1 1 1 1 1 −1 −1 −1 −1 −1 −1 −1 −1 1 1 1 1 −1 −1 1 1 −1 1 1 −1 −1 −1 −1 1 1 −1 −1 −1 1 1 −1 1 1 −1 1 1 −1 1 1 −1 −1 1 1 1 −1 −1 1 1 1 −1 −1 1 1 1 1 1 −1 −1 1 1 −1 1 1 1 1 1 1 −1 −1 −1 −1 −1 −1 −1 −1

−1 1 1 −1 1 1 −1 1 −1 1 −1 1 1 1 1 −1 −1 1 1 −1 1 1
−1 −1 1 −1 1 1 1 1 1 1 1 −1 −1 1 −1 −1 1 −1 1 −1 1
−1 −1 −1 −1 1 1 −1 −1 −1 1 1 −1 −1 1 −1 1 1 1 1 1 1
1 −1 −1 −1 1 1 −1 1 −1 1 −1 1 1 1 1 −1 −1 1 1 −1 1
1 −1 −1 1 −1 1 1 1 1 1 1 1 −1 −1 −1 1 1 −1 1 −1 1 −1
1 1 1 1 −1 −1 1 1 1 −1 −1 1 1 −1 1 −1 −1 −1 −1 −1 −1
−1 1 1 −1 1 1 −1 1 −1 1 −1 1 1 1 1 −1 −1 1 1 −1 1 1
−1 −1 1 −1 1 1 1 1 1 1 1 −1 −1 1 −1 −1 1 −1 1 −1 1
−1 −1 −1 −1 1 1 −1 −1 −1 1 1 −1 −1 1 −1 1 1 1 1 1 1
1 −1 −1 −1 1 1 −1 1 −1 1 −1 1 1 1 1 −1 −1 1 1 −1 1
1 −1 −1 1 −1 1 1 1 1 1 1 1 −1 −1 1 −1 −1 1 −1 1 −1
1 −1 −1 −1 −1 1 1 −1 −1 −1 1 1 −1 −1 1 −1 1 1 1 1 1
1 1 −1 −1 1 −1 −1 1 −1 1 −1 1 −1 −1 −1 −1 1 1 1 −1 −1
1 −1 −1 1 1 −1 1 −1 −1 −1 −1 −1 −1 −1 1 1 1 −1 1 1 1 −1
1 −1 1 −1 1 1 1 1 −1 −1 1 1 1 −1 −1 1 1 1 −1 1 −1 −1
−1 −1 −1 −1 −1 1 1 1 −1 −1 1 −1 1 −1 1 −1 −1 −1 −1
1 1 −1 −1 1 −1 −1 1 1 −1 1 −1 −1 −1 −1 −1 −1 −1 1 1
1 1 −1 −1 1 −1 1 −1 1 −1 −1 −1 −1 1 1 1 −1 −1 −1 1 1
−1 −1 1 −1 1 1 1 1 1 1 1 −1 −1 1 −1 −1 1 −1 1 −1 1
−1 −1 −1 −1 1 1 −1 −1 1 −1 −1 1 −1 1 −1 −1 −1 −1 −1
−1 −1 1 1 1 1 −1 −1 1 −1 1 −1 1 −1 −1 −1 −1 1 1 1 −1
−1 −1 1 1 −1 −1 1 −1 1 1 1 1 1 1 1 1 −1 −1 −1 1 1 1 −1
1 −1 1 1 −1 1 1 1 1 −1 −1 1 1 1 −1 1 1 −1 −1 1 −1 1 1 1
1 1 1 1 −1 −1 1 −1 −1 1 −1 1 −1 1 −1 −1 −1 −1 1 1 1 −1
−1 −1 1 1 −1 −1 1 −1 1 1 1 1 1 1 1 1 −1 −1 1 −1 −1 1 1
−1 1 −1 1 −1 −1 −1 −1 1 1 1 −1 −1 1 −1 −1 1 1 −1 1 1 −1
−1 −1 −1 −1 −1 −1 1 1 1 −1 −1 1 −1 1 −1 1 −1 −1 −1
−1 1 1 −1 −1 −1 1 1 1 −1 −1 1 −1 1 1 1 1 1 1 1 1 −1 −1
−1 1 1 −1 1 −1 1 −1 1 1 1 1 −1 −1 1 1 −1 1 1 1 −1 −1
1 −1 1 1 1 1 1 1 1 −1 −1 −1 1 1 −1 1 −1 1 −1 1 1 1 1 1
−1 −1 1 1 1 1 −1 −1 1 1 −1 1 1 −1 −1 −1 −1 −1 −1 −1 1 1
1 −1 1 1 −1 1 −1 1 −1 1 1 1 1 −1 −1 1 1 1 −1 1 1 1 −1 −1
1 −1 1 1 1 1 1 1 1 −1 −1 1 −1 −1 1 −1 1 −1 1 1 −1 −1
−1 −1 1 1 −1 −1 −1 1 1 1 −1 −1 1 −1 1 1 1 1 1 1 1 1 −1
−1 −1 1 1 −1 1 −1 1 −1 1 1 1 1 −1 −1 1 1 1 −1 1 1 1 −1
−1 1 −1 1 1 1 1 1 1 1 −1 −1 1 −1 −1 1 −1 1 −1 1 1 −1
−1 −1 −1 1 1 −1 −1 −1 1 1 1 −1 −1 1 −1 1 1 1 1 1 1 1
−1 −1 1 −1 −1 1 −1 1 −1 1 −1 −1 −1 −1 1 1 1 −1 −1 1 1
−1 −1 1 −1 1 −1 −1 −1 −1 −1 −1 −1 1 1 1 1 1 −1 −1 1 1
−1 1 −1 1 −1 −1 −1 −1 1 1 1 −1 −1 −1 1 1 1 −1 −1 1 1 −1
1 1 1 1 1 1 1 −1 −1 −1 1 1 −1 1 −1 1 −1 1 1 1 1 1 −1 −1
1 1 −1 1 1 −1 −1 1 −1 1 1 1 1 1 1 1 −1 −1 −1 1 1 1 −1
1 −1 1 1 −1 1 1 1 1 −1 −1 1 1 1 −1 −1 1 1 1 −1 1 −1 −1
−1 −1 −1 −1 −1 1 1 1 −1 1 1 1 −1 1 −1 1 −1 1 1 1 1 1 −1 −1
1 1 −1 1 1 −1 −1 1 −1 1 1 1 1 1 1 1 −1 −1 −1 1 1 1 −1
1 −1 1 1 −1 1 1 1 1 −1 −1 1 1 1 −1 −1 1 1 1 −1 1 1 1 1 1
1 1 1 1 1 1 −1 −1 1 −1 1 −1 1 −1 −1 −1 −1 1 1 1 −1 −1
1 −1 −1 1 1 −1 1 1 1 1 1 1 1 1 1 1 1 1 1 −1 1 1 −1 1 1 −1
1 1 1 1 −1 −1 1 1 1 −1 −1 1 1 −1 1 1 −1 −1 −1 −1 −1 −1
−1 1 1 −1 1 1 1 1 −1 1 1 −1 1 1 1 1 −1 −1 1 1 1 −1 1 1 1 −1
−1 1 1 −1 1 1 1 1 1 1 1 −1 −1 1 −1 −1 1 −1 1 −1 1 1 −1
−1 −1 −1 1 1 1 −1 −1 −1 1 1 1 −1 −1 1 −1 1 1 1 1 1 1 1
−1 −1 −1 1 1 1 −1 1 −1 1 −1 1 1 1 1 1 −1 −1 1 1 1 −1 1 1 1
−1 −1 1 −1 1 1 1 1 1 1 1 −1 −1 −1 1 1 1 −1 1 1 −1 1 1 −1
1 1 1 1 −1 −1 1 1 1 1 −1 −1 1 1 1 −1 1 1 1 −1 −1 −1 −1 −−1
−1 1 1 −1 1 1 −1 1 −1 1 −1 1 1 1 1 1 −1 −1 1 1 1 −1 1 1 1
−1 −1 1 −1 1 1 1 1 1 1 1 −1 −1 1 −1 −1 1 −1 1 −1 1 1
−1 −1 −1 −1 1 1 −1 −1 −1 1 1 −1 −1 1 −1 1 1 1 1 1 1 1
1 −1 −1 −1 1 1 −1 1 −1 1 −1 1 1 1 1 −1 −1 1 1 −1 1 1
1 −1 −1 1 −1 1 1 1 1 1 1 1 −1 −1 1 −1 −1 1 −1 1 −1 1 1 −1
1 −1 −1 −1 −1 1 1 −1 −1 −1 1 1 −1 −1 1 −1 1 1 1 1 1 1
1 1 −1 −1 1 −1 −1 1 −1 1 −1 1 −1 −1 −1 −1 1 1 1 −1 −1
1 −1 −1 1 1 −1 1 −1 −1 −1 −1 −1 −1 −1 −1 1 1];

sequence (77): G_2048(5,:)=[1 1 −1 −1 −1 −1 −1 −1 −1
1 −1 1 1 −1 −1 1 1 1 1 −1 −1 1 1 1 1 1 −1 1 1 −1 1 1 −1 1 1 1
−1 −1 −1 1 1 1 1 1 1 1 1 −1 1 1 −1 −1 1 1 1 −1 1 1 1 −1 −1
1 1 1 1 −1 1 1 −1 1 1 −1 1 1 1 −1 −1 −1 1 1 1 1 1 1 1 1 −1 1 1

−1 −1 1 1 −1 −1 −1 1 1 −1 −1 −1 −1 1 1 −1 1 −1 1 1 −1
−1 1 −1 −1 1 1 1 1 1 1 1 −1 1 −1 −1 1 1 −1 1 1 1 −1 −1
1 1 1 1 −1 1 −1 1 −1 1 1 1 −1 −1 −1 1 1 1 1 1 1 1 1 −1 1 1
−1 −1 1 1 −1 −1 −1 1 1 −1 −1 −1 −1 1 1 −1 1 −1 1 1 −1
−1 1 −1 1 −1 −1 −1 −1 −1 −1 −1 −1 1 1 1 1 1 −1 −1 1 1 −1
−1 1 1 −1 −1 −1 −1 1 −1 1 −1 1 −1 −1 1 −1 −1 1 1 1 1
1 1 1 1 −1 1 −1 −1 1 1 1 −1 −1 −1 1 1 1 −1 −1 −1 −1 1 1 −1
1 −1 1 −1 −1 1 −1 −1 1 1 1 1 1 1 1 −1 1 1 −1 −1 1 1 1 −1
1 1 −1 −1 1 1 1 1 1 −1 1 1 −1 1 1 −1 1 1 1 −1 −1 −1 1 1 1 1 1
1 1 1 −1 1 −1 −1 1 1 1 −1 −1 −1 1 1 1 −1 −1 −1 −1 1 1 −1
1 −1 1 1 −1 −1 1 1 1 1 1 1 1 1 1 1 1 −1 1 1 1 −1 −1 1 1 −1
−1 1 1 1 −1 −1 −1 −1 1 1 −1 1 1 −1 1 1 −1 −1 1 1 1 1 −1 −1 −1
−1 −1 −1 −1 1 1 −1 1 1 1 −1 −1 1 1 1 1 −1 −1 1 1 1 1 1 −1 1 1
−1 1 1 −1 1 1 −1 1 1 1 −1 −1 −1 −1 −1 −1 −1 −1 1 1 −1 1 1 1 −1
−1 1 1 −1 −1 1 1 1 −1 −1 −1 −1 1 1 −1 1 −1 1 1 −1 −1 1 1 −1
−1 1 1 1 1 1 1 1 −1 1 1 −1 −1 1 1 1 −1 −1 −1 1 1 1 −1 −1
−1 −1 1 1 −1 1 1 −1 1 1 −1 −1 1 1 −1 1 1 −1 −1 −1 −1 −1 −1 −1
1 1 1 1 −1 −1 1 1 −1 −1 1 1 1 −1 −1 −1 −1 1 1 −1 1 1 −1 1 1 −1
−1 1 1 −1 −1 1 1 1 1 1 1 1 −1 1 1 −1 −1 1 1 1 −1 −1 −1 1 1
1 −1 −1 −1 −1 1 1 −1 1 1 −1 1 1 −1 −1 1 1 −1 −1 1 1 1 1 1 1
1 −1 1 1 −1 −1 1 1 1 −1 1 1 1 −1 −1 1 1 1 1 1 −1 1 1 −1 1 1 −1
1 1 −1 1 1 1 −1 −1 −1 −1 −1 −1 −1 −1 1 1 −1 1 1 1 −1 −1 1 1 1
1 −1 −1 1 1 1 1 1 −1 1 1 −1 1 1 −1 1 1 1 −1 −1 −1 1 1 1 1 1 1
1 1 −1 1 1 −1 −1 1 1 1 −1 1 1 1 −1 −1 1 1 1 1 1 −1 1 1 −1 1 1 −1
1 1 −1 −1 −1 1 1 1 1 1 1 1 1 −1 1 1 −1 −1 1 1 1 −1 −1 −1
1 1 −1 −1 −1 −1 −1 1 1 −1 1 1 −1 1 1 −1 −1 1 1 −1 −1 1 1 1 1 1
1 1 −1 1 1 −1 −1 1 1 1 −1 1 1 1 −1 −1 1 1 1 1 1 −1 1 1 −1 1 1 −1
1 1 −1 −1 −1 1 1 1 1 1 1 1 1 −1 1 1 −1 −1 1 1 1 −1 −1 −1
1 1 −1 −1 −1 −1 1 1 −1 1 1 −1 1 1 −1 −1 1 1 −1 1 1 −1 −1 −1
−1 −1 −1 −1 1 1 1 1 1 −1 −1 1 1 −1 −1 1 1 1 −1 −1 −1 −1
1 −1 1 1 −1 1 1 −1 −1 1 1 −1 −1 1 1 1 1 1 1 1 1 −1 1 1 −1 −1
1 1 −1 −1 −1 1 1 1 −1 −1 −1 −1 1 1 −1 1 1 −1 1 1 −1 −1 1 1 −1
−1 1 1 1 1 1 1 1 −1 1 1 −1 −1 1 1 1 −1 1 1 1 −1 −1 1 1 1 1 1
−1 1 1 −1 1 1 −1 1 1 1 −1 −1 −1 −1 −1 −1 −1 −1 1 1 1 −1 1 1 −1
1 1 −1 −1 1 1 1 1 −1 −1 1 1 1 1 1 −1 1 1 −1 1 1 −1 1 1 1 −1 −1
−1 1 1 1 1 1 1 1 −1 1 1 −1 −1 1 1 1 −1 1 1 1 −1 −1 1 1 1 1 1
−1 1 1 −1 1 1 −1 1 1 1 −1 −1 −1 1 1 1 1 1 1 1 1 −1 1 1 −1 −1
1 1 −1 −1 −1 1 1 1 −1 −1 −1 −1 1 1 −1 1 1 −1 1 1 −1 −1 1 1 −1
−1 1 1 1 1 1 1 1 −1 1 1 −1 −1 1 1 1 −1 1 1 1 −1 −1 1 1 1 1 1
−1 1 1 −1 1 1 −1 1 1 1 −1 1 1 1 −1 −1 −1 −1 −1 −1 −1 −1 1 1 −1
1 1 −1 −1 1 1 1 1 −1 −1 1 1 1 1 1 −1 1 1 −1 1 1 −1 1 1 1 −1 −1
−1 1 1 1 1 1 1 1 −1 1 1 −1 −1 1 1 1 −1 1 1 1 −1 −1 1 1 1 1 1
−1 1 1 −1 1 1 −1 1 1 1 −1 1 1 1 −1 −1 −1 −1 −1 −1 −1 −1 1 1 −1
1 1 −1 −1 1 1 1 1 −1 −1 1 1 1 1 1 −1 1 1 −1 1 1 −1 1 1 1 −1 1 1
1 −1 −1 −1 −1 −1 −1 −1 1 1 −1 1 1 1 −1 −1 1 1 −1 −1 1 1 1
−1 −1 −1 −1 1 1 −1 1 1 −1 1 1 −1 −1 1 1 −1 −1 1 1 1 1 1 1 1 1
−1 1 1 −1 −1 1 1 1 −1 −1 −1 1 1 1 −1 −1 −1 −1 1 1 −1 1 1 −1
1 −1 −1 1 1 1 1 −1 −1 −1 −1 −1 −1 −1 −1 1 1 −1 1 1 1 −1 −1
1 −1 −1 1 1 1 −1 −1 −1 −1 1 1 −1 1 1 −1 1 1 −1 −1 1 1 1 1 −1
−1 −1 −1 −1 −1 −1 1 1 −1 1 1 1 −1 −1 1 1 1 1 −1 −1 1 1 1 1
1 −1 1 1 −1 1 1 −1 1 1 1 −1 1 1 1 −1 −1 −1 −1 −1 −1 −1 1 1 −1
1 1 −1 −1 1 1 −1 −1 1 1 1 −1 −1 −1 −1 1 1 −1 1 1 −1 1 1 −1 −1
1 1 1 −1 −1 −1 −1 −1 −1 −1 1 1 −1 1 1 1 −1 −1 1 1 1 1 −1
−1 1 1 1 1 −1 1 1 −1 1 1 −1 1 1 1 −1 −1 −1 1 1 1 1 1 1 1 1 −1
1 −1 −1 1 1 1 −1 1 1 1 −1 −1 1 1 1 1 1 −1 1 1 −1 1 1 −1 1 1 1 −1
1 1 −1 −1 −1 −1 −1 −1 −1 1 1 −1 1 1 1 −1 −1 1 1 1 1 −1 −1
1 1 1 1 −1 1 1 −1 1 1 −1 1 1 1 −1 1 1 1 −1 −1 −1 −1 −1 −1 −1
1 −1 1 1 1 −1 −1 1 1 −1 −1 1 1 1 −1 −1 −1 −1 1 1 −1 1 1 −1 1 1
−1 −1 1 1 1 1 −1 −1 −1 −1 −1 −1 −1 −1 1 1 −1 1 1 1 −1 −1 1 1
1 1 −1 −1 1 1 1 1 1 −1 1 1 −1 1 1 −1 1 1 1 −1 −1 −1 1 1 1 1 1
1 1 1 −1 1 1 −1 −1 1 1 1 −1 1 1 1 −1 −1 1 1 1 1 1 −1 1 1 −1 1 1
−1 1 1 1 −1 −1 −1 1 1 1 1 1 1 1 1 −1 1 1 −1 −1 1 1 1 −1 −1
−1 1 1 1 −1 −1 −1 −1 1 1 −1 1 1 −1 1 1 −1 −1 1 1 −1 −1 1 1 1 1
1 1 1 1 −1 1 1 −1 −1 1 1 1 −1 1 1 1 −1 −1 1 1 1 1 1 −1 1 1 −1
1 −1 1 1 1 −1 1 1 1 −1 −1 −1 −1 −1 −1 −1 −1 1 1 −1 1 1 1 −1 −1
1 1 1 −1 −1 1 1 1 1 1 −1 1 1 −1 1 1 −1 1 1 1 −1 −1 −1 1 1 1 1
1 1 1 1 −1 1 1 −1 −1 1 1 1 −1 1 1 1 −1 −1 1 1 1 1 1 −1 1 1 −1

1 −1 1 1 −1 1 1 −1 −1 −1 −1 −1 −1 −1 1 −1 1 1 −1 −1 1 1 1 −1 −1 1 1 1 1 −1 1 −1 1 −1 1 1 −1 1 1 −1 −1 −1 −1 −1 −1 −1 1 −1 1 1 −1 1 1 −1 −1 1 −1 −1 1 1 −1 −1 −1 −1 1 −1 1 −1 1 −1 −1 1 1 1 1 1 1 1 1 1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 −1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 1 −1 −1 1 1 −1 1 1 −1 1 1 −1 −1 1 1 1 1 −1 1 −1 1 −1 −1 −1 1 1 1 1 1 1 1 −1 1 −1 −1 1 1 −1 −1 −1 1 1 −1 −1 −1 −1 1 −1 1 −1 1 −1 −1 1 1 1 1 −1 −1 −1 −1 −1 −1 1 −1 1 1 −1 −1 1 −1 −1 1 1 −1 −1 −1 −1 1 −1 1 −1 1 −1 −1 1 −1 −1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 1 1 1 1 −1 1 1 −1 1 −1 1 1 −1 1 −1 −1 −1 −1 −1 −1 −1 1 1 −1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 1 −1 1 −1 −1 1 1 −1 −1 −1 1 1 −1 −1 −1 −1 1 −1 1 −1 1 −1 −1 1 1 −1 −1 1 1 1 1 1 1 1 −1 1 −1 −1 1 1 −1 1 1 −1 −1 1 1 1 1 −1 1 −1 1 1 −1 1 1 −1 1 −1 −1 −1 −1 −1 −1 −1 −1 1 1 1 1 1 −1 −1 1 1 1 −1 −1 1 1 1 1 −1 1 −1 1 −1 1 1 −1 1 1 −1 1 1 −1 −1 −1 −1 −1 −1 −1 −1 −1 −1 −1 1 −1 1 1 −1 −1 1 −1 1 −1 1 1 −1 1 1 1 −1 −1 1 −1 1 −1 1 −1 −1 1 1 1;

sequence (78): G_2048(6,:)=[1 −1 −1 1 −1 1 −1 1 −1 −1 −1 −1 1 1 −1 −1 1 −1 −1 1 1 −1 −1 −1 −1 −1 −1 −1 −1 1 1 −1 1 1 −1 1 1 −1 1 −1 1 1 1 1 −1 −1 1 1 1 1 −1 −1 1 1 −1 1 −1 −1 −1 −1 −1 −1 −1 1 1 −1 1 1 −1 1 −1 1 −1 1 1 1 1 −1 −1 1 1 −1 1 1 −1 −1 1 −1 1 1 1 1 1 1 1 −1 −1 −1 1 −1 1 −1 1 −1 1 1 1 1 −1 −1 1 1 1 −1 −1 1 1 −1 1 −1 −1 −1 −1 −1 −1 −1 1 1 −1 1 1 −1 1 −1 1 −1 1 1 1 1 −1 −1 1 1 −1 1 1 −1 −1 1 −1 1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 1 −1 −1 1 1 1 1 1 1 1 1 −1 −1 1 1 1 −1 −1 1 −1 1 −1 1 −1 −1 −1 −1 1 1 −1 −1 1 −1 −1 1 −1 −1 1 −1 1 −1 −1 −1 −1 −1 −1 −1 1 1 1 −1 1 1 −1 1 1 −1 1 −1 1 1 1 1 −1 −1 1 1 1 1 −1 −1 1 1 −1 1 −1 −1 −1 −1 −1 −1 −1 1 1 1 −1 1 1 −1 1 −1 1 −1 1 1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 1 1 1 −1 −1 1 1 −1 1 −1 −1 −1 −1 −1 −1 −1 1 1 1 −1 −1 1 −1 1 −1 1 −1 −1 −1 −1 1 1 −1 −1 1 −1 −1 1 −1 1 1 −1 1 −1 −1 1 −1 −1 1 −1 −1 −1 −1 −1 −1 −1 −1 1 1 1 −1 −1 1 −1 1 −1 1 −1 1 −1 −1 −1 1 1 −1 1 1 1 1 −1 1 −1 1 1 1 1 −1 −1 1 1 1 1 1 1 1 −1 1 −1 1 −1 −1 1 1 −1 −1 1 −1 1 −1 1 −1 1 −1 −1 −1 −1 1 1 −1 −1 1 −1 −1 1 −1 1 −1 1 1 −1 1 −1 −1 −1 −1 −1 −1 −1 1 1 −1 1 1 −1 1 −1 1 −1 1 −1 1 1 1 1 −1 −1 1 1 1 −1 −1 1 1 −1 1 −1 −1 −1 −1 −1 −1 −1 1 1 1 −1 1 1 1 −1 1 −1 −1 −1 −1 −1 −1 −1 −1 1 1 −1 1 1 1 1 −1 1 1 −1 1 1 1 1 −1 1 −1 1 1 1 1 1 1 1 −1 −1 1 −1 1 −1 1 1 1 1 1 −1 −1 1 1 1 −1 1 −1 1 −1 1 −1 −1 −1 −1 −1 −1 −1 1 1 −1 1 1 1 1 −1 −1 1 −1 1 −1 1 1 −1 1 1 1 1 1 1 1 −1 −1 1 −1 −1 1 −1 1 −1 1 1 −1 −1 −1 −1 1 1 −1 −1 −1 1 1 −1 −1 1 −1 1 1 1 1 1 1 1 1 −1 −1 −1 1 1 −1 1 1 −1 −1 1 −1 1 1 1 1 1 1 1 −1 −1 −1 1 1 −1 1 −1 1 −1 1 1 1 1 −1 −1 1 1 1 −1 −1 1 1 −1 1 −1 −1 −1 −1 −1 −1 −1 1 1 −1 1 1 −1 1 1 1 1 −1 1 −1 1 1 1 1 −1 −1 1 1 1 −1 1 1 −1 −1 1 −1 −1 1 −1 1 1 1 1 1 1 1 −1 −1 1 −1 −1 1 −1 1 −1

1 −1 −1 −1 −1 1 1 −1 −1 −1 1 1 −1 −1 1 −1 1 1 −1 1 1 1 1 1 1 1 1 −1 −1 1 −1 −1 1 −1 1 −1 1 −1 −1 −1 −1 −1 1 1 1 −1 −1 1 −1 −1 1 1 −1 1 −1 −1 −1 −1 −1 −1 −1 −1 1 1 1 1 −1 −1 1 −1 1 −1 1 −1 −1 −1 −1 1 1 −1 −1 −1 1 1 −1 −1 1 1 −1 1 1 1 1 1 1 1 −1 −1 −1 1 1 −1 1 −1 1 −1 1 1 1 1 1 −1 −1 1 1 −1 1 1 −1 −1 1 −1 1 1 1 1 1 1 1 −1 −1 1 −1 −1 1 1 −1 1 −1 1 −1 −1 −1 −1 1 1 1 −1 −1 −1 1 1 1 −1 −1 1 1 −1 1 1 1 1 1 1 1 −1 −1 −1 1 1 −1 1 −1 1 −1 1 1 1 1 1 −1 −1 1 1 −1 1 1 −1 −1 1 −1 1 1 1 1 1 1 1 −1 −1 −1 1 1 1 −1 1 −1 1 1 1 1 −1 −1 1 1 1 1 −1 −1 1 1 1 −1 1 1 −1 −1 −1 −1 −1 −1 −1 1 1 −1 1 1 1 −1 1 1 −1 1 1 −1 1 1 1 1 1 −1 −1 1 1 −1 1 1 −1 −1 1 −1 1 1 1 1 1 1 1 −1 −1 1 −1 −1 1 1 −1 1 −1 1 −1 −1 −1 −1 1 1 1 −1 −1 −1 1 1 1 −1 −1 1 1 −1 1 1 1 1 1 1 −1 −1 1 −1 −1 1 −1 1 −1 1 −1 1 −1 −1 −1 −1 1 1 −1 −1 1 −1 −1 1 −1 1 −1 −1 −1 −1 −1 −1 −1 −1 1 1 1 1 1 −1 −1 1 −1 1 −1 1 −1 −1 −1 −1 1 1 1 −1 −1 −1 1 1 1 −1 −1 1 −1 1 1 1 1 1 1 1 1 −1 −1 1 −1 −1 1 1 −1 1 1 −1 1 1 −1 −1 −1 −1 1 1 1 −1 −1 1 1 −1 1 1 −1 −1 −1 1 1 1 1 −1 1 1 1 1 1 −1 −1 1 −1 −1 1 −1 1 −1 1 −1 −1 −1 −1 −1 −1 −1 −1 1 1 1 −1 −1 1 −1 1 −1 1 −1 −1 −1 1 1 −1 −1 −1 1 1 −1 −1 1 −1 1 1 1 1 1 1 1 1 −1 −1 −1 1 1 1 −1 1 1 −1 −1 1 1 −1 1 −1 1 −1 1 1 1 1 1 −1 −1 1 1 −1 1 1 −1 −1 1 −1 1 1 1 1 1 1 1 −1 −1 1 1 −1 1 1 1 1 1 1 1 −1 −1 1 −1 1 −1 1 −1 1 −1 1 −1 −1 1 −1 −1 1 1 1 −1 −1 −1 −1 1 1 −1 −1 1 −1 1 1 1 1 1 1 1 1 −1 −1 −1 1 −1 1 −1 1 −1 −1 −1 −1 −1 1 1 1 −1 −1 1 −1 1 −1 −1 −1 −1 −1 −1 −1 −1 1 1 −1 −1 −1 1 1 −1 −1 1 −1 1 1 1 1 1 1 1 −1 −1 1 −1 1 1 −1 1 −1 1 −1 1 −1 −1 −1 −1 1 1 1 −1 −1 −1 1 1 −1 1 1 1 1 1 1 1 −1 −1 −1 1 1 −1 −1 1 1 1 1 1 −1 −1 −1 1 1 −1 1 −1 1 −1 1 1 1 1 −1 −1 1 1 −1 1 1 −1 −1 1 −1 1 1 1 1 1 1 1 −1 −1 −1 1 1 −1 1 −1 1 −1 1 1 1 1 −1 −1 1 −1 1 1 −1 1 1 1 1 1 −1 −1 −1 1 −1 −1 −1 −1 −1 −1 −1 −1 1 1 1 −1 1 1 1 −1 −1 1 −1 1 −1 1 −1 −1 −1 −1 1 1 −1 −1 1 −1 −1 1 1 −1 1 −1 1 −1 −1 −1 −1 −1 −1 −1 1 1 −1 1 1 −1 1 −1 1 −1 1 1 1 1 −1 −1 1 1 1 −1 −1 1 1 −1 1 −1 1 −1 1 1 1 1 −1 −1 1 1 1 −1 −1 1 1 −1 1 1 −1 −1 1 −1 1 1 1 1 1 1 1 −1 −1 −1 1 1 −1 1 −1 −1 −1 −1 −1 −1 −1 1 1 −1 1 1 −1 1 −1 1 −1 1 1 1 1 −1 −1 1 1 −1 1 1 −1 −1 1 −1 1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 1 −1 −1 1 −1 1 −1 1 −1 −1 −1 1 1 −1 −1 −1 1 1 −1 −1 1 −1 1 −1 1 −1 1 −1 −1 1 1 −1 1 −1 −1 −1 −1 −1 −1 1 1 1 −1 −1 1 −1 1 −1 1 −1 −1 −1 −1 1 1 −1 −1 −1 1 1 −1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 −1 −1 1 −1 −1 1 −1 1 −1 1 −1 −1 −1 −1 1 1 −1 −1 −1 1 1 −1 −1 1 −1 1 1 1 1 1 1 1 −1 −1 −1 1 1 −1 1 −1 1 −1 1 1 1 1 −1 −1 1 1 −1 1 1 −1 −1 1 −1 1 1 1 1 1 1 1 1 −1 −1 −1 1 1 −1 1 −1 1 −1 1 1 1 1 −1 −1 1 1 1 −1 −1 1 1 −1 1 −1 −1 −1 −1 −1 −1 −1 1 1];

sequence (79): G_2048(7,:)=[1 1 −1 −1 −1 −1 −1 −1 −1 1 −1 1 1 −1 −1 1 1 1 −1 −1 1 1 1 1 −1 1 −1 1 −1 1 1 −1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 1 −1 1 −1 −1 1 1 −1 −1 −1 1 1 −1 −1 −1 −1 1 −1 1 −1 1 −1 −1 1 −1 −1 1 1 1 1 1 1 1 −1 1 −1 −1 1 1 −1 1 1 −1 −1 1 1 1 1 −1 1 −1 1 −1 1 1 −1 −1 −1 1 1 1 1 1 1 1 1 −1 1

–1 –1 1 1 –1 –1 –1 1 1 –1 –1 –1 –1 1 –1 1 –1 1 –1
–1 1 –1 1 –1 –1 –1 –1 –1 –1 –1 1 1 1 1 –1 –1 1 –1
–1 1 1 –1 –1 –1 –1 1 –1 1 –1 1 –1 –1 1 –1 –1 1 1 1
1 1 1 1 –1 1 –1 –1 1 1 –1 –1 –1 1 1 –1 –1 –1 –1 1 –1
1 –1 1 –1 –1 1 –1 –1 1 1 1 1 1 1 1 –1 1 –1 –1 1 1 –1
1 1 –1 –1 1 1 1 1 –1 1 –1 1 –1 1 1 –1 1 1 –1 –1 –1
–1 –1 –1 –1 1 –1 1 1 –1 –1 1 1 1 –1 –1 1 1 1 1 –1 1
–1 1 –1 1 1 –1 –1 –1 1 1 1 1 1 1 1 –1 1 –1 –1 1 1 –1
1 1 –1 –1 1 1 1 1 –1 1 –1 1 –1 1 1 –1 –1 –1 1 1 1 1
1 1 1 –1 1 –1 –1 1 1 –1 –1 –1 1 1 –1 –1 –1 –1 1 –1
1 –1 1 –1 –1 1 –1 –1 1 1 1 1 1 1 1 –1 1 –1 –1 1 1 –1
1 1 –1 –1 1 1 1 1 –1 1 –1 1 –1 1 1 –1 1 1 –1 –1 –1
–1 –1 –1 –1 1 –1 1 1 –1 –1 1 1 1 –1 –1 1 1 1 1 –1 1
–1 1 –1 1 1 –1 –1 –1 1 1 1 1 1 1 1 –1 1 –1 –1 1 1 –1
1 1 –1 –1 1 1 1 1 –1 1 –1 1 –1 1 1 –1 1 1 –1 –1 –1
–1 –1 –1 –1 1 1 –1 1 –1 –1 1 1 1 –1 –1 1 1 1 1 –1 1
–1 1 –1 1 1 –1 1 1 –1 –1 –1 –1 –1 –1 –1 1 –1 1 1 –1
–1 1 –1 –1 1 1 –1 –1 –1 –1 1 –1 1 –1 1 –1 –1 1 1 1
1 1 1 1 1 1 –1 1 –1 1 1 –1 –1 1 1 1 –1 –1 1 1 1 1 –1
1 –1 1 –1 1 1 –1 –1 –1 1 1 1 1 1 1 1 –1 1 –1 –1 1 1
–1 1 1 –1 –1 1 1 1 1 –1 1 –1 1 –1 1 1 –1 –1 –1 1 1
1 1 1 1 1 –1 1 –1 –1 1 1 –1 –1 –1 1 1 –1 –1 –1 –1 1
–1 1 –1 1 –1 –1 1 –1 –1 1 1 1 1 1 1 1 –1 1 –1 –1 1
1 –1 1 1 –1 –1 1 1 1 1 –1 1 –1 1 –1 1 1 –1 –1 –1 1
1 1 1 1 1 1 –1 1 –1 –1 1 1 –1 –1 –1 1 1 –1 –1 –1 –1
1 –1 1 –1 1 –1 –1 1 1 1 –1 –1 –1 –1 –1 –1 –1 1 –1
1 1 –1 –1 1 –1 –1 1 1 –1 –1 –1 –1 1 –1 1 –1 1 –1 –1
1 –1 –1 1 1 1 1 1 1 1 –1 1 –1 –1 1 1 –1 –1 –1 1 1 –1
–1 –1 –1 1 –1 1 –1 1 –1 –1 1 –1 –1 1 1 1 1 1 1 1 –1
1 –1 –1 1 1 –1 1 1 –1 –1 1 1 1 1 –1 1 –1 1 –1 1 1 –1
–1 –1 1 1 1 1 1 1 1 –1 1 –1 –1 1 1 –1 –1 –1 1 1 –1
–1 –1 –1 1 –1 1 –1 1 –1 –1 1 –1 1 –1 –1 –1 –1 –1 –1
–1 1 1 1 1 –1 –1 1 –1 –1 1 1 –1 –1 –1 –1 1 –1 1 –1
1 –1 –1 1 1 1 –1 –1 –1 –1 –1 –1 –1 1 –1 1 1 –1 –1
1 1 1 –1 –1 1 1 1 1 –1 1 –1 1 –1 1 1 –1 1 1 –1 –1 –1
–1 –1 –1 –1 1 1 –1 1 –1 –1 1 –1 –1 1 1 –1 –1 –1 –1
1 –1 1 –1 1 –1 –1 1 –1 –1 1 1 1 1 1 1 1 –1 1 –1 –1
1 1 –1 –1 –1 1 1 –1 –1 –1 –1 1 –1 1 –1 1 –1 –1 1 1
1 –1 –1 –1 –1 –1 –1 –1 1 –1 1 1 –1 –1 1 –1 –1 1 1
–1 –1 –1 –1 1 –1 1 –1 1 –1 –1 1 –1 –1 1 1 1 1 1 1 1
–1 1 –1 –1 1 1 –1 –1 –1 1 1 –1 –1 –1 –1 1 –1 1 –1
1 –1 –1 1 –1 –1 1 1 1 1 1 1 1 –1 1 –1 –1 1 1 –1 1 1
–1 –1 1 1 1 1 –1 1 –1 1 –1 1 1 –1 –1 –1 1 1 1 1 1 1
1 –1 1 –1 –1 1 1 –1 –1 –1 1 1 –1 –1 –1 –1 1 –1 1 –1
1 –1 –1 1 1 1 –1 –1 –1 –1 –1 –1 –1 1 –1 1 1 –1 –1
1 –1 –1 1 1 –1 –1 –1 –1 1 –1 1 –1 1 –1 –1 1 1 1 –1
–1 –1 –1 –1 –1 –1 1 –1 1 1 –1 –1 1 1 1 –1 –1 1 1 1
1 –1 1 –1 1 –1 1 1 –1 1 1 –1 –1 –1 –1 –1 –1 –1 1 –1
1 1 –1 –1 1 –1 –1 1 1 –1 –1 –1 –1 1 –1 1 –1 1 –1 –1
1 1 1 –1 –1 –1 –1 –1 –1 –1 1 –1 1 1 –1 –1 1 1 1 –1
–1 1 1 1 1 –1 1 –1 1 –1 1 1 –1 –1 –1 1 1 1 1 1 1 1 –1
1 –1 –1 1 1 –1 1 1 –1 –1 1 1 1 1 –1 1 –1 1 –1 1 1 –1
1 1 –1 –1 –1 –1 –1 –1 –1 1 –1 1 1 –1 –1 1 1 1 –1 –1
1 1 1 1 –1 1 –1 1 –1 1 1 –1 1 1 –1 –1 –1 –1 –1 –1 –1
1 –1 1 1 –1 –1 1 –1 –1 1 1 –1 –1 –1 –1 1 –1 1 –1 1
–1 –1 1 –1 –1 1 1 1 1 1 1 1 –1 1 –1 –1 1 1 –1 –1 –1
1 1 –1 –1 –1 –1 1 –1 1 –1 1 –1 –1 1 1 1 –1 –1 –1 –1
–1 –1 –1 1 –1 1 1 –1 –1 1 –1 –1 1 1 –1 –1 –1 –1 1
–1 1 –1 1 –1 –1 1 1 1 1 1 1 1 1 1 1 1 –1 1 1 –1 –1 1
1 1 –1 –1 1 1 1 1 –1 1 –1 1 –1 1 1 –1 1 1 –1 –1 –1
–1 –1 –1 –1 1 –1 1 1 –1 –1 1 –1 –1 1 1 –1 –1 –1 –1
1 –1 1 –1 1 –1 –1 1 –1 –1 1 1 1 1 1 1 1 –1 1 –1 –1
1 1 –1 –1 –1 1 1 –1 –1 –1 –1 1 –1 1 –1 1 –1 –1 1 –1
1 –1 –1 –1 –1 –1 –1 –1 1 1 1 1 –1 –1 1 –1 –1 1 1 –1
–1 –1 –1 1 –1 1 –1 1 –1 –1 1 –1 –1 1 1 1 1 1 1 1 –1
1 –1 –1 1 1 –1 –1 –1 1 1 –1 –1 –1 –1 1 –1 1 –1 1 –1
–1 1 –1 –1 1 1 1 1 1 1 1 –1 1 –1 –1 1 1 –1 1 1 –1 –1
1 1 1 1 –1 1 –1 1 –1 1 1 –1 1 1 –1 –1 –1 –1 –1 –1 –1
1 –1 1 1 –1 –1 1 1 1 –1 –1 1 1 1 1 –1 1 –1 1 –1 1 1
–1 –1 –1 1 1 1 1 1 1 1 –1 1 –1 –1 1 1 –1 1 1 –1 –1
1 1 1 1 –1 1 –1 1 –1 1 1 –1 –1 –1 1 1 1 1 1 1 1 –1 1
–1 –1 1 1 –1 –1 –1 1 1 –1 –1 –1 –1 1 –1 1 –1 1 –1
–1 1 –1 –1 1 1 1 1 1 1 1 –1 1 –1 –1 1 1 –1 1 1 –1 –1
1 1 1 1 –1 1 –1 1 –1 1 1 –1 –1 –1 1 1 1 1 1 1 1 –1 1
–1 –1 1 1 –1 –1 –1 1 1 –1 –1 –1 –1 1 –1 1 –1 1 –1
–1 1 1 1 –1 –1 –1 –1 –1 –1 –1 1 –1 1 1 –1 –1 1 –1
–1 1 1 –1 –1 –1 –1 1 –1 1 –1 1 –1 –1 1 –1 –1 1 1 1
1 1 1 1 –1 1 –1 –1 1 1 –1 –1 –1 1 1 –1 –1 –1 –1 1 –1
1 –1 1 –1 –1 1 –1 –1 1 1 1 1 1 1 1 –1 1 –1 –1 1 1 –1
1 1 –1 –1 1 1 1 1 –1 1 –1 1 –1 1 1 –1 –1 –1 1 1 1 1
1 1 1 –1 1 –1 –1 1 1 –1 –1 –1 1 1 –1 –1 –1 –1 1 –1
1 –1 1 –1 –1 1 1 1 –1 –1 –1 –1 –1 –1 –1 1 –1 1 1 –1
–1 1 –1 –1 1 1 –1 –1 –1 –1 1 –1 1 –1 1 –1 –1 1 1 1
–1 –1 –1 –1 –1 –1 –1 1 –1 1 1 –1 –1 1 1 1 –1 –1 1
1 1 1 –1 1 –1 1 –1 1 1 –1 1 1 –1 –1 –1 –1 –1 –1 –1
1 –1 1 1 –1 –1 1 –1 –1 1 1 –1 –1 –1 –1 1 –1 1 –1 1
–1 –1 1 –1 –1 1 1 1 1 1 1 1 –1 1 –1 –1 1 1 –1 –1 –1
1 1 –1 –1 –1 –1 1 –1 1 –1 1 –1 –1 1 –1 1 –1 –1 –1
–1 –1 –1 –1 1 1 1 1 –1 –1 1 –1 –1 1 1 –1 –1 –1 –1
1 –1 1 –1 1 –1 –1 1 –1 –1 1 1 1 1 1 1 1 –1 1 –1 –1
1 1 –1 –1 –1 1 1 –1 –1 –1 –1 1 –1 1 –1 1 –1 –1 1 –1
–1 1 1 1 1 1 1 1 –1 1 –1 –1 1 1 –1 1 1 –1 –1 1 1 1 1 1
–1 1 –1 1 –1 1 1 –1];

sequence (80): G_2048(8,:)=[1 –1 –1 1 –1 1 –1 1 –1 –1
–1 –1 1 1 –1 –1 1 –1 –1 1 1 –1 1 –1 –1 –1 –1 –1 –1
–1 1 1 –1 1 1 –1 1 –1 1 –1 1 1 1 1 –1 –1 1 1 1 –1 –1
1 1 –1 1 –1 –1 –1 –1 –1 –1 –1 1 1 –1 1 1 –1 1 –1 1
–1 1 1 1 1 –1 –1 1 1 –1 1 1 –1 –1 1 –1 1 1 1 1 1 1 1
–1 –1 –1 1 –1 1 –1 1 –1 1 1 1 1 –1 –1 1 1 1 –1 –1 1
1 –1 1 –1 –1 –1 –1 –1 –1 –1 1 1 –1 1 1 –1 1 –1 1 –1
1 1 1 1 –1 –1 1 1 –1 1 1 –1 –1 1 –1 1 1 1 1 1 1 1 –1
–1 1 –1 –1 1 –1 1 –1 1 –1 –1 –1 –1 1 1 –1 –1 –1 1
1 –1 –1 1 –1 1 1 1 1 1 1 1 –1 –1 –1 1 1 –1 1 –1 1 –1
1 1 1 1 –1 –1 1 1 –1 1 1 –1 –1 1 –1 1 1 1 1 1 1 1 –1
–1 –1 1 1 –1 1 –1 1 –1 1 1 1 1 –1 –1 1 1 1 –1 –1 1
1 1 1 1 1 1 1 1 –1 –1 1 1 1 –1 –1 1 –1 1 –1 1 –1 –1
–1 –1 1 1 –1 –1 1 –1 –1 1 –1 1 –1 –1 –1 –1 –1 –1 –1
1 1 1 –1 1 1 –1 1 –1 1 –1 1 1 1 1 –1 –1 1 1 1 –1 –1
1 1 –1 1 –1 –1 –1 –1 –1 –1 –1 1 1 –1 1 1 –1 1 –1 1
–1 1 1 1 1 –1 –1 1 1 –1 1 1 –1 –1 1 –1 1 1 1 1 1 1 1
–1 –1 –1 1 1 –1 1 –1 1 –1 1 1 1 1 –1 –1 1 1 1 –1 –1
1 1 –1 1 –1 –1 –1 –1 –1 –1 –1 1 1 1 –1 –1 1 –1 1 –1
1 –1 –1 –1 –1 1 1 –1 –1 1 –1 –1 1 1 –1 1 –1 –1 –1
–1 –1 –1 –1 1 1 –1 1 1 1 1 –1 1 –1 1 1 1 1 –1 –1 1
1 1 –1 –1 1 1 –1 1 –1 –1 –1 –1 –1 –1 –1 1 1 1 –1 –1
1 –1 1 –1 1 –1 –1 –1 –1 1 1 –1 –1 1 –1 –1 1 1 –1 1
–1 –1 –1 –1 –1 –1 –1 1 1 1 –1 –1 1 –1 1 –1 1 –1 –1
–1 –1 1 1 –1 –1 –1 1 1 –1 –1 1 –1 1 1 1 1 1 1 1 –1
–1 1 –1 –1 1 –1 1 –1 1 –1 –1 –1 –1 1 1 –1 –1 1 –1
–1 1 1 –1 1 –1 –1 –1 –1 –1 –1 –1 1 1 –1 1 1 –1 1 –1
1 –1 1 1 1 1 –1 –1 1 1 1 –1 –1 1 1 –1 1 –1 –1 –1 –1
–1 –1 –1 1 1 –1 1 1 1 1 –1 1 –1 1 1 1 1 –1 –1 1 1 –1
1 1 –1 –1 1 –1 1 1 1 1 1 1 1 –1 –1 –1 1 1 –1 1 –1 1
–1 1 1 1 1 –1 –1 1 1 1 –1 –1 1 1 –1 1 –1 –1 –1 –1 –1
–1 –1 1 1 –1 1 1 –1 1 –1 1 –1 1 1 1 1 –1 –1 1 1 –1
1 1 –1 –1 1 –1 1 1 1 1 1 1 1 –1 –1 1 –1 –1 1 –1 1 –1
1 –1 –1 –1 –1 1 1 –1 –1 –1 1 1 –1 –1 1 –1 1 1 1 1 1
1 1 –1 –1 –1 1 1 –1 1 –1 1 –1 1 1 1 1 –1 –1 1 1 –1
1 1 –1 –1 1 –1 1 1 1 1 1 1 1 –1 –1 –1 1 1 –1 1 –1 1
–1 1 1 1 1 –1 –1 1 1 1 –1 –1 1 1 –1 1 –1 –1 –1 –1 –1
–1 –1 1 1 –1 1 1 1 1 –1 1 –1 1 1 1 1 –1 –1 1 1 –1 1
1 –1 –1 1 –1 1 1 1 1 1 1 1 –1 –1 1 –1 –1 1 –1 1 –1
1 –1 –1 –1 –1 1 1 –1 –1 –1 1 1 –1 –1 1 –1 1 1 1 1 1
1 1 –1 –1 1 –1 –1 1 –1 1 –1 1 –1 –1 –1 –1 1 1 –1 –1

1 –1 –1 1 1 –1 1 –1 –1 –1 –1 –1 –1 –1 1 1 1 –1 –1
1 –1 1 –1 1 –1 –1 –1 –1 1 1 –1 –1 –1 1 1 –1 –1 1 –1
1 1 1 1 1 1 1 –1 –1 –1 1 1 –1 1 –1 1 –1 1 1 1 1 –1 –1
1 1 –1 1 1 –1 –1 1 –1 1 1 1 1 1 1 1 –1 –1 1 –1 –1 1
–1 1 –1 1 –1 –1 –1 –1 1 1 –1 –1 –1 1 1 –1 –1 1 –1
1 1 1 1 1 1 1 –1 –1 –1 1 1 –1 1 –1 1 –1 1 1 1 1 –1 –1
1 1 –1 1 1 –1 –1 1 –1 1 1 1 1 1 1 1 –1 –1 –1 1 1 –1
1 –1 1 –1 1 1 1 1 –1 –1 1 1 1 –1 –1 1 1 –1 1 –1 –1
–1 –1 –1 –1 –1 1 1 –1 1 1 –1 1 –1 1 –1 1 1 1 1 –1 –1
1 1 –1 1 1 –1 –1 1 –1 1 1 1 1 1 1 1 –1 –1 1 –1 –1 1
–1 1 –1 1 –1 –1 –1 –1 1 1 –1 –1 –1 1 1 –1 –1 1 –1
1 1 1 1 1 1 1 –1 –1 1 –1 –1 1 –1 1 –1 1 –1 –1 –1 –1
1 1 –1 –1 1 –1 –1 1 –1 1 –1 –1 –1 –1 –1 –1 –1 1 1
1 1 –1 –1 1 –1 1 –1 1 –1 –1 –1 –1 1 1 –1 –1 –1 1 1
–1 –1 1 –1 1 1 1 1 1 1 1 –1 –1 1 –1 –1 1 –1 1 –1 1
–1 –1 –1 –1 1 1 –1 –1 1 –1 –1 1 1 –1 1 –1 –1 –1 –1
–1 –1 –1 1 1 –1 1 1 1 1 –1 1 –1 1 1 1 1 –1 –1 1 1 1
–1 –1 1 –1 1 –1 –1 –1 –1 –1 –1 –1 1 1 1 1 –1 –1 1
–1 1 –1 1 –1 –1 –1 –1 1 1 –1 –1 1 –1 –1 1 1 –1 1 –1
–1 –1 –1 –1 –1 –1 1 1 1 –1 –1 1 –1 1 –1 1 –1 –1 –1
–1 1 1 –1 –1 –1 1 1 –1 –1 1 –1 1 1 1 1 1 1 1 –1 –1
–1 1 1 –1 1 –1 1 –1 1 1 1 1 –1 –1 1 1 –1 1 1 –1 –1
1 –1 1 1 1 1 1 1 1 –1 –1 1 –1 –1 1 –1 1 –1 1 –1 –1
–1 –1 1 1 –1 –1 –1 1 1 –1 –1 1 –1 1 1 1 1 1 1 1 –1
–1 1 –1 –1 1 –1 1 –1 1 –1 –1 –1 –1 1 1 –1 –1 1 –1
–1 1 –1 1 –1 –1 –1 –1 –1 –1 –1 1 1 1 1 –1 –1 1 –1
1 –1 1 –1 –1 –1 –1 1 1 –1 –1 –1 1 1 –1 –1 1 –1 1 1
1 1 1 1 1 –1 –1 –1 1 1 –1 1 –1 1 –1 1 1 1 1 –1 –1 1
1 –1 1 1 –1 –1 1 –1 1 1 1 1 1 1 1 –1 –1 1 –1 –1 1 –1
1 –1 1 –1 –1 –1 –1 1 1 –1 –1 –1 1 1 –1 –1 1 –1 1 1
1 1 1 1 1 –1 –1 –1 1 1 –1 1 –1 1 –1 1 1 1 1 –1 –1 1
1 –1 1 1 –1 –1 1 –1 1 1 1 1 1 1 1 –1 –1 –1 1 1 –1 1
–1 1 –1 1 1 1 1 –1 –1 1 1 1 –1 –1 1 –1 1 –1 –1 –1 –1
–1 –1 –1 1 1 1 1 –1 –1 1 –1 1 –1 1 –1 –1 –1 –1 1 1
–1 –1 1 –1 –1 1 1 –1 1 –1 –1 –1 –1 –1 –1 –1 1 1 –1
1 1 –1 1 –1 1 –1 1 1 1 1 –1 –1 1 1 1 –1 –1 1 1 –1 1
–1 –1 –1 –1 –1 –1 –1 1 1 –1 1 1 1 1 –1 1 –1 1 1 1 1
–1 –1 1 1 –1 1 1 –1 –1 1 –1 1 1 1 1 1 1 1 –1 –1 –1
1 1 –1 1 –1 1 –1 1 1 1 1 –1 –1 1 1 1 –1 –1 1 1 –1 1
–1 –1 –1 –1 –1 –1 –1 1 1 –1 1 1 –1 1 –1 1 –1 1 1 1
1 –1 –1 1 1 –1 1 1 –1 –1 1 –1 1 1 1 1 1 1 1 –1 –1 1
–1 –1 1 –1 1 –1 1 –1 –1 –1 –1 1 1 –1 –1 –1 1 1 –1
–1 1 –1 1 1 1 1 1 1 1 –1 –1 –1 1 1 –1 1 –1 1 –1 1 1
1 1 –1 –1 1 1 –1 1 1 –1 –1 1 –1 1 1 1 1 1 1 1 –1 –1
–1 1 1 –1 1 –1 1 –1 1 1 1 1 –1 –1 1 1 1 –1 –1 1 1 –1
1 –1 –1 –1 –1 –1 –1 –1 1 1 –1 1 1 –1 1 –1 1 –1 1 1
1 1 –1 –1 1 1 –1 1 1 –1 –1 1 –1 1 1 1 1 1 1 1 –1 –1
1 –1 –1 1 –1 1 –1 1 –1 –1 –1 –1 1 1 –1 –1 –1 1 1 –1
–1 1 –1 1 1 1 1 1 1 1 –1 –1 1 –1 –1 1 –1 1 –1 1 –1
–1 –1 –1 1 1 –1 –1 1 –1 –1 1 1 –1 1 –1 –1 –1 –1 –1
–1 –1 1 1 1 –1 –1 1 –1 1 –1 1 –1 –1 –1 –1 1 1 –1 –1
–1 1 1 –1 –1 1 –1 1 1 1 1 1 1 1 –1 –1 –1 1 1 –1 1 –1
1 –1 1 1 1 1 –1 –1 1 1 –1 1 1 –1 –1 1 –1 1 1 1 1 1 1
1 –1 –1 1 –1 –1 1 –1 1 –1 1 –1 –1 –1 –1 1 1 –1 –1
–1 1 1 –1 –1 1 –1 1 1 1 1 1 1 1 –1 –1 –1 1 1 –1 1 –1
1 –1 1 1 1 1 –1 –1 1 1 –1 1 1 –1 –1 1 –1 1 1 1 1 1 1
1 –1 –1 –1 1 1 –1 1 –1 1 –1 1 1 1 1 –1 –1 1 1 1 –1
–1 1 1 –1 1 –1 –1 –1 –1 –1 –1 –1 1 1];

sequence (81): G_2048(1,:)=[–1 –1 1 1 1 1 1 1 1 –1 1 –1
–1 1 1 –1 –1 –1 1 1 –1 –1 –1 –1 1 –1 1 –1 1 –1 –1
1 –1 1 –1 –1 –1 –1 –1 –1 –1 1 1 1 1 –1 –1 1 –1 –1
1 1 –1 –1 –1 –1 1 –1 1 –1 1 –1 –1 1 1 1 –1 –1 –1 –1
–1 –1 –1 1 –1 1 1 –1 –1 1 1 1 –1 –1 1 1 1 1 –1 1 –1
1 –1 1 1 –1 1 1 –1 –1 –1 –1 –1 –1 –1 1 1 –1 1 –1 –1
1 –1 –1 1 1 –1 –1 –1 –1 1 –1 1 –1 1 –1 –1 1 –1 –1
1 1 1 1 1 1 1 –1 1 –1 –1 1 1 –1 –1 –1 1 1 –1 –1 –1
–1 1 –1 1 –1 1 –1 –1 1 1 1 –1 –1 –1 –1 –1 –1 –1 1

–1 1 1 –1 –1 1 –1 –1 1 1 –1 –1 –1 –1 1 –1 1 –1 1 –1
–1 1 –1 –1 1 1 1 1 1 1 1 –1 1 –1 –1 1 1 –1 –1 –1 1
1 –1 –1 –1 –1 1 –1 1 –1 1 –1 –1 1 –1 –1 1 1 1 1 1 1
1 –1 1 –1 –1 1 1 –1 1 1 –1 –1 1 1 1 1 –1 1 –1 1 –1
1 1 –1 –1 –1 1 1 1 1 1 1 1 –1 1 –1 –1 1 1 –1 –1 –1
1 1 –1 –1 –1 –1 1 –1 1 –1 1 –1 –1 1 1 1 –1 –1 –1 –1
–1 –1 –1 1 –1 1 1 –1 –1 1 –1 –1 1 1 –1 –1 –1 –1 1
–1 1 –1 1 –1 –1 1 1 1 –1 –1 –1 –1 –1 –1 –1 1 –1 1
1 –1 –1 1 1 1 –1 –1 1 1 1 1 –1 1 –1 1 –1 1 1 –1 1 1
–1 –1 –1 –1 –1 –1 –1 1 –1 1 1 –1 –1 1 –1 –1 1 1 –1
–1 –1 –1 1 –1 1 –1 1 –1 –1 1 1 1 –1 –1 –1 –1 –1 –1
–1 1 –1 1 1 –1 –1 1 1 1 –1 –1 1 1 1 1 –1 1 –1 1 –1
1 1 –1 –1 –1 1 1 1 1 1 1 1 –1 1 –1 –1 1 1 –1 1 1 –1
–1 1 1 1 1 –1 1 –1 1 –1 1 1 –1 1 1 –1 –1 –1 –1 –1 –1
–1 1 –1 1 1 –1 –1 1 1 1 –1 –1 1 1 1 1 –1 1 –1 1 –1
1 1 –1 1 1 –1 –1 –1 –1 –1 –1 –1 1 –1 1 1 –1 –1 1 –1
–1 1 1 –1 –1 –1 –1 1 –1 1 –1 1 –1 –1 1 –1 –1 1 1 1
1 1 1 1 –1 1 –1 –1 1 1 –1 –1 –1 1 1 –1 –1 –1 –1 1 –1
1 –1 1 –1 –1 1 1 1 –1 –1 –1 –1 –1 –1 –1 1 –1 1 1 –1
–1 1 –1 –1 1 1 –1 –1 –1 –1 1 –1 1 –1 1 –1 –1 1 1 1
1 1 1 1 1 1 1 1 –1 1 1 –1 –1 1 1 1 –1 –1 1 1 1 1 –1
1 –1 1 –1 1 1 –1 1 1 –1 –1 –1 –1 –1 –1 –1 1 –1 1 1
–1 –1 1 –1 –1 1 1 –1 –1 –1 –1 1 –1 1 –1 1 –1 –1 1
–1 –1 1 1 1 1 1 1 1 –1 1 –1 –1 1 1 –1 –1 –1 1 1 –1
–1 –1 –1 1 –1 1 –1 1 –1 –1 1 –1 1 –1 –1 –1 –1 –1 –1
–1 1 1 1 1 –1 –1 1 –1 –1 1 1 –1 –1 –1 –1 1 –1 1 –1
1 –1 –1 1 –1 –1 1 1 1 1 1 1 1 –1 1 –1 –1 1 1 –1 –1
–1 1 1 –1 –1 –1 –1 1 –1 1 –1 1 –1 –1 1 –1 –1 1 1 1
1 1 1 1 –1 1 –1 –1 1 1 –1 1 1 –1 –1 1 1 1 1 –1 1 –1
1 –1 1 1 –1 1 1 –1 –1 –1 –1 –1 –1 –1 1 –1 1 1 –1 –1
1 1 1 –1 –1 1 1 1 1 –1 1 –1 1 –1 1 1 –1 –1 –1 1 1 1
1 1 1 1 –1 1 –1 –1 1 1 –1 1 1 –1 –1 1 1 1 1 –1 1 –1
1 –1 1 1 –1 –1 –1 1 1 1 1 1 1 1 –1 1 –1 –1 1 1 –1 –1
–1 1 1 –1 –1 –1 –1 1 –1 1 –1 1 –1 –1 1 –1 –1 1 1 1
1 1 1 1 –1 1 –1 –1 1 1 –1 1 1 –1 –1 1 1 1 1 –1 1 –1
1 –1 1 1 –1 –1 –1 1 1 1 1 1 1 1 –1 1 –1 –1 1 1 –1 –1
–1 1 1 –1 –1 –1 –1 1 –1 1 –1 1 –1 –1 1 1 1 –1 –1 –1
–1 –1 –1 –1 1 –1 1 1 –1 –1 1 –1 –1 1 1 –1 –1 –1 –1
1 –1 1 –1 1 –1 –1 1 –1 –1 1 1 1 1 1 1 1 –1 1 –1 –1
1 1 –1 –1 –1 1 1 –1 –1 –1 –1 1 –1 1 –1 1 –1 –1 1 –1
–1 1 1 1 1 1 1 1 –1 1 –1 –1 1 1 –1 1 1 –1 –1 1 1 1 1
–1 1 –1 1 –1 1 1 –1 –1 –1 1 1 1 1 1 1 1 –1 1 –1 –1
1 1 –1 –1 –1 1 1 –1 –1 –1 –1 1 –1 1 –1 1 –1 –1 1 1
1 –1 –1 –1 –1 –1 –1 –1 1 –1 1 1 –1 –1 1 –1 –1 1 1
–1 –1 –1 –1 1 –1 1 –1 1 –1 –1 1 1 1 –1 –1 –1 –1 –1
–1 –1 1 –1 1 1 –1 –1 1 1 1 –1 –1 1 1 1 1 –1 1 –1 1
–1 1 1 –1 1 1 –1 –1 –1 –1 –1 –1 –1 1 –1 1 1 –1 –1
1 –1 –1 1 1 –1 –1 –1 –1 1 –1 1 –1 1 –1 –1 1 –1 –1
1 1 1 1 1 1 1 –1 1 –1 –1 1 1 –1 –1 –1 1 1 –1 –1 –1
–1 1 –1 1 –1 1 –1 –1 1 –1 1 –1 –1 –1 –1 –1 –1 –1 1
1 1 1 –1 –1 1 –1 –1 1 1 –1 –1 –1 –1 1 –1 1 –1 1 –1
–1 1 –1 –1 1 1 1 1 1 1 1 –1 1 –1 –1 1 1 –1 –1 –1 1
1 –1 –1 –1 –1 1 –1 1 –1 1 –1 –1 1 –1 –1 1 1 1 1 1 1
1 –1 1 –1 –1 1 1 –1 1 1 –1 –1 1 1 1 1 –1 1 –1 1 –1
1 1 –1 –1 –1 1 1 1 1 1 1 1 –1 1 –1 –1 1 1 –1 –1 –1
1 1 –1 –1 –1 –1 1 –1 1 –1 1 –1 –1 1 1 1 –1 –1 –1 –1
–1 –1 –1 1 –1 1 1 –1 –1 1 –1 –1 1 1 –1 –1 –1 –1 1
–1 1 –1 1 –1 –1 1 1 1 –1 –1 –1 –1 –1 –1 –1 1 –1 1
1 –1 –1 1 1 1 –1 –1 1 1 1 1 –1 1 –1 1 –1 1 1 –1 1 1
–1 –1 –1 –1 –1 –1 –1 1 –1 1 1 –1 –1 1 –1 –1 1 1 –1
–1 –1 –1 1 –1 1 –1 1 –1 –1 1 1 1 –1 –1 –1 –1 –1 –1
–1 1 –1 1 1 –1 –1 1 1 1 –1 –1 1 1 1 1 –1 1 –1 1 –1
1 1 –1 –1 –1 1 1 1 1 1 1 1 –1 1 –1 –1 1 1 –1 1 1 –1
–1 1 1 1 1 –1 1 –1 1 –1 1 1 –1 1 1 –1 –1 –1 –1 –1 –1
–1 1 –1 1 1 –1 –1 1 1 1 –1 –1 1 1 1 1 –1 1 –1 1 –1
1 1 –1 –1 –1 –1 –1 –1 –1 1 1 –1 1 –1 1 1 –1 –1 1 –1
–1 1 1 –1 –1 –1 –1 1 –1 1 –1 1 –1 –1 1 1 1 –1 –1 –1

−1 −1 −1 −1 1 −1 1 1 −1 −1 1 1 1 −1 −1 1 1 1 1 −1 1
−1 1 −1 1 1 −1 −1 −1 1 1 1 1 1 1 1 −1 1 −1 −1 1 1 −1
1 1 −1 −1 1 1 1 1 −1 1 −1 1 −1 1 1 −1 −1 −1 1 1 1 1
1 1 1 −1 1 −1 −1 1 1 −1 −1 −1 1 1 −1 −1 −1 −1 1 −1
1 −1 1 −1 −1 1 −1 −1 1 1 1 1 1 1 1 −1 1 −1 −1 1 1 −1
1 1 −1 −1 1 1 1 1 −1 1 −1 1 −1 1 1 −1 1 1 −1 −1 −1
−1 −1 −1 −1 1 −1 1 1 −1 −1 1 1 1 −1 −1 1 1 1 1 −1 1
−1 1 −1 1 1 −1 −1 −1 1 1 1 1 1 1 1 −1 1 −1 −1 1 1 −1
1 1 −1 −1 1 1 1 1 −1 1 −1 1 −1 1 1 −1 1 1 −1 −1 −1
−1 −1 −1 −1 1 −1 1 1 −1 −1 1 1 1 −1 −1 1 1 1 1 −1 1
−1 1 −1 1 1 −1 1 1 −1 −1 −1 −1 −1 −1 −1 1 −1 1 1 −1
−1 1 −1 −1 1 1 −1 −1 −1 −1 1 −1 1 −1 1 −1 −1 1 −1
−1 1 1 1 1 1 1 1 −1 1 −1 −1 1 1 −1 −1 −1 1 1 −1 −1
−1 −1 1 −1 1 −1 1 −1 −1 1 1 1 −1 −1 −1 −1 −1 −1 −1
1 −1 1 1 −1 −1 1 −1 −1 1 1 −1 −1 −1 −1 1 −1 1 −1 1
−1 −1 1 1 1 −1 −1 −1 −1 −1 −1 −1 1 −1 1 1 −1 −1 1
1 1 −1 −1 1 1 1 1 −1 1 −1 1 −1 1 1 −1 1 1 −1 −1 −1
−1 −1 −1 −1 1 −1 1 1 −1 −1 1 −1 −1 1 1 −1 −1 −1 −1
1 −1 1 −1 1 −1 −1 1 −1 1 −1 −1 −1 −1 −1 −1 −1 1 −1
1 1 −1 −1 1 1 1 −1 −1 1 1 1 1 −1 1 −1 1 −1 1 1 −1 −1
−1 1 1 1 1 1 1 1 −1 1 −1 −1 1 1 −1 1 1 −1 −1 1 1 1 1
−1 1 −1 1 −1 1 1 −1 1 1 −1 −1 −1 −1 −1 −1 −1 1 −1
1 1 −1 −1 1 1 1 −1 −1 1 1 1 1 −1 1 −1 1 −1 1 1 −1 1
1 −1 −1 −1 −1 −1 −1 −1 1 −1 1 1 −1 −1 1 −1 −1 1 1
−1 −1 −1 −1 1 −1 1 −1 1 −1 −1 1];

sequence (82): G_2048(2,:)=[−1 1 1 −1 1 −1 1 −1 1 1 1
1 −1 −1 1 1 −1 1 1 −1 −1 1 −1 1 1 1 1 1 1 1 −1 −1 1
−1 −1 1 −1 1 −1 1 −1 −1 −1 −1 1 1 −1 −1 −1 1 1 −1
−1 1 −1 1 1 1 1 1 1 1 −1 −1 1 −1 −1 1 −1 1 −1 1 −1
−1 −1 −1 1 1 −1 −1 1 −1 −1 1 1 −1 1 1 1 1 1 1 1 1 1
1 1 −1 −1 1 −1 1 −1 1 −1 −1 −1 −1 1 1 −1 −1 −1 1 1
−1 −1 1 −1 1 1 1 1 1 1 1 −1 −1 −1 1 1 −1 1 −1 1 −1
1 1 1 1 −1 −1 1 1 −1 1 1 −1 −1 1 −1 1 1 1 1 1 1 1 −1
−1 1 −1 −1 1 −1 1 −1 1 −1 −1 −1 −1 1 1 −1 −1 −1 1
1 −1 −1 1 −1 1 1 1 1 1 1 1 −1 −1 −1 1 1 −1 1 −1 1 −1
1 1 1 1 −1 −1 1 1 −1 1 1 −1 −1 1 −1 1 1 1 1 1 1 1 −1
−1 −1 1 1 −1 1 −1 1 −1 1 1 1 1 −1 −1 1 1 1 −1 −1 1
1 −1 1 1 −1 −1 −1 −1 −−1 −1 1 1 −1 1 1 −1 1 −1 1 −1
1 1 1 1 −1 −1 1 1 −1 1 1 −1 −1 1 −1 1 1 1 1 1 1 1 −1
−1 1 −1 −1 1 −1 1 −1 1 −1 −1 −1 −1 1 1 −1 −1 −1 1
1 −1 −1 1 −1 1 1 1 1 1 1 1 −1 −1 1 −1 −1 1 −1 1 −1
1 −1 −1 −1 −1 1 1 −1 −1 1 −1 −1 1 −1 1 −1 −1 −1 −1
−1 −1 −1 1 1 1 1 −1 −1 1 −1 1 −1 1 −1 −1 −1 −1 1 1
−1 −1 −1 1 1 −1 −1 1 −1 1 1 1 1 1 1 1 −1 −1 1 −1 −1
1 −1 1 −1 1 −1 −1 −1 −1 1 1 −1 −1 1 −1 −1 1 1 −1 1
−1 −1 −1 −1 −1 −1 −1 1 1 −1 1 1 −1 1 −1 1 −1 1 1 1
1 −1 −1 1 1 1 −1 −1 1 1 −1 1 −1 −1 −1 −1 −1 −1 −1
1 1 1 −1 −1 1 −1 1 −1 1 −1 −1 −1 −1 1 1 −1 −1 1 −1
−1 1 1 −1 1 −1 −1 −1 −1 −1 −1 −1 1 1 1 −1 −1 1 −1
1 −1 1 −1 −1 −1 −1 1 1 −1 −1 −1 1 1 −1 −1 1 −1 1 1
1 1 1 1 1 −1 −1 −1 1 1 −1 1 −1 1 −1 1 1 1 1 −1 −1 1
1 −1 1 1 −1 −1 1 −1 1 1 1 1 1 1 1 −1 −1 1 −1 −1 1 −1
1 −1 1 −1 −1 −1 −1 1 1 −1 −1 −1 1 1 −1 −1 1 −1 1 1
1 1 1 1 1 −1 −1 1 −1 −1 1 −1 1 −1 1 −1 −1 −1 −1 1 1
−1 −1 1 −1 −1 1 −1 1 −1 −1 −1 −1 −1 −1 −1 1 1 1 1
−1 −1 1 −1 1 −1 1 −1 −1 −1 −1 1 1 −1 −1 −1 1 1 −1
−1 1 −1 1 1 1 1 1 1 1 −1 −1 −1 1 1 −1 1 −1 1 −1 1 1
1 1 −1 −1 1 1 −1 1 1 −1 −1 1 −1 1 1 1 1 1 1 1 −1 −1
1 −1 −1 1 −1 1 −1 1 −1 −1 −1 −1 1 1 −1 −1 −1 1 1 −1
−1 1 −1 1 1 1 1 1 1 1 −1 −1 −1 1 1 −1 1 −1 1 −1 1 1
1 1 −1 −1 1 1 −1 1 1 −1 −1 1 −1 1 1 1 1 1 1 1 −1 −1
−1 1 1 −1 1 −1 1 −1 1 1 1 1 −1 −1 1 1 1 −1 −1 1 −1
1 −1 −1 −1 −1 −1 −1 −1 1 1 1 1 −1 −1 1 −1 1 −1 1 −1
−1 −1 −1 1 1 −1 −1 1 −1 −1 1 1 −1 1 −1 −1 −1 −1 −1
−1 −1 1 1 −1 1 1 −1 1 −1 1 −1 1 1 1 1 −1 −1 1 1 1 −1
−1 1 1 −1 1 −1 −1 −1 −1 −1 −1 −1 1 1 −1 1 1 1 1 −1
1 −1 1 1 1 1 −1 −1 1 1 −1 1 1 −1 −1 1 −1 1 1 1 1 1 1
1 −1 −1 −1 1 1 −1 1 −1 1 −1 1 1 1 1 −1 −1 1 1 1 −1
−1 1 −1 1 −1 −1 −1 −1 −1 −1 −1 −1 1 1 −1 1 1 −1 1
−1 1 −1 1 1 1 1 −1 −1 1 1 −1 1 1 −1 −1 1 −1 1 1 1 1
1 1 1 −1 −1 1 −1 −1 1 −1 1 −1 1 −1 −1 −1 −1 1 1 −1
−1 −1 1 1 −1 −1 1 −1 1 1 1 1 1 1 −1 −1 −1 1 1 −1
1 −1 1 −1 1 1 1 1 −1 −1 1 1 −1 1 1 −1 −1 1 −1 1 1 1
1 1 1 −1 −1 1 1 −1 1 −1 1 −1 −1 1 1 −1 1 −1 1 1 1 1
1 −1 1 1 1 1 1 1 −1 −1 1 −1 −1 1 −1 1 −1 1 −1 −1
−1 −1 1 1 −1 −1 −1 1 1 −1 −1 1 −1 1 1 1 1 1 1 1 −1
−1 −1 1 1 −1 1 −1 1 −1 1 1 1 1 −1 −1 1 1 −1 1 1 −1
−1 1 −1 1 1 1 1 1 1 1 −1 −1 −1 1 1 −1 1 −1 1 −1 1 1
1 1 −1 −1 1 1 1 −1 −1 1 1 −1 1 1 1 1 1 1 1 1 1 1 −1
1 1 −1 1 −1 1 −1 1 1 1 1 −1 −1 1 1 −1 1 1 −1 −1 1 −1
1 1 1 1 1 1 1 −1 −1 1 −1 −1 1 −1 1 −1 1 −1 −1 −1 −1
1 1 −1 −1 −1 1 1 −1 −1 1 −1 1 1 1 1 1 1 1 −1 −1 1 −1
−1 1 −1 1 −1 1 −1 −1 −1 −1 1 1 −1 −1 1 −1 −1 1 1 −1
1 −1 −1 −1 −1 −1 −1 −1 1 1 1 −1 −1 1 −1 1 −1 1 −1
−1 −1 −1 1 1 −1 −1 −1 1 1 −1 −1 1 −1 1 1 1 1 1 1 1
−1 −1 1 −1 −1 1 −1 1 −1 1 −1 −1 −1 −1 1 1 −1 −1 1
−1 −1 1 1 −1 1 −1 −1 −1 −1 −1 −1 −1 1 1 −1 1 1 1 −1
1 −1 1 −1 1 1 1 1 −1 −1 1 1 1 −1 −1 1 1 −1 1 −1 −1
−1 −1 −1 −1 −1 1 1 1 −1 −1 1 −1 1 −1 1 −1 −1 −1 −1
1 1 −1 −1 1 −1 −1 1 −1 1 −1 −1 −1 −1 −1 −1 −1 −1 1
1 1 −1 −1 1 −1 1 −1 1 −1 −1 −1 −1 1 1 −1 −1 −1 1 1
−1 −1 1 −1 1 1 1 1 1 1 1 −1 −1 1 −1 −1 1 −1 1 −1 1
−1 −1 −1 −1 1 1 −1 −1 1 −1 −1 1 1 −1 1 −1 −1 −1 −1
−1 −1 −1 1 1 −1 1 1 1 1 −1 1 −1 1 1 1 1 −1 −1 1 1 1
−1 −1 1 1 −1 1 −1 −1 −1 −1 −1 −1 −1 1 1 −1 1 1 1 1
1 1 −1 1 1 1 1 −1 −1 1 1 −1 1 1 −1 −1 1 −1 1 1 1 1 1
1 1 −1 −1 −1 1 1 −1 1 −1 1 −1 1 1 1 1 −1 −1 1 1 1 −1
−1 1 1 −1 1 −1 −1 −1 −1 −1 −1 −1 1 1 1 −1 −1 1 −1
1 −1 1 −1 −1 −1 −1 1 1 −1 −1 1 −1 −1 1 1 −1 1 −1 −1
−1 −1 −1 −1 −1 1 1 −1 1 1 −1 1 −1 1 −1 1 1 1 1 −1 −1
1 1 1 −1 −1 1 1 −1 1 −1 −1 −1 −1 −1 −1 −1 1 1 1 −1
−1 1 −1 1 −1 1 −1 −1 −1 −1 1 1 −1 −1 1 −1 −1 1 −1
1 −1 −1 −1 −1 −1 −1 −1 1 1 1 1 −1 −1 1 −1 1 −1 1 −1
−1 −1 −1 1 1 −1 −1 −1 1 1 −1 −1 1 −1 1 1 1 1 1 1 1
−1 −1 −1 1 1 −1 1 −1 1 −1 1 1 1 1 −1 −1 1 1 −1 1 1
−1 −1 1 −1 1 1 1 1 1 1 1 −1 −1 1 −1 −1 1 −1 1 −1 1
−1 −1 −1 −1 1 1 −1 −1 −1 1 1 −1 −1 1 −1 1 1 1 1 1 1
1 −1 −1 1 −1 −1 1 −1 1 −1 1 −1 −1 −1 −1 1 1 −1 −1
1 −1 −1 1 1 −1 1 −1 −1 −1 −1 −1 −1 1 1 1 −1 −1 1 −1
1 −1 1 −1 −1 −1 −1 1 1 −1 −1 −1 1 1 −1 −1 1 −1 1 1
1 1 1 1 1 −1 −1 1 −1 −1 1 −1 1 −1 1 −1 −1 −1 −1 1 1
−1 −1 1 −1 −1 1 1 −1 1 1 1 1 1 1 −1 −1 1 1 −1 1 1 −1
1 −1 1 −1 1 1 1 1 −1 −1 1 1 1 −1 −1 1 −1 1 −1 −1 −1
−1 −1 −1 −1 1 1 1 1 −1 −1 1 −1 1 −1 1 −1 −1 −1 −1
1 1 −1 −1 1 −1 −1 1 −1 1 −1 −1 −1 −1 −1 −1 −1 1 1
1 1 −1 −1 1 −1 1 −1 1 −1 −1 −1 −1 1 1 −1 −1 −1 1 1
−1 −1 1 −1 1 1 1 1 1 1 1 −1 −1];

sequence (83): G_2048(3,:)=[−1 −1 1 1 1 1 1 1 1 −1 1 −1
−1 1 1 −1 1 1 −1 −1 1 1 1 1 −1 1 −1 1 −1 1 1 −1 1 1
−1 −1 −1 −1 −1 −1 −1 1 −1 1 1 −1 −1 1 1 1 −1 −1 1
1 1 1 −1 1 −1 1 −1 1 1 −1 1 1 −1 −1 −1 −1 −1 −1 −1
1 −1 1 1 −1 −1 1 −1 −1 1 1 −1 −1 −1 −1 1 −1 1 −1 1
−1 −1 1 1 1 −1 −1 −1 −1 −1 −1 −1 1 −1 1 1 −1 −1 1
1 1 −1 −1 1 1 1 1 −1 1 −1 1 −1 1 1 −1 1 1 −1 −1 −1
−1 −1 −1 −1 1 −1 1 1 −1 −1 1 −1 −1 1 1 −1 −1 −1 −1
1 −1 1 −1 1 −1 −1 1 −1 −1 1 1 1 1 1 1 1 −1 1 −1 −1

1 1 –1 –1 –1 1 1 –1 –1 –1 –1 1 –1 1 –1 1 –1 –1 1 1 1 –1 –1 –1 –1 –1 –1 –1 1 –1 1 1 –1 –1 –1 –1 1 1 –1 –1 –1 –1 1 –1 1 –1 1 –1 –1 1 1 1 –1 –1 –1 –1 –1 –1 –1 1 –1 1 1 –1 –1 1 1 1 –1 –1 1 1 1 1 –1 1 –1 1 –1 1 1 –1 –1 –1 –1 –1 –1 –1 –1 –1 1 –1 1 1 –1 –1 1 1 1 –1 –1 1 1 1 1 –1 1 –1 1 –1 1 1 –1 –1 –1 –1 –1 –1 –1 –1 –1 –1 –1 1 –1 1 –1 1 1 1 –1 –1 1 1 1 –1 1 –1 1 –1 1 –1 1 1 –1 1 1 –1 –1 –1 –1 1 1 –1 –1 –1 1 –1 1 –1 1 –1 –1 1 –1 –1 1 1 1 1 1 1 –1 1 –1 –1 1 1 –1 –1 –1 1 1 –1 –1 –1 –1 1 –1 1 –1 1 –1 –1 1 1 1 1 1 1 1 –1 1 –1 –1 1 1 1 1 –1 1 –1 1 –1 1 1 –1 –1 –1 1 1 1 1 1 1 1 –1 1 –1 –1 1 1 –1 –1 –1 1 1 –1 –1 –1 –1 1 –1 1 –1 1 –1 –1 1 –1 1 –1 –1 –1 –1 –1 –1 –1 –1 –1 1 –1 1 1 –1 –1 1 –1 –1 1 1 –1 –1 –1 –1 1 –1 1 –1 1 –1 –1 1 –1 –1 1 1 1 1 1 1 1 –1 1 –1 –1 1 1 –1 –1 –1 1 1 –1 –1 –1 1 –1 1 –1 1 –1 –1 1 –1 1 –1 1 –1 –1 –1 –1 –1 –1 –1 1 1 1 1 –1 –1 1 –1 –1 1 1 –1 –1 –1 –1 1 –1 1 –1 1 –1 –1 1 –1 1 –1 –1 –1 –1 –1 –1 –1 1 1 1 1 –1 –1 1 1 1 –1 –1 1 1 1 1 –1 1 –1 1 –1 1 1 –1 –1 –1 1 1 1 1 1 1 1 –1 1 –1 –1 1 1 –1 1 1 1 1 1 –1 1 –1 –1 1 1 –1 –1 –1 –1 –1 –1 –1 –1 1 1 –1 1 –1 –1 1 1 1 –1 –1 1 1 1 1 –1 1 –1 1 –1 1 1 –1 1 1 –1 –1 –1 –1 1 –1 –1 –1 –1 1 –1 1 1 –1 –1 1 –1 –1 1 1 –1 –1 –1 –1 1 –1 1 –1 1 –1 –1 1 1 1 1 1 1 1 –1 1 –1 1 1 –1 –1 1 1 1 –1 –1 1 1 1 1 –1 1 –1 1 –1 1 1 –1 1 1 –1 –1 –1 –1 1 –1 –1 –1 –1 1 –1 1 1 –1 –1 1 –1 –1 1 1 –1 –1 –1 –1 1 –1 1 –1 1 –1 –1 1 –1 1 –1 –1 1 1 1 1 1 1 1 –1 1 –1 –1 1 1 –1 –1 –1 1 1 –1 –1 –1 –1 1 –1 1 –1 1 –1 –1 1 1 1 –1 –1 –1 –1 –1 –1 –1 –1 1 –1 1 1 –1 –1 1 –1 –1 1 1 –1 –1 –1 –1 1 –1 1 –1 1 –1 –1 1 1 1 1 –1 –1 –1 –1 –1 1 1 1 –1 –1 –1 –1 –1 –1 –1 –1 1 –1 1 1 1 1 –1 –1 1 1 1 1 –1 1 –1 –1 1 1 1 1 –1 1 –1 1 –1 1 1 –1 –1 –1 1 1 1 1 1 1 1 –1 1 –1 –1 1 1 –1 1 1 –1 –1 1 1 1 1 –1 1 –1 –1 1 1 1 1 1 1 1 –1 1 –1 –1 1 1 –1 1 1 –1 –1 1 1 1 1 –1 –1 1 1 1 1 –1 1 –1 1 –1 1 1 –1 –1 –1 1 1 1 1 1 1 1 –1 1 –1 –1 1 1 –1 –1 –1 –1 1 –1 1 –1 1 –1 –1 1 1 1 1 –1 1 –1 –1 1 1 –1 –1 1 –1 –1 1 1 –1 –1 –1 –1 –1 –1 –1 1 –1 1 –1 –1 1 –1 1 –1 –1 1 1 –1 1 1 –1 –1 –1 –1 –1 –1 –1 –1 –1 –1 –1 –1 1 –1 1 1 1 –1 –1 1 1 1 –1 –1 1 1 1 1 –1 –1 1 –1 1 1 –1 –1 1 –1 –1 –1 1 1 1 1 1 1 1 –1 1 –1 –1 1 1 –1 1 1 –1 1 1 –1 –1 1 1 1 1 –1 1 –1 1 –1 1 1 –1 1 1 –1 1 1 –1 –1 –1 –1 –1 –1 –1 –1 1 –1 1 1 1 –1 –1 1 1 1 –1 –1 1 1 1 1 1 –1 –1 1 –1 –1 1 –1 1 –1 1 –1 1 1 1 1 1 1 1 –1 1 –1 1 –1 –1 1 1 –1 –1 1 1 1 1 1 1 1 –1 1 –1 –1 1 1 1 –1 –1 1 1 –1 –1 1 1 1 –1 1 –1 –1 1 1 1 1 –1 1 –1 1 –1 1 1 –1 1 1 –1 1 –1 –1 –1 –1 –1 –1 –1 –1 1 –1 1 1 –1 –1 1 1 1 1 –1 –1 1 1 1 –1 1 1 –1 1 1 –1 1 1 –1 1 –1 –1 –1 –1 –1 –1 –1 –1 1 1 1 1 –1 –1 1 –1 –1 1 1 1 –1 –1 –1 –1 –1 1 1 –1 1 1 –1 1 –1 –1 1 1 1 1 –1 –1 –1 –1 –1 –1 –1 –1 –1 1 1 1 1 –1 1 –1 1 –1 1 1 –1 1 1 –1 1 –1 –1 –1 –1 –1 –1 –1 –1 –1 1 –1 1 1 –1 1 1 –1 1 1 –1 –1 –1 –1 –1 1 –1 1 –1 1 –1 –1 1 –1 1 1 1 1 1 1 1 –1 1 –1 –1 1 1 –1 1 –1 –1 1 –1 –1 –1 –1 1 1 1 –1 –1 1 –1 –1 1 –1 1 1 –1 1 –1 1 1 –1 –1 –1 –1 –1 –1 –1 –1 1 –1 1 1 1 –1 –1 1 –1 1 –1 –1 –1 –1 –1 1 –1 1 1 –1 1 –1 –1 1 1 1 1 –1 1 –1 –1 1 1 1 1 –1 –1 1 1 1 1 –1 1 –1 1 –1 1 1 –1 1 1 –1 1 1 –1 –1 –1 –1 –1 –1 –1 1 1 –1 1 1 1 –1 –1 1 –1 1 –1 –1 1 –1 1 1 –1 –1 –1 –1 1 –1 1 –1 1 –1 –1 1 1 1 1 1 1 1 –1 –1 1 –1 1 –1 –1 1 –1 1 –1 1 –1 –1 1 1 1 –1 –1 1 1 1 –1 –1 –1 –1 –1 1 1 –1 1 1 –1 –1 1 –1 –1 1 –1 1 –1 –1 1 –1 –1 –1 –1 –1 –1 –1 1 1 1 1 –1 –1 1 –1 –1 1 1 1 –1 –1 –1 –1 1 –1 1 –1 1 –1 –1 1 –1 –1 1 –1 –1 1 1 1 1 1 1 1 –1 1 –1 –1 1 1 –1 1 1 –1 1 1 –1 1 –1 –1 –1 –1 1 –1 1 –1 1 –1 –1 1 1 1 1 1 1 1 –1 1 –1 –1 1 1 –1 –1 –1 1 1 –1 –1 –1 –1 1 –1 1 –1 1 –1 –1 1 –1 1 1 –1 1 1 –1 1 1 –1 1 –1 –1 –1 –1 –1 –1 –1 –1 1 –1 1 1 1 –1 –1 1 1 1 –1 1 1 –1 1 –1 1 –1 1 1 –1 1 1 –1 1 –1 –1 –1 –1 –1 –1 –1 1 1 –1 1 1 –1 1 1 –1 –1 1 –1 1 –1 1 –1 –1 –1 –1 –1 –1 –1 1 1 1 1 –1 –1 –1 1 –1 1 1 –1 1 1 –1 1 –1 –1 –1 –1 –1 –1 –1 1 1 1 1 –1 1 –1 –1 1 1 1 1 –1 1 –1 1 –1 1 1 –1 1 1 –1 –1 –1 –1 –1 –1

–1 1 –1 1 1 –1 –1 1 –1 –1 1 1 –1 –1 –1 –1 1 –1 1 –1 1 –1 –1 1 –1 –1 1 1 1 1 1 1 1 –1 1 –1 –1 1 1 –1 –1 –1 1 1 –1 –1 –1 –1 1 –1 1 –1 1 –1 –1 1 –1 –1 1 1 1 1 1 1 1 –1 1 –1 1 –1 1 1 –1 1 1 –1 –1 –1 –1 1 –1 1 –1 1 –1 –1 1 –1 –1 1 1 1 1 1 1 1 –1 1 –1 1 –1 1 1 –1 1 1 –1 –1 –1 –1 1 –1 1 –1 1 –1 –1 1 –1 –1 1 1 1 1 1 1 1 –1 1 –1 1 –1 1 1 –1 1 1 –1 –1 –1 –1 1 –1 1 –1 1 –1 –1 1 1 –1 1 1 –1 1 1 –1 –1 –1 –1 –1 –1 –1 1 –1 1 1 –1 –1 1 1 1 –1 –1 1 1 1 1 –1 1 –1 1 –1 1 1 –1 –1 –1 1 1 1 1 1 1 1 –1 1 –1 –1 1 1 –1 –1 1 1 1 1 1 1 1 –1 1 –1 –1 1 1 –1 –1 1 –1 1 1 –1 –1 –1 –1 1 –1 1 –1 1 –1 –1 1 –1 1 –1 1 –1 –1 –1 –1 –1 –1 1 1 1 1 –1 –1 1 –1 –1 1 1 –1 –1 –1 –1 1 –1 1 –1 1 –1 1 –1 –1 1 –1 –1 1 1 1 1 1 1 1 –1 1 –1 –1 1 1 –1 –1 –1 1 1 –1 –1 –1 –1 1 –1 1 –1 1 –1 –1 1 –1 –1 1 1 1 1 1 1 1 –1 1 –1 –1 1 1 –1 1 1 –1 –1 1 1 1 –1 1 –1 1 –1 1 1 –1 –1 –1 1 1 1 1 1 1 1 –1 1 –1 –1 1 1 –1 –1 –1 1 1 –1 –1 –1 –1 1 –1 1 –1 1 –1 –1 1 –1 1 –1 –1 –1 –1 –1 –1 –1 1 –1 1 1 –1 –1 1 –1 –1 1 1 –1 –1 –1 –1 1 –1 1 –1 1 –1 –1 1 1 1 1 1 1 1 –1 1 –1 –1 1 1 –1 1 –1 –1 1 1 –1 –1 –1 –1 –1 –1 –1 1 –1 1 1 –1 –1 1 –1 –1 1 1 –1 –1 –1 –1 1 –1 1 –1 1 –1 –1 1 –1 –1 1 1 –1 –1 –1 –1 1 –1 1 –1 1 –1 –1 1 1 –1 –1 –1 1 1 –1 –1 –1 –1 1 –1 1 1 –1 1 –1 –1 1 1 1 –1 –1 –1 –1 –1 –1 –1 1 –1 1 1 –1 –1 1 –1 –1 1 1 –1 –1 –1 –1 1 –1 1 –1 1 –1 –1 1 –1 1 1 –1 –1 –1 –1 –1 –1 –1 1 1 1 1 –1 –1 1 1 1 –1 –1 1 1 1 –1 1 –1 1 –1 1 1 –1 1;

sequence (84): G_2048(4,:)=1 –1 1 1 –1 1 –1 1 –1 1 1 1 1 –1 –1 1 1 1 –1 –1 1 1 –1 1 –1 –1 –1 –1 –1 –1 –1 1 1 1 –1 –1 1 –1 1 –1 1 –1 –1 –1 –1 1 1 –1 –1 1 –1 –1 1 1 –1 1 –1 –1 –1 –1 –1 –1 –1 1 1 1 –1 –1 1 –1 1 –1 1 –1 –1 –1 –1 1 1 –1 –1 –1 1 1 –1 –1 1 –1 1 1 1 1 1 1 1 –1 –1 1 –1 –1 1 –1 1 –1 1 –1 –1 –1 –1 1 1 –1 –1 1 –1 –1 1 –1 1 –1 1 –1 –1 –1 –1 –1 –1 –1 –1 –1 1 1 1 1 –1 –1 1 –1 1 –1 1 –1 –1 –1 –1 1 1 –1 –1 –1 1 1 –1 –1 1 –1 1 1 1 1 1 1 1 –1 –1 –1 1 1 –1 1 –1 1 –1 1 1 1 1 –1 –1 1 1 –1 1 1 –1 1 1 –1 –1 1 –1 1 1 1 1 1 1 1 –1 –1 1 –1 –1 1 –1 1 –1 1 –1 –1 –1 –1 1 1 –1 –1 –1 1 1 –1 1 –1 1 –1 1 1 1 1 1 1 1 –1 –1 1 –1 –1 1 –1 1 –1 1 –1 –1 –1 –1 1 –1 1 1 –1 –1 1 –1 –1 1 1 –1 1 –1 –1 1 –1 1 –1 –1 –1 –1 –1 –1 –1 1 1 1 –1 –1 1 –1 –1 1 –1 1 –1 1 –1 –1 –1 –1 1 1 –1 –1 –1 1 1 –1 –1 1 1 1 1 1 1 1 –1 –1 –1 1 1 –1 1 –1 1 –1 1 1 1 1 –1 –1 1 1 –1 1 1 –1 1 1 –1 –1 1 –1 1 1 1 1 1 1 1 –1 –1 –1 1 1 –1 1 –1 1 1 –1 1 1 1 1 –1 –1 1 1 1 –1 –1 1 1 –1 1 –1 –1 –1 –1 –1 –1 –1 1 1 –1 1 1 1 1 –1 1 –1 1 –1 1 1 1 1 –1 –1 1 1 –1 1 1 –1 1 1 –1 –1 1 –1 1 1 1 1 1 1 1 1 –1 –1 1 –1 –1 1 –1 1 –1 1 –1 –1 –1 –1 1 1 –1 –1 –1 1 1 –1 –1 1 –1 1 1 1 1 1 1 1 –1 –1 1 –1 –1 1 –1 1 –1 1 –1 –1 –1 1 1 1 –1 –1 1 –1 –1 1 –1 1 –1 1 –1 –1 1 –1 1 1 1 1 –1 –1 1 1 –1 –1 1 –1 1 –1 1 –1 –1 –1 –1 –1 1 1 1 –1 1 1 –1 1 –1 1 –1 1 1 1 1 –1 –1 1 1 1 –1 –1 1 –1 1 –1 –1 –1 –1 –1 –1 –1 –1 1 1 1 1 –1 –1 1 –1 1 –1 1 –1 –1 –1 –1 1 1 –1 –1 1 –1 –1 1 –1 1 –1 –1 –1 –1 –1 –1 –1 1 1 1 1 –1 –1 1 –1 1 –1 1 –1 –1 –1 –1 1 1 1 1 1 1 –1 –1 1 –1 –1 1 –1 1 –1 1 –1 –1 –1 –1 1 1 –1 –1 1 –1 –1 1 –1 1 –1 –1 –1 –1 –1 –1 –1 1 1 1 1 –1 –1 1 –1 1 –1 1 –1 –1 1 –1 –1 1 1 –1 –1 1 –1 1 1 1 1 1 1 1 –1 –1 1 –1 1 –1 –1 1 –1 1 1 –1 –1 –1 1 1 –1 1 –1 1 –1 1 1 1 1 –1 –1 1 1 1 1 1 1 1 –1 –1 –1 1 1 –1 1 –1 1 –1 1 1 1 1 –1 –1 1 1 –1 1 1 –1 –1 1 –1 1 1 1 1 1 1 1 –1 –1 1 –1 –1 1 1 –1 –1 –1 1 1 –1 –1 1 –1 1 –1 1 –1 –1 –1 –1 1 1 –1 –1 –1 1 1 –1 –1 1 –1 1 1 1 1 1 1 1 –1 –1 1 –1 1 –1 1 –1 1 1 –1 1 –1 –1 –1 –1 1 1 –1 –1 –1 1 1 –1 1 1 1 1 1 1 1 –1 –1 1 –1 –1 1 –1 1 –1 1 –1 1 1 –1 –1 –1 –1 1 1 –1 –1 –1 –1 1 –1 1 1 1 1 –1 1 –1 1 1 1 1 1 –1 –1 1 1 1 –1 –1 1 1 –1 1 –1 –1 –1 –1 –1 –1 –1 1 1 1 –1 1 –1 1 –1 1 –1 –1 1 –1 –1 –1 1 1 –1 –1 1 –1 1 –1 –1 1 –1 1 –1 –1 –1 –1 –1 –1 –1 1 1 1 1 –1 –1 1 –1 1 –1 1 –1 –1 –1 –1 1 1 –1 –1

–1 1 1 –1 –1 1 –1 1 1 1 1 1 1 1 –1 –1 1 –1 –1 1 –1
1 –1 1 –1 –1 –1 –1 1 1 –1 –1 1 –1 –1 1 1 –1 1 –1 –1
–1 –1 –1 –1 –1 1 1 –1 1 1 –1 1 –1 1 –1 1 1 1 1 –1 –1
1 1 1 –1 –1 1 1 –1 1 –1 –1 –1 –1 –1 –1 –1 1 1 1 –1
–1 1 –1 1 –1 1 –1 –1 –1 –1 1 1 –1 –1 1 –1 –1 1 1 –1
1 –1 –1 –1 –1 –1 –1 –1 1 1 –1 1 1 –1 1 –1 1 –1 1 1
1 1 –1 –1 1 1 1 –1 –1 1 –1 1 –1 –1 –1 –1 –1 –1 –1
1 1 1 1 1 1 –1 1 –1 1 –1 1 1 1 1 –1 –1 1 1 –1 1 1 –1
–1 1 –1 1 1 1 1 1 1 1 –1 –1 –1 1 1 –1 1 –1 1 –1 1 1
1 1 –1 –1 1 1 1 –1 –1 1 1 –1 1 –1 –1 –1 –1 –1 –1 –1
1 1 1 –1 –1 1 –1 1 –1 1 –1 –1 –1 –1 1 1 –1 –1 1 –1
–1 1 –1 1 –1 –1 –1 –1 –1 –1 –1 1 1 1 1 –1 –1 1 –1
1 –1 1 –1 –1 –1 –1 1 1 –1 –1 –1 1 1 –1 –1 1 –1 1 1
1 1 1 1 1 –1 –1 1 –1 –1 1 –1 1 –1 1 –1 –1 –1 –1 1 1
–1 –1 1 –1 –1 1 1 –1 1 –1 –1 –1 –1 –1 –1 –1 1 1 1
–1 –1 1 –1 1 –1 1 –1 –1 –1 –1 1 1 –1 –1 –1 1 1 –1
–1 1 –1 1 1 1 1 1 1 1 –1 –1 –1 1 1 –1 1 –1 1 –1 1 1
1 1 –1 –1 1 1 –1 1 1 –1 –1 1 –1 1 1 1 1 1 1 1 –1 –1
1 –1 –1 1 –1 1 –1 1 –1 –1 –1 –1 1 1 –1 –1 –1 1 1 –1
–1 1 –1 1 1 1 1 1 1 1 –1 –1 1 –1 –1 1 –1 1 –1 1 –1
–1 –1 –1 1 1 –1 –1 1 –1 –1 1 –1 1 –1 –1 –1 –1 –1 –1
–1 1 1 1 1 –1 –1 1 –1 1 –1 1 –1 –1 –1 –1 1 1 –1 –1
–1 1 1 –1 –1 1 –1 1 1 1 1 1 1 1 –1 –1 –1 1 1 –1 1 –1
1 –1 1 1 1 1 –1 –1 1 1 –1 1 1 –1 –1 1 –1 1 1 1 1 1 1
1 –1 –1 –1 1 1 –1 1 –1 1 –1 1 1 1 1 –1 –1 1 1 1 –1
–1 1 1 –1 1 1 –1 –1 –1 –1 ––1 –1 1 1 –1 1 1 –1 1 –1
1 –1 1 1 1 1 –1 –1 1 1 –1 1 1 –1 –1 1 –1 1 1 1 1 1 1
1 –1 –1 1 –1 –1 1 –1 1 –1 1 –1 –1 –1 –1 1 1 –1 –1
–1 1 1 –1 –1 1 –1 1 1 1 1 1 1 1 –1 –1 –1 1 1 –1 1 –1
1 –1 1 1 1 1 –1 –1 1 1 –1 1 1 –1 –1 1 –1 1 1 1 1 1 1
1 –1 –1 1 –1 –1 1 –1 1 –1 1 –1 –1 –1 –1 1 1 –1 –1
–1 1 1 –1 –1 1 –1 1 1 1 1 1 1 1 –1 –1 1 –1 –1 1 –1
1 –1 1 –1 –1 –1 –1 1 1 –1 –1 1 –1 –1 1 1 –1 1 –1 –1
–1 –1 –1 –1 –1 1 1 1 –1 –1 1 –1 1 –1 1 –1 –1 –1 –1
1 1 –1 –1 –1 1 1 –1 –1 1 –1 1 1 1 1 1 1 1 –1 –1 –1
1 1 –1 1 –1 1 –1 1 1 1 1 –1 –1 1 1 –1 1 1 –1 –1 1 –1
1 1 1 1 1 1 1 –1 –1 –1 1 1 –1 1 –1 1 –1 1 1 1 1 1 –1 –1
1 1 1 –1 –1 1 1 –1 1 –1 –1 –1 –1 –1 –1 –1 1 1 –1 1
1 1 1 –1 1 –1 1 1 1 1 –1 –1 1 1 –1 1 1 –1 –1 1 –1 1
1 1 1 1 1 1 –1 –1 –1 1 1 1 –1 1 1 –1 1 1 –1 1 1 1 1 1 –1 –1 –1
1 1 1 –1 –1 1 –1 1 –1 –1 –1 –1 –1 –1 –1 –1 1 1 1 1 1 –1
–1 1 –1 1 –1 1 –1 –1 –1 –1 1 1 1 –1 –1 1 –1 –1 1 1 1 –1
1 –1 –1 –1 –1 –1 –1 –1 1 1 1 –1 1 1 1 –1 1 –1 1 –1 1 1 1
1 1 –1 –1 1 1 1 1 –1 –1 1 1 1 –1 1 –1 –1 –1 –1 –1 –1 –1
1 1 –1 1 1 –1 1 –1 1 –1 1 1 1 1 1 –1 –1 1 1 1 –1 1 1 1 –1
–1 1 –1 1 1 1 1 1 1 1 1 –1 –1 1 –1 –1 1 –1 1 –1 1 –1
–1 –1 –1 1 1 1 –1 –1 –1 1 1 1 –1 –1 1 –1 1 1 1 1 1 1 1 1
–1 –1 –1 1 1 1 –1 1 –1 1 –1 1 1 1 1 1 –1 –1 1 1 1 –1 1 1 1
–1 –1 1 –1 1 1 1 1 1 1 1 1 –1 –1 –1 1 1 1 –1 1 –1 1 –1
1 1 1 1 –1 –1 1 1 1 1 –1 –1 1 1 1 –1 1 1 –1 –1 –1 –1 –1 –1
–1 1 1 1 –1 1 1 1 1 1 –1 1 1 –1 1 1 1 1 1 –1 –1 1 1 1 –1 1 1 1 –1
–1 1 –1 1 1 1 1 1 1 1 1 –1 –1 1 –1 –1 1 –1 1 –1 1 –1
–1 –1 –1 1 1 1 –1 –1 –1 1 1 1 –1 –1 1 –1 1 1 1 1 1 1 1 1
–1 –1 –1 1 1 1 –1 1 –1 1 –1 1 1 1 1 1 –1 –1 1 1 1 –1 1 1 1
–1 –1 1 –1 1 1 1 1 1 1 1 1 –1 –1 1 –1 –1 1 –1 1 –1 1 1
–1 –1 –1 –1 1 1 1 –1 –1 –1 1 1 1 –1 –1 1 –1 1 1 1 1 1 1 1
1 –1 –1 1 –1 –1 1 –1 1 –1 1 –1 –1 –1 –1 1 1 1 –1 –1
1 –1 –1 1 1 –1 1 –1 –1 –1 –1 –1 –1 –1 1 1];
sequence (85): G_2048(5,:)=[–1 –1 1 1 1 1 1 1 1 –1 1 –1
–1 1 1 –1 –1 –1 1 1 –1 –1 –1 –1 1 –1 1 –1 1 –1 –1
1 –1 1 –1 –1 –1 –1 –1 –1 –1 1 1 1 1 1 –1 –1 1 –1 –1
1 1 –1 –1 –1 –1 1 –1 1 –1 1 –1 –1 1 1 1 1 –1 –1 –1 –1
–1 –1 –1 1 –1 1 1 –1 –1 1 1 1 1 –1 –1 1 1 1 1 1 –1 1 1 –1
1 –1 1 1 –1 1 1 1 –1 –1 –1 –1 –1 –1 –1 1 1 1 –1 1 1 –1 –1
1 –1 –1 1 1 –1 –1 –1 –1 1 –1 1 –1 1 –1 –1 1 1 1 1 –1
–1 –1 –1 –1 –1 –1 1 –1 1 1 1 –1 –1 1 1 1 1 –1 –1 1 1 1 1
1 –1 1 –1 1 –1 1 1 1 –1 –1 –1 1 1 1 1 1 1 1 1 –1 1 1 –1 –1
1 1 –1 1 1 –1 –1 1 1 1 1 –1 1 –1 1 –1 1 1 –1 1 1 –1
–1 –1 –1 –1 –1 –1 1 1 1 1 –1 –1 1 1 1 –1 –1 1 1 1 1
–1 1 –1 1 –1 1 1 –1 1 1 –1 –1 –1 –1 –1 –1 –1 1 –1
1 1 –1 –1 1 –1 –1 1 1 –1 –1 –1 –1 1 –1 1 –1 1 –1 –1
1 1 1 –1 –1 –1 –1 –1 –1 –1 1 –1 1 1 –1 –1 1 1 1 –1
–1 1 1 1 1 –1 1 –1 1 –1 1 1 –1 –1 –1 1 1 1 1 1 1 1 –1
1 –1 –1 1 1 –1 1 1 –1 –1 1 1 1 1 –1 1 –1 1 –1 1 1 –1
–1 –1 1 1 1 1 1 1 1 –1 1 –1 –1 1 1 –1 –1 –1 1 1 –1
–1 –1 –1 1 –1 1 –1 1 –1 –1 1 –1 –1 1 1 1 1 1 1 1 –1
1 –1 –1 1 1 –1 1 1 –1 –1 1 1 1 1 –1 1 –1 1 –1 1 1 –1
1 1 –1 –1 –1 –1 –1 –1 –1 1 –1 1 1 –1 –1 1 1 1 –1 –1
1 1 1 1 –1 1 –1 1 –1 1 1 –1 –1 –1 1 1 1 1 1 1 1 –1 1
–1 –1 1 1 –1 1 1 –1 –1 1 1 1 1 –1 1 –1 1 –1 1 1 –1
1 1 –1 –1 –1 –1 –1 –1 –1 1 –1 1 1 –1 –1 1 1 1 –1 –1
1 1 1 1 –1 1 –1 1 –1 1 1 –1 1 1 –1 –1 –1 –1 –1 –1 –1
1 –1 1 1 –1 –1 1 –1 –1 1 1 –1 –1 –1 –1 1 –1 1 –1 1
–1 –1 1 –1 –1 1 1 1 1 1 1 1 –1 1 –1 –1 1 1 –1 –1 –1
1 1 –1 –1 –1 –1 1 –1 1 –1 1 –1 –1 1 1 1 1 1 1 1 1 –1
–1 1 –1 1 1 –1 –1 1 –1 –1 1 1 –1 –1 –1 –1 1 –1 1 –1
1 –1 –1 1 –1 1 –1 –1 –1 –1 –1 –1 –1 1 –1 1 1 –1 –1
1 1 1 –1 –1 1 1 1 1 –1 1 –1 1 –1 1 1 –1 1 1 –1 –1 –1
–1 –1 –1 –1 1 –1 1 1 –1 –1 1 –1 –1 1 1 –1 –1 –1 –1
1 –1 1 –1 1 –1 –1 1 –1 1 –1 –1 –1 –1 –1 –1 –1 1 1
1 1 –1 –1 1 1 1 –1 –1 1 1 1 1 –1 1 –1 1 –1 1 1 –1 –1
–1 1 1 1 1 1 1 1 –1 1 –1 –1 1 1 –1 1 1 –1 –1 1 1 1 1
–1 1 –1 1 –1 1 1 –1 1 1 –1 –1 –1 –1 –1 –1 –1 1 –1
1 1 –1 –1 1 1 1 –1 –1 1 1 1 1 –1 1 –1 1 –1 1 1 –1 1
1 –1 1 1 1 1 1 1 1 1 1 1 –1 –1 1 –1 –1 1 1 –1 –1 –1
–1 1 –1 1 –1 1 –1 –1 1 –1 –1 1 1 1 1 1 1 1 –1 1 –1
–1 1 1 –1 –1 –1 1 1 –1 –1 –1 –1 1 –1 1 –1 1 –1 –1
1 –1 1 –1 –1 –1 –1 –1 –1 –1 1 –1 1 1 –1 –1 1 –1 –1
1 1 –1 –1 –1 –1 1 –1 1 –1 1 –1 –1 1 1 1 –1 –1 –1 –1
–1 –1 –1 1 –1 1 1 –1 –1 1 1 1 –1 –1 1 1 1 1 –1 1 –1
1 –1 1 1 –1 1 1 –1 –1 –1 –1 –1 –1 –1 1 –1 1 1 –1 –1
1 –1 –1 1 1 –1 –1 –1 –1 1 –1 1 –1 1 –1 –1 1 –1 –1
1 1 1 1 1 1 1 –1 1 –1 –1 1 1 –1 –1 –1 1 1 –1 –1 –1
–1 1 –1 1 –1 1 –1 –1 1 1 1 –1 –1 –1 –1 –1 –1 –1 1
–1 1 1 –1 –1 1 –1 –1 1 1 –1 –1 –1 –1 1 –1 1 –1 1 –1
–1 1 –1 –1 1 1 1 1 1 1 1 –1 1 –1 –1 1 1 –1 –1 –1 1
1 –1 –1 –1 –1 1 –1 1 –1 1 –1 –1 1 –1 –1 1 1 1 1 1 1
1 –1 1 –1 –1 1 1 –1 1 1 –1 –1 1 1 1 1 –1 1 –1 1 –1
1 1 –1 –1 –1 1 1 1 1 1 1 1 –1 1 –1 –1 1 1 –1 –1 –1
1 1 –1 –1 –1 –1 1 –1 1 –1 1 –1 –1 1 –1 1 –1 –1 –1
–1 –1 –1 –1 1 1 1 1 –1 –1 1 –1 –1 1 1 –1 –1 –1 –1
1 –1 1 –1 1 –1 –1 1 1 1 –1 –1 –1 –1 –1 –1 –1 1 –1
1 1 –1 –1 1 1 1 –1 –1 1 1 1 1 –1 1 –1 1 –1 1 1 –1 1
1 –1 –1 –1 –1 –1 –1 –1 1 –1 1 1 –1 –1 1 –1 –1 1 1
–1 –1 –1 –1 1 –1 1 –1 1 –1 –1 1 –1 1 –1 –1 –1 –1 –1
–1 –1 1 1 1 1 –1 –1 1 1 1 –1 –1 1 1 1 1 –1 1 –1 1 –1
1 1 –1 –1 –1 1 1 1 1 1 1 1 –1 1 –1 –1 1 1 –1 1 1 –1
–1 1 1 1 1 –1 1 –1 1 –1 1 1 –1 1 1 –1 –1 –1 –1 –1 –1
–1 1 –1 1 1 –1 –1 1 1 1 –1 –1 1 1 1 1 –1 1 –1 1 –1
1 1 –1 1 1 –1 –1 –1 –1 –1 –1 –1 1 –1 1 1 –1 –1 1 –1
–1 1 1 –1 –1 –1 –1 1 –1 1 –1 1 –1 –1 1 1 1 –1 –1 –1
–1 –1 –1 –1 1 –1 1 1 –1 –1 1 1 1 –1 –1 1 1 1 1 –1 1
–1 1 –1 1 1 –1 –1 –1 1 1 1 1 1 1 1 –1 1 –1 –1 1 1 –1
1 1 –1 –1 1 1 1 1 –1 1 –1 1 –1 1 1 –1 –1 –1 1 1 1 1
1 1 1 –1 1 –1 –1 1 1 –1 –1 –1 1 1 –1 –1 –1 –1 1 –1
1 –1 1 –1 –1 1 –1 –1 1 1 1 1 1 1 1 –1 1 –1 –1 1 1 –1
1 1 –1 –1 1 1 1 1 –1 1 –1 1 –1 1 1 –1 1 1 –1 –1 1 1
1 1 1 1 –1 1 1 –1 –1 1 1 1 –1 –1 1 1 1 1 –1 1 –1 1 –1
1 1 –1 –1 –1 1 1 1 1 1 1 1 –1 1 –1 –1 1 1 –1 1 1 –1
–1 1 1 1 1 –1 1 –1 1 –1 1 1 –1 1 1 –1 –1 –1 –1 –1 –1
–1 1 –1 1 1 –1 –1 1 1 1 –1 –1 1 1 1 1 –1 1 –1 1 –1
1 1 –1 1 1 –1 –1 –1 –1 –1 –1 –1 1 –1 1 1 –1 –1 1 –1
–1 1 1 –1 –1 –1 –1 1 –1 1 –1 1 –1 –1 1 1 1 –1 –1 –1
–1 –1 –1 –1 1 –1 1 1 –1 –1 1 1 1 –1 –1 1 1 1 1 –1 1

–1 1 –1 1 1 –1 –1 –1 1 1 1 1 1 1 1 –1 1 –1 –1 1 1 –1
1 1 –1 –1 1 1 1 1 –1 1 –1 1 –1 1 1 –1 –1 –1 1 1 1 1
1 1 1 –1 1 –1 –1 1 1 –1 –1 –1 1 1 –1 –1 –1 –1 1 –1
1 –1 1 –1 –1 1 –1 –1 1 1 1 1 1 1 1 –1 1 –1 –1 1 1 –1
1 1 –1 –1 1 1 1 1 –1 1 –1 1 –1 1 1 –1 –1 –1 1 1 1 1
1 1 1 –1 1 –1 –1 1 1 –1 –1 –1 1 1 –1 –1 –1 –1 1 –1
1 –1 1 –1 –1 1 1 1 –1 –1 –1 –1 –1 –1 –1 1 –1 1 1 –1
–1 1 –1 –1 1 1 –1 –1 –1 –1 1 –1 1 –1 1 –1 –1 1 –1
–1 1 1 1 1 1 1 1 –1 1 –1 –1 1 1 –1 –1 –1 1 1 –1 –1
–1 –1 1 –1 1 –1 1 –1 –1 1 –1 –1 1 1 1 1 1 1 1 –1 1
–1 –1 1 1 –1 1 1 –1 –1 1 1 1 1 –1 1 –1 1 –1 1 1 –1
1 1 –1 –1 –1 –1 –1 –1 –1 1 –1 1 1 –1 –1 1 1 1 –1 –1
1 1 1 1 –1 1 –1 1 –1 1 1 –1 –1 –1 1 1 1 1 1 1 1 –1 1
–1 –1 1 1 –1 1 1 –1 –1 1 1 1 1 –1 1 –1 1 –1 1 1 –1
–1 –1 1 1 1 1 1 1 1 –1 1 –1 –1 1 1 –1 –1 –1 1 1 –1
–1 –1 –1 1 –1 1 –1 1 –1 –1 1 –1 –1 1 1 1 1 1 1 1 –1
1 –1 –1 1 1 –1 1 1 –1 –1 1 1 1 1 –1 1 –1 1 –1 1 1 –1
1 1 –1 –1 –1 –1 –1 –1 –1 1 –1 1 1 –1 –1 1 1 1 –1 –1
1 1 1 1 –1 1 –1 1 –1 1 1 –1 –1 –1 1 1 1 1 1 1 1 –1 1
–1 –1 1 1 –1 1 1 –1 –1 1 1 1 1 –1 1 –1 1 –1 1 1 –1
1 1 –1 –1 –1 –1 –1 –1 –1 1 –1 1 1 –1 –1 1 1 1 –1 –1
1 1 1 1 –1 1 –1 1 –1 1 1 –1 1 1 –1 –1 –1 –1 –1 –1 –1
1 –1 1 1 –1 –1 1 –1 –1 1 1 –1 –1 –1 –1 1 –1 1 –1 1
–1 –1 1];

sequence (86): G_2048(6,:)=[–1 1 1 –1 1 –1 1 –1 1 1 1
1 –1 –1 1 1 –1 1 1 –1 –1 1 –1 1 1 1 1 1 1 1 –1 –1 1
–1 –1 1 –1 1 –1 1 –1 –1 –1 –1 1 1 –1 –1 –1 1 1 –1
–1 1 –1 1 1 1 1 1 1 1 –1 –1 1 –1 –1 1 –1 1 –1 1 –1
–1 –1 –1 1 1 –1 –1 1 –1 –1 1 1 –1 1 –1 –1 –1 –1 –1
–1 –1 1 1 1 –1 –1 1 –1 1 –1 1 –1 –1 –1 –1 1 1 –1 –1
–1 1 1 –1 –1 1 –1 1 1 1 1 1 1 1 –1 –1 1 –1 –1 1 –1
1 –1 1 –1 –1 –1 –1 1 1 –1 –1 1 –1 –1 1 1 –1 1 –1 –1
–1 –1 –1 –1 –1 1 1 –1 1 1 1 1 –1 1 –1 1 1 1 1 –1 –1
1 1 1 –1 –1 1 1 –1 1 –1 –1 –1 –1 –1 –1 –1 1 1 1 –1
–1 1 –1 1 –1 1 –1 –1 –1 –1 1 1 –1 –1 1 –1 –1 1 –1
1 –1 –1 –1 –1 –1 –1 –1 1 1 1 1 –1 –1 1 –1 1 –1 1 –1
–1 –1 –1 1 1 –1 –1 –1 1 1 –1 –1 1 –1 1 1 1 1 1 1 1
–1 –1 –1 1 1 –1 1 –1 1 –1 1 1 1 1 –1 –1 1 1 –1 1 1
–1 –1 1 –1 1 1 1 1 1 1 1 –1 –1 1 –1 –1 1 –1 1 –1 1
–1 –1 –1 –1 1 1 –1 –1 –1 1 1 –1 –1 1 –1 1 1 1 1 1 1
1 –1 –1 1 –1 –1 1 –1 1 –1 1 –1 –1 –1 –1 1 1 –1 –1
1 –1 –1 1 –1 1 –1 –1 –1 –1 –1 –1 –1 1 1 1 1 –1 –1
1 –1 1 –1 1 –1 –1 –1 –1 1 1 –1 –1 –1 1 1 –1 –1 1 –1
1 1 1 1 1 1 1 –1 –1 –1 1 1 –1 1 –1 1 –1 1 1 1 1 –1 –1
1 1 –1 1 1 –1 –1 1 –1 1 1 1 1 1 1 1 –1 –1 1 –1 –1 1
–1 1 –1 1 –1 –1 –1 –1 1 1 –1 –1 –1 1 1 –1 –1 1 –1
1 1 1 1 1 1 1 –1 –1 –1 1 1 –1 1 –1 1 –1 1 1 1 1 –1 –1
1 1 –1 1 1 –1 –1 1 –1 1 1 1 1 1 1 1 –1 –1 –1 1 1 –1
1 –1 1 –1 1 1 1 1 –1 –1 1 1 1 –1 –1 1 1 –1 1 1 –1 1
1 –1 –1 –1 –1 –1 –1 1 1 –1 1 –1 1 –1 1 1 1 1 –1 –1
1 1 –1 1 1 –1 –1 1 –1 1 1 1 1 1 1 1 –1 –1 1 –1 –1 1
–1 1 –1 1 –1 –1 –1 –1 1 1 –1 –1 –1 1 1 –1 –1 1 –1
1 1 1 1 1 1 1 –1 –1 1 –1 –1 1 –1 1 –1 1 –1 –1 –1 –1
1 1 –1 –1 1 –1 –1 1 1 –1 1 –1 –1 –1 –1 –1 –1 –1 1
1 1 –1 –1 1 –1 1 –1 1 –1 –1 –1 –1 1 1 –1 –1 –1 1 1
–1 –1 1 –1 1 1 1 1 1 1 1 –1 –1 1 –1 –1 1 –1 1 –1 1
–1 –1 –1 –1 1 1 –1 –1 1 –1 –1 1 1 –1 1 –1 –1 –1 –1
–1 –1 –1 1 1 –1 1 1 –1 1 –1 1 –1 1 1 1 1 –1 –1 1 1
1 –1 –1 1 1 –1 1 –1 –1 –1 –1 –1 –1 –1 1 1 1 –1 –1
1 –1 1 –1 1 –1 –1 –1 –1 1 1 –1 –1 1 –1 –1 1 –1 1 –1
–1 –1 –1 –1 –1 –1 1 1 1 1 –1 –1 1 –1 1 –1 1 –1 –1
–1 –1 1 1 –1 –1 –1 1 1 –1 –1 1 –1 1 1 1 1 1 1 1 –1
–1 1 –1 –1 1 –1 1 –1 1 –1 –1 –1 –1 1 1 –1 –1 1 –1
–1 1 1 –1 1 –1 –1 –1 –1 –1 –1 –1 1 1 –1 1 1 1 1 –1
1 –1 1 1 1 1 –1 –1 1 1 1 –1 –1 1 1 –1 1 –1 –1 –1 –1
–1 –1 –1 1 1 –1 1 1 1 1 –1 1 –1 1 1 1 1 –1 –1 1 1 –1
1 1 –1 –1 1 –1 1 1 1 1 1 1 1 –1 –1 –1 1 1 –1 1 –1 1
–1 1 1 1 1 –1 –1 1 1 1 –1 –1 1 1 –1 1 –1 –1 –1 –1 –1
–1 –1 1 1 1 –1 –1 1 –1 1 –1 1 –1 –1 –1 –1 1 1 –1 –1
1 –1 –1 1 1 –1 1 –1 –1 –1 –1 –1 –1 –1 1 1 –1 1 1 –1
1 –1 1 –1 1 1 1 1 –1 –1 1 1 1 –1 –1 1 –1 1 –1 –1 –1
–1 –1 –1 –1 1 1 1 1 –1 –1 1 –1 1 –1 1 –1 –1 –1 –1
1 1 –1 –1 1 –1 –1 1 –1 1 –1 –1 –1 –1 –1 –1 –1 1 1
1 1 –1 –1 1 –1 1 –1 1 –1 –1 –1 –1 1 1 –1 –1 –1 1 1
–1 –1 1 –1 1 1 1 1 1 1 1 –1 –1 –1 1 1 –1 1 –1 1 –1
1 1 1 1 –1 –1 1 1 –1 1 1 –1 –1 1 –1 1 1 1 1 1 1 1 –1
–1 1 –1 –1 1 –1 1 –1 1 –1 –1 –1 –1 1 1 –1 –1 –1 1
1 –1 –1 1 –1 1 1 1 1 1 1 1 –1 –1 1 –1 –1 1 –1 1 –1
1 –1 –1 –1 –1 1 1 –1 –1 1 –1 –1 1 1 –1 1 –1 –1 –1
–1 –1 –1 –1 1 1 1 –1 –1 1 –1 1 –1 1 –1 –1 –1 –1 1
1 –1 –1 –1 1 1 –1 –1 1 –1 1 1 1 1 1 1 1 –1 –1 1 –1
–1 1 –1 1 –1 1 –1 –1 –1 –1 1 1 –1 –1 1 –1 –1 1 1 –1
1 1 1 1 1 1 1 –1 1 1 –1 1 1 –1 1 –1 1 –1 1 1 1 1 –1
–1 1 1 1 –1 –1 1 –1 1 –1 –1 –1 –1 –1 –1 –1 1 1 1 1
–1 –1 1 –1 1 –1 1 –1 –1 –1 –1 1 1 –1 –1 1 –1 –1 1
1 –1 1 –1 –1 –1 –1 –1 –1 –1 1 1 1 –1 –1 1 –1 1 –1
1 –1 –1 –1 –1 1 1 –1 –1 –1 1 1 –1 –1 1 –1 1 1 1 1 1
1 1 –1 –1 –1 1 1 –1 1 –1 1 –1 1 1 1 1 –1 –1 1 1 –1
1 1 –1 –1 1 –1 1 1 1 1 1 1 1 –1 –1 1 –1 –1 1 –1 1 –1
1 –1 –1 –1 –1 1 1 –1 –1 –1 1 1 –1 –1 1 –1 1 1 1 1 1
1 1 –1 –1 1 –1 –1 1 –1 1 –1 1 –1 –1 –1 –1 1 1 –1 –1
1 –1 –1 1 1 –1 1 –1 –1 1 1 1 1 1 1 1 1 –1 –1 1 –1 1
–1 1 –1 –1 –1 –1 1 1 –1 –1 –1 1 1 –1 –1 1 –1 1 1 1
1 1 1 1 –1 –1 –1 1 1 –1 1 –1 1 –1 1 1 1 1 –1 –1 1 1
–1 1 1 –1 –1 1 –1 1 1 1 1 1 1 1 –1 –1 1 –1 –1 1 –1
1 –1 1 –1 –1 –1 –1 1 1 –1 –1 –1 1 1 –1 –1 1 –1 1 1
1 1 1 1 1 –1 –1 –1 1 1 –1 1 –1 1 –1 1 1 1 1 –1 –1 1
1 –1 1 1 –1 –1 1 –1 1 1 1 1 1 1 1 –1 –1 –1 1 1 –1 1
–1 1 –1 1 1 1 1 –1 –1 1 1 1 –1 –1 1 1 –1 1 1 1 1 1 1
1 1 1 1 1 –1 –1 1 –1 1 –1 1 –1 –1 –1 –1 1 1 –1 –1 1
–1 –1 1 1 –1 1 –1 –1 –1 –1 –1 –1 –1 1 –1 1 1 –1 –1
1 1 1 –1 –1 1 1 1 1 –1 1 –1 1 –1 1 1 –1 1 1 –1 –1 –1
–1 –1 –1 –1 1 1 –1 1 1 –1 1 –1 1 –1 1 1 1 1 –1 –1 1
1 –1 1 1 –1 –1 1 –1 1 1 1 1 1 1 1 –1 –1 –1 1 1 –1 1
–1 1 –1 1 1 1 1 –1 –1 1 1 1 –1 –1 1 1 –1 1 –1 –1 –1
–1 –1 –1 –1 1 1 –1 1 1 1 1 1 1 –1 1 1 1 1 –1 –1 1 1
–1 1 1 –1 –1 1 –1 1 1 1 1 1 1 1 –1 –1 1 –1 –1 1 –1
1 –1 1 –1 –1 –1 –1 1 1 –1 –1 –1 1 1 –1 –1 1 –1 1 1
1 1 1 1 1 –1 –1 –1 1 1 –1 1 –1 1 –1 1 1 1 1 –1 –1 1
1 –1 1 1 –1 –1 1 –1 1 1 1 1 1 1 1 –1 –1 –1 1 1 –1 1
–1 1 –1 1 1 1 1 –1 –1 1 1 1 –1 –1 1 –1 1 –1 –1 –1 –1
–1 –1 –1 1 1 1 –1 1 1 –1 1 –1 1 –1 1 1 1 1 –1 –1 1
1 –1 1 1 –1 –1 1 –1 1 1 1 1 1 1 1 –1 –1 1 –1 –1 1 –1
1 –1 1 –1 –1 –1 –1 1 1 –1 –1 –1 1 1 –1 –1 1 –1 1 1
1 1 1 1 1 –1 –1 1 –1 –1 1 –1 1 –1 1 –1 –1 –1 –1 1 1
–1 –1 1 –1 –1 1 1 –1 1 –1 –1 –1 –1 –1 –1 –1 1 1 1
–1 –1 1 –1 1 –1 1 –1 –1 –1 –1 1 1 –1 –1 –1 1 1 –1
–1 1 –1 1 1 1 1 1 1 1 –1 –1 –1 1 1 –1 1 –1 1 –1 1 1
1 1 –1 –1 1 1 –1 1 1 –1 –1 1 –1 1 1 1 1 1 1 1 –1 –1
1 –1 –1 1 –1 1 –1 1 –1 –1 –1 –1 1 1 –1 –1 –1 1 1 –1
–1 1 –1 1 1 1 1 1 1 1 –1 –1 –1 1 1 –1 1 –1 1 –1 1 1
1 1 –1 –1 1 1 –1 1 1 –1 –1 1 –1 1 1 1 1 1 1 1 –1 –1
–1 1 1 –1 1 –1 1 –1 1 1 1 1 –1 –1 1 1 1 –1 –1 1 –1
1 –1 –1 –1 –1 –1 –1 –1 1 1 1];

sequence (87): G_2048(7,:)=[–1 –1 1 1 1 1 1 1 1 –1 1 –1
–1 1 1 –1 –1 –1 1 1 –1 –1 –1 –1 1 –1 1 –1 1 –1 –1
1 –1 1 –1 –1 –1 –1 –1 –1 –1 1 1 1 1 –1 –1 1 –1 –1
1 1 –1 –1 –1 –1 1 –1 1 –1 1 –1 –1 1 1 1 –1 –1 –1 –1
–1 –1 –1 1 –1 1 1 –1 –1 1 1 1 –1 –1 1 1 1 1 –1 1 –1
1 –1 1 1 –1 1 1 –1 –1 –1 –1 –1 –1 –1 1 1 –1 1 –1 –1
1 –1 –1 1 1 –1 –1 –1 –1 1 –1 1 –1 1 –1 –1 1 1 1 –1
–1 –1 –1 –1 –1 –1 1 –1 1 1 –1 –1 1 1 1 –1 –1 1 1 1
1 –1 1 –1 1 –1 1 1 –1 –1 –1 1 1 1 1 1 1 1 –1 1 –1 –1
1 1 –1 1 1 –1 –1 1 1 1 1 –1 1 –1 1 –1 1 1 –1 1 1 –1

–1 –1 –1 –1 –1 –1 1 1 1 1 –1 –1 1 1 1 –1 –1 1 1 1 1
–1 1 –1 1 –1 1 1 –1 1 1 –1 –1 –1 –1 –1 –1 –1 1 –1
1 1 –1 –1 1 –1 –1 1 1 –1 –1 –1 –1 1 –1 1 –1 1 –1 –1
1 –1 –1 1 1 1 1 1 1 1 –1 1 –1 –1 1 1 –1 –1 –1 1 1 –1
–1 –1 –1 1 –1 1 –1 1 –1 –1 1 1 1 –1 –1 –1 –1 –1 –1
–1 1 –1 1 1 –1 –1 1 –1 –1 1 1 –1 –1 –1 –1 1 –1 1 –1
1 –1 –1 1 1 –1 1 –1 –1 –1 –1 –1 –1 –1 1 1 1 –1 –1
1 1 1 –1 –1 1 1 1 1 –1 1 –1 1 –1 1 1 –1 1 1 –1 –1 –1
–1 –1 –1 –1 –1 1 1 1 –1 –1 1 –1 –1 1 1 –1 –1 –1 –1
1 –1 1 –1 1 –1 –1 1 –1 –1 1 1 1 1 1 1 1 –1 1 –1 –1
1 1 –1 –1 –1 1 1 –1 –1 –1 –1 1 –1 1 –1 1 –1 –1 1 –1
1 –1 –1 –1 –1 –1 –1 –1 1 1 1 1 –1 –1 1 –1 –1 1 1 –1
–1 –1 –1 1 –1 1 –1 1 –1 –1 1 –1 –1 1 1 1 1 1 1 1 –1
1 –1 –1 1 1 –1 –1 –1 1 1 –1 –1 –1 –1 1 –1 1 –1 1 –1
–1 1 –1 –1 1 1 1 1 1 1 1 –1 1 –1 –1 1 1 –1 1 1 –1 –1
1 1 1 1 –1 1 –1 1 –1 1 1 –1 –1 –1 1 1 1 1 1 1 1 –1 1
–1 –1 1 1 –1 –1 –1 1 1 –1 –1 –1 –1 1 –1 1 –1 1 –1
–1 1 1 1 –1 –1 –1 –1 –1 –1 –1 1 –1 1 1 –1 –1 1 –1
–1 1 1 –1 –1 –1 –1 1 –1 1 –1 1 –1 –1 1 1 1 –1 –1 –1
–1 –1 –1 –1 1 –1 1 1 –1 –1 1 1 1 –1 –1 1 1 1 1 –1 1
–1 1 –1 1 1 –1 1 1 –1 –1 –1 –1 –1 –1 –1 1 –1 1 1 –1
–1 1 –1 –1 1 1 –1 –1 –1 –1 1 –1 1 –1 1 –1 –1 1 –1
1 –1 –1 –1 –1 –1 –1 –1 1 –1 1 1 –1 –1 1 1 1 –1 –1
1 1 1 1 –1 1 –1 1 –1 1 1 –1 –1 –1 1 1 1 1 1 1 1 –1 1
–1 –1 1 1 –1 1 1 –1 –1 1 1 1 1 –1 1 –1 1 –1 1 1 –1
1 1 –1 –1 –1 –1 –1 –1 –1 1 –1 1 1 –1 –1 1 1 1 –1 –1
1 1 1 1 –1 1 –1 1 –1 1 1 –1 1 1 –1 –1 –1 –1 –1 –1 –1
1 –1 1 1 –1 –1 1 –1 –1 1 1 –1 –1 –1 –1 1 –1 1 –1 1
–1 –1 1 –1 1 –1 –1 –1 –1 –1 –1 –1 1 1 1 1 –1 –1 1
1 1 –1 –1 1 1 1 1 –1 1 –1 1 –1 1 1 –1 –1 –1 1 1 1 1
1 1 1 –1 1 –1 –1 1 1 –1 1 1 –1 –1 1 1 1 1 –1 1 –1 1
–1 1 1 –1 –1 –1 1 1 1 1 1 1 1 –1 1 –1 –1 1 1 –1 –1
–1 1 1 –1 –1 –1 –1 1 –1 1 –1 1 –1 –1 1 –1 –1 1 1 1
1 1 1 1 –1 1 –1 –1 1 1 –1 1 1 –1 –1 1 1 1 1 1 –1 1 –1
1 –1 1 1 –1 1 1 –1 –1 –1 –1 –1 –1 –1 1 –1 1 1 –1 –1
1 1 1 –1 –1 1 1 1 1 –1 1 –1 1 –1 1 1 –1 –1 –1 1 1 1 1
1 1 1 1 –1 1 –1 –1 1 1 –1 1 1 –1 –1 1 1 1 1 1 –1 1 –1
1 –1 1 1 –1 1 1 –1 –1 –1 –1 –1 –1 –1 1 1 –1 1 1 –1 –1
1 1 1 –1 –1 1 1 1 1 –1 1 –1 1 –1 1 1 –1 1 1 –1 –1 –1
–1 –1 –1 –1 1 –1 1 1 –1 –1 1 –1 –1 1 1 –1 –1 –1 –1
1 –1 1 –1 1 –1 –1 1 –1 –1 1 1 1 1 1 1 1 –1 1 –1 –1
1 1 –1 –1 –1 1 1 –1 –1 –1 –1 1 –1 1 –1 1 –1 –1 1 1 1
1 –1 –1 –1 –1 –1 –1 –1 1 1 –1 1 1 –1 –1 1 –1 –1 1 1 1
–1 –1 –1 –1 1 –1 1 –1 1 –1 –1 1 1 1 1 –1 –1 –1 –1 –1
–1 –1 1 –1 1 1 –1 –1 1 1 1 1 –1 –1 1 1 1 1 1 –1 1 –1 1 1
–1 1 1 –1 1 1 –1 –1 –1 –1 –1 –1 –1 1 –1 1 1 –1 –1
1 –1 –1 1 1 –1 –1 –1 1 1 –1 1 –1 1 –1 –1 1 1 1 –1
–1 –1 –1 –1 –1 –1 1 –1 1 1 –1 –1 1 1 1 1 –1 –1 1 1 1
1 –1 1 –1 1 –1 1 1 –1 –1 –1 1 1 1 1 1 1 1 –1 1 –1 –1
1 1 –1 1 1 –1 –1 1 1 1 1 –1 1 –1 1 –1 1 1 –1 1 1 1 –1
–1 –1 –1 –1 –1 –1 1 –1 1 1 –1 –1 1 1 1 1 –1 –1 1 1 1
1 –1 1 –1 1 –1 1 1 –1 1 1 –1 –1 –1 –1 –1 –1 –1 1 –1
1 1 –1 –1 1 –1 –1 1 1 –1 –1 –1 –1 1 1 –1 1 –1 1 –1 –1
1 –1 –1 1 1 1 1 1 1 1 –1 1 –1 –1 1 1 –1 –1 –1 1 1 –1
–1 –1 –1 1 –1 1 –1 1 –1 –1 1 –1 1 –1 –1 –1 –1 –1 –1
–1 1 1 1 1 –1 –1 1 –1 –1 1 1 –1 –1 –1 –1 1 –1 1 –1
1 –1 –1 1 1 1 –1 –1 –1 –1 –1 –1 –1 –1 1 –1 1 1 1 –1 –1
1 1 1 –1 –1 1 1 1 1 –1 1 –1 1 –1 1 1 –1 1 1 –1 –1 –1
–1 –1 –1 –1 1 –1 1 1 –1 –1 1 –1 –1 1 1 –1 –1 –1 –1
1 –1 1 –1 1 –1 –1 1 –1 –1 1 1 1 1 1 1 1 –1 1 –1 –1
1 1 –1 –1 –1 1 1 –1 –1 –1 –1 1 –1 1 –1 1 –1 –1 1 1 1
1 –1 –1 –1 –1 –1 –1 –1 1 1 –1 1 1 –1 –1 1 –1 –1 1 1 1
–1 –1 –1 –1 1 –1 1 –1 1 –1 –1 1 1 –1 –1 1 1 1 1 1 1 1
–1 1 –1 –1 1 1 –1 –1 –1 1 1 –1 –1 –1 –1 1 1 –1 1 1 –1
1 –1 –1 1 –1 –1 1 1 1 1 1 1 1 –1 1 –1 –1 1 1 –1 1 1 1
–1 –1 1 1 1 1 –1 1 –1 1 –1 1 1 –1 1 1 –1 –1 –1 –1 –1
–1 –1 1 –1 1 1 –1 –1 1 1 1 1 –1 –1 1 1 1 1 1 –1 1 –1 1 1
–1 1 1 –1 –1 –1 1 1 1 1 1 1 1 –1 1 –1 –1 1 1 –1 1 1
–1 –1 1 1 1 1 –1 1 –1 1 –1 1 1 –1 –1 –1 1 1 1 1 1 1
1 –1 1 –1 –1 1 1 –1 –1 –1 1 1 –1 –1 –1 –1 1 –1 1 –1
1 –1 –1 1 –1 –1 1 1 1 1 1 1 1 –1 1 –1 –1 1 1 –1 1 1
–1 –1 1 1 1 1 –1 1 –1 1 –1 1 1 –1 –1 –1 1 1 1 1 1 1
1 –1 1 –1 –1 1 1 –1 –1 –1 1 1 –1 –1 –1 –1 1 –1 1 –1
1 –1 –1 1 –1 1 –1 –1 –1 –1 –1 –1 –1 1 –1 1 1 –1 –1
1 –1 –1 1 1 –1 –1 –1 –1 1 –1 1 –1 1 –1 –1 1 –1 –1
1 1 1 1 1 1 1 –1 1 –1 –1 1 1 –1 –1 –1 1 1 –1 –1 –1
–1 1 –1 1 –1 1 –1 –1 1 –1 –1 1 1 1 1 1 1 1 –1 1 –1
–1 1 1 –1 1 1 –1 –1 1 1 1 1 –1 1 –1 1 –1 1 1 –1 –1
–1 1 1 1 1 1 1 1 –1 1 –1 –1 1 1 –1 –1 –1 1 1 –1 –1
–1 –1 1 –1 1 –1 1 –1 –1 1 –1 1 –1 –1 –1 –1 –1 –1 –1
1 1 1 1 –1 –1 1 –1 –1 1 1 –1 –1 –1 –1 1 –1 1 –1 1 –1
–1 1 1 1 –1 –1 –1 –1 –1 –1 –1 1 1 –1 1 –1 –1 1 1 1
–1 –1 1 1 1 1 –1 1 –1 1 –1 1 1 –1 1 1 –1 –1 –1 –1 –1
–1 –1 1 –1 1 1 –1 –1 1 –1 –1 1 1 –1 –1 –1 –1 1 –1
1 –1 1 –1 –1 1 –1 –1 1 1 1 1 1 1 1 –1 1 –1 –1 1 1 –1
–1 –1 1 1 –1 –1 –1 –1 1 –1 1 –1 1 –1 –1 1 1 1 –1 –1
–1 –1 –1 –1 –1 1 –1 1 1 –1 –1 1 –1 –1 1 1 –1 –1 –1
–1 1 –1 1 –1 1 –1 –1 1 –1 –1 1 1 1 1 1 1 1 –1 1 –1
–1 1 1 –1 –1 –1 1 1 –1 –1 –1 –1 1 –1 1 –1 1 –1 –1
1 –1 –1 1 1 1 1 1 1 1 –1 1 –1 –1 1 1 –1 1 1 –1 –1 1
1 1 1 –1 1 –1 1 –1 1 1 –1 1;

sequence (88): G_2048(8,:)=[–1 1 1 –1 1 –1 1 –1 1 1 1
1 –1 –1 1 1 –1 1 1 –1 –1 1 –1 1 1 1 1 1 1 1 –1 –1 1
–1 –1 1 –1 1 –1 1 –1 –1 –1 –1 1 1 –1 –1 –1 1 1 –1
–1 1 –1 1 1 1 1 1 1 1 –1 –1 1 –1 –1 1 –1 1 –1 1 –1
–1 –1 –1 1 1 –1 –1 1 –1 –1 1 1 –1 1 –1 –1 –1 –1 –1
–1 –1 1 1 1 –1 –1 1 –1 1 –1 1 –1 –1 –1 –1 1 1 –1 –1
–1 1 1 –1 –1 1 –1 1 1 1 1 1 1 1 –1 –1 1 –1 –1 1 –1
1 –1 1 –1 –1 –1 –1 1 1 –1 –1 1 –1 –1 1 1 –1 1 –1 –1
–1 –1 –1 –1 –1 1 1 –1 1 1 1 1 –1 1 –1 1 1 1 1 –1 –1
1 1 1 –1 –1 1 1 –1 1 –1 –1 –1 –1 –1 –1 –1 1 1 1 –1
–1 1 –1 1 –1 1 –1 –1 –1 –1 1 1 –1 –1 1 –1 –1 1 –1
1 –1 –1 –1 –1 –1 –1 –1 1 1 1 1 –1 –1 1 –1 1 –1 1 –1
–1 –1 –1 1 1 –1 –1 –1 1 1 –1 –1 1 –1 1 1 1 1 1 1 1
–1 –1 –1 1 1 –1 1 –1 1 –1 1 1 1 1 –1 –1 1 1 –1 1 1
–1 –1 1 –1 1 1 1 1 1 1 1 –1 –1 1 –1 –1 1 –1 1 –1 1
–1 –1 –1 –1 1 1 –1 –1 –1 1 1 –1 –1 1 –1 1 1 1 1 1 1
1 –1 –1 1 –1 –1 1 –1 1 –1 1 –1 –1 –1 –1 1 1 –1 –1
1 –1 –1 1 –1 1 –1 –1 –1 –1 –1 –1 –1 1 1 1 1 –1 –1
1 –1 1 –1 1 –1 –1 –1 –1 1 1 –1 –1 –1 1 1 –1 –1 1 –1
1 1 1 1 1 1 1 –1 –1 –1 1 1 –1 1 –1 1 –1 1 1 1 1 –1 –1
1 1 –1 1 1 –1 –1 1 –1 1 1 1 1 1 1 1 –1 –1 1 –1 –1 1
–1 1 –1 1 –1 –1 –1 –1 1 1 –1 –1 –1 1 1 –1 –1 1 –1
1 1 1 1 1 1 1 –1 –1 –1 1 1 –1 1 –1 1 –1 1 1 1 1 –1 –1
1 1 –1 1 1 –1 –1 1 –1 1 1 1 1 1 1 1 –1 –1 –1 1 1 –1
1 –1 1 –1 1 1 1 1 –1 –1 1 1 1 –1 –1 1 1 –1 1 1 –1 1
1 –1 –1 –1 –1 –1 –1 1 1 –1 1 –1 1 –1 1 1 1 1 –1 –1
1 1 –1 1 1 –1 –1 1 –1 1 1 1 1 1 1 1 –1 –1 1 –1 –1 1
–1 1 –1 1 –1 –1 –1 –1 1 1 –1 –1 –1 1 1 –1 –1 1 –1
1 1 1 1 1 1 1 –1 –1 1 –1 –1 1 –1 1 –1 1 –1 –1 –1 –1
1 1 –1 –1 1 –1 –1 1 1 –1 1 –1 –1 –1 –1 –1 –1 –1 1
1 1 –1 –1 1 –1 1 –1 1 –1 –1 –1 –1 1 1 –1 –1 –1 1 1
–1 –1 1 –1 1 1 1 1 1 1 1 –1 –1 1 –1 –1 1 –1 1 –1 1
–1 –1 –1 –1 1 1 –1 –1 1 –1 –1 1 1 –1 1 –1 –1 –1 –1
–1 –1 –1 1 1 –1 1 1 –1 1 –1 1 –1 1 1 1 1 –1 –1 1 1
1 –1 –1 1 1 –1 1 –1 –1 –1 –1 –1 –1 –1 1 1 1 –1 –1
1 –1 1 –1 1 –1 –1 –1 –1 1 1 –1 –1 1 –1 –1 1 –1 1 –1
–1 –1 –1 –1 –1 –1 1 1 1 1 –1 –1 1 –1 1 –1 1 –1 –1
–1 –1 1 1 –1 –1 –1 1 1 –1 –1 1 –1 1 1 1 1 1 1 1 –1
–1 1 –1 –1 1 –1 1 –1 1 –1 –1 –1 –1 1 1 –1 –1 1 –1
–1 1 1 –1 1 –1 –1 –1 –1 –1 –1 –1 1 1 –1 1 1 1 1 1 –1
1 –1 1 1 1 1 –1 –1 1 1 1 –1 –1 1 1 –1 1 –1 –1 –1 –1
–1 –1 –1 1 1 –1 1 1 –1 1 –1 1 –1 1 1 1 1 –1 –1 1 1
–1 1 1 –1 –1 1 –1 1 1 1 1 1 1 1 –1 –1 –1 1 1 –1 1 –1

1 –1 1 1 1 1 –1 –1 1 1 1 –1 –1 1 1 –1 1 –1 –1 –1 –1
–1 –1 –1 1 1 1 –1 –1 1 –1 1 –1 1 –1 –1 –1 –1 1 1 –1
–1 1 –1 –1 1 1 –1 1 –1 –1 –1 –1 –1 –1 –1 1 1 –1 1
1 –1 1 –1 1 –1 1 1 1 1 –1 –1 1 1 1 –1 –1 1 –1 1 –1
–1 –1 –1 –1 –1 –1 1 1 1 1 –1 –1 1 –1 1 –1 1 –1 –1
–1 –1 1 1 –1 –1 1 –1 –1 1 1 –1 1 –1 –1 –1 –1 –1 –1
–1 1 1 1 –1 –1 1 –1 1 –1 1 –1 –1 –1 –1 1 1 –1 –1 –1
1 1 –1 –1 1 –1 1 1 1 1 1 1 1 –1 –1 –1 1 1 –1 1 –1 1
–1 1 1 1 1 –1 –1 1 1 –1 1 1 –1 –1 1 –1 1 1 1 1 1 1 1
–1 –1 1 –1 –1 1 –1 1 –1 1 –1 –1 –1 –1 1 1 –1 –1 –1
1 1 –1 –1 1 –1 1 1 1 1 1 1 1 –1 –1 1 –1 –1 1 –1 1 –1
1 –1 –1 –1 –1 1 1 –1 –1 1 –1 –1 1 1 –1 1 –1 –1 –1
–1 –1 –1 –1 1 1 1 –1 –1 1 –1 1 –1 1 –1 –1 –1 –1 1
1 –1 –1 –1 1 1 –1 –1 1 –1 1 1 1 1 1 1 1 –1 –1 1 –1
–1 1 –1 1 –1 1 –1 –1 –1 –1 1 1 –1 –1 1 –1 –1 1 1 –1
1 –1 –1 –1 –1 –1 –1 –1 1 1 –1 1 1 –1 1 –1 1 –1 1 1
1 1 –1 –1 1 1 1 –1 –1 1 –1 1 –1 –1 –1 –1 –1 –1 –1
1 1 1 1 –1 –1 1 –1 1 –1 1 –1 –1 –1 –1 1 1 –1 –1 1 –1
–1 1 1 –1 1 –1 –1 –1 –1 –1 –1 –1 1 1 1 –1 –1 1 –1
1 –1 1 –1 –1 –1 –1 1 1 –1 –1 –1 1 1 –1 –1 1 –1 1 1
1 1 1 1 1 –1 –1 –1 1 1 –1 1 –1 1 –1 1 1 1 1 –1 –1 1
1 –1 1 1 –1 –1 1 –1 1 1 1 1 1 1 1 –1 –1 1 –1 –1 1 –1
1 –1 1 –1 –1 –1 –1 1 1 –1 –1 –1 1 1 –1 –1 1 –1 1 1
1 1 1 1 1 –1 –1 1 –1 –1 1 –1 1 –1 1 –1 –1 –1 –1 1 1
–1 –1 1 –1 –1 1 1 –1 1 –1 –1 –1 –1 –1 –1 –1 1 1 1
–1 –1 1 –1 1 –1 1 –1 –1 –1 –1 1 1 –1 –1 –1 1 1 –1
–1 1 –1 1 1 1 1 1 1 1 –1 –1 –1 1 1 –1 1 –1 1 –1 1 1
1 1 –1 –1 1 1 –1 1 1 –1 –1 1 –1 1 1 1 1 1 1 1 –1 –1
1 –1 –1 1 –1 1 –1 1 –1 –1 –1 –1 1 1 –1 –1 –1 1 1 –1
–1 1 –1 1 1 1 1 1 1 1 –1 –1 –1 1 1 –1 1 –1 1 –1 1 1
1 1 –1 –1 1 1 –1 1 1 –1 –1 1 –1 1 1 1 1 1 1 1 –1 –1
–1 1 1 –1 1 –1 1 –1 1 1 1 1 –1 –1 1 1 1 –1 –1 1 1 –1
1 –1 –1 –1 –1 –1 –1 –1 1 1 1 –1 –1 1 –1 1 –1 1 –1
–1 –1 –1 1 1 –1 –1 1 –1 –1 1 1 –1 1 –1 –1 –1 –1 –1
–1 –1 1 –1 1 1 –1 –1 1 1 1 –1 –1 1 1 1 1 –1 1 –1 1
–1 1 1 –1 1 1 –1 –1 –1 –1 –1 –1 –1 1 1 –1 1 1 –1 1
–1 1 –1 1 1 1 1 –1 –1 1 1 –1 1 1 –1 –1 1 –1 1 1 1 1
1 1 1 –1 –1 –1 1 1 –1 1 –1 1 –1 1 1 1 1 –1 –1 1 1 1
–1 –1 1 1 –1 1 –1 –1 –1 –1 –1 –1 –1 1 1 –1 1 1 1 1
1 1 –1 1 1 1 1 –1 –1 1 1 –1 1 1 –1 –1 1 –1 1 1 1 1 1 1
1 1 –1 –1 1 –1 –1 1 –1 1 –1 1 –1 –1 –1 –1 1 1 –1 –1
–1 1 1 –1 –1 1 –1 1 1 1 1 1 1 1 –1 –1 –1 1 1 –1 1 –1
1 –1 1 1 1 1 –1 –1 1 1 –1 1 1 –1 –1 1 –1 1 1 1 1 1 1
1 –1 –1 –1 1 1 –1 1 –1 1 –1 1 1 1 1 –1 –1 1 1 1 –1
–1 1 –1 1 –1 –1 –1 –1 –1 –1 –1 1 1 1 –1 1 1 –1 1 –1
1 –1 1 1 1 1 –1 –1 1 1 –1 1 1 –1 –1 1 –1 1 1 1 1 1 1
1 –1 –1 1 –1 –1 1 –1 1 –1 1 –1 –1 –1 –1 1 1 –1 –1
–1 1 1 –1 –1 1 –1 1 1 1 1 1 1 1 –1 –1 1 –1 –1 1 –1
1 –1 1 –1 –1 –1 –1 1 1 –1 –1 1 –1 –1 1 1 –1 1 –1 –1
–1 –1 –1 –1 –1 1 1 1 –1 –1 1 –1 1 –1 1 –1 –1 –1 –1
1 1 –1 –1 –1 1 1 –1 –1 1 –1 1 1 1 1 1 1 1 –1 –1 –1
1 1 –1 1 –1 1 –1 1 1 1 1 –1 –1 1 1 –1 1 1 –1 –1 1 –1
1 1 1 1 1 1 1 –1 –1 1 –1 –1 1 –1 1 –1 1 –1 –1 –1 –1
1 1 –1 –1 –1 1 1 –1 –1 1 –1 1 1 1 1 1 1 1 –1 –1 –1
1 1 –1 1 –1 1 –1 1 1 1 1 –1 –1 1 1 –1 1 1 –1 –1 1 –1
1 1 1 1 1 1 1 –1 –1 –1 1 1 –1 1 –1 1 –1 1 1 1 1 –1 –1
1 1 1 –1 –1 1 –1 1 –1 –1 –1 –1 –1 –1 –1 1 1 1];
sequence (89): G_2048(1,:)=[1 1 1 –1 –1 –1 1 –1 1 1 1
–1 1 1 –1 1 –1 –1 –1 1 1 1 –1 1 1 1 1 –1 1 1 –1 1 –1
–1 –1 1 1 1 –1 1 –1 –1 –1 1 –1 –1 1 –1 –1 –1 –1 1
1 1 –1 1 1 1 1 –1 1 1 –1 1 1 1 1 –1 –1 –1 1 –1 1 1 1
–1 1 1 –1 1 –1 –1 –1 1 1 1 –1 1 1 1 1 –1 1 1 –1 1 1
1 1 –1 –1 –1 1 –1 1 1 1 –1 1 1 –1 1 1 1 1 –1 –1 –1
1 –1 –1 –1 –1 1 –1 –1 1 –1 1 1 1 –1 –1 –1 1 –1 1 1
1 –1 1 1 –1 1 –1 –1 –1 1 1 1 –1 1 1 1 1 –1 1 1 –1 1
–1 –1 –1 1 1 1 –1 1 –1 –1 –1 1 –1 –1 1 –1 –1 –1 –1
1 1 1 –1 1 1 1 1 –1 1 1 –1 1 –1 –1 –1 1 1 1 –1 1 –1

–1 –1 1 –1 –1 1 –1 1 1 1 –1 –1 –1 1 –1 –1 –1 –1 1
–1 –1 1 –1 –1 –1 –1 1 1 1 –1 1 –1 –1 –1 1 –1 –1 1
–1 –1 –1 –1 1 1 1 –1 1 1 1 1 –1 1 1 –1 1 1 1 1 –1 –1
–1 1 –1 1 1 1 –1 1 1 –1 1 –1 –1 –1 1 1 1 –1 1 1 1 1
–1 1 1 –1 1 –1 –1 –1 1 1 1 –1 1 –1 –1 –1 1 –1 –1 1
–1 –1 –1 –1 1 1 1 –1 1 1 1 1 –1 1 1 –1 1 1 1 1 –1 –1
–1 1 –1 1 1 1 –1 1 1 –1 1 –1 –1 –1 1 1 1 –1 1 1 1 1
–1 1 1 –1 1 1 1 1 –1 –1 –1 1 –1 1 1 1 –1 1 1 –1 1 1
1 1 –1 –1 –1 1 –1 –1 –1 –1 1 –1 –1 1 –1 –1 –1 –1 1
1 1 –1 1 –1 –1 –1 1 –1 –1 1 –1 1 1 1 –1 –1 –1 1 –1
–1 –1 –1 1 –1 –1 1 –1 1 1 1 –1 –1 –1 1 –1 1 1 1 –1
1 1 –1 1 1 1 1 –1 –1 –1 1 –1 –1 –1 –1 1 –1 –1 1 –1
1 1 1 –1 –1 –1 1 –1 1 1 1 –1 1 1 –1 1 –1 –1 –1 1 1
1 –1 1 1 1 1 –1 1 1 –1 1 1 1 1 –1 –1 –1 1 –1 1 1 1 –1
1 1 –1 1 1 1 1 –1 –1 –1 1 –1 –1 –1 –1 1 –1 –1 1 –1
1 1 1 –1 –1 –1 1 –1 1 1 1 –1 1 1 –1 1 –1 –1 –1 1 1
1 –1 1 1 1 1 –1 1 1 –1 1 –1 –1 –1 1 1 1 –1 1 –1 –1
–1 1 –1 –1 1 –1 –1 –1 –1 1 1 1 –1 1 1 1 1 –1 1 1 –1
1 1 1 1 –1 –1 –1 1 –1 1 1 1 –1 1 1 –1 1 –1 –1 –1 1
1 1 –1 1 1 1 1 –1 1 1 –1 1 1 1 1 –1 –1 –1 1 –1 1 1 1
–1 1 1 –1 1 1 1 1 –1 –1 –1 1 –1 –1 –1 –1 1 –1 –1 1
–1 1 1 1 –1 –1 –1 1 –1 1 1 1 –1 1 1 –1 1 –1 –1 –1 1
1 1 –1 1 1 1 1 –1 1 1 –1 1 –1 –1 –1 1 1 1 –1 1 –1 –1
–1 1 –1 –1 1 –1 –1 –1 –1 1 1 1 –1 1 1 1 1 –1 1 1 –1
1 –1 –1 –1 1 1 1 –1 1 –1 –1 –1 1 –1 –1 1 –1 1 1 1 –1
–1 –1 1 –1 –1 –1 –1 1 –1 –1 1 –1 –1 –1 –1 1 1 1 –1
1 –1 –1 –1 1 –1 –1 1 –1 –1 –1 –1 1 1 1 –1 1 1 1 1 –1
1 1 –1 1 –1 –1 –1 1 1 1 –1 1 –1 –1 –1 1 –1 –1 1 –1
1 1 1 –1 –1 –1 1 –1 –1 –1 –1 1 –1 –1 1 –1 1 1 1 –1
–1 –1 1 –1 1 1 1 –1 1 1 –1 1 1 1 1 –1 –1 –1 1 –1 –1
–1 –1 1 –1 –1 1 –1 –1 –1 –1 1 1 1 –1 1 –1 –1 –1 1
–1 –1 1 –1 1 1 1 –1 –1 –1 1 –1 –1 –1 –1 1 –1 –1 1
–1 –1 –1 –1 1 1 1 –1 1 –1 –1 –1 1 –1 –1 1 –1 –1 –1
–1 1 1 1 –1 1 1 1 1 –1 1 1 –1 1 1 1 1 –1 –1 –1 1 –1
1 1 1 –1 1 1 –1 1 –1 –1 –1 1 1 1 –1 1 1 1 1 –1 1 1 –1
1 –1 –1 –1 1 1 1 –1 1 –1 –1 –1 1 –1 –1 1 –1 –1 –1
–1 1 1 1 –1 1 1 1 1 –1 1 1 –1 1 –1 –1 –1 1 1 1 –1 1
–1 –1 –1 1 –1 –1 1 –1 1 1 1 –1 –1 –1 1 –1 –1 –1 –1
1 –1 –1 1 –1 –1 –1 –1 1 1 1 –1 1 –1 –1 –1 1 –1 –1
1 –1 –1 –1 –1 1 1 1 –1 1 1 1 1 –1 1 1 –1 1 1 1 1 –1
–1 –1 1 –1 1 1 1 –1 1 1 –1 1 –1 –1 –1 1 1 1 –1 1 1
1 1 –1 1 1 –1 1 –1 –1 –1 1 1 1 –1 1 –1 –1 –1 1 –1 –1
1 –1 –1 –1 –1 1 1 1 –1 1 1 1 1 –1 1 1 –1 1 1 1 1 –1
–1 –1 1 –1 1 1 1 –1 1 1 –1 1 –1 –1 –1 1 1 1 –1 1 1
1 1 –1 1 1 –1 1 1 1 1 –1 –1 –1 1 –1 1 1 1 –1 1 1 –1
1 1 1 1 –1 –1 –1 1 –1 –1 –1 –1 1 –1 –1 1 –1 1 1 1 –1
–1 –1 1 –1 1 1 1 –1 1 1 –1 1 –1 –1 –1 1 1 1 –1 1 1
1 1 –1 1 1 –1 1 –1 –1 –1 1 1 1 –1 1 –1 –1 –1 1 –1 –1
1 –1 –1 –1 –1 1 1 1 –1 1 1 1 1 –1 1 1 –1 1 –1 –1 –1
1 1 1 –1 1 –1 –1 –1 1 –1 –1 1 –1 1 1 1 –1 –1 –1 1 –1
–1 –1 –1 1 –1 –1 1 –1 –1 –1 –1 1 1 1 –1 1 –1 –1 –1
1 –1 –1 1 –1 –1 –1 –1 1 1 1 –1 1 1 1 1 –1 1 1 –1 1
1 1 1 –1 –1 –1 1 –1 1 1 1 –1 1 1 –1 1 –1 –1 –1 1 1
1 –1 1 1 1 1 –1 1 1 –1 1 –1 –1 –1 1 1 1 –1 1 –1 –1
–1 1 –1 –1 1 –1 –1 –1 –1 1 1 1 –1 1 1 1 1 –1 1 1 –1
1 1 1 1 –1 –1 –1 1 –1 1 1 1 –1 1 1 –1 1 –1 –1 –1 1
1 1 –1 1 1 1 1 –1 1 1 –1 1 1 1 1 –1 –1 –1 1 –1 1 1 1
–1 1 1 –1 1 1 1 1 –1 –1 –1 1 –1 –1 –1 –1 1 –1 –1 1
–1 –1 –1 –1 1 1 1 –1 1 –1 –1 –1 1 –1 –1 1 –1 1 1 1
–1 –1 –1 1 –1 –1 –1 –1 1 –1 –1 1 –1 1 1 1 –1 –1 –1
1 –1 1 1 1 –1 1 1 –1 1 1 1 1 –1 –1 –1 1 –1 –1 –1 –1
1 –1 –1 1 –1 1 1 1 –1 –1 –1 1 –1 1 1 1 –1 1 1 –1 1
–1 –1 –1 1 1 1 –1 1 1 1 1 –1 1 1 –1 1 1 1 1 –1 –1 –1
1 –1 1 1 1 –1 1 1 –1 1 1 1 1 –1 –1 –1 1 –1 –1 –1 –1
1 –1 –1 1 –1 –1 –1 –1 1 1 1 –1 1 –1 –1 –1 1 –1 –1
1 –1 1 1 1 –1 –1 –1 1 –1 –1 –1 –1 1 –1 –1 1 –1 1 1
1 –1 –1 –1 1 –1 1 1 1 –1 1 1 –1 1 1 1 1 –1 –1 –1 1

–1 –1 –1 –1 1 –1 –1 1 –1 –1 –1 –1 1 1 1 –1 1 –1 –1 –1 1 –1 –1 1 –1 1 1 1 –1 –1 –1 1 –1 –1 –1 –1 1 1 –1 –1 1 –1 –1 –1 –1 1 1 1 –1 1 –1 –1 –1 1 –1 –1 1 1 –1 –1 –1 –1 1 1 1 –1 1 1 1 1 –1 1 1 –1 1 –1 –1 –1 1 1 1 –1 1 –1 –1 –1 1 –1 –1 1 –1 1 1 1 –1 –1 –1 1 –1 –1 –1 –1 1 –1 –1 1 –1 1 1 1 –1 –1 –1 1 –1 1 1 1 –1 1 1 –1 1 1 1 1 –1 –1 –1 1 –1 –1 –1 –1 1 –1 –1 1 –1 1 1 1 1 –1 –1 –1 1 –1 1 1 1 –1 1 1 –1 1 –1 –1 –1 1 1 1 –1 1 1 1 1 –1 1 1 –1 1 1 1 1 –1 –1 –1 1 –1 1 1 1 –1 1 1 –1 1 1 1 1 –1 –1 –1 1 –1 –1 –1 –1 1 –1 –1 1 –1 1 1 1 1 –1 –1 –1 1 –1 1 1 1 –1 1 1 –1 1 –1 –1 –1 1 1 1 –1 1 1 1 1 –1 1 1 –1 1 –1 –1 –1 1 1 1 –1 1 –1 –1 –1 1 1 –1 –1 1 –1 –1 –1 –1 1 1 1 –1 1 1 1 1 –1 1 1 –1 1 1 1 1 –1 –1 –1 1 –1 1 1 1 –1 1 1 –1 1 –1 –1 –1 1 1 1 –1 1 1 –1 1 –1 –1 –1 1 1 1 1 –1 1 1 1 1 –1 1 1 –1 1 1 1 1 –1 –1 –1 1 –1 1 1 1 1 –1 1 1 –1 1 1 1 1 –1 –1 –1 1 1 –1 –1 –1 –1 1 –1 –1 1 –1 –1 –1 –1 –1 1 1 1 –1 1 –1 –1 –1 1 –1 –1 1 –1 –1 1 –1 1 1 1 1 –1 –1 –1 1 –1 –1 –1 –1 1 –1 –1 1 –1 –1 1 –1 1 1 1 –1 –1 –1 1 1 –1 1 1 1 –1 1 1 –1 1 1 1 1 –1 –1 –1 1 –1 –1 –1 –1 1 1 –1 –1 1 –1 1 1 1 –1 –1 –1 1 –1 1 1 1 –1 1 1 –1 1 –1 –1 –1 1 1 1 1 –1 1 1 1 1 –1 1 1 –1 1 1 1 1 –1 –1 –1 1 1 –1 1 1 1 –1 1 1 –1 1 1 1 1 –1 –1 –1 1 –1 –1 –1 –1 1 1 –1 –1 1 –1];

sequence (90): G_2048(2,:)=[1 1 1 –1 –1 –1 1 –1 1 1 1 –1 1 1 –1 1 –1 –1 –1 1 1 1 –1 1 1 1 1 –1 1 1 –1 1 –1 –1 –1 1 1 1 –1 1 –1 –1 –1 1 –1 –1 –1 –1 1 1 1 1 –1 1 1 1 1 –1 1 1 –1 1 1 1 1 –1 –1 –1 1 –1 1 1 1 1 –1 1 1 –1 1 –1 –1 –1 1 1 1 –1 1 1 1 1 –1 1 1 –1 1 1 1 1 1 –1 –1 –1 1 –1 –1 1 –1 –1 1 –1 1 1 1 –1 1 1 –1 1 1 1 1 1 –1 –1 –1 1 –1 –1 –1 –1 1 –1 –1 1 –1 1 1 1 –1 –1 –1 1 –1 1 1 1 –1 1 1 –1 1 –1 –1 –1 1 1 1 1 –1 1 1 1 1 –1 1 1 –1 1 1 1 1 –1 –1 –1 1 –1 –1 –1 –1 1 1 1 –1 1 1 1 1 –1 1 1 –1 1 –1 –1 –1 1 1 1 –1 1 1 –1 –1 1 –1 –1 1 –1 1 1 1 1 –1 –1 –1 1 –1 –1 –1 –1 1 1 –1 –1 1 –1 –1 –1 –1 1 1 1 –1 1 1 –1 –1 –1 1 –1 –1 1 1 –1 –1 –1 –1 1 1 1 1 –1 1 1 1 1 –1 1 1 –1 1 1 1 1 –1 –1 –1 –1 1 –1 1 1 1 1 –1 1 1 –1 1 –1 –1 –1 1 1 1 –1 1 1 1 1 1 –1 1 1 –1 1 1 –1 –1 1 –1 –1 1 1 –1 1 1 1 1 –1 –1 –1 1 –1 1 1 1 –1 1 1 –1 1 1 –1 –1 –1 1 1 1 1 –1 1 1 1 1 –1 1 1 –1 1 1 1 1 –1 –1 –1 –1 1 –1 1 1 1 1 –1 1 1 –1 1 –1 –1 –1 1 1 1 –1 1 1 1 1 1 –1 1 1 –1 1 1 1 1 –1 –1 –1 1 1 –1 1 1 1 –1 1 1 1 1 –1 1 1 –1 1 1 1 1 –1 –1 –1 1 –1 1 1 1 1 1 –1 –1 1 –1 –1 1 –1 –1 –1 –1 1 1 –1 –1 –1 1 –1 –1 1 1 1 –1 1 –1 –1 –1 1 –1 –1 1 –1 1 1 1 –1 1 1 –1 1 –1 –1 –1 1 –1 –1 1 –1 –1 1 1 1 1 –1 –1 –1 1 –1 –1 –1 –1 1 1 –1 –1 1 –1 –1 1 –1 1 1 1 1 –1 –1 –1 1 –1 1 1 1 1 –1 1 1 –1 1 1 –1 –1 –1 1 –1 –1 1 –1 1 1 1 –1 –1 –1 1 1 1 –1 –1 –1 –1 1 1 1 1 –1 –1 –1 1 1 1 –1 1 1 1 1 –1 1 1 –1 1 1 –1 –1 –1 1 –1 1 1 1 1 –1 1 1 –1 1 1 1 1 1 –1 –1 –1 1 1 –1 1 1 1 –1 1 –1 –1 –1 –1 1 –1 –1 –1 1 1 –1 1 1 1 1 1 –1 1 1 –1 1 1 1 1 –1 –1 –1 1 1 –1 1 1 –1 1 1 1 1 –1 –1 –1 1 –1 –1 1 1 1 –1 1 1 1 1 1 –1 1 1 –1 1 –1 –1 –1 1 1 1 –1 1 1 –1 –1 –1 –1 1 –1 1 1 1 1 –1 –1 –1 1 1 –1 1 1 1 –1 1 1 1 1 –1 1 1 –1 1 1 1 1 –1 –1 –1 1 1 –1 –1 1 1 1 1 –1 1 1 –1 1 –1 –1 –1 1 1 1 1 –1 –1 –1 1 –1 –1 –1 –1 1 1 –1 1 1 –1 –1 –1 1 1 1 –1 1 1 1 1 –1 1 1 –1 1 1 1 1 –1 1 –1 –1 –1 1 –1 –1 1 –1 –1 –1 –1 1 1 1 1 –1 –1 –1 1 1 1 –1 1 –1 –1 1 1 –1 –1 1 –1 –1 1 –1 –1 –1 –1 1 1 1 1 –1 1 –1 –1 1 –1 –1 1 –1 –1 –1 –1 1 1 1 –1 1 1 1 1 –1 1 1 –1 1 –1 –1 –1 1 1 1 –1 1 –1 –1 –1 1 –1 –1 1 –1 –1 1 –1 1 1 1 1 –1 –1 –1 1 1 –1 1 1 –1 –1 1 –1 –1 1 –1 –1 1 –1 1 1 1 –1 –1 –1 –1 1 –1 –1 –1 –1 1 1 –1 1 1 –1 –1 1 –1 –1 1 –1 –1 –1 1 –1 –1 –1 –1 1 –1 –1 1 1 –1 –1 1 –1 1 1 1 –1 –1 –1 1 –1 –1 –1 –1 1 –1 –1 1 1 –1 –1 –1 –1 1 1 1 –1 1 –1 –1 –1 1 –1 –1 1 –1 –1 –1 –1 1 1 1 1 –1 1 1 1 1 –1 1 1 –1 1 1 1 1 –1 –1 –1 1 –1

1 1 1 –1 1 1 –1 1 –1 –1 –1 1 1 1 –1 1 1 1 1 –1 1 1 –1 1 –1 –1 –1 1 1 1 –1 1 –1 –1 –1 1 –1 –1 1 –1 –1 –1 –1 1 1 1 –1 1 1 1 1 –1 1 1 –1 1 –1 –1 –1 1 1 1 –1 1 –1 –1 –1 1 –1 –1 1 –1 1 1 1 –1 –1 –1 1 –1 –1 –1 –1 1 –1 –1 1 –1 –1 –1 –1 1 1 1 –1 1 –1 –1 –1 1 –1 –1 1 –1 –1 –1 –1 1 1 1 –1 1 1 1 1 –1 1 1 –1 1 –1 –1 –1 1 1 1 –1 1 –1 –1 –1 1 –1 –1 1 –1 –1 1 –1 1 1 1 –1 –1 –1 1 –1 1 1 1 –1 –1 –1 –1 1 –1 –1 1 –1 1 1 1 –1 –1 –1 1 –1 1 1 1 –1 1 1 –1 1 1 1 1 –1 –1 –1 1 –1 –1 1 –1 –1 –1 1 –1 –1 1 –1 –1 1 –1 1 1 1 –1 –1 –1 1 –1 1 1 1 –1 –1 –1 1 –1 1 –1 –1 –1 –1 1 –1 –1 1 –1 –1 1 –1 –1 –1 –1 1 1 1 –1 1 –1 –1 –1 1 –1 –1 1 –1 –1 –1 –1 1 1 1 –1 1 1 1 1 –1 1 1 –1 1 –1 –1 –1 1 1 1 –1 1 –1 –1 –1 1 –1 –1 1 –1 1 1 1 –1 –1 –1 1 –1 –1 –1 –1 1 –1 –1 1 –1 –1 1 –1 1 1 1 –1 –1 –1 1 –1 1 1 1 –1 –1 –1 –1 1 –1 –1 1 –1 1 1 1 –1 1 1 –1 1 1 1 1 –1 –1 –1 1 –1 –1 –1 –1 1 –1 –1 1 –1 –1 1 –1 1 1 1 –1 –1 –1 1 –1 1 1 1 –1 1 1 –1 1 1 1 1 –1 –1 –1 1 –1 1 1 1 1 –1 1 1 –1 1 1 1 1 –1 –1 –1 1 –1 –1 –1 –1 1 –1 –1 1 –1 –1 1 –1 1 1 1 –1 1 1 –1 1 1 1 1 –1 –1 –1 1 –1 –1 –1 –1 1 1 –1 –1 1 –1 –1 1 –1 –1 –1 –1 1 1 1 –1 1 –1 –1 –1 1 –1 –1 1 –1 –1 1 –1 1 1 1 –1 –1 –1 1 –1 –1 –1 –1 1 –1 –1 1 –1 –1 1 –1 1 1 1 –1 –1 –1 1 –1 1 1 1 –1 1 1 –1 1 1 1 1 –1 –1 –1 1 –1 –1 –1 –1 1 1 1 –1 1 –1 –1 –1 1 –1 –1 1 –1 –1 –1 –1 1 –1 1 1 1 –1 –1 –1 1 –1 1 1 1 –1 1 1 –1 1 1 1 1 –1 –1 –1 1 –1 1 –1 –1 –1 –1 1 –1 –1 1 –1 –1 1 –1 –1 –1 –1 1 1 1 –1 1 1 1 1 –1 –1 –1 1 –1 –1 1 –1 1 1 1 –1 –1 –1 1 –1 1 1 1 –1 –1 –1 1 –1 1 1 1 –1 –1 –1 1 1 1 –1 1 1 –1 1 –1 1 1 –1 1 1 1 –1 1 1 –1 –1 1 1 1 –1 –1 –1 –1 1 –1 –1 1 –1 1 1 1 –1 1 –1 –1 1 –1 –1 –1 –1 1 –1 1 –1 –1 –1 –1 1 1 1 –1 1 1 1 1 –1 1 1 –1 1 1 –1 –1 –1 –1 1 1 1 –1 1 1 –1 1 –1 1 1 1 –1 1 –1 –1 –1 –1 1 1 –1 –1 1 1 1 1 –1 1 1 1 1 –1 1 1 –1 1 –1 –1 –1 1 1 1 –1 –1 1 –1 –1 1 –1 1 1 1 –1 1 1 1 1 –1 1 1 –1 1 1 –1 1 1 –1 –1 –1 1 –1 1 1 1 –1 –1 –1 1 –1 –1 –1 –1 1 –1 1 1 –1 1 –1 –1 1 –1 1 1 1 –1 1 1 1 1 –1 1 1 –1 1 –1 –1 1 –1 –1 1 –1 1 1 1 1 –1 –1 –1 1 1 –1 1 1 –1 1 –1 1 1 –1 –1 –1 1 –1 –1 1 –1 1 1 1 1 –1 1 1 –1 1 1 –1 –1 1 –1 1 1 –1 1 1 1 1 –1 –1 –1 1 –1 –1 –1 –1 1 1 –1 1 1 –1 –1 –1 1 1 1 1 –1 –1 –1 –1 –1 1 1 1 1 1 –1 –1 –1 –1 1 –1 1 –1 –1 1 –1 –1 –1 –1 1 –1 –1 –1 –1 –1 1 1 –1 –1 1 1 1 –1 1 –1 1 1 1 –1 1 1 1 1 –1 1 1 –1 –1 1 1 1 1 –1 –1 –1 1 –1 1 1 1 –1 –1 1 –1 –1 1 –1 –1 1 –1 –1 1 –1 1 1 –1 –1 1 1 1 1 1 1 1 –1 1 1 1 –1 1 –1 –1 1 1 1 –1 –1 –1 –1 1 –1 1 –1 –1 1 –1 –1 1 –1 1 1 1 1 –1 1 1 1 1 –1 1 1 1 1 –1 1 1 –1 1 –1 –1 1 –1 1 –1 1 1 1 –1 1 1 –1 1 1 –1 1 1 –1 –1 –1 1 –1 1 –1 –1 –1 1 –1 –1 1 –1 –1 1 –1 1 1 1 –1 1 –1 –1 –1 1 –1 –1 –1 1 –1 –1 –1 –1 1 1 1 –1 1 1 1 1 –1 1 1 –1 1 1 –1 –1 –1 1 –1 –1 –1 –1 1 1 1 –1 1 –1 –1 1 –1 –1 –1 1 –1 –1 –1 1 –1 –1 1 1 1 –1 1 1 1 1 –1 1 1 –1 1 1 –1 1 –1 –1 –1 1 1 1 1 –1 –1 –1 1 1 1 –1 1 –1 –1 1 –1 –1 –1 –1 1 1 1 –1 1 1 1 1 –1 1 1 –1 1 –1 –1 –1 1 –1 –1 1 –1 1 1 1 –1 –1 –1 1 –1 –1 –1 –1 1 –1 –1 1 –1 –1 –1 –1 1 –1 –1 1 –1 1 1 1 –1 –1 –1 1 –1 –1 –1 –1 1 1 1 –1 1 1 1 1 –1 1 1 –1 1];

sequence (91): G_2048(3,:)=[1 1 1 –1 –1 –1 1 –1 1 1 1 –1 1 1 –1 1 –1 –1 –1 1 1 1 –1 1 1 1 1 –1 1 1 –1 1 –1 –1 –1 1 1 1 –1 1 –1 –1 –1 1 –1 –1 1 –1 –1 –1 –1 1 1 1 –1 1 1 1 1 –1 1 1 –1 1 1 1 1 –1 –1 –1 1 –1 1 1 1 –1 1 1 –1 1 –1 –1 –1 1 1 1 –1 1 1 1 1 –1 1 1 –1 1 1 1 1 1 –1 –1 –1 1 –1 1 1 1 –1 1 1 –1 1 1 1 1 1 –1 –1 –1 1 –1 –1 –1 –1 1 –1 –1 1 –1 1 1 1 –1 –1 –1 1 –1 1 1 1 –1 1 1 –1 1 –1 –1 –1 1 1 1 –1 1 1 –1 1 –1 –1 1 –1 –1 –1 1 1 1 –1 1 1 1 1 –1 1 1 –1 1 –1 –1 –1 –1 1 1 1 –1 1 –1 –1 –1 1 –1 –1 1 –1 –1 –1 –1 1 1 1 –1 1 1 1 1 –1 1 1 –1 1 –1 –1 –1 1 1 1 –1 1 –1 –1 1 –1 –1 1 –1 1 1 1 –1 –1 –1 1 –1 –1 –1 –1 1

−1 −1 1 −1 −1 −1 −1 1 1 1 −1 1 −1 −1 −1 1 −1 −1 1
−1 −1 −1 −1 1 1 1 −1 1 1 1 1 −1 1 1 −1 1 −1 −1 −1 1
1 1 −1 1 −1 −1 −1 1 −1 −1 1 −1 1 1 1 −1 −1 −1 1 −1
−1 −1 −1 1 −1 −1 1 −1 1 1 1 −1 −1 −1 1 −1 1 1 1 −1
1 1 −1 1 1 1 1 −1 −1 −1 1 −1 −1 −1 −1 1 −1 −1 1 −1
−1 −1 −1 1 1 1 −1 1 −1 −1 −1 1 −1 −1 1 −1 1 1 1 −1
−1 −1 1 −1 −1 −1 −1 1 −1 −1 1 −1 −1 −1 −1 1 1 1 −1
1 −1 −1 −1 1 −1 −1 1 −1 −1 −1 −1 1 1 1 −1 1 1 1 1 −1
1 1 −1 1 1 1 1 −1 −1 −1 1 −1 1 1 1 −1 1 1 −1 1 −1 −1
−1 1 1 1 −1 1 1 1 1 −1 1 1 −1 1 −1 −1 −1 1 1 1 −1 1
−1 −1 −1 1 −1 −1 1 −1 −1 −1 −1 1 1 1 −1 1 1 1 1 −1
1 1 −1 1 −1 −1 −1 1 1 1 −1 1 −1 −1 −1 1 −1 −1 1 −1
1 1 1 −1 −1 −1 1 −1 −1 −1 −1 1 −1 −1 1 −1 −1 −1 −1
1 1 1 −1 1 −1 −1 −1 1 −1 −1 1 −1 −1 −1 −1 1 1 1 −1
1 1 1 1 −1 1 1 −1 1 1 1 1 −1 −1 −1 1 −1 1 1 1 −1 1 1
−1 1 −1 −1 −1 1 1 1 −1 1 1 1 1 −1 1 1 −1 1 −1 −1 −1
1 1 1 −1 1 −1 −1 −1 1 −1 −1 1 −1 −1 −1 −1 1 1 1 −1
1 1 1 1 −1 1 1 −1 1 1 1 1 −1 −1 −1 1 −1 1 1 1 −1 1 1
−1 1 −1 −1 −1 1 1 1 −1 1 1 1 1 −1 1 1 −1 1 1 1 1 −1
−1 −1 1 −1 1 1 1 −1 1 1 −1 1 1 1 1 −1 −1 −1 1 −1 −1
−1 −1 1 −1 −1 1 −1 1 1 1 −1 −1 −1 1 −1 1 1 1 −1 1 1
−1 1 −1 −1 −1 1 1 1 −1 1 1 1 1 −1 1 1 −1 1 −1 −1 −1
1 1 1 −1 1 −1 −1 −1 1 −1 −1 1 −1 −1 −1 −1 1 1 1 −1
1 1 1 1 −1 1 1 −1 1 −1 −1 −1 1 1 1 −1 1 −1 −1 −1 1
−1 −1 1 −1 1 1 1 −1 −1 −1 1 −1 −1 −1 −1 1 −1 −1 1
−1 −1 −1 −1 1 1 1 −1 1 −1 −1 −1 1 −1 −1 1 −1 −1 −1
−1 1 1 1 −1 1 1 1 1 −1 1 1 −1 1 1 1 1 −1 −1 −1 1 −1
1 1 1 −1 1 1 −1 1 −1 −1 −1 1 1 1 −1 1 1 1 1 −1 1 1 −1
1 −1 −1 −1 1 1 1 −1 1 −1 −1 −1 1 −1 −1 1 −1 −1 −1
−1 1 1 1 −1 1 1 1 1 −1 1 1 −1 1 1 1 1 −1 −1 −1 1 −1
1 1 1 −1 1 1 −1 1 −1 −1 −1 1 1 1 −1 1 1 1 1 −1 1 1 −1
1 1 1 1 −1 −1 −1 1 −1 1 1 1 −1 1 1 −1 1 1 1 1 −1 −1
−1 1 −1 −1 −1 −1 1 −1 −1 1 −1 −1 −1 −1 1 1 1 −1 1
−1 −1 −1 1 −1 −1 1 −1 1 1 1 −1 −1 −1 1 −1 −1 −1 −1
1 −1 −1 1 −1 1 1 1 −1 −1 −1 1 −1 1 1 1 −1 1 1 −1 1
1 1 1 −1 −1 −1 1 −1 −1 −1 −1 1 −1 −1 1 −1 1 1 1 −1
−1 −1 1 −1 1 1 1 −1 1 1 −1 1 −1 −1 −1 1 1 1 −1 1 1
1 1 −1 1 1 −1 1 1 1 1 −1 −1 −1 1 −1 1 1 1 −1 1 1 −1
1 1 1 1 −1 −1 −1 1 −1 −1 −1 −1 1 −1 −1 1 −1 1 1 1 −1
−1 −1 1 −1 1 1 1 −1 1 1 −1 1 −1 −1 −1 1 1 1 −1 1 1
1 1 −1 1 1 −1 1 −1 −1 −1 1 1 1 −1 1 −1 −1 −1 1 −1 −1
1 −1 −1 −1 −1 1 1 1 −1 1 1 1 1 −1 1 1 −1 1 1 1 1 −1
−1 −1 1 −1 1 1 1 −1 1 1 −1 1 −1 −1 −1 1 1 1 −1 1 1
1 1 −1 1 1 −1 1 1 1 1 −1 −1 −1 1 −1 1 1 1 −1 1 1 −1
1 1 1 1 −1 −1 −1 1 −1 −1 −1 −1 1 −1 −1 1 −1 1 1 1 −1
−1 −1 1 −1 1 1 1 −1 1 1 −1 1 −1 −1 −1 1 1 1 −1 1 1
1 1 −1 1 1 −1 1 −1 −1 −1 1 1 1 −1 1 −1 −1 −1 1 −1 −1
1 −1 −1 −1 −1 1 1 1 −1 1 1 1 1 −1 1 1 −1 1 −1 −1 −1
1 1 1 −1 1 −1 −1 −1 1 −1 −1 1 −1 1 1 1 −1 −1 −1 1 −1
−1 −1 −1 1 −1 −1 1 −1 −1 −1 −1 1 1 1 −1 1 −1 −1 −1
1 −1 −1 1 −1 −1 −1 −1 1 1 1 −1 1 1 1 1 −1 1 1 −1 1
−1 −1 −1 1 1 1 −1 1 −1 −1 −1 1 −1 −1 1 −1 1 1 1 −1
−1 −1 1 −1 −1 −1 −1 1 −1 −1 1 −1 1 1 1 −1 −1 −1 1
−1 1 1 1 −1 1 1 −1 1 1 1 1 −1 −1 −1 1 −1 −1 −1 −1 1
−1 −1 1 −1 −1 −1 −1 1 1 1 −1 1 −1 −1 −1 1 −1 −1 1
−1 1 1 1 −1 −1 −1 1 −1 −1 −1 −1 1 −1 −1 1 −1 −1 −1
−1 1 1 1 −1 1 −1 −1 −1 1 −1 −1 1 −1 −1 −1 −1 1 1 1
−1 1 1 1 1 −1 1 1 −1 1 1 1 1 −1 −1 −1 1 −1 1 1 1 −1
1 1 −1 1 −1 −1 −1 1 1 1 −1 1 1 1 1 −1 1 1 −1 1 −1 −1
−1 1 1 1 −1 1 −1 −1 −1 1 −1 −1 1 −1 −1 −1 −1 1 1 1
−1 1 1 1 1 −1 1 1 −1 1 −1 −1 −1 1 1 1 −1 1 −1 −1 −1
1 −1 −1 1 −1 1 1 1 −1 −1 −1 1 −1 −1 −1 −1 1 −1 −1
1 −1 −1 −1 −1 1 1 1 −1 1 −1 −1 −1 1 −1 −1 1 −1 −1
−1 −1 1 1 1 −1 1 1 1 1 −1 1 1 −1 1 −1 −1 −1 1 1 1 −1
1 −1 −1 −1 1 −1 −1 1 −1 1 1 1 −1 −1 −1 1 −1 −1 −1
−1 1 −1 −1 1 −1 1 1 1 −1 −1 −1 1 −1 1 1 1 −1 1 1 −1
1 1 1 1 −1 −1 −1 1 −1 −1 −1 −1 1 −1 −1 1 −1 −1 −1

−1 1 1 1 −1 1 −1 −1 −1 1 −1 −1 1 −1 1 1 1 −1 −1 −1
1 −1 −1 −1 −1 1 −1 −1 1 −1 −1 −1 −1 1 1 1 −1 1 −1
−1 −1 1 −1 −1 1 −1 −1 −1 −1 1 1 1 −1 1 1 1 1 −1 1 1
−1 1 −1 −1 −1 1 1 1 −1 1 −1 −1 −1 1 −1 −1 1 −1 1 1
1 −1 −1 −1 1 −1 −1 −1 −1 1 −1 −1 1 −1 1 1 1 −1 −1
−1 1 −1 1 1 1 −1 1 1 −1 1 1 1 1 −1 −1 −1 1 −1 −1 −1
−1 1 −1 −1 1 −1 1 1 1 −1 −1 −1 1 −1 1 1 1 −1 1 1 −1
1 −1 −1 −1 1 1 1 −1 1 1 1 1 −1 1 1 −1 1 1 1 1 −1 −1
−1 1 −1 1 1 1 −1 1 1 −1 1 1 1 1 −1 −1 −1 1 −1 −1 −1
−1 1 −1 −1 1 −1 −1 −1 −1 1 1 1 −1 1 −1 −1 −1 1 −1
−1 1 −1 1 1 1 −1 −1 −1 1 −1 −1 −1 −1 1 −1 −1 1 −1
1 1 1 −1 −1 −1 1 −1 1 1 1 −1 1 1 −1 1 1 1 1 −1 −1 −1
1 −1 −1 −1 −1 1 −1 −1 1 −1 −1 −1 −1 1 1 1 −1 1 −1
−1 −1 1 −1 −1 1 −1 1 1 1 −1 −1 −1 1 −1 −1 −1 −1 1
−1 −1 1 −1 −1 −1 −1 1 1 1 −1 1 −1 −1 −1 1 −1 −1 1
−1 −1 −1 −1 1 1 1 −1 1 1 1 1 −1 1 1 −1 1 1 1 1 −1 −1
−1 1 −1 1 1 1 −1 1 1 −1 1 −1 −1 −1 1 1 1 −1 1 1 1 1
−1 1 1 −1 1 −1 −1 −1 1 1 1 −1 1 −1 −1 −1 1 −1 −1 1
−1 −1 −1 −1 1 1 1 −1 1 1 1 1 −1 1 1 −1 1 −1 −1 −1 1
1 1 −1 1 −1 −1 −1 1 −1 −1 1 −1 1 1 1 −1 −1 −1 1 −1
−1 −1 −1 1 −1 −1 1 −1 −1 −1 −1 1 1 1 −1 1 −1 −1 −1
1 −1 −1 1 −1 −1 −1 −1 1 1 1 −1 1 1 1 1 −1 1 1 −1 1
1;

sequence (92): G_2048(4,:)=[1 1 1 −1 −1 −1 1 −1 1 1 1
−1 1 1 −1 1 −1 −1 −1 1 1 1 −1 1 1 1 1 −1 1 1 −1 1 −1
−1 −1 1 1 1 −1 1 −1 −1 −1 1 −1 −1 1 −1 −1 −1 −1 1
1 1 −1 1 1 1 1 −1 1 1 −1 1 1 1 1 −1 −1 −1 1 −1 1 1 1
−1 1 1 −1 1 −1 −1 −1 1 1 1 −1 1 1 1 1 −1 1 1 −1 1 1
1 1 −1 −1 −1 1 −1 1 1 1 −1 1 1 −1 1 1 1 1 −1 −1 −1
1 −1 −1 −1 −1 1 −1 −1 1 −1 1 1 1 −1 −1 −1 1 −1 1 1
1 −1 1 1 −1 1 −1 −1 −1 1 1 1 −1 1 1 1 1 −1 1 1 −1 1
−1 −1 −1 1 1 1 −1 1 −1 −1 −1 1 −1 −1 1 −1 −1 −1 −1
1 1 1 −1 1 1 1 1 −1 1 1 −1 1 −1 −1 −1 1 1 1 −1 1 −1
−1 −1 1 −1 −1 1 −1 1 1 1 −1 −1 −1 1 −1 −1 −1 −1 1
−1 −1 1 −1 −1 −1 −1 1 1 1 −1 1 −1 −1 −1 1 −1 −1 1
−1 −1 −1 −1 1 1 1 −1 1 1 1 1 −1 1 1 −1 1 −1 −1 −1 1
1 1 −1 1 −1 −1 −1 1 −1 −1 1 −1 1 1 1 −1 −1 −1 1 −1
−1 −1 −1 1 −1 −1 1 −1 1 1 1 −1 −1 −1 1 −1 1 1 1 −1
1 1 −1 1 1 1 1 −1 −1 −1 1 −1 −1 −1 −1 1 −1 −1 1 −1
−1 −1 −1 1 1 1 −1 1 −1 −1 −1 1 −1 −1 1 −1 1 1 1 −1
−1 −1 1 −1 −1 −1 −1 1 −1 −1 1 −1 −1 −1 −1 1 1 1 −1
1 −1 −1 −1 1 −1 −1 1 −1 −1 −1 −1 1 1 1 −1 1 1 1 1 −1
1 1 −1 1 1 1 1 −1 −1 −1 1 −1 1 1 1 −1 1 1 −1 1 −1 −1
−1 1 1 1 −1 1 1 1 1 −1 1 1 −1 1 −1 −1 −1 1 1 1 −1 1
−1 −1 −1 1 −1 −1 1 −1 −1 −1 −1 1 1 1 −1 1 1 1 1 −1
1 1 −1 1 −1 −1 −1 1 1 1 −1 1 −1 −1 −1 1 −1 −1 1 −1
1 1 1 −1 −1 −1 1 −1 −1 −1 −1 1 −1 −1 1 −1 −1 −1 −1
1 1 1 −1 1 −1 −1 −1 1 −1 −1 1 −1 −1 −1 −1 1 1 1 −1
1 1 1 1 −1 1 1 −1 1 1 1 1 −1 −1 −1 1 −1 1 1 1 −1 1 1
−1 1 −1 −1 −1 1 1 1 −1 1 1 1 1 −1 1 1 −1 1 −1 −1 −1
1 1 1 −1 1 −1 −1 −1 1 −1 −1 1 −1 −1 −1 −1 1 1 1 −1
1 1 1 1 −1 1 1 −1 1 1 1 1 −1 −1 −1 1 −1 1 1 1 −1 1 1
−1 1 −1 −1 −1 1 1 1 −1 1 1 1 1 −1 1 1 −1 1 1 1 1 −1
−1 −1 1 −1 1 1 1 −1 1 1 −1 1 1 1 1 −1 −1 −1 1 −1 −1
−1 −1 1 −1 −1 1 −1 1 1 1 −1 −1 −1 1 −1 1 1 1 −1 1 1
−1 1 −1 −1 −1 1 1 1 −1 1 1 1 1 −1 1 1 −1 1 −1 −1 −1
1 1 1 −1 1 −1 −1 −1 1 −1 −1 1 −1 −1 −1 −1 1 1 1 −1
1 1 1 1 −1 1 1 −1 1 −1 −1 −1 1 1 1 −1 1 −1 −1 −1 1
−1 −1 1 −1 1 1 1 −1 −1 −1 1 −1 −1 −1 −1 1 −1 −1 1
−1 −1 −1 −1 1 1 1 −1 1 −1 −1 −1 1 −1 −1 1 −1 −1 −1
−1 1 1 1 −1 1 1 1 1 −1 1 1 −1 1 1 1 1 −1 −1 −1 1 −1
1 1 1 −1 1 1 −1 1 −1 −1 −1 1 1 1 −1 1 1 1 1 −1 1 1 −1
1 −1 −1 −1 1 1 1 −1 1 −1 −1 −1 1 −1 −1 1 −1 −1 −1
−1 1 1 1 −1 1 1 1 1 −1 1 1 −1 1 1 1 1 −1 −1 −1 1 −1
1 1 1 −1 1 1 −1 1 −1 −1 −1 1 1 1 −1 1 1 1 1 −1 1 1 −1
1 1 1 1 −1 −1 −1 1 −1 1 1 1 −1 1 1 −1 1 1 1 1 −1 −1
−1 1 −1 −1 −1 −1 1 −1 −1 1 −1 −1 −1 −1 1 1 1 −1 1

–1 –1 –1 1 –1 –1 1 –1 1 1 1 –1 –1 –1 1 –1 –1 –1 –1
1 –1 –1 1 –1 1 1 1 –1 –1 –1 1 –1 1 1 1 –1 1 1 –1 1
1 1 1 –1 –1 –1 1 –1 –1 –1 –1 1 –1 –1 1 –1 1 1 1 –1
–1 –1 1 –1 1 1 1 –1 1 1 –1 1 –1 –1 –1 1 1 1 –1 1 1
1 1 –1 1 1 –1 1 1 1 1 –1 –1 –1 1 –1 1 1 1 –1 1 1 –1
1 1 1 1 –1 –1 –1 1 –1 –1 –1 –1 1 –1 –1 1 –1 –1 –1
–1 1 1 1 –1 1 –1 –1 –1 1 –1 –1 1 –1 1 1 1 –1 –1 –1
1 –1 –1 –1 –1 1 –1 –1 1 –1 1 1 1 –1 –1 –1 1 –1 1 1
1 –1 1 1 –1 1 1 1 1 –1 –1 –1 1 –1 –1 –1 –1 1 –1 –1
1 –1 –1 –1 –1 1 1 1 –1 1 –1 –1 –1 1 –1 –1 1 –1 1 1
1 –1 –1 –1 1 –1 –1 –1 –1 1 –1 –1 1 –1 –1 –1 –1 1 1
1 –1 1 –1 –1 –1 1 –1 –1 1 –1 –1 –1 –1 1 1 1 –1 1 1
1 1 –1 1 1 –1 1 –1 –1 –1 1 1 1 –1 1 –1 –1 –1 1 –1 –1
1 –1 1 1 1 –1 –1 –1 1 –1 –1 –1 –1 1 –1 –1 1 –1 1 1
1 –1 –1 –1 1 –1 1 1 1 –1 1 1 –1 1 1 1 1 –1 –1 –1 1
–1 –1 –1 –1 1 –1 –1 1 –1 1 1 1 –1 –1 –1 1 –1 1 1 1
–1 1 1 –1 1 –1 –1 –1 1 1 1 –1 1 1 1 1 –1 1 1 –1 1 1
1 1 –1 –1 –1 1 –1 1 1 1 –1 1 1 –1 1 1 1 1 –1 –1 –1
1 –1 –1 –1 –1 1 –1 –1 1 –1 1 1 1 –1 –1 –1 1 –1 1 1
1 –1 1 1 –1 1 –1 –1 –1 1 1 1 –1 1 1 1 1 –1 1 1 –1 1
–1 –1 –1 1 1 1 –1 1 –1 –1 –1 1 –1 –1 1 –1 –1 –1 –1
1 1 1 –1 1 1 1 1 –1 1 1 –1 1 1 1 1 –1 –1 –1 1 –1 1 1
1 –1 1 1 –1 1 –1 –1 –1 1 1 1 –1 1 1 1 1 –1 1 1 –1 1
1 1 1 –1 –1 –1 1 –1 1 1 1 –1 1 1 –1 1 1 1 1 –1 –1 –1
1 –1 –1 –1 –1 1 –1 –1 1 –1 –1 –1 –1 1 1 1 –1 1 –1
–1 –1 1 –1 –1 1 –1 1 1 1 –1 –1 –1 1 –1 –1 –1 –1 1
–1 –1 1 –1 1 1 1 –1 –1 –1 1 –1 1 1 1 –1 1 1 –1 1 1
1 1 –1 –1 –1 1 –1 –1 –1 –1 1 –1 –1 1 –1 1 1 1 –1 –1
–1 1 –1 1 1 1 –1 1 1 –1 1 –1 –1 –1 1 1 1 –1 1 1 1 1
–1 1 1 –1 1 1 1 1 –1 –1 –1 1 –1 1 1 1 –1 1 1 –1 1 1
1 1 –1 –1 –1 1 –1 –1 –1 –1 1 –1 –1 1 –1 1 1 1 –1 –1
–1 1 –1 1 1 1 –1 1 1 –1 1 –1 –1 –1 1 1 1 –1 1 1 1 1
–1 1 1 –1 1 –1 –1 –1 1 1 1 –1 1 –1 –1 –1 1 –1 –1 1
–1 –1 –1 –1 1 1 1 –1 1 1 1 1 –1 1 1 –1 1 1 1 1 –1 –1
–1 1 –1 1 1 1 –1 1 1 –1 1 –1 –1 –1 1 1 1 –1 1 1 1 1
–1 1 1 –1 1 1 1 1 –1 –1 –1 1 –1 1 1 1 –1 1 1 –1 1 1
1 1 –1 –1 –1 1 –1 –1 –1 –1 1 –1 –1 1 –1 1 1 1 –1 –1
–1 1 –1 1 1 1 –1 1 1 –1 1 –1 –1 –1 1 1 1 –1 1 1 1 1
–1 1 1 –1 1 –1 –1 –1 1 1 1 –1 1 –1 –1 –1 1 –1 –1 1
–1 –1 –1 –1 1 1 1 –1 1 1 1 1 –1 1 1 –1 1 –1 –1 –1 1
1 1 –1 1 –1 –1 –1 1 –1 –1 1 –1 1 1 1 –1 –1 –1 1 –1
–1 –1 –1 1 –1 –1 1 –1 –1 –1 –1 1 1 1 –1 1 –1 –1 –1
1 –1 –1 1 –1 –1 –1 –1 1 1 1 –1 1 1 1 1 –1 1 1 –1 1
1 1 1 –1 –1 –1 1 –1 1 1 1 –1 1 1 –1 1 –1 –1 –1 1 1
1 –1 1 1 1 1 –1 1 1 –1 1 –1 –1 –1 1 1 1 –1 1 –1 –1
–1 1 –1 –1 1 –1 –1 –1 –1 1 1 1 –1 1 1 1 1 –1 1 1 –1
1 1 1 1 –1 –1 –1 1 –1 1 1 1 –1 1 1 –1 1 –1 –1 –1 1
1 1 –1 1 1 1 1 –1 1 1 –1 1 1 1 1 –1 –1 –1 1 –1 1 1 1
–1 1 1 –1 1 1 1 1 –1 –1 –1 1 –1 –1 –1 –1 1 –1 –1 1
–1 –1 –1 –1 1 1 1 –1 1 –1 –1 –1 1 –1 –1 1 –1 1 1 1
–1 –1 –1 1 –1 –1 –1 –1 1 –1 –1 1 –1 1 1 1 –1 –1 –1
1 –1 1 1 1 –1 1 1 –1 1 1 1 1 –1 –1 –1 1 –1 –1 –1 –1
1 –1 –1 1 –1 1 1 1 –1 –1 –1 1 –1 1 1 1 –1 1 1 –1 1
–1 –1 –1 1 1 1 –1 1 1 1 1 –1 1 1 –1 1 1 1 1 –1 –1 –1
1 –1 1 1 1 –1 1 1 –1 1 1 1 1 –1 –1 –1 1 –1 –1 –1 –1
1 –1 –1 1 –1];

sequence (93): G_2048(5,:)=[1 1 1 –1 –1 –1 1 –1 1 1 1
–1 1 1 –1 1 –1 –1 –1 1 1 1 –1 1 1 1 1 –1 1 1 –1 1 –1
–1 –1 1 1 1 –1 1 –1 –1 –1 1 –1 –1 1 –1 –1 –1 –1 1
1 1 –1 1 1 1 1 –1 1 1 –1 1 1 1 1 –1 –1 –1 1 –1 1 1 1
–1 1 1 –1 1 –1 –1 –1 1 1 1 –1 1 1 1 1 –1 1 1 –1 1 1
1 1 –1 –1 –1 1 –1 1 1 1 –1 1 1 –1 1 1 1 1 –1 –1 –1
1 –1 –1 –1 –1 1 –1 –1 1 –1 1 1 1 –1 –1 –1 1 –1 1 1
1 –1 1 1 –1 1 –1 –1 –1 1 1 1 –1 1 1 1 1 –1 1 1 –1 1
–1 –1 –1 1 1 1 –1 1 –1 –1 –1 1 –1 –1 1 –1 –1 –1 –1
1 1 1 –1 1 1 1 1 –1 1 1 –1 1 –1 –1 –1 1 1 1 –1 1 –1
–1 –1 1 –1 –1 1 –1 1 1 1 –1 –1 –1 1 –1 –1 –1 –1 1

–1 –1 1 –1 –1 –1 –1 1 1 1 –1 1 –1 –1 –1 1 –1 –1 1
–1 –1 –1 –1 1 1 1 –1 1 1 1 1 –1 1 1 –1 1 1 1 1 –1 –1
–1 1 –1 1 1 1 –1 1 1 –1 1 –1 –1 –1 1 1 1 –1 1 1 1 1
–1 1 1 –1 1 –1 –1 –1 1 1 1 –1 1 –1 –1 –1 1 –1 –1 1
–1 –1 –1 –1 1 1 1 –1 1 1 1 1 –1 1 1 –1 1 1 1 1 –1 –1
–1 1 –1 1 1 1 –1 1 1 –1 1 –1 –1 –1 1 1 1 –1 1 1 1 1
–1 1 1 –1 1 1 1 1 –1 –1 –1 1 –1 1 1 1 –1 1 1 –1 1 1
1 1 –1 –1 –1 1 –1 –1 –1 –1 1 –1 –1 1 –1 –1 –1 –1 1
1 1 –1 1 –1 –1 –1 1 –1 –1 1 –1 1 1 1 –1 –1 –1 1 –1
–1 –1 –1 1 –1 –1 1 –1 1 1 1 –1 –1 –1 1 –1 1 1 1 –1
1 1 –1 1 1 1 1 –1 –1 –1 1 –1 –1 –1 –1 1 –1 –1 1 –1
1 1 1 –1 –1 –1 1 –1 1 1 1 –1 1 1 –1 1 –1 –1 –1 1 1
1 –1 1 1 1 1 –1 1 1 –1 1 1 1 1 –1 –1 –1 1 –1 1 1 1 –1
1 1 –1 1 1 1 1 –1 –1 –1 1 –1 –1 –1 –1 1 –1 –1 1 –1
–1 –1 –1 1 1 1 –1 1 –1 –1 –1 1 –1 –1 1 –1 1 1 1 –1
–1 –1 1 –1 –1 –1 –1 1 –1 –1 1 –1 1 1 1 –1 –1 –1 1
–1 1 1 1 –1 1 1 –1 1 1 1 1 –1 –1 –1 1 –1 –1 –1 –1 1
–1 –1 1 –1 –1 –1 –1 1 1 1 –1 1 –1 –1 –1 1 –1 –1 1
–1 1 1 1 –1 –1 –1 1 –1 –1 –1 –1 1 –1 –1 1 –1 –1 –1
–1 1 1 1 –1 1 –1 –1 –1 1 –1 –1 1 –1 –1 –1 –1 1 1 1
–1 1 1 1 1 –1 1 1 –1 1 –1 –1 –1 1 1 1 –1 1 –1 –1 –1
1 –1 –1 1 –1 1 1 1 –1 –1 –1 1 –1 –1 –1 –1 1 –1 –1
1 –1 1 1 1 –1 –1 –1 1 –1 1 1 1 –1 1 1 –1 1 1 1 1 –1
–1 –1 1 –1 –1 –1 –1 1 –1 –1 1 –1 1 1 1 –1 –1 –1 1
–1 1 1 1 –1 1 1 –1 1 –1 –1 –1 1 1 1 –1 1 1 1 1 –1 1
1 –1 1 1 1 1 –1 –1 –1 1 –1 1 1 1 –1 1 1 –1 1 1 1 1 –1
–1 –1 1 –1 –1 –1 –1 1 –1 –1 1 –1 1 1 1 –1 –1 –1 1
–1 1 1 1 –1 1 1 –1 1 –1 –1 –1 1 1 1 –1 1 1 1 1 –1 1
1 –1 1 –1 –1 –1 1 1 1 –1 1 –1 –1 –1 1 –1 –1 1 –1 –1
–1 –1 1 1 1 –1 1 1 1 1 –1 1 1 –1 1 1 1 1 –1 –1 –1 1
–1 1 1 1 –1 1 1 –1 1 –1 –1 –1 1 1 1 –1 1 1 1 1 –1 1
1 –1 1 1 1 1 –1 –1 –1 1 –1 1 1 1 –1 1 1 –1 1 1 1 1 –1
–1 –1 1 –1 –1 –1 –1 1 –1 –1 1 –1 –1 –1 –1 1 1 1 –1
1 –1 –1 –1 1 –1 –1 1 –1 1 1 1 –1 –1 –1 1 –1 –1 –1
–1 1 –1 –1 1 –1 1 1 1 –1 –1 –1 1 –1 1 1 1 –1 1 1 –1
1 1 1 1 –1 –1 –1 1 –1 –1 –1 –1 1 –1 –1 1 –1 1 1 1 –1
–1 –1 1 –1 1 1 1 –1 1 1 –1 1 –1 –1 –1 1 1 1 –1 1 1
1 1 –1 1 1 –1 1 1 1 1 –1 –1 –1 1 –1 1 1 1 –1 1 1 –1
1 1 1 1 –1 –1 –1 1 –1 –1 –1 –1 1 –1 –1 1 –1 1 1 1 –1
–1 –1 1 –1 1 1 1 –1 1 1 –1 1 –1 –1 –1 1 1 1 –1 1 1
1 1 –1 1 1 –1 1 –1 –1 –1 1 1 1 –1 1 –1 –1 –1 1 –1 –1
1 –1 –1 –1 –1 1 1 1 –1 1 1 1 1 –1 1 1 –1 1 1 1 1 –1
–1 –1 1 –1 1 1 1 –1 1 1 –1 1 –1 –1 –1 1 1 1 –1 1 1
1 1 –1 1 1 –1 1 1 1 1 –1 –1 –1 1 –1 1 1 1 –1 1 1 –1
1 1 1 1 –1 –1 –1 1 –1 –1 –1 –1 1 –1 –1 1 –1 1 1 1 –1
–1 –1 1 –1 1 1 1 –1 1 1 –1 1 –1 –1 –1 1 1 1 –1 1 1
1 1 –1 1 1 –1 1 –1 –1 –1 1 1 1 –1 1 –1 –1 –1 1 –1 –1
1 –1 –1 –1 –1 1 1 1 –1 1 1 1 1 –1 1 1 –1 1 –1 –1 –1
1 1 1 –1 1 –1 –1 –1 1 –1 –1 1 –1 1 1 1 –1 –1 –1 1 –1
–1 –1 –1 1 –1 –1 1 –1 –1 –1 –1 1 1 1 –1 1 –1 –1 –1
1 –1 –1 1 –1 –1 –1 –1 1 1 1 –1 1 1 1 1 –1 1 1 –1 1
1 1 1 –1 –1 –1 1 –1 1 1 1 –1 1 1 –1 1 –1 –1 –1 1 1
1 –1 1 1 1 1 –1 1 1 –1 1 –1 –1 –1 1 1 1 –1 1 –1 –1
–1 1 –1 –1 1 –1 –1 –1 –1 1 1 1 –1 1 1 1 1 –1 1 1 –1
1 1 1 1 –1 –1 –1 1 –1 1 1 1 –1 1 1 –1 1 –1 –1 –1 1
1 1 –1 1 1 1 1 –1 1 1 –1 1 1 1 1 –1 –1 –1 1 –1 1 1 1
–1 1 1 –1 1 1 1 1 –1 –1 –1 1 –1 –1 –1 –1 1 –1 –1 1
–1 –1 –1 –1 1 1 1 –1 1 –1 –1 –1 1 –1 –1 1 –1 1 1 1
–1 –1 –1 1 –1 –1 –1 –1 1 –1 –1 1 –1 1 1 1 –1 –1 –1
1 –1 1 1 1 –1 1 1 –1 1 1 1 1 –1 –1 –1 1 –1 –1 –1 –1
1 –1 –1 1 –1 1 1 1 –1 –1 –1 1 –1 1 1 1 –1 1 1 –1 1
–1 –1 –1 1 1 1 –1 1 1 1 1 –1 1 1 –1 1 1 1 1 –1 –1 –1
1 –1 1 1 1 –1 1 1 –1 1 1 1 1 –1 –1 –1 1 –1 –1 –1 –1
1 –1 –1 1 –1 1 1 1 –1 –1 –1 1 –1 1 1 1 –1 1 1 –1 1
–1 –1 –1 1 1 1 –1 1 1 1 1 –1 1 1 –1 1 –1 –1 –1 1 1
1 –1 1 –1 –1 –1 1 –1 –1 1 –1 –1 –1 –1 1 1 1 –1 1 1
1 1 –1 1 1 –1 1 1 1 1 –1 –1 –1 1 –1 1 1 1 –1 1 1 –1

1 −1 −1 −1 1 1 1 −1 1 1 1 1 −1 1 1 −1 1 1 1 1 −1 −1 −1 1 −1 1 1 1 −1 1 1 −1 1 1 1 1 −1 −1 −1 1 −1 −1 −1 −1 1 −1 −1 1 −1 1 −1 1 1 1 −1 −1 −1 1 −1 1 1 1 1 −1 1 1 1 −1 1 −1 −1 −1 1 1 1 −1 1 1 1 1 −1 1 1 −1 1 −1 −1 −1 1 1 1 1 −1 1 −1 −1 −1 1 1 −1 −1 1 1 −1 −1 1 −1 −1 −1 −1 1 1 1 1 −1 1 1 1 1 −1 1 1 −1 1 −1 −1 −1 1 1 1 −1 1 1 −1 1 −1 −1 −1 1 1 −1 1 −1 −1 −1 1 1 −1 −1 1 −1 1 1 1 −1 1 1 1 −1 −1 −1 1 −1 −1 −1 1 −1 −1 −1 1 1 −1 1 −1 −1 −1 1 −1 −1 1 −1 −1 1 −1 −1 1 −1 −1 −1 −1 1 1 1 −1 1 1 1 1 −1 1 1 1 −1 1 1 −1 1 −1 −1 −1 1 1 1 1 −1 1 1 −1 −1 1 −1 −1 1 −1 1 1 1 1 −1 −1 −1 1 1 −1 −1 −1 −1 1 1 −1 −1 1 −1 1 1 1 1 −1 −1 −1 1 1 −1 1 1 1 1 −1 1 1 1 −1 1 1 1 1 1 −1 −1 −1 1 −1 −1 1 −1 −1 −1 −1 1 1 −1 −1 1 1 −1 1 −1 −1 −1 1 1 −1 1 −1 −1 1 1 −1 1 −1 −1 1 1 1 1 −1 −1 −1 1 1 −1 −1 −1 −1 1 −1 −1 1 −1 −1 −1 −1 1 1 1 1 −1 1 1 −1 1 −1 −1 −1 1 −1 −1 1 −1 −1 −1 −1 1 1 1 1 −1 1 1 1 1 −1 1 1 1 −1 1 1 1 1 −1 −1 −1 1 1 −1 1 1 1 1 −1 1 1 −1 1 −1 −1 −1 1 1 1 1 −1 1 1 −1 1 −1 −1 1 1 1 1 1 −1 1 1 1 −1 1 1 −1 1 −1 −1 −1 1 1 1 −1 1 1 −1 −1 1 −1 −1 1 −1 1 −1 −1 −1 −1 1 1 1 1 −1 1 1 1 1 −1 1 1 1 −1 1 −1 −1 −1 1 1 1 1 −1 1 1 −1 −1 1 −1 −1 1 −1 −1 1 −1 1 −1 −1 1 −1 −1 1 −1 1 1 1 1 −1 −1 1 1 −1 −1 −1 −1 1 1 −1 −1 1 −1 −1 1 −1 −1 −1 −1 1 1 1 1 −1 1 −1 −1 −1 1 −1 −1 1 −1 −1 1 −1 −1 −1 −1 1 1 1 1 −1 1 1 1 1 1 −1 1 1 −1 1];

sequence (94): G_2048(6,:)=1 −1 −1 −1 1 1 1 −1 1 −1 −1 −1 1 −1 1 −1 −1 1 −1 1 1 1 −1 −1 −1 1 1 −1 −1 −1 −1 −1 1 −1 −1 1 −1 −1 1 −1 1 1 1 1 −1 −1 −1 1 −1 1 1 1 1 −1 1 1 1 −1 1 −1 1 1 1 1 −1 1 −1 −1 1 1 −1 −1 −1 1 −1 −1 1 −1 1 1 1 1 −1 −1 −1 1 −1 −1 1 1 1 1 −1 1 −1 −1 −1 1 −1 −1 1 −1 −1 1 −1 1 1 1 1 −1 −1 −1 1 −1 −1 1 −1 1 −1 −1 −1 1 −1 −1 −1 −1 1 1 1 1 −1 1 1 −1 −1 1 −1 −1 1 −1 −1 −1 1 −1 1 1 −1 1 1 −1 1 −1 −1 1 1 −1 −1 1 −1 −1 −1 1 −1 −1 −1 1 1 1 −1 1 1 −1 −1 1 1 1 1 −1 1 −1 −1 −1 1 1 −1 −1 −1 −1 1 1 −1 −1 1 −1 1 1 1 −1 1 1 1 −1 −1 −1 1 1 −1 −1 1 1 −1 −1 −1 −1 1 1 −1 −1 1 −1 1 1 1 −1 1 1 1 −1 −1 −1 1 −1 1 1 1 1 −1 1 1 1 −1 −1 1 1 −1 1 1 1 −1 −1 −1 1 1 −1 −1 1 −1 1 1 1 −1 1 1 1 1 −1 1 1 1 1 −1 1 −1 −1 1 1 −1 −1 1 −1 −1 −1 1 1 −1 1 1 1 −1 −1 −1 1 1 −1 −1 1 1 1 −1 1 1 −1 1 −1 −1 −1 −1 1 1 −1 −1 1 −1 1 1 1 −1 1 1 −1 −1 −1 −1 −1 1 1 1 1 −1 1 −1 −1 1 1 −1 −1 1 −1 1 −1 1 1 −1 −1 −1 −1 1 −1 −1 −1 −1 1 1 1 1 −1 1 1 −1 1 −1 −1 −1 1 1 −1 −1 1 −1 1 1 1 1 −1 −1 −1 1 1 −1 −1 −1 −1 1 −1 −1 −1 −1 1 1 −1 −1 −1 1 −1 −1 −1 1 1 −1 −1 1 −1 1 1 1 −1 −1 −1 1 −1 −1 −1 1 −1 1 1 1 −1 1 1 1 1 −1 1 1 1 −1 1 1 1 1 1 −1 −1 −1 1 −1 −1 1 1 1 1 −1 1 1 −1 1 −1 −1 1 1 1 1 −1 1 1 1 1 −1 1 1 −1 −1 −1 −1 1 1 1 1 −1 1 1 1 −1 1 1 1 1 −1 1 1 −1 1 −1 −1 −1 1 −1 −1 −1 1 −1 −1 1 1 1 1 −1 1 −1 −1 −1 1 1 −1 −1 −1 −1 1 1 −1 −1 1 −1 −1 −1 −1 1 −1 1 −1 −1 −1 1 1 1 1 −1 1 1 −1 −1 1 −1 −1 −1 −1 1 −1 −1 −1 1 −1 1 1 1 1 −1 1 1 1 1 −1 1 1 1 −1 1 1 1 1 1 −1 −1 −1 1 −1 −1 1 1 1 1 −1 1 1 1 −1 1 1 −1 1 −1 −1 −1 1 1 1 1 −1 1 1 1 1 1 −1 1 1 −1 1 −1 −1 1 1 1 1 −1 1 1 −1 1 −1 −1 −1 1 1 1 −1 1 1 −1 −1 1 −1 −1 1 1 −1 1 −1 −1 −1 1 1 1 1 −1 1 1 1 1 −1 1 1 −1 1 −1 −1 −1 1 1 1 1 −1 −1 −1 1 −1 −1 1 −1 −1 −1 1 1 1 −1 1 1 −1 1 1 1 1 −1 −1 −1 1 1 −1 1 1 1 1 −1 1 1 1 1 −1 −1 −1 1 −1 −1 −1 −1 1 −1 −1 1 −1 −1 −1 1 1 1 1 −1 1 1 −1 −1 1 −1 −1 −1 −1 1 1 1 1 −1 1 1 1 1 −1 1 1 1 −1 1 1 1 1 1 −1 1 1 −1 −1 1 −1 −1 −1 1 −1 −1 1 −1 −1 −1 1 −1 −1 1 −1 1 1 1 1 −1 1 −1 −1 −1 1 −1 −1 −1 1 1 −1 −1 1 −1 −1 1 −1 −1 −1 −1 1 1 1 −1 −1 1 −1 1 1 1 1 −1 −1 −1 −1 1 1 1 −1 1 1 1 −1 1 1 1 1 −1 −1 −1 1 −1 −1 −1 −1 1 1 −1 −1 −1 1 −1 −1 −1 1 −1 −1 1 −1 −1 −1 1 1 −1 −1 1 −1 −1 −1 1 1 1 −1 1 1 1 1 −1 1 1 −1 −1 −1 1 1 −1 1 −1 −1 1 1 1 1 −1 1 1 −1 −1 1 −1 1 1 1 1 −1 −1 1 1 1 1 −1 1 1 −1 1 −1 −1 1 1 −1 −1 1 −1 −1 −1 1 1 −1 −1 1 −1 −1 −1 −1 1 1 1 −1 1 1 1 1 −1 −1 1 −1 −1 1 −1 1 −1 −1 −1 1 1 1 1 −1 1 1 −1 1 −1 −1 −1 1 −1 −1 1 1 −1 −1 −1 −1 1 1 1 1 −1 1 1 1 −1 −1 −1 1 −1 −1 −1 1 1 −1 1 −1 −1 −1 1 −1 1 1 1 1 −1 1 1 1 1 1 −1 1 1 −1 1 −1 −1 −1 1 1 1 1 1 −1 1 1 −1 1 1 1 1 −1 −1 −1 1 1 −1 1 1 1 −1 1 1 1 1 −1 1 1 1 1 −1 −1 −1 1 −1 −1 −1 −1 1 −1 −1 −1 −1 1 −1 1 −1 1 1 −1 −1 −1 1 1 1 1 1 −1 1 1 1 −1 1 −1 −1 1 −1 −1 1 −1 −1 −1 1 1 1 1 1 −1 1 1 −1 −1 −1 −1 1 −1 1 1 1 1 −1 −1 1 1 −1 1 −1 −1 −1 −1 1 1 1 1 −1 1 −1 1 1 −1 1 1 −1 −1 1 −1 −1 −1 1 1 1 1 −1 1 −1 1 1 −1 1 −1 −1 −1 −1 1 1 −1 −1 1 1 −1 −1 −1 1 1 −1 −1 1 1 1 −1 1 1 −1 1 −1 −1 −1 −1 1 1 1 1 1 1 −1 1 1 1 −1 1 −1 −1 −1 1 1 1 1 −1 −1 1 1 1 −1 −1 −1 1 1 −1 1 1 1 −1 1 −1 −1 −1 1 −1 1 1 1 −1 1 −1 −1 −1 1 1 −1 1 1 1 −1 1 −1 1 −1 1 −1 −1 −1 1 −1 −1 −1 1 −1 −1 1 −1 −1 −1 −1 1 1 1 1 −1 1 1 1 −1 1 1 1 −1 1 1 1 1 1 −1 1 1 −1 1 −1 1 1 −1 1 −1 1 1 −1 −1 −1 1 1 1 1 −1 1 1 −1 −1 −1 1 1 −1 −1 −1 1 1 −1 1 1 1 1 1 −1 1 −1 −1 1 −1 1 1 −1 −1 −1 1 1 −1 1 −1 −1 −1 1 −1 −1 1 −1 1 −1 −1 1 1 −1 −1 −1 1 1 −1 1 −1 −1 −1 1 1 −1 1 −1 1 −1 −1 −1 1 −1 −1 −1 −1 1 1 1 1 −1 1 1 1 1 1 −1 1 1 −1 −1 1 −1 1 1 1 1 −1 1 1 −1 −1 −1 1 −1 −1 1 1 −1 −1 −1 −1 1 1 1 −1 −1 −1 −1 1 1 1 −1 1 1 1 −1 1 −1 −1 −1 1 −1 −1 −1 −1 1 1 1 −1 −1 1 −1 1 1 1 −1 1 1 −1 1 1 1 1 −1 1 1 1 −1 −1 −1 1 1 −1 −1 1 −1 −1 1 −1 −1 −1 1 −1 −1 −1 1 1 −1 −1 1 −1 −1 1 1 1 −1 1 1 1 −1 1 1 1 −1 −1 −1 1 1 −1 −1 1 −1 −1 −1 −1 1 1 1 −1 1 1 1 1 −1 1 1 −1 1];

sequence (95): G_2048(7,:)=[1 1 1 −1 −1 −1 1 −1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 1 −1 1 1 −1 1 1 1 1 −1 −1 −1 1 −1 1 1 1 −1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 −1 1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 −1 −1 −1 1 1 1 −1 1 −1 −1 −1 −1 1 −1 −1 1 −1 −1 −1 −1 1 1 1 −1 1 1 1 1 −1 1 1 −1 1 −1 −1 −1 −1 1 1 1 −1 1 −1 −1 −1 1 −1 −1 1 1 1 −1 1 1 1 1 −1 1 1 −1 1 −1 −1 −1 1 1 1 −1 1 −1 −1 −1 1 1 1 −1 1 −1 −1 1 −1 −1 −1 −1 1 −1 −1 −1 −1 1 −1 −1 1 −1 −1 −1 1 1 −1 1 −1 −1 −1 1 −1 −1 1 −1 −1 −1 −1 1 1 1 −1 1 1 1 1 −1 1 −1 −1 −1 −1 1 1 1 −1 1 −1 −1 −1 1 −1 −1 1

–1 –1 –1 –1 1 1 1 –1 1 1 1 1 –1 1 1 –1 1 –1 –1 –1 1 1 1 –1 1 –1 –1 –1 1 –1 –1 1 –1 1 1 1 –1 –1 –1 1 –1 –1 –1 –1 1 –1 –1 1 –1 1 1 1 –1 –1 –1 1 –1 1 1 1 –1 1 1 –1 1 1 1 1 –1 –1 –1 1 –1 –1 –1 –1 1 –1 –1 1 –1 –1 –1 –1 1 1 1 –1 1 –1 –1 –1 1 –1 –1 1 –1 1 1 1 –1 –1 –1 1 –1 –1 –1 –1 1 –1 –1 1 –1 –1 –1 –1 1 1 1 –1 1 –1 –1 –1 1 –1 –1 1 –1 –1 –1 –1 1 1 1 –1 1 1 1 1 –1 1 1 –1 1 1 1 1 –1 –1 –1 1 –1 1 1 1 –1 1 1 –1 1 –1 –1 –1 1 1 1 –1 1 1 1 1 –1 1 1 1 –1 1 1 1 1 –1 1 1 –1 1 –1 –1 –1 1 1 1 –1 1 –1 –1 1 –1 –1 1 –1 –1 –1 –1 1 1 1 –1 1 1 1 1 –1 1 1 –1 1 –1 –1 –1 1 1 1 –1 1 –1 –1 –1 1 –1 –1 1 –1 1 1 1 –1 –1 –1 1 –1 –1 –1 –1 1 –1 –1 1 –1 –1 –1 –1 1 1 1 1 –1 –1 –1 1 –1 –1 1 –1 –1 –1 –1 1 –1 –1 1 –1 –1 –1 –1 1 1 1 –1 1 1 1 1 –1 1 1 –1 1 –1 –1 –1 1 1 1 –1 1 –1 –1 –1 1 –1 –1 1 –1 –1 –1 –1 1 –1 –1 1 –1 1 1 1 –1 –1 –1 1 –1 –1 –1 –1 1 –1 –1 1 –1 1 1 –1 1 –1 –1 –1 –1 1 1 1 –1 1 –1 –1 –1 1 –1 –1 1 –1 –1 –1 –1 1 1 1 –1 1 1 1 1 –1 1 1 –1 1 –1 –1 –1 1 1 1 –1 1 –1 1 –1 –1 –1 1 –1 –1 1 –1 1 1 1 –1 –1 –1 1 –1 1 1 1 –1 1 1 –1 1 1 1 1 –1 –1 –1 1 –1 –1 –1 –1 1 –1 –1 1 –1 1 1 1 –1 –1 –1 1 –1 1 1 1 –1 1 1 –1 1 –1 –1 –1 1 1 1 –1 1 1 1 1 –1 1 1 –1 1 1 1 1 –1 –1 –1 1 –1 1 1 1 –1 1 1 –1 1 1 1 1 –1 –1 –1 1 –1 –1 –1 –1 1 –1 –1 1 –1 –1 –1 1 1 1 –1 1 –1 –1 –1 1 –1 –1 1 –1 1 1 1 –1 –1 –1 1 –1 –1 –1 –1 1 –1 –1 1 –1 1 1 1 –1 1 1 –1 1 1 1 1 –1 –1 –1 1 –1 –1 –1 –1 1 –1 1 1 1 –1 –1 –1 1 –1 –1 –1 –1 1 –1 –1 1 –1 –1 –1 –1 1 1 1 –1 1 –1 –1 –1 1 –1 –1 1 –1 –1 –1 –1 1 1 1 –1 1 1 1 1 –1 1 1 –1 1 1 1 1 –1 –1 –1 1 –1 1 1 1 –1 1 1 –1 1 –1 –1 –1 1 1 1 –1 1 1 1 1 –1 1 1 –1 1 –1 –1 –1 1 1 1 –1 1 1 –1 1 –1 –1 –1 1 1 1 –1 1 1 1 1 –1 1 1 –1 1 –1 –1 –1 1 1 1 –1 1 –1 –1 –1 1 –1 1 1 1 –1 –1 –1 1 –1 1 1 1 –1 1 1 –1 1 1 1 1 –1 –1 –1 1 –1 1 1 1 –1 1 1 –1 1 –1 –1 –1 1 –1 –1 –1 –1 1 –1 –1 1 –1 –1 –1 –1 1 1 1 –1 1 –1 –1 –1 –1 1 1 1 –1 1 –1 –1 –1 1 –1 –1 1 –1 –1 –1 –1 1 1 1 –1 1 1 1 1 –1 1 1 –1 1 1 1 1 –1 –1 –1 1 –1 1 1 1 –1 1 1 –1 1 –1 –1 –1 1 1 1 –1 1 1 1 1 –1 1 1 –1 1 –1 –1 –1 1 1 1 –1 1 1 –1 1 –1 –1 –1 1 –1 –1 1 –1 –1 –1 –1 1 1 1 –1 1 –1 –1 1 1 1 –1 1 1 1 1 –1 1 1 –1 1 1 1 1 –1 –1 –1 1 –1 1 1 1 –1 1 1 –1 1 –1 –1 –1 1 1 1 –1 1 1 1 1 –1 1 1 –1 1 –1 –1 –1 1 1 1 –1 1 –1 –1 1 –1 –1 1 –1 1 1 1 1 –1 –1 –1 1 –1 1 1 1 –1 1 1 –1 1 1 1 1 –1 –1 –1 1 –1 –1 –1 –1 1 –1 –1 1 –1 1 1 1 –1 –1 –1 1 –1 –1 1 –1 1 1 1 –1 1 1 –1 1 –1 –1 –1 1 1 1 –1 1 1 1 1 –1 1 1 –1 1 1 1 1 –1 –1 –1 1 –1 1 1 1 –1 1 1 –1 1 –1 –1 –1 1 –1 –1 1 –1 –1 –1 –1 1 –1 –1 1 –1 1 1 1 –1 –1 –1 1 –1 –1 1 –1 1 1 1 –1 1 1 –1 1 1 1 1 –1 –1 –1 1 1 1 –1 1 1 1 –1 –1 –1 1 –1 –1 1 –1 1 1 1 –1 –1 –1 1 –1 1 –1 –1 1 –1 –1 –1 –1 1 1 1 –1 1 –1 –1 –1 1 –1 –1 1 –1 –1 –1 –1 1 1 1 –1 1 1 1 1 –1 1 1 –1 1 –1 –1 –1 1 –1 1 1 1 –1 1 –1 –1 –1 1 –1 –1 1 –1 1 1 1 –1 –1 –1 1 –1 1 –1 –1 –1 –1 1 –1 –1 1 –1 1 1 1 –1 –1 –1 1 –1 1 1 1 –1 1 –1 1 1 –1 1 1 1 1 –1 –1 –1 1 –1 –1 –1 –1 1 –1 –1 1 –1 –1 –1 –1 1 1 1 –1 1 –1 –1 –1 1 –1 –1 1 –1 1 1 1 –1 –1 –1 1 –1 –1 1 –1 1 1 1 –1 1 –1 –1 –1 1 –1 –1 1 –1 –1 –1 –1 1 1 1 –1 1 –1 1 –1 –1 –1 1 –1 –1 1 –1 –1 –1 –1 1 1 1 –1 1 1 1 1 –1 1 1 –1 1 1 1 1 –1 –1 –1 1 –1 1 1 –1 1 1 1 –1 –1 –1 1 –1 1 1 1 1 –1 1 1 –1 1 –1 –1 –1 1 1 1 –1 1 –1 –1 1 –1 –1 –1 –1 1 1 1 –1 1 1 1 1 –1 1 1 –1 1 –1 –1 –1 1 1 1 –1 1 –1 –1 –1 1 –1 1 –1 1 1 1 –1 –1 –1 1 –1 –1 –1 –1 1 –1 –1 1 –1 –1 –1 –1 1 1 1 –1 1 –1 –1 –1 1 –1 –1 1 –1 –1 –1 –1 1 1 1 –1 1 1 1 1 –1 1 1 –1 1 1 1 1 –1 –1 –1 1 –1 1 1 1 –1 1 1 –1 1 –1 –1 –1 1 1 1 –1 1 1 1 1 –1 1 1 –1 1 –1 –1 –1 1 1 1 –1 1 1 –1 1 –1 –1 –1 1 1 1 –1 1 –1 –1 –1 1 –1 –1 1 –1 –1 –1 –1 1 1 1 –1 1 –1 –1 –1 1 –1 –1 1 –1 –1 –1 –1 1 1 1 –1 1 1 1 1 –1 1 1 –1 1 1 1 1 –1 –1 –1 1 –1 1 1

1 –1 1 1 –1 1 –1 –1 –1 1 1 1 –1 1 1 1 1 –1 1 1 –1 1 1 1 1 –1 –1 –1 1 –1 1 1 1 –1 1 1 –1 1 1 1 1 –1 –1 –1 1 –1 –1 –1 –1 1 –1 –1 1 –1 1 1 1 –1 –1 –1 1 –1 1 1 1 –1 1 1 –1 1 –1 –1 –1 1 1 1 –1 1 1 1 1 –1 1 1 –1 1 –1 –1 –1 1 1 1 –1 1 –1 –1 –1 1 –1 –1 1 –1 –1 –1 –1 1 1 1 –1 1 1 1 1 –1 1 1 –1 1 –1 –1 –1 1 1 1 –1 1 –1 –1 –1 1 –1 –1 1 –1 –1 1 –1 1 1 1 –1 –1 –1 1 –1 –1 –1 –1 1 –1 –1 1 –1 –1 –1 –1 1 1 1 –1 1 –1 –1 –1 1 –1 –1 1 –1 –1 –1 –1 1 1 1 –1 1 1 1 1 –1 1 1 –1 1 1 1 1 –1 –1 –1 1 –1 1 1 1 –1 1 1 –1 1 –1 –1 –1 1 1 1 –1 1 1 1 1 –1 1 1 –1 1 –1 –1 –1 1 1 1 –1 1 –1 –1 –1 1 –1 –1 1 –1 –1 –1 –1 1 1 1 –1 1 1 1 1 –1 1 1 –1 1 1 1 1 –1 –1 –1 1 –1 1 1 –1 1 1 1 –1 –1 –1 1 –1 1 1 1 –1 1 1 –1 1 –1 –1 –1 1 1 1 –1 1 1 1 1 –1 1 1 –1 1 1 –1 1 1 1 1 –1 –1 –1 1 –1 1 1 1 –1 1 1 –1 1 1 1 1 –1 –1 –1 1 –1 –1 –1 –1 1 –1 –1 1 –1 1 1 1 –1 –1 –1 1 –1 1 1 1 –1 1 1 –1 1 1 1 1 –1 –1 –1 1 1 1 –1 1 1 1 1 –1 –1 –1 1 –1 –1 1 –1 –1 –1 –1 1 1 –1 1 –1 –1 –1 1 –1 –1 1 –1 1 1 1 –1 –1 –1 1 –1 –1 –1 –1 1 –1 –1 1 –1 1 1 1 –1 –1 –1 1 –1 1 1 1 –1 1 1 –1 1 1 1 1 –1 –1 –1 1 –1 –1 –1 –1 1 –1 –1 1 –1 1 1 1 –1 –1 –1 1 –1 1 1 1 –1 1 1 –1 1 –1 –1 –1 1 1 1 –1 1 1 1 1 –1 1 1 –1 1 1 1 1 –1 –1 –1 1 –1 1 1 1 –1 1 1 –1 1 1 1 1 –1 –1 –1 1 –1 –1 –1 –1 1 –1 –1 1 –1];

sequence (96): G_2048(8,:)=[–1 –1 –1 1 1 1 –1 1 –1 –1 –1 1 –1 –1 1 –1 1 1 1 –1 –1 –1 1 –1 –1 –1 –1 1 –1 –1 1 –1 1 1 1 –1 –1 –1 1 –1 1 1 1 –1 1 1 –1 1 1 1 1 –1 –1 –1 –1 1 –1 –1 –1 –1 1 –1 –1 1 –1 –1 –1 –1 1 1 1 –1 1 –1 –1 –1 1 –1 –1 1 –1 1 1 1 –1 –1 –1 1 –1 –1 –1 –1 1 –1 –1 1 –1 –1 –1 –1 1 1 1 –1 1 –1 –1 –1 1 –1 –1 –1 –1 1 1 1 –1 1 1 1 1 –1 1 1 –1 1 –1 –1 –1 1 1 1 –1 1 –1 –1 –1 1 –1 –1 1 –1 1 1 1 –1 –1 –1 1 –1 1 –1 –1 –1 –1 1 –1 –1 1 –1 1 1 1 –1 –1 –1 1 –1 1 1 1 –1 1 1 –1 1 1 1 1 –1 –1 –1 1 –1 –1 –1 –1 1 –1 –1 1 –1 1 1 1 –1 –1 –1 1 –1 1 1 1 –1 1 1 –1 1 –1 –1 –1 1 1 1 1 –1 1 1 –1 1 1 1 1 –1 –1 –1 1 –1 1 1 1 –1 1 1 –1 1 1 1 1 –1 –1 –1 1 –1 –1 –1 –1 1 –1 –1 1 –1 1 1 1 –1 –1 –1 1 –1 1 1 1 –1 1 1 –1 1 –1 –1 –1 1 1 1 1 –1 1 1 1 1 –1 1 1 –1 1 –1 –1 –1 1 1 1 –1 1 –1 –1 –1 1 –1 –1 1 –1 –1 –1 –1 1 1 1 –1 1 1 1 1 –1 1 1 –1 1 –1 –1 –1 1 1 1 –1 1 1 –1 1 –1 –1 –1 1 1 1 1 –1 1 1 1 1 –1 1 1 –1 1 1 1 1 –1 –1 –1 1 –1 1 1 1 –1 1 1 –1 1 1 1 1 –1 –1 –1 1 –1 –1 –1 –1 1 –1 –1 1 –1 1 1 1 –1 1 1 –1 1 –1 –1 –1 1 1 1 –1 1 1 1 1 –1 1 1 –1 1 1 1 1 –1 1 1 –1 1 1 1 1 –1 –1 –1 1 –1 –1 –1 1 1 1 –1 1 1 –1 1 1 1 1 –1 –1 –1 1 –1 –1 –1 –1 1 –1 –1 1 –1 –1 1 –1 1 1 1 –1 1 1 –1 1 1 1 1 –1 –1 –1 1 –1 –1 –1 1 1 1 –1 1 –1 –1 1 –1 –1 –1 –1 1 –1 –1 1 –1 –1 1 –1 1 1 1 –1 –1 –1 1 –1 1 1 1 –1 1 1 –1 1 –1 –1 –1 1 1 1 –1 1 1 1 1 –1 1 1 –1 1 1 1 1 –1 –1 –1 1 –1 1 1 1 –1 1 1 –1 1 1 1 1 –1 –1 –1 1 –1 –1 1 –1 1 1 1 –1 1 1 –1 1 –1 –1 –1 1 1 1 –1 1 1 1 1 –1 1 1 –1 1 1 1 1 –1 –1 –1 1 –1 1 1 1 –1 1 1 –1 1 1 1 1 –1 –1 –1 1 –1 –1 –1 –1 1 –1 1 1 1 –1 1 1 –1 1 –1 –1 –1 1 1 1 –1 1 1 1 1 –1 1 1 –1 1 –1 –1 –1 –1 1 1 1 –1 1 –1 –1 –1 1 –1 –1 1 –1 –1 1 –1 1 1 1 –1 1 1 –1 1 1 1 1 –1 –1 –1 1 –1 1 1 1 –1 1 1 –1 1 1 1 1 –1 1 1 –1 1 –1 –1 –1 1 1 1 –1 1 1 1 1 –1 1 1 –1 1 1 1 1 –1 –1 –1 1 –1 –1 1 –1 1 1 1 –1 1 –1 –1 –1 1 –1 –1 1 –1 –1 –1 –1 1 1 1 –1 1 1 1 1 –1 1 1 –1 1 –1 –1 –1 1 1 1 –1 1 –1 –1 –1 1 –1 –1 1 –1 –1 –1 –1 1 1 1 –1 1 –1 –1 1 1 1 –1 1 –1 –1 –1 1 –1 –1 1 –1 –1 –1 –1 1 –1 –1 1 –1 1 1 1 –1 1 1 –1 1 1 1 1 –1 –1 –1 1 –1 –1 –1 –1 1 –1 –1 1 –1 –1 1 –1 1 1 1 –1 –1 –1 1 –1 1 1 1 –1 1 1 –1 1 –1 –1 –1 1 1 1 –1 1 –1 –1 1

1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 −1 1 1 1 1 −1 1 1 −1 1 1 1 1 −1 −1 −1 1 −1 1 1 1 −1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 −1 1 1 1 −1 1 1 −1 1 −1 −1 −1 1 1 1 −1 1 −1 −1 −1 1 −1 −1 1 −1 −1 −1 −1 1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 −1 1 1 −1 1 1 1 1 −1 −1 −1 1 −1 1 1 1 −1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 −1 −1 −1 1 1 1 −1 1 1 1 −1 1 1 −1 1 −1 −1 −1 1 1 1 −1 1 −1 −1 −1 1 −1 −1 1 −1 1 −1 −1 −1 −1 1 1 1 −1 1 1 1 1 −1 1 1 −1 1 −1 −1 −1 1 1 1 −1 1 −1 −1 −1 1 −1 −1 1 −1 1 1 1 −1 −1 −1 1 −1 −1 −1 1 −1 −1 1 −1 −1 −1 −1 1 1 1 −1 1 −1 −1 −1 1 −1 −1 1 −1 −1 −1 −1 1 1 1 −1 1 1 1 1 −1 1 1 −1 1 1 −1 1 −1 −1 −1 1 1 1 −1 1 −1 −1 −1 1 1 1 −1 1 −1 −1 −1 1 −1 −1 1 −1 1 1 1 −1 −1 −1 1 −1 −1 1 −1 −1 −1 −1 1 −1 −1 1 −1 1 1 1 −1 −1 −1 1 −1 1 1 1 −1 1 1 −1 1 1 1 1 −1 −1 −1 1 −1 −1 −1 −1 1 −1 −1 1 −1 −1 1 −1 −1 −1 −1 1 1 1 −1 1 −1 −1 −1 1 −1 −1 1 −1 1 1 1 −1 −1 −1 1 −1 −1 −1 −1 1 −1 −1 1 −1 −1 −1 −1 1 1 1 −1 1 −1 −1 1 −1 −1 −1 −1 1 1 1 −1 1 1 1 −1 1 −1 −1 1 −1 −1 −1 −1 1 1 1 −1 1 1 1 1 −1 1 1 −1 1 1 1 1 −1 −1 −1 1 −1 1 1 1 −1 1 1 −1 1 −1 −1 −1 1 1 1 −1 1 1 1 1 −1 1 1 −1 1 −1 1 −1 −1 −1 1 1 1 −1 1 −1 −1 1 1 1 −1 1 −1 −1 −1 1 −1 −1 −1 −1 1 −1 1 −1 1 −1 −1 1 −1 1 1 1 −1 −1 −1 1 −1 −1 −1 −1 1 −1 −1 1 −1 −1 −1 −1 1 1 1 −1 1 −1 −1 1 −1 −1 −1 1 −1 −1 −1 −1 1 1 1 −1 1 −1 −1 1 −1 1 1 1 −1 −1 −1 1 −1 1 1 1 −1 1 1 −1 1 −1 1 1 1 1 1 1 1 −1 1 −1 −1 1 −1 −1 −1 1 1 1 −1 −1 1 −1 −1 1 −1 1 1 1 −1 1 1 −1 1 1 1 1 −1 1 1 −1 1 1 1 1 −1 −1 −1 1 −1 1 1 1 −1 1 1 −1 1 1 1 1 −1 −1 −1 1 −1 1 1 1 −1 1 −1 −1 −1 1 −1 1 1 1 −1 1 −1 1 1 −1 1 1 1 1 −1 −1 −1 1 −1 1 1 −1 1 −1 1 1 −1 1 1 1 1 −1 1 1 −1 1 −1 −1 −1 1 1 1 −1 1 −1 −1 1 −1 −1 −1 −1 1 −1 −1 −1 −1 1 −1 −1 1 1 −1 1 1 −1 1 1 1 1 −1 −1 −1 1 −1 −1 −1 −1 1 −1 −1 1 −1 1 1 1 −1 −1 −1 1 −1 1 1 1 −1 1 1 −1 1 1 1 1 −1 −1 −1 1 −1 −1 −1 −1 1 −1 −1 1 −1 1 −1 1 1 1 −1 1 1 1 1 −1 −1 −1 1 −1 1 1 1 −1 1 1 −1 1 1 1 1 −1 −1 −1 1 −1 1 1 1 −1 1 1 −1 1 1 1 1 −1 1 1 −1 1 1 1 1 −1 −1 −1 1 −1 1 1 1 −1 1 −1 1 1 −1 1 1 1 1 −1 −1 −1 1 −1 −1 −1 −1 1 −1 −1 1 −1 1 −1];

sequence (97): G352(1,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i 1i −1i 1 1i −1i −1 1 −1i −1 −1 1 −1 1i 1 1 −1i −1i −1i 1 1 −1 −1 −1i −1i 1 −1 1 −1i −1 1 −1 1 −1i −1 −1 1i 1i 1i −1 −1 −1 −1i −1i −1 1i −1i 1 −1 1 −1i −1 1 −1 1 −1i −1 −1 1i 1i 1i −1 −1];

sequence (98): G352(2,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1, 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1];

sequence (99): G352(3,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1];

sequence (100): G352(4,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 −1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i −1 1i −1i 1 −1 1 −1i −1 1 −1 1 −1i −1 −1 1i 1i 1i −1 −1];

sequence (101): G352(5,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1];

sequence (102): G352(6,:)=[−1 −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1];

sequence (103): G352(7,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

sequence (104): G352(8,:)=[−1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

sequence (105): G704(1,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1, 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i 1 1];

sequence (106): G704(2,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1, −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1

−1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 −1 −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

sequence (107): G704(3,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 −1 −1i −1i 1 1i −1i −1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

sequence (108): G704(4,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 1 −1 1 −1 1i 1 1 −1i −1i 1 1 −1 −1i −1i 1 1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1i 1 1 −1i −1i 1 1 1 1i 1i −1 −1i 1i −1 1 −1 1i 1 −1 1 −1 1i 1 1 −1i −1i 1 1];

sequence (109): G704(5,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1];

sequence (110): G704(6,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1 i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1 1i 1 1 −1 −1i −1i 1 1i −1i 1 −1 1 −1i −1 1 −1 1 −1i −1 −1 1i 1i 1i −1 −1 −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 −1 −1i 1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

sequence (111): G704(7,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

sequence (112): G704(8,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1 1i −1i 1 −1 1 −1i −1 1 −1 1 −1i −1 −1 1i 1i 1i −1 −1 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i 1 1 −1 −1i −1i 1 1i −1i 1 −1 1 −1i −1 1 −1 1 −1i −1 −1 1i 1i 1i −1 −1 −1i −1i 1 1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1];

sequence (113): G_1056(1,:)=[1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1 1 −1 1 −1 1 −1i −1 −1 1i 1i 1i −1 −1 −1 −1i −1i 1 1i −1i 1 −1 1 −1i −1 −1 1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 −1 1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i −1 −1i 1i −1 1 −1 1i 1 −1 1 −1 1i 1 1 −1i −1i −1i 1 1 1 1i 1i −1 −1i 1i −1 1 −1

1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 1 −1 1i 1 1 −1i −1i 1i 1 1 −1 −1i −1i 1 1i −1i 1 −1 1 1 −1i −1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 1 −1 1 −1i −1 −1 1i −1 −1 1i 1i 1i −1 −1 −1 −1i −1i 1 1i −1i 1 −1 1 −1i −1 −1 1 −1 1i 1 1 −1i −1i −1i 1 1 1 1i 1i −1 −1i −1 1 −1 1i 1 −1 1 −1 1i 1 1 −1i −1i −1i 1 1 −1 −1i −1i 1 1i −1i 1 −1 1 −1i −1 −1 1 −1 1i −1i −1i 1 1 1i 1i −1 −1i 1i −1 1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1];

sequence (114): G_1056(2,:)=[1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1 1i −1i 1 −1 1 −1i −1 −1 1 −1 1i 1 1 −1i −1i 1 1 −1 −1i −1i 1 1i −1i 1 −1 1 −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 −1 −1i −1i 1 1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i −1i 1 1 −1 −1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 −1 −1i −1i 1 1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 −1 −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 1];

sequence (115): G_1056(3,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1 −1 1i 1 −1i −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 −1 −1i −1i 1 1i −1i 1 −1 1 −1 1i 1 1 −1i −1i −1i 1 1 −1 −1i −1i 1 1i −1i 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1 1i 1i 1i −1 −1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 −1 −1i −1i 1 1i −1 1i −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1

−1 1i 1i 1i −1 −1 −1 −1i −1i 1 1i −1 1i −1i −1 1 −1i −1 1 −1 1 −1 −1 1i 1i 1i −1 −1];

sequence (116): G_1056(4,:)=[1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 −1 −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i 1i 1 1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1i −1 1 −1 1 −1i −1 −1 1i −1 −1 1 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i 1i −1 −1i 1i −1 1 −1 1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −14i 1i −1 1 −1 1i 1 −1 1 −1 1i 1 1 −1i −1i −1i 1 1];

sequence (117): G_1056(5,:)=[1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −11 1 −1 −1i −1i −1i 1 1i −1i 1 −1 1 −1i −1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 −1 −1i −1i 1 1i −1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1i 1 −1 1 −1 1i 1 1 −1i −1i −1i 1 1 −1 −1i −1i 1 1i −1i 1 −1 1 −1i −1 1 −1 1 −1i −1 −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1i −1 −1i 1i −1 1 −1 1i 1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1i 1 1 1 1i 1i −1 −1i 1i −1 1 −1 1i 1 1 −1i 1 1 −1i −1i −1i 1 1 −1 −1i −1i 1 1i −1i 1 −1 1 −1i −1 −1 1 −1 1i 1 1 −1i −1 −1i 1 1];

sequence (118): G_1056(6,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i −1i 1 1 1 1i 1i −1 −1 i 1i −1 1 −1 1i 1 1 −1 1 −1 1 −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1 1 −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

sequence (119): G_1056(7,:)=[1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1 1 i 1i −1 −1i 1i −1 1 −1 1i 1 −1 1 −1 1i 1 1 −1i −1i −1i 1 1, 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1i 1 1 1 1i 1i −1 −1i 1i −1 1 −1 1 −1 1i 1 1 −1 1 −1i −1 −1 1i 1i 1i −1 −1 −1 −1i −1i 1 1i −1i 1 −1 1 −1i −1 1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i 1 −1 1 −1i −1 1 −1 1−1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −−1 1 −1 1i 1 1 −1i −1i −1i 1 1 −1 −1i −1i 1 1i −1i 1 −1 1 −1i −1 1 −1 1 −1i −1 −1 1i 1i 1i −1 −1];

sequence (120): G_1056(8,)=[1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 1 1i 1i −1 −1i 1i −1 1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i −1 −1i 1i −1 1 −1 1i 1 −1 1 −1 1i 1 1 −1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1, 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 −1i −1i −1i 1 1 −1 −1i 1 1i −1i 1 −1 1 −1i −1 1 −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1];

sequence (121): G1408(1,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1, 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i 1i 1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i 1i 1 1i −1i 1 −1 1 −1i −1 −1 1 −1 1i 1 1 −1i −1i −1i 1 1 1 1i −1 −1i 1i −1 1 −1 1i 1 −1 1 −1 1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1i 1i 1 1i 1i 1 −1 1 1i −1 −1 1 −1 1i 1 1 1i 1i 1i 1 1 1 1i 1i −1 1i 1i −1 1 −1 1i 1 −1 1 −1 1i 1 1 1i 1i 1i 1 1, −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1 1i 1i −1 1i 1i −1 1 −1 1i 1 1 −1 1 1i −1 −1 1i 1i 1i −1 −1 −1 1i 1i 1 1i 1i 1 −1 1 1i −1 1 −1 1 1i −1 −1 1i 1i 1i −1 −1 1 1i 1i −1 1i 1i −1 1i 1 1 −1 1 1i −1 −1 1i 1i 1i −1 −1 1 1i 1i −1 1i 1i −1 1 −1 1i 1 −1 1 −1 1i 1 1 1i 1i 1i 1 1 1 1i 1i −1 1i 1i −1 1i 1 1 −1 1 1i −1 −1 1i 1i 1i −1 −1 −1 1i 1i 1 1i 1i 1 −1 1 1i −1 1 −1 1 1i −1 −1 1i 1i 1i −1 −1 −1 1i 1i 1 1i 1i 1 −1 1 −1 1 1i −1 −1 1 −1 1i 1 1 1i 1i 1i 1 1 −1 1i 1i 1 1i 1i 1i 1 −1 1 1i −1 1 −1 1 1i −1 −1 1i 1i 1i −1 −1 1 1i 1i −1 1i 1i −1 1i 1 1 −1 1 1i −1 −1 1i 1i 1i −1 −1 −1 1i 1i 1 1i 1i 1 −1 1 1i −1 −1 1i 1i 1i −1 1];

sequence (122): G1408(2,:)=[−1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1i 1i 1 1i 1i 1 −1 1 1i −1 −1 1 −1 1i 1 1 1i 1i 1i 1 1 1 1i 1i −1 1i 1i −1 1 −1 1i 1 −1 1 −1 1i 1 1 1i 1i 1i 1 1, −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1 1i 1i −1 1i 1i −1 1 −1 1i 1 1 −1 1 1i −1 −1 1i 1i 1i −1 −1 −1 1i 1i 1 1i 1i 1 −1 1 1i −1 1 −1 1 1i −1 −1 1i 1i 1i −1 −1 1i −1 1i 1i −1 1 −1 1i 1 1 −1 1 1i −1 −1 1i 1i 1i −1 −1 1 1i 1i −1 1i 1i −1 1 −1 1i 1 −1 1 −1 1i 1 1 1i 1i 1i 1 1 1 1i 1i −1 1i 1i −1 1 −1 1i 1 1 −1 1 1i −1 −1 1i 1i 1i −1 −1 −1 1i 1i 1 1i 1i 1 −1 1 1i −1 1 −1 1 1i −1 −1 1i 1i 1i −1 −1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1 1i 1i −1 1i 1i −1 1 −1 1i 1 1 −1 1 1i −1 −1 1i 1i 1i −1 −1 −1 1i 1i 1 1i 1i 1 −1 1 1i −1 1 −1 1 1i −1 −1 1i 1i 1i −1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i 1i 1i −1 −1, 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 −1 1 −1 1 −1i −1 −1 1i 1i 1i −1 −1 −1 −1i −1i 1

1i −1i 1 −1 1 −1i −1 −1 1 −1 1i 1 1 −1i −1i −1i 1 1 1 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1i −1 −1i 1i −1 1 −1 1i 1 −1 1 −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 −1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i −1 −1i 1i −1 1 −1 1i 1 1 −1 1 −1i −1 −1 1i 1i 1i −1 −1 1 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1 1i 1 1 −1i −1i −1i 1 1 −1 −1i 1 1 −1 −1i −1i 1 1i −1i 1 −1 1 −1i −1 1 −1 1 −1i −1 −1 1i 1i 1i −1 −1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1];

sequence (123): G1408(3,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1 1i 1i −1 1i 1i −1 1 −1 1i 1 1 −1 1 1 1i −1 −1 1i 1i 1i −1 −1 −1 1i 1i 1 1i 1i 1 −1 1 1i −1 1 1 −1 1 1i −1 −1 1i 1i 1i −1 −1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1i 1i 1 1i 1i 1 −1 1 1i −1 −1 1 −1 1i 1 1 1i 1i 1i 1 1 1 1i 1i −1 1i 1i −1 1 −1 1i 1 −1 1 −1 1i 1 1 1i 1i 1i 1 1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1 1i 1i −1 1i 1i −1 1 −1 1i 1 1 −1 1 1i −1 −1 1i 1i 1i −1 −1 −1 1i 1i 1 1i 1i 1 −1 1 1i −1 1 −1 1 1i −1 −1 1i 1i 1i −1 −1 1 1i 1i −1 1i 1i −1 1 −1 1i 1 1 −1 1 1i −1 −1 1i 1i 1i −1 −1 1 1i 1i −1 1i 1i −1 1 −1 1i 1 −1 1 −1 1i 1 1 1i 1i 1i 1 1 1 1i 1i −1 1i 1i −1 1 −1 1i 1 1 −1 1 1i −1 −1 1i 1i 1i −1 −1 −1 1i 1i 1 1i 1i 1 −1 1 1i −1 1 −1 1 1i −1 −1 1i 1i 1i −1i 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −i −1 −1 1i 1i 1i −1 −1 −1 −1i −1i 1 1i −1i 1 −1 1 −1i −1 1 −1 1 −1i −1 −1 1i 1i 1i −1 −1];

sequence (124): G1408(4,:)=[1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i 1 −1 1 −1i −1 −1 1 −1 1i 1 1 −1i −1i 1 1 1 1i 1i −1 −1i 1i −1 1 −1 1i 1 −1 1

−1 1i 1 1 −1i −1i 1 1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1i 1i 1 1i 1i 1 −1 1 1i −1 −1 1 −1 1i 1 1 1i 1i 1i 1 1 1 1i 1i −1 1i 1i −1 1 −1 1i 1 −1 1 −1 1i 1 1 1i 1i 1i 1 1 1 1i 1i −1 1i 1i −1 1 −1 1i 1 1 −1 1 1i −1 −1 1i 1i 1i −1 −1 1 1i 1i −1 1i 1i −1 1 −1 1i 1 −1 1 −1 1i 1 1 1i 1i 1i 1 1 −1 1i 1i 1 1i 1i 1 −1 1 1i −1 −1 1 −1 1i 1 1 1i 1i 1i 1 1 1 1i 1i −1 1i 1i −1 1 −1 1i 1 −1 1 −1 1i 1 1 1i 1i 1i 1 1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1i 1i 1 1i 1i 1 −1 1 1i −1 −1 1 −1 1i 1 1 1i 1i 1i 1 1i 1i −1 1 −1 1i 1 −1 1 −1 1i 1 1 1i 1i 1i 1 1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1 1 1i 1i −1 1i 1 −1 1i 1 1 −1 1 1i −1 −1 1i 1i 1i −1 −1 −1 1i 1i 1 1i 1i 1 −1 1 1i −1 1 −1 1 1i −1 −1 1i 1i 1i −1 1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i 1i 1i −1 −1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1−1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1];

sequence (125): G1408(5,:)=[−1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1i 1i 1 1i 1i 1 −1 1 1i −1 −1 1 −1 1i 1 1 1i 1i 1i 1 1 1 1i 1i −1 1i 1i −1 1 −1 1i 1 −1 1 −1 1i 1 1 1i 1i 1i 1 1 1 1i 1i −1 1i 1i −1 1 −1 1i 1 1 −1 1 1i −1 −1 1i 1i 1i −1 −1 1 1i 1i −1 1i 1i −1 1 −1 1i 1 −1 1 −1 1i 1 1 1i 1i 1i 1 1 −1 1i 1i 1 1i 1i 1 −1 1 1i −1 −1 1 −1 1i 1 1 1i 1i 1i 1 1 1 1i 1i −1 1i 1i −1 1 −1 1i 1 −1 1 −1 1i 1 1 1i 1i 1i 1 1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1i 1i 1 1i 1i 1 −1 1 1i −1 −1 1 −1 1i 1 1 1i 1i 1i 1 1 1 1i 1i −1 1i 1i −1 1i 1 −1 1 −1 1i 1 1 1i 1i 1i 1 1 −1 1i 1i 1 1i 1i 1 −1

1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1 1i 1i −1 1i 1i −1 1 −1 1i 1 1 −1 1 1i −1 −1 1i 1i 1i −1 −1 −1 1i 1i 1 1i 1i 1 −1 1 1i −1 1 −1 1 1i −1 −1 1i 1i 1i −1 1 −1 −1i −1i 1 1i −1i 1 −1 1 −1i −1 −1 1 −1 1i 1 1 −1i −1i −1i 1 1 −1 −1i −1i 1 1i −1i −1 1 −1i −1 1 −1 1 −1i −1 −1 1i 1i 1i −1 −1 −1 −1i −1i 1 1i −1i 1 −1 1 −1i −1 −1 1 −1 1i 1 1 −1 1i −1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i −11 1i −1i 1 −1 1 −1i −1 1 −1i −1 −1 −1 1i 1i 1i −1 −1 1 1i 1i −1 −1 i 1−1 1 −1 1i 1 1 −1 1 −1i −1 −1 1i 1i 1i −1 −1 1 1i 1i −1 −1i 1i −1 1 −1 1i 1 −1 1 −1 1i 1 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1 1 −1i −1i 1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1 i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1 1 −1i −1i −1i 1 1 1 1i 1i −1 −1i 1i −1 1 −1 1i 1 −1 1 −1 1i 1 1 −1i −1i −1i 1 1];

sequence (126): G1408(6,:)=[−1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 −1 1 −1 1i 1 1 −1i −1i 1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i −1 1 1i 1i −1 −1i 1i −1 1 −1 1i −1 −1 1i 1i 1i −1 −1 −1 −1i −1i 1 1i −1i 1 −1 1 −1i −1 1 −1 1 −1i −1 −1 1i 1i 1i −1 1 1i 1i −1 −1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i 1i 1 1 1 1i 1i −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i 1i 1 1 −1 −1i −1i 1 1i −1i 1 −1 1 −1i −1 1 −1 1 −1i −1

−1 1 i 1i 1i −1 −1 −1 −1i −1i 1 1i −1i 1 −1 1 −1i −1 −1 1 −1 1i 1 1 −1i −1i −1i 1 1 1 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i 1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i 1 −1 1 −1 1i 1 1 −1i −1i −1i 1 1 1 1i 1i −1 −1i 1i −1 1 −1 1i 1 −1 1 −1 1i 1 1 −1i −1i 1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1 −1i −1i 1 1i −1i 1 −1 1 −1i 1 1 −1 1 −1i −1 −1 1i 1i 1i −1 −1 −1 1i 1i 1 1i 1i 1 −1 1 1i −1 −1 1 1 −1 1i 1 1 1i 1i 1i 1 1 −1 1i 1i 1 1i 1i −1 1 1i −1 1 −1 1 1i −1 −1 1i 1i 1i −1 −1 1 1i 1i −1 1i 1i −1 1 −1 1i 1 1 −1 1 1i −1 −1 1i 1i 1i −1 −1 −1 1i 1i 1 1i 1i 1 −1 1 1i −1 1 −1 1 1i −1 −1 1i 1i 1i −1 −1 1 1i 1i −1 1i 1i −1 1 1 −1 1i 1 1 −1 1 1i −1 −1 1i 1i 1i −1 −1 1 1i 1i −1 1i 1i −1 1 −1 1i 1 −1 1 −1 1i 1 1 1i 1i 1i 1 1 1 1i 1i −1 1i 1i −1 1 −1 1i 1 1 −1 1 1i −1 −1 1i 1i 1i −1 −1 −1 1i 1i 1 1i 1i 1 −1 1 1i −1 1 −1 1 1i −1 −1 1i 1i 1i −1 −1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1 1i 1i −1 1i 1i −1 1 −1 1i 1 1 −1 1 1i −1 −1 1i 1i 1i −1 −1 −1 1i 1i 1 1i 1i 1 −1 1 1i −1 1 −1 1 1i −1 −1 1i 1i 1i −1 −1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1i 1i 1 1i 1i 1 −1 1 1i −1 −1 1 −1 1i 1 1 1i 1i 1i 1 1 1 1i 1i −1 1i 1i −1 1 −1 1i 1 −1 1 −1 1i 1 1 1i 1i 1i 1 1];

sequence (127): G1408(7,:)=[−1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 −1 i 1i 1i −1 −1 −1 −1i −1i 1 1i −1i 1 −1 1 −1i −1 1 −1 1 −1i −1 −1 1i 1i 1i −1 −1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1 1i 1i −1 1i 1i −1 1 −1 1i 1 1 −1 1 1i −1 −1 1i 1i 1i −1 −1 −1 1i 1i 1 1i 1i 1 −1 1 1i −1 1 −1 1 1i −1 −1 1i 1i 1i −1 −1 1 1i 1i −1 1i 1i 1 1 −1 1i 1 1 −1 1 1i −1 −1 1i 1i 1i −1 −1 1 1i 1i −1 1i 1i −1 1 −1 1i 1 −1 1 −1 1i 1 1 1i 1i 1i 1 1 1 1i 1i −1 1i 1i −1 1i 1 1 −1 1 1i −1 −1 1i 1i 1i −1 −1 −1 1i 1i 1 1i 1i 1 −1 1 1i −1 1 −1 1 1i −1 −1 1i 1i 1i −1 −1 −1 1i 1i 1 1i 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1 1i 1i −1 1i 1i −1 1 −1 1i 1 1 −1 1 1i −1 −1 1i 1i 1i −1 −1 −1 1i 1i 1 1i 1i 1 −1 1 1i −1 1 −1 1 1i −1 −1 1i 1i 1i −1 −1 −1 −1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1i 1i 1 1i 1i 1 −1 1 1i −1 −1 1 −1 1i 1 1 1 1i 1i 1i 1 1 1 1i 1i −1 1i 1i −1 1 −1 1i 1 −1 1 −1 1i 1 1 1 1i 1i 1i 1 1 −1 −1i −1i 1 1i −1i 1 −1 1 −1i −1 −1 1 −1 1i 1 1 −1i −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1]; and sequence (128): G1408(8,:)=[1 1i 1i −1 1i 1i −1 1 −1 1i 1 1 −1 1 1i −1 −1 1i 1i 1i −1 −1 1 1i 1i −1 1i 1i −1 1 1 −1 1i 1 −1 1 −1 1i 1 1 1i 1i 1i 1 1 −1 1i 1i 1 1i 1i 1 −1 1 1i −1 −1 1 −1 1i 1 1 1i 1i 1i 1 1 1 1i 1i −1 1i 1i −1 1 −1 1i 1 −1 1 −1 1i 1 1 1i 1i 1 1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1i 1i 1 1i 1i 1 −1 1 1i −1 −1 1 −1 1i 1 1 1 i 1i 1i 1 1 1 1i 1i −1 1i 1i −1 1 −1 1i 1 −1 1 −1 1i 1 1 1i 1i 1i 1 1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1 1i 1i −1 1i 1i −1 1 −1 1i 1 1 −1 1 1i −1 −1 1i 1i 1i −1 −1

−1 1i 1i 1 1i 1i 1 −1 1 1i −1 1 −1 1 1i −1 −1 1i 1i 1i −1 −1 −1 1i 1i 1 1i 1i 1 −1 1 1i −1 −1 1 −1 1i 1 1 1i 1i 1i 1 1 −1 1i 1i 1 1i 1i 1 −1 1 1i −1 1 −1 1 1i −1 −1 1i 1i 1i −1 −1 1i 1i 1 1i 1i 1 −1 1 1i −1 −1 1 −1 1i 1 1 1i 1i 1i 1 1 1 1i 1i −1 1i 1i −1 1 −1 1i 1 −1 1 −1 1i 1 1 1i 1i 1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 −1 −1i −1i 1 1i −1i 1 −1 1 −1i −1 −1 1 −1 1i 1 1 −1i −1i 1 1 1 1i 1i −1 −1i 1i −1 1 −1 1i 1 −1 1 −1 1i 1 1 −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i 1 1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 −1 1i 1i 1i −1 −1 −1 −1i −1i 1 1i −1i 1 −1 1 −1i −1 1 −1 1 −1i −1 −1 1i 1i 1i −1 −1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1−1i 1 1i −1i 1 −1 1 −1i −1 −1 1 −1 1i 1 1 −1i −1i −1i 1 1 1 1i 1i −1 −1i 1i −1 1 −1 1i 1 −1 1−1 1i 1 1 −1i −1i −1i 1 −1 −1i −1i 1 1i −1i 1 −1 1 −1i −1 −1 1 −1 1i 1 1 −1i −1i −1i 1 1 −1 −1i 1 1 −1 −1i −1i 1 1i −1i 1 −1 1 −1i −1 1 −1 1 −1i −1 −1 1i 1i 1i −1 −1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 −1 −1i −1i 1 1i −1i 1 −1 1 −1i −1 −1 1 −1 1i 1 1 −1i −1i −1i 1 1 1 1i 1i −1 −1i 1i −1 1 −1 1i 1 −1 1 −1 1i 1 1 −1i −1i −1i 1 1 1 1i 1i −1 −1i 1i −1 1 −1 1i 1 1 −1 1 −1i −1 −1 1i 1i 1i −1 −1 1 1i 1i −1 −1i 1i −1 1 −1 1i 1 −1 1 −1 1i 1 1 −1i −1i −1i 1 1 1i 1i −1 −1i 1i −1 1 −1 1i 1 1 −1 1 −1i −1 1i 1i 1i −1 −1 −1 −1i −1i 1 1i −1i 1 −1 1 −1i −1 1 −1 1 −1i 1i 1i −1 −1].

What is claimed is:

1. A data transmission method, wherein one or more bonding channels are used in transmitting data and each bonding channel comprises a plurality of subcarriers, the method comprising:

generating a bit sequence, wherein a length of the bit sequence is determined based on a quantity of the one or more bonding channels and a quantity of subcarriers comprised in each bonding channel;

generating a physical layer protocol data unit (PPDU) using the bit sequence, wherein the PPDU comprises an enhanced directional multi-gigabit (EDMG) modulation field that comprises a channel estimation field (CEF), and the CEF comprises a CEF sequence derived from the bit sequence; and transmitting the PPDU to a receiving device for channel estimation by the receiving device.

2. The data transmission method of claim 1, further comprising:

mapping the bit sequence to a subcarrier by a discrete Fourier transform (DFT) module to obtain the CEF sequence.

3. The data transmission method of claim 2, further comprising:

performing inverse fast Fourier transform (IFFT) by an IFFT module on the CEF sequence.

4. The data transmission method of claim 3, wherein the plurality of subcarriers is mapped by the DFT module to a central position of frequency resources of the IFFT module to reduce a peak to average power ratio (PAPR).

5. The data transmission method of claim 1, wherein the PPDU comprises a pre-EDMG modulation field and the EDMG modulation field, and wherein the pre-EDMG modulation field is used to carry data compatible with an existing 60 GHz WLAN standard.

6. The data transmission method of claim 5, wherein the quantity of the one or more bonding channels is 1 and the quantity of subcarriers is 512, and wherein the CLE sequence is a Golay sequence of a length 512.

7. The data transmission method of claim 1, wherein the CEF sequence is generated by using a generation register as follows:

$$A_0(n)=\delta(n) \quad \text{formula (1);}$$

$$B_0(n)=\delta(n) \quad \text{formula (2);}$$

$$A_k(n)=W_k A_{k-1}(n)+B_{k-1}(n-D_k) \quad \text{formula (3); and}$$

$$B_k(n)=W_k A_{k-1}(n)-B_{k-1}(n-D_k) \quad \text{formula (4),}$$

wherein,

A is a first sequence corresponding to a first spatial stream,

B is a second sequence corresponding to a second spatial stream, n is the quantity of subcarriers, K is a quantity of register levels, W is a register parameter, and D is a delay module.

8. The data transmission method of claim 7, wherein:

the first sequence is the CEF sequence;

the second sequence is the CEF sequence; or the CEF sequence is obtained by reversely arranging the first sequence and the second sequence.

9. A data transmission apparatus for transmitting data, wherein one or more bonding channels are used in transmitting the data and each bonding channel comprises a plurality of subcarriers, the data transmission apparatus comprising:

a generation circuit configured to:

generate a bit sequence, wherein a length of the bit sequence is determined based on a quantity of the one or more bonding channels and a quantity of subcarriers comprised in each bonding channel, and generate a physical layer protocol data unit (PPDU) using the bit sequence, wherein the PPDU comprises an enhanced directional multi-gigabit (EDMG) modulation field that comprises a channel estimation field (CEF), and the CEF comprises a CEF sequence derived from the bit sequence; and a sending circuit configured to transmit the PPDU to a receiving device for channel estimation by the receiving device.

10. The data transmission apparatus of claim 9, further comprising a discrete Fourier transform (DFT) module configured to map the bit sequence to a subcarrier to obtain the CEF sequence.

11. The data transmission apparatus of claim 10, further comprising an inverse fast Fourier transform (IFFT) module configured to perform IFFT on the CEF sequence.

12. The data transmission apparatus of claim 11, wherein the plurality of subcarriers is mapped by the DFT module to a central position of frequency resources of the IFFT module to reduce a peak to average power ratio (PAPR).

13. The data transmission apparatus of claim 9, wherein the PPDU comprises a pre-EDMG modulation field and the EDMG modulation field, and wherein the pre-EDMG modulation field is used to carry data compatible with an existing 60 GHz WLAN standard.

14. The data transmission apparatus of claim 13, wherein the quantity of the one or more bonding channels is 1 and the quantity of subcarriers is 512, and wherein the CLE sequence is a Golay sequence of a length 512.

15. The data transmission apparatus of claim 9, further comprising a generation register configured to generate the CEF sequence as follows:

$$A_0(n)=\delta(n) \quad \text{formula (1);}$$

$$B_0(n)=\delta(n) \quad \text{formula (2);}$$

$$A_k(n)=W_kA_{k-1}(n)+B_{k-1}(n-D_k) \quad \text{formula (3); and}$$

$$B_k(n)=W_kA_{k-1}(n)-B_{k-1}(n-D_k) \quad \text{formula (4),}$$

wherein,

A is a first sequence corresponding to a first spatial stream,

B is a second sequence corresponding to a second spatial stream, n is the quantity of subcarriers, K is a quantity of register levels, W is a register parameter, and D is a delay module.

16. The data transmission apparatus of claim 15, wherein:

the first sequence is the CEF sequence;

the second sequence is the CEF sequence; or the CEF sequence is obtained by reversely arranging the first sequence and the second sequence.

* * * * *